United States Patent
Cohen et al.

(10) Patent No.: US 9,583,141 B2
(45) Date of Patent: Feb. 28, 2017

(54) IMPLEMENTING AUDIO SUBSTITUTION OPTIONS IN MEDIA WORKS

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William H. Mangione-Smith, Kirkland, WA (US); John D. Rinaldo, Jr., Bellevue, WA (US); Clarence T. Tegreene, Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 898 days.

(21) Appl. No.: 12/156,122

(22) Filed: May 28, 2008

(65) Prior Publication Data
US 2008/0313233 A1    Dec. 18, 2008

Related U.S. Application Data

(63) Continuation-in-part of application No. 11/807,350, filed on May 25, 2007, now Pat. No. 8,910,033, and
(Continued)

(51) Int. Cl.
*G06F 17/00* (2006.01)
*G11B 27/034* (2006.01)
(Continued)

(52) U.S. Cl.
CPC .......... *G11B 27/034* (2013.01); *G11B 27/036* (2013.01); *G11B 27/28* (2013.01); *G11B 27/3027* (2013.01); *G11B 27/34* (2013.01)

(58) Field of Classification Search
CPC .... G06F 17/30017; G06F 17/24; G06F 21/62; G06F 2221/2113
(Continued)

(56) References Cited

U.S. PATENT DOCUMENTS 3,278,676 A    10/1966    Becker
3,713,148 A    1/1973     Cardullo et al.
(Continued)

FOREIGN PATENT DOCUMENTS

JP    2005-005960 A    1/2005
KR    10-2007-1012360 A    10/2007
(Continued)

OTHER PUBLICATIONS

Adobe Premiere Pro 1.5, Mar. 2005, Adobe Systems Inc.*
(Continued)

*Primary Examiner* — Scott Baderman
*Assistant Examiner* — Howard Cortes

(57) ABSTRACT

A classification method and system for possible content alteration of a media work may include criteria regarding content that is feasible for alteration. Such criteria may be maintained in records that are accessible to an interested party. Some embodiments may include a record of primary authorization rights applicable to a possible content alteration. A further embodiment feature may include a record of secondary authorization rights applicable to substitute altered content incorporated in a derivative version. Various exemplary techniques may be used to provide audio and/or visual substitution options in a derivative version of the media work in accordance with applicable alteration guidelines.

39 Claims, 103 Drawing Sheets

Related U.S. Application Data a continuation-in-part of application No. 11/807,352, filed on May 25, 2007, now Pat. No. 8,126,938, and a continuation-in-part of application No. 11/824,515, filed on Jun. 29, 2007, and a continuation-in-part of application No. 11/807,353, filed on May 25, 2007, which is a continuation-in-part of application No. 11/796,543, filed on Apr. 27, 2007, and a continuation-in-part of application No. 11/796,570, filed on Apr. 26, 2007, and a continuation-in-part of application No. 11/731,795, filed on Mar. 30, 3007, now Pat. No. 8,732,087, and a continuation-in-part of application No. 11/731,738, filed on Mar. 30, 2007, and a continuation-in-part of application No. 11/195,358, filed on Aug. 2, 2005, now Pat. No. 7,860,342, and a continuation-in-part of application No. 11/195,346, filed on Aug. 2, 2005, now abandoned, and a continuation-in-part of application No. 11/173,990, filed on Jul. 1, 2005, and a continuation-in-part of application No. 11/174,432, filed on Jul. 1, 2005, application No. 12/156,122, which is a continuation-in-part of application No. 12/156,121, filed on May 28, 2008, and a continuation-in-part of application No. 12/154,962, filed on May 27, 2008, and a continuation-in-part of application No. 12/154,973, filed on May 27, 2008.

(51) Int. Cl.
  *G11B 27/036* (2006.01)
  *G11B 27/28* (2006.01)
  *G11B 27/30* (2006.01)
  *G11B 27/34* (2006.01)

(58) Field of Classification Search
  USPC .... 715/700, 760, 733, 741; 725/32; 386/283
  See application file for complete search history.

(56) References Cited

U.S. PATENT DOCUMENTS

| | | | |
|---|---|---|---|
| 4,467,349 A | 8/1984 | Maloomian | |
| RE32,662 E | 5/1988 | Pennington | |
| 4,872,056 A | 10/1989 | Hicks et al. | |
| 5,029,014 A | 7/1991 | Lindstrom | |
| 5,060,171 A | 10/1991 | Steir et al. | |
| 5,220,657 A * | 6/1993 | Bly et al. | 711/152 |
| 5,343,386 A | 8/1994 | Barber | |
| 5,345,313 A | 9/1994 | Blank | |
| 5,428,732 A | 6/1995 | Hancock et al. | |
| 5,434,678 A | 7/1995 | Abecassis | |
| 5,469,536 A | 11/1995 | Blank | |
| 5,481,664 A | 1/1996 | Hiroya et al. | |
| 5,623,587 A | 4/1997 | Bulman | |
| 5,629,736 A | 5/1997 | Haskell et al. | |
| 5,629,980 A | 5/1997 | Stefik et al. | |
| 5,640,560 A | 6/1997 | Smith | |
| 5,680,619 A | 10/1997 | Gudmundson et al. | |
| 5,682,326 A | 10/1997 | Klingler et al. | |
| 5,708,709 A | 1/1998 | Rose | |
| 5,708,766 A | 1/1998 | Goto | |
| 5,712,964 A | 1/1998 | Kamada et al. | |
| 5,742,816 A | 4/1998 | Barr et al. | |
| 5,748,956 A | 5/1998 | Lafer et al. | |
| 5,819,086 A | 10/1998 | Kroenke | |
| 5,828,402 A | 10/1998 | Collings | |
| 5,859,662 A | 1/1999 | Cragun et al. | |
| 5,861,880 A | 1/1999 | Shimizu et al. | |
| 5,892,900 A | 4/1999 | Ginter et al. | |
| 5,898,430 A | 4/1999 | Matsuzawa et al. | |
| 5,903,317 A | 5/1999 | Sharir et al. | |
| 5,933,498 A | 8/1999 | Schneck et al. | |
| 5,945,989 A * | 8/1999 | Freishtat et al. | 715/760 |
| 5,990,901 A * | 11/1999 | Lawton et al. | 345/581 |
| 5,991,782 A | 11/1999 | Miyagawa et al. | |
| 6,018,744 A | 1/2000 | Mamiya et al. | |
| 6,047,128 A | 4/2000 | Zander | |
| 6,067,399 A | 5/2000 | Berger | |
| 6,078,756 A | 6/2000 | Squilla et al. | |
| 6,084,590 A | 7/2000 | Robotham et al. | |
| 6,135,646 A | 10/2000 | Kahn et al. | |
| 6,154,172 A | 11/2000 | Piccionelli et al. | |
| 6,181,336 B1 | 1/2001 | Chiu et al. | |
| 6,181,364 B1 | 1/2001 | Ford | |
| 6,189,146 B1 * | 2/2001 | Misra et al. | 717/177 |
| 6,216,228 B1 | 4/2001 | Chapman et al. | |
| 6,226,793 B1 | 5/2001 | Kwoh | |
| 6,236,971 B1 | 5/2001 | Stefik et al. | |
| 6,253,193 B1 | 6/2001 | Ginter et al. | |
| 6,266,100 B1 | 7/2001 | Gloudemans et al. | |
| 6,297,853 B1 | 10/2001 | Sharir et al. | |
| 6,314,569 B1 | 11/2001 | Chernock et al. | |
| 6,317,795 B1 | 11/2001 | Malkin et al. | |
| 6,363,488 B1 | 3/2002 | Ginter et al. | |
| 6,385,592 B1 | 5/2002 | Angles et al. | |
| 6,388,682 B1 | 5/2002 | Kurtzberg et al. | |
| 6,389,402 B1 | 5/2002 | Ginter et al. | |
| 6,394,356 B1 | 5/2002 | Zagami | |
| 6,400,374 B2 | 6/2002 | Lanier | |
| 6,418,439 B1 | 7/2002 | Papierniak et al. | |
| 6,427,140 B1 | 7/2002 | Ginter et al. | |
| 6,446,093 B2 | 9/2002 | Tabuchi | |
| 6,466,956 B1 | 10/2002 | Cho et al. | |
| 6,484,182 B1 | 11/2002 | Dunphy et al. | |
| 6,493,744 B1 | 12/2002 | Emens et al. | |
| 6,505,169 B1 | 1/2003 | Bhagavath et al. | |
| 6,519,770 B2 | 2/2003 | Ford | |
| 6,542,925 B2 | 4/2003 | Brown et al. | |
| 6,567,569 B1 | 5/2003 | Claessens | |
| 6,574,609 B1 | 6/2003 | Downs et al. | |
| 6,574,793 B1 | 6/2003 | Ngo et al. | |
| 6,577,746 B1 | 6/2003 | Evans et al. | |
| 6,628,811 B1 | 9/2003 | Nagao et al. | |
| 6,654,814 B1 | 11/2003 | Britton et al. | |
| 6,675,387 B1 | 1/2004 | Boucher et al. | |
| 6,704,930 B1 | 3/2004 | Eldering et al. | |
| 6,719,565 B1 * | 4/2004 | Saita et al. | 434/94 |
| 6,745,226 B1 | 6/2004 | Guedalia | |
| 6,772,340 B1 | 8/2004 | Peinado et al. | |
| 6,775,381 B1 | 8/2004 | Nelson et al. | |
| 6,779,117 B1 | 8/2004 | Wells | |
| 6,801,642 B2 | 10/2004 | Gorday et al. | |
| 6,807,534 B1 * | 10/2004 | Erickson | 705/51 |
| 6,816,628 B1 | 11/2004 | Sarachik et al. | |
| 6,825,859 B1 | 11/2004 | Severenuk et al. | |
| 6,829,368 B2 | 12/2004 | Meyer et al. | |
| 6,829,780 B2 | 12/2004 | Kraft et al. | |
| 6,850,252 B1 | 2/2005 | Hoffberg | |
| 6,903,756 B1 | 6/2005 | Giannini | |
| 6,912,571 B1 | 6/2005 | Serena | |
| 6,937,730 B1 | 8/2005 | Buxton | |
| 6,959,099 B2 | 10/2005 | Gutta et al. | |
| 6,970,602 B1 | 11/2005 | Smith et al. | |
| 6,972,856 B1 * | 12/2005 | Takahashi | H04N 1/00244 358/1.14 |
| 6,973,130 B1 | 12/2005 | Wee et al. | |
| 7,006,155 B1 | 2/2006 | Agarwala et al. | |
| 7,006,993 B1 | 2/2006 | Cheong et al. | |
| 7,032,014 B2 | 4/2006 | Thiyagarajan et al. | |
| 7,034,848 B2 | 4/2006 | Sobol | |
| 7,092,568 B2 | 8/2006 | Eaton | |
| 7,106,887 B2 | 9/2006 | Kinjo | |
| 7,109,993 B2 | 9/2006 | Peleg et al. | |
| 7,110,570 B1 | 9/2006 | Berenz et al. | |
| 7,120,250 B2 | 10/2006 | Candelore | |
| 7,133,845 B1 | 11/2006 | Ginter et al. | |
| 7,134,130 B1 | 11/2006 | Thomas | |
| 7,139,031 B1 | 11/2006 | Bray | |
| 7,162,690 B2 | 1/2007 | Gupta et al. | |
| 7,181,686 B1 | 2/2007 | Bahrs | |
| 7,181,758 B1 | 2/2007 | Chan | |

(56) References Cited

U.S. PATENT DOCUMENTS

| | | | |
|---|---|---|---|
| 7,184,047 B1 | 2/2007 | Crampton | |
| 7,200,801 B2 | 4/2007 | Agassi et al. | |
| 7,212,650 B2 | 5/2007 | Sumi | |
| 7,216,351 B1 | 5/2007 | Maes | |
| 7,227,567 B1 | 6/2007 | Beck et al. | |
| 7,230,653 B1 | 6/2007 | Overton et al. | |
| 7,251,048 B2 | 7/2007 | Cheatle et al. | |
| 7,284,040 B2 | 10/2007 | Kobayashi et al. | |
| 7,290,285 B2 | 10/2007 | McCurdy et al. | |
| 7,293,017 B2 | 11/2007 | Hurst-Hiller et al. | |
| 7,313,810 B1 | 12/2007 | Bell et al. | |
| 7,333,957 B2 | 2/2008 | Levy et al. | |
| 7,334,017 B2 | 2/2008 | Hawkes et al. | |
| 7,334,249 B1 | 2/2008 | Byers | |
| 7,346,585 B1 | 3/2008 | Alabraba et al. | |
| 7,360,230 B1 | 4/2008 | Paz et al. | |
| 7,370,343 B1 | 5/2008 | Ellis | |
| 7,380,258 B2 | 5/2008 | Durden et al. | |
| 7,389,473 B1 * | 6/2008 | Sawicki | G06F 17/211 715/237 |
| 7,391,432 B2 | 6/2008 | Terada | |
| 7,395,244 B1 | 7/2008 | Kingsford | |
| 7,406,434 B1 | 7/2008 | Chang et al. | |
| 7,406,658 B2 | 7/2008 | Brassell et al. | |
| 7,456,871 B2 | 11/2008 | Iida et al. | |
| 7,505,621 B1 | 3/2009 | Agrawal et al. | |
| 7,523,071 B2 | 4/2009 | Fox et al. | |
| 7,543,068 B2 | 6/2009 | Aaron et al. | |
| 7,548,794 B2 | 6/2009 | Vandergriff et al. | |
| 7,564,476 B1 | 7/2009 | Coughlan et al. | |
| 7,570,283 B2 | 8/2009 | Sato et al. | |
| 7,571,385 B2 | 8/2009 | Miller et al. | |
| 7,657,529 B2 | 2/2010 | Kaura et al. | |
| 7,668,242 B2 | 2/2010 | Sullivan et al. | |
| 7,668,345 B2 | 2/2010 | Kiyohara et al. | |
| 7,673,013 B2 | 3/2010 | Rudolph et al. | |
| 7,680,819 B1 | 3/2010 | Mellmer et al. | |
| 7,707,642 B1 | 4/2010 | Herbach et al. | |
| 7,725,812 B1 | 5/2010 | Balkus et al. | |
| 7,734,802 B1 * | 6/2010 | Gay | G06F 3/0481 709/231 |
| 7,735,144 B2 | 6/2010 | Pravetz et al. | |
| 7,752,548 B2 | 7/2010 | Mercer | |
| 7,755,645 B2 | 7/2010 | Sun et al. | |
| 7,761,922 B1 | 7/2010 | Baum et al. | |
| 7,769,416 B2 | 8/2010 | Wei et al. | |
| 7,770,220 B2 | 8/2010 | Fernstrom | |
| 7,782,993 B2 | 8/2010 | Lesser et al. | |
| 7,805,678 B1 * | 9/2010 | Niles et al. | 715/716 |
| 7,847,815 B2 | 12/2010 | Patel et al. | |
| 7,860,342 B2 | 12/2010 | Levien et al. | |
| 7,882,107 B2 | 2/2011 | Baader et al. | |
| 7,890,368 B2 | 2/2011 | Lambert et al. | |
| 7,895,617 B2 * | 2/2011 | Pedlow, Jr. | 725/32 |
| 7,895,620 B2 | 2/2011 | Haberman et al. | |
| 7,903,904 B1 | 3/2011 | Loeb et al. | |
| 7,913,273 B2 | 3/2011 | Del Beccaro et al. | |
| 7,917,924 B2 | 3/2011 | Haberman et al. | |
| 7,921,360 B1 * | 4/2011 | Sundermeyer | G06F 17/24 715/255 |
| 7,945,926 B2 | 5/2011 | Dempski et al. | |
| 7,974,970 B2 | 7/2011 | Leung et al. | |
| 8,006,186 B2 | 8/2011 | Kellock et al. | |
| 8,031,060 B2 | 10/2011 | Hoffberg et al. | |
| 8,099,660 B1 | 1/2012 | O'Sullivan et al. | |
| 8,126,938 B2 | 2/2012 | Cohen et al. | |
| 8,136,028 B1 | 3/2012 | Loeb et al. | |
| 8,180,826 B2 | 5/2012 | Hua et al. | |
| 8,224,950 B2 | 7/2012 | Humes | |
| 8,259,995 B1 | 9/2012 | Schendel et al. | |
| 8,281,339 B1 | 10/2012 | Walker et al. | |
| 8,285,070 B2 | 10/2012 | Panetta et al. | |
| 8,312,485 B2 | 11/2012 | Robson et al. | |
| 8,345,918 B1 | 1/2013 | Fleisher | |
| 8,347,396 B2 | 1/2013 | Grigsby et al. | |
| 8,363,890 B2 | 1/2013 | Ihara | |
| 8,368,745 B2 | 2/2013 | Nam et al. | |
| 8,375,302 B2 | 2/2013 | Oakley et al. | |
| 8,437,567 B2 | 5/2013 | Jeong et al. | |
| 8,459,807 B2 | 6/2013 | Herbert et al. | |
| 8,478,959 B1 | 7/2013 | Wyatt | |
| 8,498,413 B2 | 7/2013 | Kita et al. | |
| 8,553,928 B2 | 10/2013 | Kiya et al. | |
| 8,584,002 B2 | 11/2013 | Cave et al. | |
| 8,635,198 B1 | 1/2014 | McBrian | |
| 8,689,261 B2 | 4/2014 | Austin | |
| 8,694,604 B2 | 4/2014 | Cummins et al. | |
| 8,732,087 B2 | 5/2014 | Cohen et al. | |
| 8,739,017 B2 | 5/2014 | Glazer et al. | |
| 8,745,068 B2 | 6/2014 | Colombino et al. | |
| 8,755,058 B1 | 6/2014 | Jackson | |
| 8,775,918 B2 | 7/2014 | Livshin et al. | |
| 8,782,726 B1 | 7/2014 | Cox | |
| 2001/0014897 A1 | 8/2001 | Hata et al. | |
| 2001/0016820 A1 | 8/2001 | Tanaka et al. | |
| 2001/0023436 A1 | 9/2001 | Srinivasan et al. | |
| 2001/0033661 A1 | 10/2001 | Prokoski | |
| 2001/0033671 A1 | 10/2001 | Kearey | |
| 2001/0033674 A1 | 10/2001 | Chen et al. | |
| 2001/0034740 A1 | 10/2001 | Kerne | |
| 2001/0034742 A1 | 10/2001 | Stinson | |
| 2001/0041050 A1 | 11/2001 | Iwata et al. | |
| 2001/0044781 A1 | 11/2001 | Shutes | |
| 2002/0001395 A1 * | 1/2002 | Davis | G06F 21/10 382/100 |
| 2002/0007308 A1 | 1/2002 | Anderson et al. | |
| 2002/0010757 A1 | 1/2002 | Granik et al. | |
| 2002/0015514 A1 | 2/2002 | Kinjo | |
| 2002/0026638 A1 | 2/2002 | Eldering et al. | |
| 2002/0033842 A1 | 3/2002 | Zetts | |
| 2002/0073121 A1 | 6/2002 | Sano et al. | |
| 2002/0077986 A1 | 6/2002 | Kobata et al. | |
| 2002/0081003 A1 | 6/2002 | Sobol | |
| 2002/0081040 A1 | 6/2002 | Uchida | |
| 2002/0087403 A1 | 7/2002 | Meyers et al. | |
| 2002/0091725 A1 * | 7/2002 | Skok | 707/501.1 |
| 2002/0109707 A1 * | 8/2002 | Lao et al. | 345/700 |
| 2002/0129273 A1 | 9/2002 | Noonan | |
| 2002/0138843 A1 | 9/2002 | Samaan et al. | |
| 2002/0143972 A1 | 10/2002 | Christopoulos et al. | |
| 2002/0144262 A1 | 10/2002 | Plotnick et al. | |
| 2002/0146123 A1 | 10/2002 | Tian | |
| 2002/0146238 A1 | 10/2002 | Sugahara | |
| 2002/0147782 A1 | 10/2002 | Dimitrova et al. | |
| 2002/0162120 A1 | 10/2002 | Mitchell | |
| 2002/0169793 A1 | 11/2002 | Sweeney | |
| 2002/0178077 A1 | 11/2002 | Katz et al. | |
| 2002/0184183 A1 | 12/2002 | Cherry et al. | |
| 2002/0194195 A1 | 12/2002 | Fenton et al. | |
| 2002/0194595 A1 | 12/2002 | Miller et al. | |
| 2002/0198909 A1 | 12/2002 | Huynh et al. | |
| 2002/0199189 A1 | 12/2002 | Prijatel et al. | |
| 2003/0007700 A1 | 1/2003 | Gutta et al. | |
| 2003/0012409 A1 | 1/2003 | Overton et al. | |
| 2003/0018966 A1 | 1/2003 | Cook et al. | |
| 2003/0023598 A1 | 1/2003 | Janakiraman et al. | |
| 2003/0028432 A1 | 2/2003 | Troyansky et al. | |
| 2003/0028543 A1 | 2/2003 | Dusberger | |
| 2003/0028873 A1 | 2/2003 | Lemmons | |
| 2003/0033202 A1 | 2/2003 | Ogawa et al. | |
| 2003/0039464 A1 | 2/2003 | Davis et al. | |
| 2003/0058939 A1 | 3/2003 | Lee et al. | |
| 2003/0061111 A1 * | 3/2003 | Dutta et al. | 705/26 |
| 2003/0070167 A1 | 4/2003 | Holtz et al. | |
| 2003/0076321 A1 | 4/2003 | Clavadetscher | |
| 2003/0078828 A1 | 4/2003 | Basson et al. | |
| 2003/0093790 A1 | 5/2003 | Logan et al. | |
| 2003/0108240 A1 | 6/2003 | Gutta et al. | |
| 2003/0123701 A1 | 7/2003 | Dorrell et al. | |
| 2003/0126267 A1 * | 7/2003 | Gutta | G06F 17/30867 709/229 |
| 2003/0128343 A1 | 7/2003 | Crasnianski et al. | |
| 2003/0135464 A1 | 7/2003 | Mourad et al. | |
| 2003/0145323 A1 | 7/2003 | Hendricks et al. | |

(56) References Cited

U.S. PATENT DOCUMENTS

| | | |
|---|---|---|
| 2003/0156134 A1 | 8/2003 | Kim |
| 2003/0169906 A1 | 9/2003 | Gokturk et al. |
| 2003/0174837 A1 | 9/2003 | Candelore et al. |
| 2003/0184653 A1 | 10/2003 | Ohkubo |
| 2003/0191816 A1 | 10/2003 | Landress et al. |
| 2003/0196164 A1 | 10/2003 | Gupta et al. |
| 2003/0202124 A1 | 10/2003 | Alden |
| 2003/0208466 A1 | 11/2003 | Stern |
| 2003/0208469 A1 | 11/2003 | Stern |
| 2003/0210828 A1 | 11/2003 | Georgiev et al. |
| 2003/0214727 A1 | 11/2003 | Min et al. |
| 2003/0222994 A1 | 12/2003 | Dawson |
| 2003/0229549 A1 | 12/2003 | Wolinsky et al. |
| 2003/0229628 A1* | 12/2003 | Banerjee ............ G06F 17/30277 |
| 2003/0233438 A1 | 12/2003 | Hutchinson et al. |
| 2003/0236886 A1 | 12/2003 | Oren et al. |
| 2004/0001220 A1* | 1/2004 | Gorday ................ H04N 1/38 358/1.15 |
| 2004/0012540 A1 | 1/2004 | Treibitz et al. |
| 2004/0012601 A1 | 1/2004 | Sang, Jr. et al. |
| 2004/0017390 A1 | 1/2004 | Knowlton et al. |
| 2004/0045030 A1 | 3/2004 | Reynolds et al. |
| 2004/0046868 A1* | 3/2004 | Anderson et al. ....... 348/207.11 |
| 2004/0054923 A1 | 3/2004 | Seago et al. |
| 2004/0060067 A1 | 3/2004 | Yi |
| 2004/0073430 A1 | 4/2004 | Desai et al. |
| 2004/0073916 A1 | 4/2004 | Petrovic et al. |
| 2004/0078238 A1 | 4/2004 | Thomas et al. |
| 2004/0081338 A1 | 4/2004 | Takenaka |
| 2004/0085330 A1* | 5/2004 | Walker, Jr. .............. G06T 11/00 345/630 |
| 2004/0111467 A1 | 6/2004 | Willis |
| 2004/0111468 A1 | 6/2004 | Enomoto |
| 2004/0120584 A1 | 6/2004 | Jang et al. |
| 2004/0123131 A1* | 6/2004 | Zacks ................ H04N 1/32128 726/27 |
| 2004/0128309 A1 | 7/2004 | Gurney et al. |
| 2004/0139025 A1 | 7/2004 | Coleman |
| 2004/0139480 A1 | 7/2004 | Delpuch et al. |
| 2004/0156535 A1 | 8/2004 | Goldberg et al. |
| 2004/0158858 A1 | 8/2004 | Paxton et al. |
| 2004/0164996 A1 | 8/2004 | Criminisi et al. |
| 2004/0184073 A1 | 9/2004 | Shahindoust |
| 2004/0190767 A1 | 9/2004 | Tedesco et al. |
| 2004/0194128 A1 | 9/2004 | McIntyre et al. |
| 2004/0201609 A1 | 10/2004 | Obrador |
| 2004/0202382 A1 | 10/2004 | Pilu |
| 2004/0204967 A1 | 10/2004 | Lee et al. |
| 2004/0205508 A1 | 10/2004 | Wecker et al. |
| 2004/0210928 A1 | 10/2004 | Hamzy et al. |
| 2004/0213437 A1 | 10/2004 | Howard et al. |
| 2004/0218100 A1 | 11/2004 | Staker et al. |
| 2004/0222904 A1 | 11/2004 | Ciolli |
| 2004/0230659 A1 | 11/2004 | Chase |
| 2004/0230891 A1 | 11/2004 | Pravetz et al. |
| 2004/0239681 A1 | 12/2004 | Robotham et al. |
| 2004/0249864 A1 | 12/2004 | Laumen et al. |
| 2004/0250272 A1 | 12/2004 | Durden et al. |
| 2005/0008242 A1 | 1/2005 | Liege et al. |
| 2005/0008246 A1 | 1/2005 | Kinjo |
| 2005/0011959 A1 | 1/2005 | Grosvenor |
| 2005/0028191 A1 | 2/2005 | Sullivan et al. |
| 2005/0028193 A1 | 2/2005 | Candelore et al. |
| 2005/0028217 A1 | 2/2005 | Marler et al. |
| 2005/0057689 A1 | 3/2005 | Sakagami |
| 2005/0063615 A1* | 3/2005 | Siegel ................ G06Q 30/02 382/309 |
| 2005/0071888 A1 | 3/2005 | Girouard et al. |
| 2005/0076359 A1 | 4/2005 | Pierson et al. |
| 2005/0078174 A1 | 4/2005 | Casey et al. |
| 2005/0078944 A1 | 4/2005 | Risan et al. |
| 2005/0086069 A1 | 4/2005 | Watson et al. |
| 2005/0086703 A1 | 4/2005 | Gupta et al. |
| 2005/0108754 A1 | 5/2005 | Carhart et al. |
| 2005/0114214 A1 | 5/2005 | Itoh |
| 2005/0123172 A1 | 6/2005 | Henson |
| 2005/0129196 A1 | 6/2005 | Creamer et al. |
| 2005/0129272 A1 | 6/2005 | Rottman |
| 2005/0131607 A1 | 6/2005 | Breed |
| 2005/0144635 A1 | 6/2005 | Boortz |
| 2005/0154636 A1 | 7/2005 | Hildinger et al. |
| 2005/0160368 A1 | 7/2005 | Liu et al. |
| 2005/0161368 A1 | 7/2005 | Gillespie et al. |
| 2005/0177844 A1 | 8/2005 | Levi et al. |
| 2005/0198686 A1 | 9/2005 | Krause et al. |
| 2005/0201565 A1 | 9/2005 | Choi et al. |
| 2005/0203849 A1 | 9/2005 | Benson |
| 2005/0204287 A1 | 9/2005 | Wang |
| 2005/0204381 A1 | 9/2005 | Ludvig et al. |
| 2005/0209999 A1* | 9/2005 | Jou .................................... 707/2 |
| 2005/0216836 A1* | 9/2005 | Duke .................... G06F 17/248 715/245 |
| 2005/0225566 A1 | 10/2005 | Kojo |
| 2005/0240661 A1* | 10/2005 | Heller et al. .................. 709/219 |
| 2005/0240754 A1* | 10/2005 | Auterinen ............... H04L 63/08 713/1 |
| 2005/0257273 A1* | 11/2005 | Naito ....................... G06T 1/60 726/26 |
| 2005/0270372 A1 | 12/2005 | Henninger, III |
| 2005/0273470 A1 | 12/2005 | Heigold |
| 2005/0278256 A1 | 12/2005 | Vandewater et al. |
| 2005/0278333 A1 | 12/2005 | Daniels et al. |
| 2005/0278731 A1 | 12/2005 | Cameron et al. |
| 2005/0282140 A1 | 12/2005 | Knight |
| 2005/0283617 A1 | 12/2005 | Davis |
| 2005/0285934 A1 | 12/2005 | Carter |
| 2006/0004697 A1* | 1/2006 | Lipsky .............. G06F 17/30265 |
| 2006/0015904 A1 | 1/2006 | Marcus |
| 2006/0020962 A1 | 1/2006 | Stark et al. |
| 2006/0041431 A1 | 2/2006 | Maes |
| 2006/0041591 A1 | 2/2006 | Rhoads |
| 2006/0045372 A1 | 3/2006 | Wang et al. |
| 2006/0047956 A1 | 3/2006 | Calvin |
| 2006/0053365 A1 | 3/2006 | Hollander et al. |
| 2006/0064384 A1 | 3/2006 | Mehrotra et al. |
| 2006/0064716 A1 | 3/2006 | Sull et al. |
| 2006/0069798 A1 | 3/2006 | Li et al. |
| 2006/0069987 A1 | 3/2006 | Jones et al. |
| 2006/0089160 A1 | 4/2006 | Othmer |
| 2006/0089969 A1 | 4/2006 | Brown et al. |
| 2006/0092043 A1 | 5/2006 | Lagassey |
| 2006/0098943 A1 | 5/2006 | Scott, III et al. |
| 2006/0104480 A1 | 5/2006 | Fleisher |
| 2006/0123246 A1 | 6/2006 | Vantalon et al. |
| 2006/0123462 A1 | 6/2006 | Lunt et al. |
| 2006/0125930 A1 | 6/2006 | Mindrum et al. |
| 2006/0126941 A1 | 6/2006 | Higaki |
| 2006/0129908 A1 | 6/2006 | Markel |
| 2006/0130118 A1 | 6/2006 | Damm |
| 2006/0130119 A1 | 6/2006 | Candelore et al. |
| 2006/0130121 A1* | 6/2006 | Candelore et al. ........... 725/145 |
| 2006/0143560 A1 | 6/2006 | Gupta et al. |
| 2006/0155613 A1 | 7/2006 | Foran et al. |
| 2006/0155954 A1* | 7/2006 | Haynes .................... G06F 9/542 712/1 |
| 2006/0156219 A1 | 7/2006 | Haot et al. |
| 2006/0161838 A1 | 7/2006 | Nydam et al. |
| 2006/0161850 A1 | 7/2006 | Seaberg |
| 2006/0168285 A1 | 7/2006 | Nielsen et al. |
| 2006/0170767 A1 | 8/2006 | Brassil |
| 2006/0171423 A1 | 8/2006 | Helms et al. |
| 2006/0171453 A1 | 8/2006 | Rohlfing et al. |
| 2006/0171752 A1 | 8/2006 | Tanaka et al. |
| 2006/0178997 A1 | 8/2006 | Schneck et al. |
| 2006/0179403 A1 | 8/2006 | Kirkpatrick |
| 2006/0195789 A1 | 8/2006 | Rogers et al. |
| 2006/0212805 A1 | 9/2006 | Allen et al. |
| 2006/0216021 A1 | 9/2006 | Touchard et al. |
| 2006/0222213 A1 | 10/2006 | Kiyohara et al. |
| 2006/0234765 A1 | 10/2006 | Herberger et al. |
| 2006/0238380 A1 | 10/2006 | Kimchi et al. |
| 2006/0248592 A1 | 11/2006 | Agrawal et al. |
| 2006/0251338 A1 | 11/2006 | Gokturk et al. |
| 2006/0253330 A1 | 11/2006 | Maggio et al. |

US 9,583,141 B2
Page 5

(56) References Cited

U.S. PATENT DOCUMENTS

| | | | |
|---|---|---|---|
| 2006/0253783 A1 | 11/2006 | Vronay et al. | |
| 2006/0271980 A1 | 11/2006 | Mankovitz | |
| 2006/0277454 A1 | 12/2006 | Chen | |
| 2006/0282319 A1 | 12/2006 | Maggio | |
| 2006/0282847 A1 | 12/2006 | Gupte | |
| 2006/0287916 A1 | 12/2006 | Starr et al. | |
| 2007/0002360 A1* | 1/2007 | Levien et al. | 358/1.14 |
| 2007/0005422 A1* | 1/2007 | Levien et al. | 705/14 |
| 2007/0005423 A1* | 1/2007 | Levien et al. | 705/14 |
| 2007/0005651 A1* | 1/2007 | Levien et al. | 707/104.1 |
| 2007/0006077 A1 | 1/2007 | Grubbs | |
| 2007/0016847 A1 | 1/2007 | Reichardt et al. | |
| 2007/0027844 A1* | 2/2007 | Toub et al. | 707/3 |
| 2007/0044011 A1 | 2/2007 | Cottrille et al. | |
| 2007/0050718 A1 | 3/2007 | Moore et al. | |
| 2007/0055986 A1 | 3/2007 | Gilley et al. | |
| 2007/0056034 A1 | 3/2007 | Fernstrom | |
| 2007/0061838 A1 | 3/2007 | Grubbs et al. | |
| 2007/0083571 A1 | 4/2007 | Meller et al. | |
| 2007/0094418 A1 | 4/2007 | Reisman | |
| 2007/0097955 A1 | 5/2007 | Li et al. | |
| 2007/0098267 A1 | 5/2007 | Lee et al. | |
| 2007/0100648 A1 | 5/2007 | Borquez et al. | |
| 2007/0100698 A1 | 5/2007 | Neiman et al. | |
| 2007/0101247 A1 | 5/2007 | Matsuki et al. | |
| 2007/0101271 A1 | 5/2007 | Hua et al. | |
| 2007/0113184 A1 | 5/2007 | Haot et al. | |
| 2007/0130007 A1* | 6/2007 | Haberman et al. | 705/14 |
| 2007/0153091 A1 | 7/2007 | Watlington et al. | |
| 2007/0162842 A1 | 7/2007 | Ambachtsheer et al. | |
| 2007/0168853 A1 | 7/2007 | Jarman | |
| 2007/0189710 A1* | 8/2007 | Pedlow, Jr. | 386/54 |
| 2007/0198744 A1* | 8/2007 | Wensley et al. | 709/248 |
| 2007/0199025 A1 | 8/2007 | Angiolillo et al. | |
| 2007/0208751 A1 | 9/2007 | Cowan et al. | |
| 2007/0234214 A1* | 10/2007 | Lovejoy et al. | 715/719 |
| 2007/0237358 A1 | 10/2007 | Tseng et al. | |
| 2007/0250506 A1* | 10/2007 | Stevens et al. | 707/8 |
| 2007/0255580 A1 | 11/2007 | Cole et al. | |
| 2007/0263865 A1 | 11/2007 | Cohen et al. | |
| 2007/0266049 A1* | 11/2007 | Cohen et al. | 707/104.1 |
| 2007/0274519 A1* | 11/2007 | Cohen et al. | 380/201 |
| 2007/0276757 A1* | 11/2007 | Cohen et al. | 705/51 |
| 2007/0279494 A1 | 12/2007 | Aman et al. | |
| 2007/0294305 A1* | 12/2007 | Cohen et al. | 707/104.1 |
| 2007/0294720 A1* | 12/2007 | Cohen et al. | 725/32 |
| 2007/0297641 A1 | 12/2007 | Criddle et al. | |
| 2007/0299877 A1* | 12/2007 | Cohen et al. | 707/104.1 |
| 2008/0005576 A1 | 1/2008 | Weiss | |
| 2008/0010083 A1 | 1/2008 | Cohen et al. | |
| 2008/0013859 A1 | 1/2008 | Cohen et al. | |
| 2008/0019576 A1 | 1/2008 | Senftner et al. | |
| 2008/0021997 A1 | 1/2008 | Hinton | |
| 2008/0028422 A1 | 1/2008 | Cohen et al. | |
| 2008/0034401 A1 | 2/2008 | Wang | |
| 2008/0037826 A1 | 2/2008 | Sundstrom et al. | |
| 2008/0052104 A1 | 2/2008 | Cohen et al. | |
| 2008/0052161 A1* | 2/2008 | Cohen et al. | 705/14 |
| 2008/0059530 A1 | 3/2008 | Cohen et al. | |
| 2008/0077595 A1 | 3/2008 | Leebow | |
| 2008/0077954 A1 | 3/2008 | Cohen et al. | |
| 2008/0086380 A1 | 4/2008 | Cohen et al. | |
| 2008/0109306 A1 | 5/2008 | Maigret et al. | |
| 2008/0112683 A1* | 5/2008 | Lin et al. | 386/52 |
| 2008/0117295 A1 | 5/2008 | Ebrahimi et al. | |
| 2008/0120154 A1 | 5/2008 | Dellovo | |
| 2008/0124056 A1 | 5/2008 | Concotelli | |
| 2008/0127298 A1 | 5/2008 | Reeves et al. | |
| 2008/0134282 A1 | 6/2008 | Fridman et al. | |
| 2008/0154633 A1 | 6/2008 | Ishibashi et al. | |
| 2008/0163365 A1 | 7/2008 | Austin et al. | |
| 2008/0172689 A1 | 7/2008 | Feder et al. | |
| 2008/0178068 A1 | 7/2008 | Chaudhri | |
| 2008/0184098 A1 | 7/2008 | Chen et al. | |
| 2008/0189591 A1 | 8/2008 | Lection | |
| 2008/0195938 A1 | 8/2008 | Tischer et al. | |
| 2008/0215420 A1 | 9/2008 | Angelica | |
| 2008/0244755 A1 | 10/2008 | Cohen et al. | |
| 2008/0255920 A1 | 10/2008 | Vandergriff et al. | |
| 2008/0267403 A1 | 10/2008 | Boult | |
| 2008/0270161 A1 | 10/2008 | Cohen et al. | |
| 2008/0313233 A1 | 12/2008 | Cohen et al. | |
| 2008/0319723 A1 | 12/2008 | Smith et al. | |
| 2009/0001154 A1 | 1/2009 | Wang | |
| 2009/0037243 A1 | 2/2009 | Cohen et al. | |
| 2009/0037278 A1 | 2/2009 | Cohen et al. | |
| 2009/0049467 A1 | 2/2009 | Robson et al. | |
| 2009/0063496 A1 | 3/2009 | Cunningham et al. | |
| 2009/0067820 A1 | 3/2009 | Walker et al. | |
| 2009/0113279 A1 | 4/2009 | Monro et al. | |
| 2009/0132371 A1 | 5/2009 | Strietzel et al. | |
| 2009/0144829 A1 | 6/2009 | Grigsby et al. | |
| 2009/0150199 A1 | 6/2009 | Cohen et al. | |
| 2009/0150444 A1 | 6/2009 | Cohen et al. | |
| 2009/0151004 A1 | 6/2009 | Cohen et al. | |
| 2009/0151008 A1 | 6/2009 | Cohen et al. | |
| 2009/0154806 A1 | 6/2009 | Chang et al. | |
| 2009/0157450 A1 | 6/2009 | Athsani et al. | |
| 2009/0177542 A1 | 7/2009 | Haberman et al. | |
| 2009/0180025 A1 | 7/2009 | Dawson | |
| 2009/0204580 A1 | 8/2009 | Seamon et al. | |
| 2009/0222489 A1 | 9/2009 | Sudoh et al. | |
| 2009/0248692 A1 | 10/2009 | Tsukagoshi et al. | |
| 2009/0249482 A1 | 10/2009 | Sarathy | |
| 2009/0327848 A1 | 12/2009 | Glazer et al. | |
| 2010/0027853 A1 | 2/2010 | Wen | |
| 2010/0030746 A1 | 2/2010 | Steelberg et al. | |
| 2010/0042503 A1 | 2/2010 | Farmer | |
| 2010/0083077 A1 | 4/2010 | Paulsen et al. | |
| 2010/0094868 A1 | 4/2010 | Leung et al. | |
| 2010/0131833 A1 | 5/2010 | Chaudhri | |
| 2010/0153994 A1 | 6/2010 | Alexander | |
| 2010/0177978 A1 | 7/2010 | Jeong et al. | |
| 2010/0192175 A1 | 7/2010 | Bachet et al. | |
| 2011/0047487 A1 | 2/2011 | Deweese et al. | |
| 2011/0103706 A1 | 5/2011 | Jeong et al. | |
| 2011/0123167 A1 | 5/2011 | Li et al. | |
| 2011/0271116 A1 | 11/2011 | Martinez | |
| 2011/0273553 A1 | 11/2011 | Spatharis | |
| 2011/0289579 A1 | 11/2011 | Davis et al. | |
| 2012/0005034 A1 | 1/2012 | Jarman et al. | |
| 2012/1090727 | 5/2012 | Ben-Yaacov et al. | |
| 2012/0179432 A1 | 7/2012 | Wivell et al. | |
| 2012/0195789 A1 | 8/2012 | Huang et al. | |
| 2012/0201418 A1 | 8/2012 | Bellwood et al. | |
| 2012/0218297 A1 | 8/2012 | Ur | |
| 2012/0331371 A1 | 12/2012 | Larson et al. | |
| 2013/0013705 A1 | 1/2013 | White et al. | |
| 2013/0117131 A1 | 5/2013 | Robinson et al. | |
| 2013/0226974 A1 | 8/2013 | Cosic | |
| 2014/0032547 A1 | 1/2014 | Webster et al. | |
| 2014/0040946 A1 | 2/2014 | Gates, III et al. | |
| 2014/0068661 A1 | 3/2014 | Gates, III et al. | |
| 2014/0073427 A1 | 3/2014 | Sitrick | |
| 2014/0089507 A1 | 3/2014 | Prakash et al. | |
| 2014/0259092 A1 | 9/2014 | Boucher et al. | |

FOREIGN PATENT DOCUMENTS

| | | |
|---|---|---|
| WO | WO 97/03517 | 1/1997 |
| WO | WO 02/17234 A1 | 2/2002 |
| WO | WO 02/21843 A2 | 3/2002 |
| WO | WO 02/085018 A1 | 10/2002 |
| WO | WO 2005/078597 A1 | 8/2005 |
| WO | WO 2006/112822 A1 | 10/2006 |

OTHER PUBLICATIONS

Jacob Rosenberg, Adobe Premiere Pro 1.5 Studio Techniques, Adobe Press, Jun. 2004.*

Adobe Premiere Pro 1.5, Mar. 2004, Adobe Systems Inc., screenshots taken by Examiner.*

Dionisio et al.; "A Unified Data Model for Representing Multime-

(56) References Cited

OTHER PUBLICATIONS dia, Timeline, and Simulation Data"; IEEE; Sep./Oct. 1998; pp. 746-767; vol. 10, No. 5.
"BA cuts Branson from Bond movie"; BBC News; bearing a date of Apr. 21, 2007; p. 1; located at http://news.bbc.co.uk/go/pr/fr/-/2/hi/entertainment/6579839.stm; printed on Apr. 21, 2007.
"Robust video transmission using MPEG Markup Language and adaptive error correction codes"—(abstract); bearing a date of 2007; p. 1; located at http://ieeexplore.org/xpls/absprintf.jsp?arnumber=1394682; printed on Jan. 7, 2008.
Sun, Xiaoming; Kuo, C.-C. Jay; "Robust video transmission using MPEG Markup Language and adaptive error correction codes"; IEEE International Conference on Multimedia and Expo; bearing a date of Jun. 27-30, 2004; pp. 2107-2110; vol. 3; IEEE.
Zhou, Tina T.; Jin, Jesse S.; "Principles of Video Annotation Markup Language (VAML)"; Pan-Sydney Area Workshop on Visual Information Processing; bearing a date of 2004; pp. 123-127; Australian Computer Society, Inc.
U.S. Appl. No. 11/173,990, Levien et al.
U.S. Appl. No. 11/174,432, Levien et al.
U.S. Appl. No. 11/195,346, Levien et al.
U.S. Appl. No. 11/195,358, Levien et al.
U.S. Appl. No. 11/701,167, Jung et al.
U.S. Appl. No. 11/701,524, Jung et al.
U.S. Appl. No. 11/701,527, Jung et al.
U.S. Appl. No. 11/728,729, Jung et al.
U.S. Appl. No. 11/731,738, Cohen et al.
U.S. Appl. No. 11/731,795, Cohen et al.
U.S. Appl. No. 11/796,543, Cohen et al.
U.S. Appl. No. 11/796,570, Cohen et al.
U.S. Appl. No. 11/807,352, Cohen et al.
U.S. Appl. No. 11/807,353, Cohen et al.
U.S. Appl. No. 11/823,473, Cohen et al.
U.S. Appl. No. 11/823,483, Cohen et al.
U.S. Appl. No. 11/824,515, Cohen et al.
U.S. Appl. No. 11/827,106, Cohen et al.
U.S. Appl. No. 11/827,140, Cohen et al.
U.S. Appl. No. 11/827,440, Cohen et al.
U.S. Appl. No. 11/894,026, Cohen et al.
U.S. Appl. No. 11/897,989, Cohen et al.
U.S. Appl. No. 11/903,193, Cohen et al.
U.S. Appl. No. 11/906,988, Cohen et al.
U.S. Appl. No. 12/455,301, Cohen et al.
U.S. Appl. No. 12/384,217, Cohen et al.
U.S. Appl. No. 12/384,213, Cohen et al.
U.S. Appl. No. 12/380,570, Cohen et al.
U.S. Appl. No. 12/322,605, Cohen et al.
U.S. Appl. No. 12/322,372, Cohen et al.
Wang, Ching-Te et al.; "Detecting and restoring the tampered images based on iteration-free fractal compression"; The Journal of Systems and Software; bearing a date of 2003; pp. 131-140; vol. 67; © 2002 Elsevier Inc.
Oomoto et al.; "OVID: Design and Implementation of a Video-Object Database System"; IEEE Transactions on Knowledge and Data Engineering; Aug. 1993; pp. 629-643; vol. 5, No. 4; IEEE.
Lin, Eugene T., et al.; "Detection of Image Alterations Using Semi-Fragile Watermarks"; bearing a date of 2000; Google 2000; pp. 1-12.
Maes, Frederik, et al.; "Multimodality Image Registration by Maximization of Mutual Information"; IEEE Transactions on Medical Imaging; bearing a date of Apr. 1997; pp. 187-198; vol. 16.; No. 2.
Boll et al.; "A Cross-Media Adaption Strategy for Multimedia Presentations"; ACM Multimedia; bearing a date of 1999; pp. 37-46.
Smith et al.; "Scalable Multimedia Delivery for Pervasive Computing"; ACM Multimedia; bearing a date of 1999; pp. 131-140.
White, Ron; "How Computers Work, Millennium Edition"; Sep. 1999; pp. 1-284; Que Corp.; Indianapolis, IN.
Lamay, Craig; "Public Service Advertising, Broadcasters, and the Public Interest, Regulatory Background and the Digital Future"; Shouting to be Heard, Public Service Advertising in a New Media Age; bearing a date of 2002 (provided by examiner); pp. 7-13.
Franklin et al.; "Web 2.0 for Content for Learning and Teaching in Higher Education"; bearing a date of May 28, 2007; pp. 1-29.
Tanaka, Yuzuru; "A Meme Media Architecture for Fine-Grain Component Software"; Division of Electronics and Information Engineering, Hokkaido University; 1996; pp. 190-214; Sapporo, Japan.
Manovich, Lev; "Post-Media Aesthetics"; Google; bearing a date of 2005; pp. 1-18.
Duan et al.; "Adult Image Detection Method Base-on Skin Color Model and Support Vector Machine"; ACCV2002: The $5^{th}$ Asian Conference on Computer Vision; Jan. 23-25, 2002; pp. 1-4; Melbourne, Australia.
Ap-Apid, Rigan; "An Algorithm for Nudity Detection"; College of Computer Studies De La Salle University; pp. 1-6; As provided by Examiner: Google 2006; created on May 9, 2014; Manila Philippines.
Ventura et al.; "Search and Replace of 2-D Objects in Digital Images"; Visual Form; Bearing a date of 1992; pp. 205-212; Springer.
"Truth-table reduction"; Wikipedia; bearing a date of Jun. 4, 2015; printed on Jul. 14, 2015; pp. 1-2; located at https://en.wikipedia.org/w/index.php?title=Truth-table_reduction&oldid=665496395.
Berghel, Hal et al.; "Protecting ownership rights through digital watermarking"; bearing a date of Jul. 1996; vol. 29, Issue 7; pp. 101-103 (as provided by examiner); IEEE.
Seldon et al.; "Media Substitution and Economies of Scale in Advertising"; International Journal of Industrial Organization; bearing a date of Jan. 1, 1998; pp. 1153-1180; vol. 18; Elsevier Science B.V.

\* cited by examiner

FIG. 2
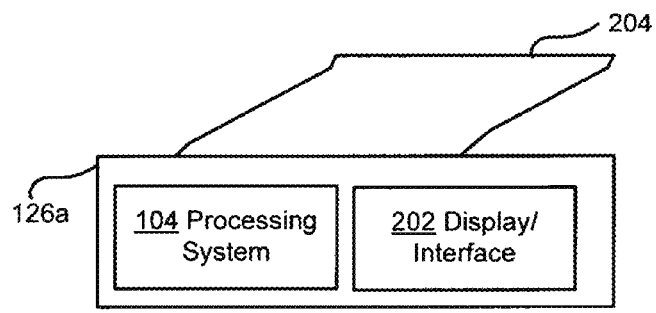
FIG. 2A
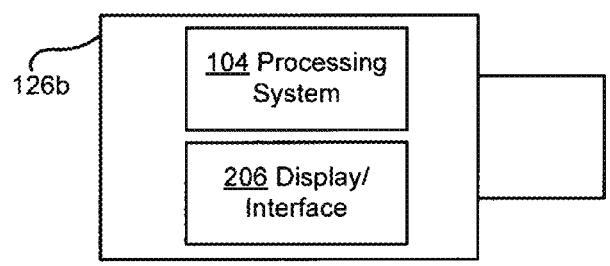
FIG. 2B
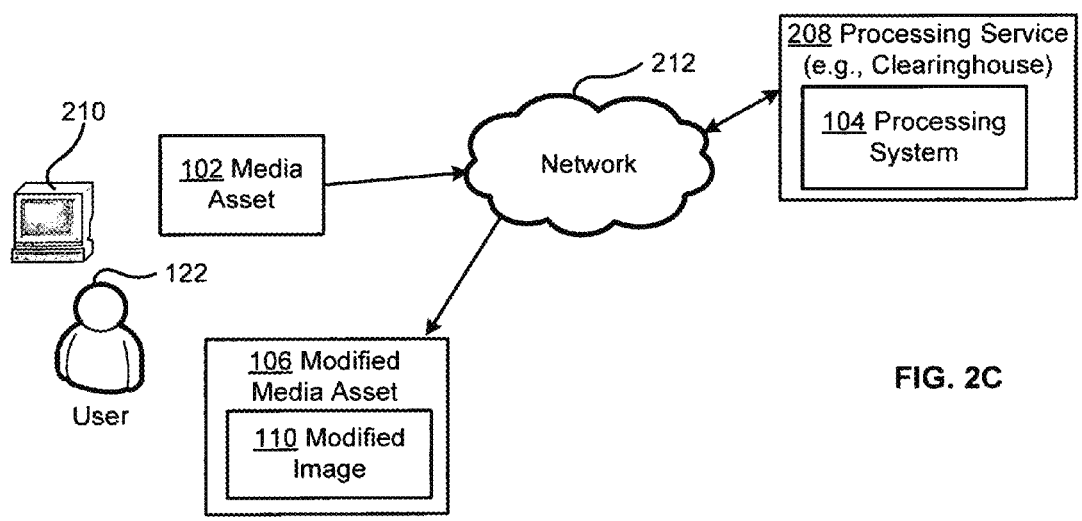
FIG. 2C

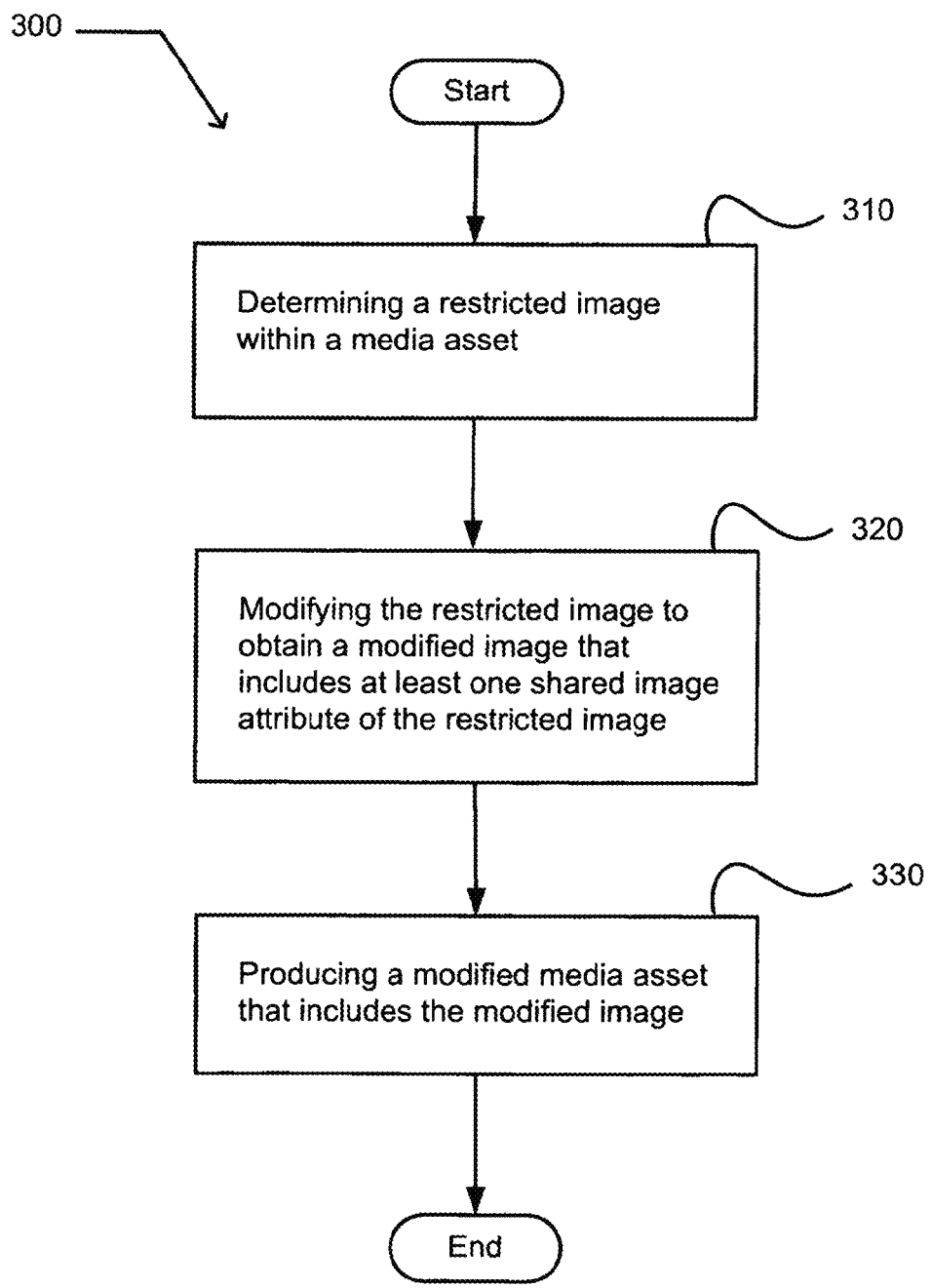

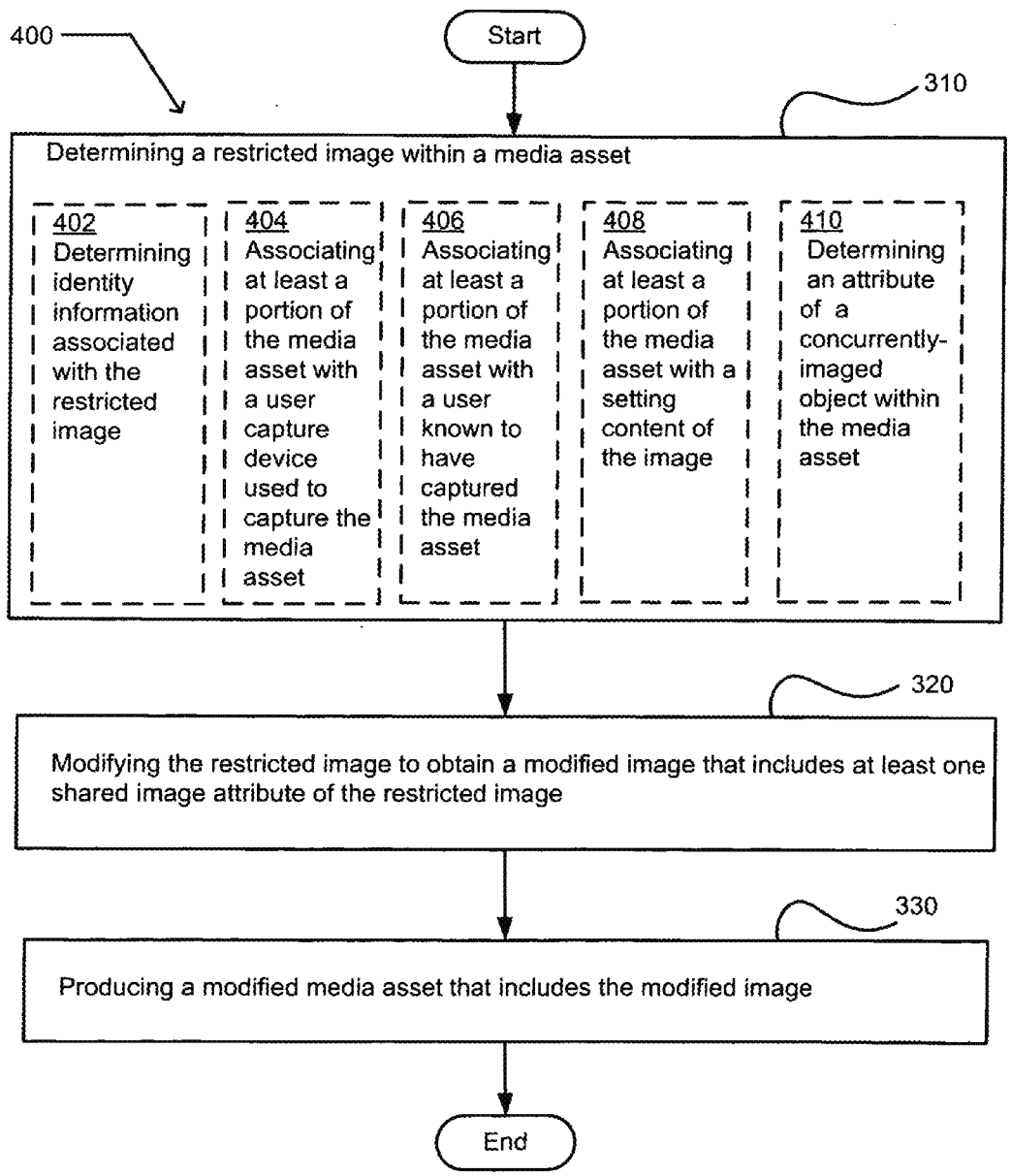

FIG. 24

FEASIBLE CONTENT ALTERATIONS 2040

| COMPONENT ELEMENT 2042 | DESIGNATED ALTERABLE ASPECTS 2044 |
|---|---|
| MUSIC 2046 | (SONG LYRICS) (BACKGROUND MUSIC) (VOCALIST) (INSTRUMENTS) 2048 |
| SETTING 2050 | (BEACH) (APARTMENT) (HOTEL) (URBAN) (AIRPORT) (COLLEGE) (STORE) 2052 |
| HERO 2054 | (AGE) (STATURE) (HAIR STYLE) (ETHNIC GROUP) (ACCENT) (AFFLUENCE) 2056 |
| HEROINE 2058 | (AGE) (PERSONALITY) (JEWELRY) (FAMILY STATUS) (CAREER) (HOBBY) 2060 |
| VILLAIN 2062 | (VOICE) (WEAPON) (ADDICTION) (JOB) (SCARS) (TATTOOS) (PROFANITY) 2064 |
| CLOTHING 2066 | (1920's) (EXPENSIVE) (STYLISH) (GAUDY) (MILITARY) (ATHLETIC) (HATS) 2068 |
| VEHICLE 2070 | (AIRPLANE) (MOTORCYCLE) (LIMOUSINE) (TRAIN) (MODEL T) (SAILBOAT) 2072 |
| COMPANY 2074 | (WESTERN UNION) (BARNUM & BAILEY) (UNION PACIFIC) (FORD MOTOR) 2076 |
| ANIMAL 2078 | (COLLIE DOG) (SIAMESE CAT) (PARAKEET) (RACE HORSE) (WALRUS) 2080 |
| FOOD 2082 | (SOUP) (FISH & CHIPS) (SAUSAGE) (PLUM PUDDING) (SAUERKRAUT) 2084 |
| PRODUCT 2086 | (TELEPHONE) (RADIO) (PIANO) (PISTOL) (MAGAZINES) (NEWSPAPER) 2088 |
| BRAND 2090 | (SEARS ROEBUCK) (RCA) (WESTINGHOUSE) (GE) (PAN AM) (KODAK) 2092 |
| DIALOGUE 2094 | (U.S. ENGLISH) (GERMAN) (COCKNEY) (SOUTHERN DRAWL) (SLANG) 2096 |

FIG. 26

| | OWNERSHIP OF PRIMARY ORIGINAL CONTENT RIGHTS 2193 | APPLICABLE PROVISIONS FOR ORIGINAL CONTENT RIGHTS 2194 | OWNERSHIP OF SECONDARY SUBSTITUTED CONTENT RIGHTS 2196 | APPLICABLE PROVISIONS FOR SUBSTITUTED CONTENT RIGHTS 2198 |
|---|---|---|---|---|
| ALTER ATTRIBUTES 2190 | | | | |
| PERSON / CHARACTER 2202 | | | | |
| ACTOR / ACTRESS 2204 | | | | |
| OBJECT / ITEM 2206 | | | | |
| PRODUCT CATEGORY 2208 | | | | |
| ALTER ASPECTS 2192 | | | | |
| VIDEO ASPECT 2210 | | | | |
| AUDIO ASPECT 2212 | | | | |
| AUDIOVISUAL ASPECT 2214 | | | | |
| ANIMATION ASPECT 2216 | | | | |
| SET(S) OF RELATED ASPECTS 2218 | | | | |

- TYPE OF DERIVATIVE VERSION 2182
- TYPE OF MEDIA FORMAT 2183
- TYPE OF DISTRIBUTION CHANNEL 2184
- OTHER DERIVATIVE VERSIONS 2185
- ASSOCIATED REAL-WORLD ENTITY 2186
- ASSOCIATED REAL-WORLD PERSON 2187

DATA RECORDS FOR AUTHORIZATION RIGHTS 2180

FIG. 66

2985 providing an alteration method for incorporating substitute content in media works (2981)

↓

2982 obtaining substitute altered content deemed to be in compliance with applicable modification guidelines regarding one or more component elements of a composite media work, wherein the one or more component elements are feasible for alteration

- 2986 obtaining previously captured substitute content that is deemed to be in compliance with the applicable modification guidelines
  - 2987 obtaining one or more of the following types of previously captured substitute content: textual, visual, image, audio, musical, live action, reenactment, simulation, and animation

- 2988 obtaining newly captured substitute content that is deemed to be in compliance with the applicable modification guidelines
  - 2989 obtaining one or more of the following types of newly captured substitute content: textual, visual, image, audio, musical, live action, reenactment, simulation, and animation

- 2983 editing the composite media work by incorporating the substitute altered content in a derivative version of the composite media work
  - 2974 identifying an existing composite media work having the one or more component elements feasible for alteration
  - 2976 creating a newly captured composite media work having the one or more component elements feasible for alteration

- 2978 making a determination that the specified substitute altered content is in compliance with one or more of the following types of applicable modification guidelines: automatic, contingent, negotiable, tentative, recommended, required, and compensation

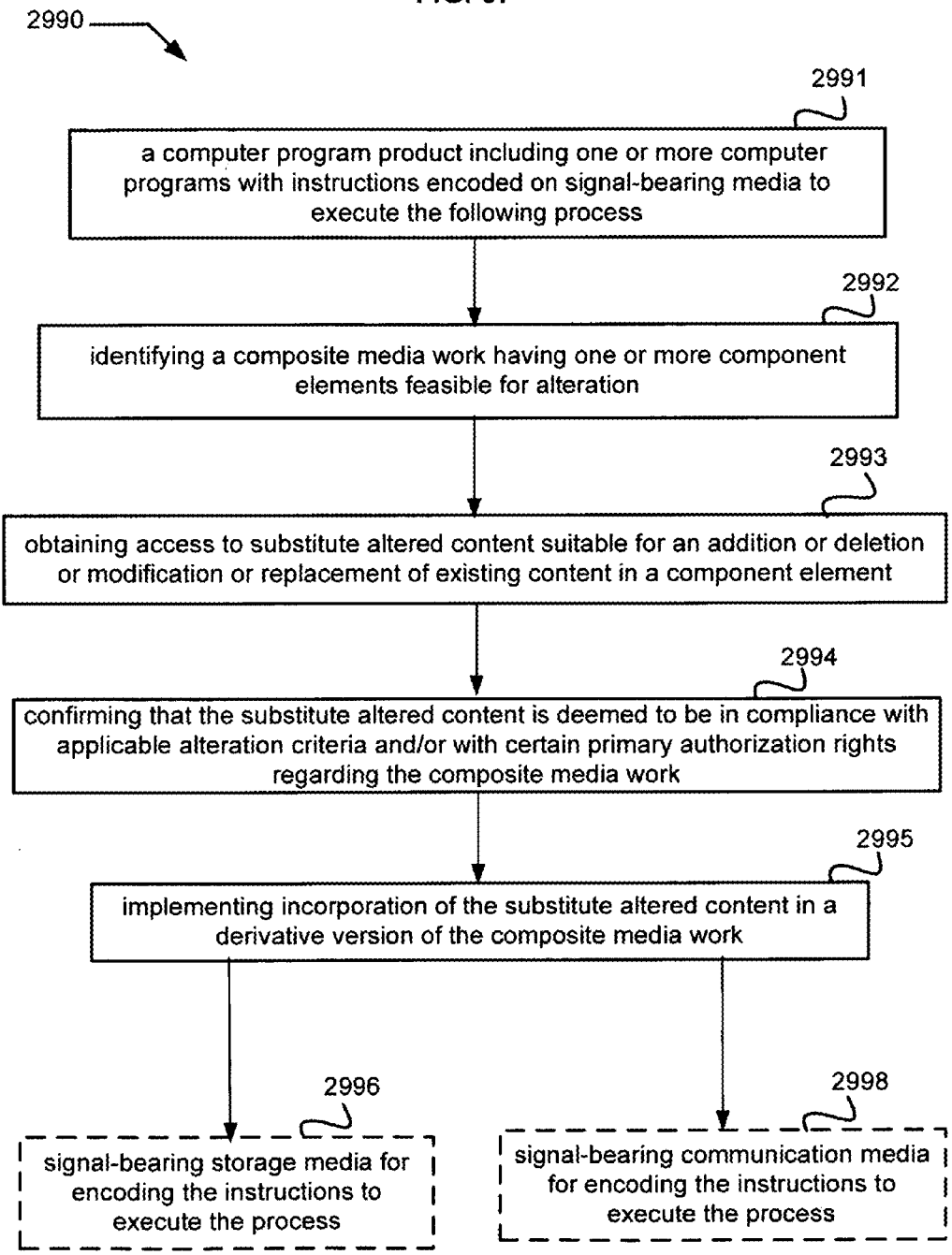

3310 → identifying a composite media work having a group of related content elements feasible for alteration, wherein the related content elements form a constituent portion of the composite media work

↓

3304 — obtaining specified substitute altered content designated for collective replacement in a derivative version of the composite media work

↓

3306 — establishing confirmation that the specified substitute altered content is deemed to be in compliance with applicable alteration guidelines regarding the composite media work 3318 — making a determination that the collective replacement in the derivative version is in compliance with one or more of the following types of applicable alteration criteria: automatic, contingent, negotiable, tentative, recommended, required, compensation 3314 — concurring with a determination that the collective replacement in the derivative version is in compliance with one or more of the following type of pre-approved alteration parameters: substitute component element, substitute designated aspect, substitution process, alternate media format, alternate distribution channel 3316 — concurring with a determination that the collective replacement in the derivative version is in compliance with applicable alteration guidelines that include forbidding or restricting alteration of one or more of following type of component elements: plot, story, animation, text, narration, dialog, color, actor, character, clothing, product, sound, music, musical lyrics, product, object, item, title, distributor, creative credit, production credit, funding credit, sponsorship 3312 — concurring with a determination that the specified substitute altered content is in compliance with applicable alteration criteria regarding one or more of the following type of alteration of the group of related content elements: addition, deletion, modification, and replacement 3313 — utilizing one or more of the following type of approval techniques to make a determination that the collective replacement in the derivative version is in compliance with the applicable alteration guidelines: programmed, pre-authorization, delegated agent, derivative version review, substitute content review, alteration review, summary characterization, substitute content rating, aggregate content rating

IMPLEMENTING AUDIO SUBSTITUTION OPTIONS IN MEDIA WORKS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/807,350 entitled IMPLEMENTING GROUP CONTENT SUBSTITUTION IN MEDIA WORKS, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 25 May 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/156,121 entitled IMPLEMENTING VISUAL SUBSTITUTION OPTIONS IN MEDIA WORKS, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed concurrently herewith on 28 May 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/154,962 entitled AUDIO SUBSTITUTION OPTIONS IN MEDIA WORKS, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed on 27 May 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/154,973 entitled VISUAL SUBSTITUTION OPTIONS IN MEDIA WORKS, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed on 27 May 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/807,352 entitled GROUP CONTENT SUBSTITUTION IN MEDIA WORKS, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 25 May 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/824,515 entitled ALTERATION OF PROMOTIONAL CONTENT IN MEDIA WORKS, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 29 Jun. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/807,353 entitled PROMOTIONAL PLACEMENT IN MEDIA WORKS, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 25 May 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/796,543 entitled IMPLEMENTATION OF MEDIA CONTENT ALTERATION, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 27 Apr. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/796,570 entitled AUTHORIZATION RIGHTS FOR SUBSTITUTE MEDIA CONTENT, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 26 Apr. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/731,795 entitled AUTHORIZATION FOR MEDIA CONTENT ALTERATION, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 30 Mar. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/731,738 entitled APPROVAL TECHNIQUE FOR MEDIA CONTENT ALTERATION, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 30 Mar. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/195,358 entitled MODIFYING RESTRICTED IMAGES, naming Royce A. Levien, Robert W. Lord, Mark A. Malamud and John D. Rinaldo, Jr. as inventors, filed 2 Aug. 2005, now U.S. Pat. No. 7,860,342, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/195,346 entitled RESTORING MODIFIED ASSETS, naming Royce A. Levien, Robert W. Lord, Mark A. Malamud and John D. Rinaldo, Jr. as inventors, filed 2 Aug. 2005, now abandoned, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/173,990 entitled TECHNIQUES FOR IMAGE GENERATION, naming Royce A. Levien, Robert W. Lord, Mark A. Malamud and John D. Rinaldo, Jr. as inventors, filed 1 Jul. 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/174,432 entitled PROVIDING PROMOTIONAL CONTENT, naming Royce A. Levien, Robert W. Lord, Mark A. Malamud and John D. Rinaldo, Jr. as inventors, filed 1 Jul. 2005, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

Content alteration of media works provides new opportunities and benefits in connection with the distribution of various derivative versions of an original work.

SUMMARY

Method and system embodiments involving implementation of content alteration in a media work as disclosed herein may take different forms. For example, one or more computer program products having process instructions encoded on computer readable media may be incorporated in a computerized system.

An exemplary system for implementing audio content alteration of a media work may include a composite media work having a constituent component configured to include one or more optional audio elements, a capture device having a capability to obtain specified optional audio content confirmed to be in compliance with applicable alteration guidelines regarding possible audio content alteration of the composite media work, and an editor module operatively coupled to the capture device and configured to incorporate the specified optional audio content in a derivative version of the composite media work. Another exemplary system feature may include a data record of status information regarding the confirmed compliance with the applicable alteration guidelines.

An exemplary process embodiment for implementing authorized content alteration in a media work may include identifying a composite media work having a constituent component configured to include one or more optional audio elements, obtaining specified optional audio content that is confirmed to be in compliance with applicable alteration guidelines for incorporation in a derivative version of the composite media work, submitting status information to a designated data record regarding the confirmed compliance, and incorporating the specified optional audio content in the constituent component of the composite media work.

An exemplary computer program product embodiment may include instructions encoded on computer readable media to execute a process, wherein the process may include identifying a composite media work having a constituent component configured to include one or more optional audio elements, obtaining specified optional audio content confirmed to be in compliance with applicable alteration guidelines regarding possible audio content alteration of the composite media work, and incorporating the specified optional audio content in a derivative version of the composite media work. Another possible programmed process feature may include maintaining a data record of status information regarding the confirmed compliance with the applicable alteration guidelines.

Some implementations for a computer program embodiment may include process instructions encoded on computer readable media including a storage medium and/or a communication medium.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 2A-2C illustrate certain alternative embodiments of the device and/or processing system of FIG. 1.

FIG. 3 illustrates an operational flow representing example operations that produce a modified media asset that includes a modified image.

FIG. 4 illustrates an alternative embodiment of the example operational flow of FIG. 3.

FIG. 24 is a tabular depiction of exemplary elements and aspects that may be feasible for possible alteration in a composite media work.

FIG. 26 is a tabular representation showing additional exemplary types of data records that may be used in connection with an authorization rights embodiment for media works.

FIG. 66 is a more detailed flow chart illustrating additional possible enhancements for media content alteration embodiments.

FIG. 67 is a diagrammatic flow chart for an additional exemplary computer program product embodiment.

FIGS. 77-83 are more detailed flow charts illustrating further possible features that may be included in an exemplary process embodiment.

DETAILED DESCRIPTION

Figure 1:
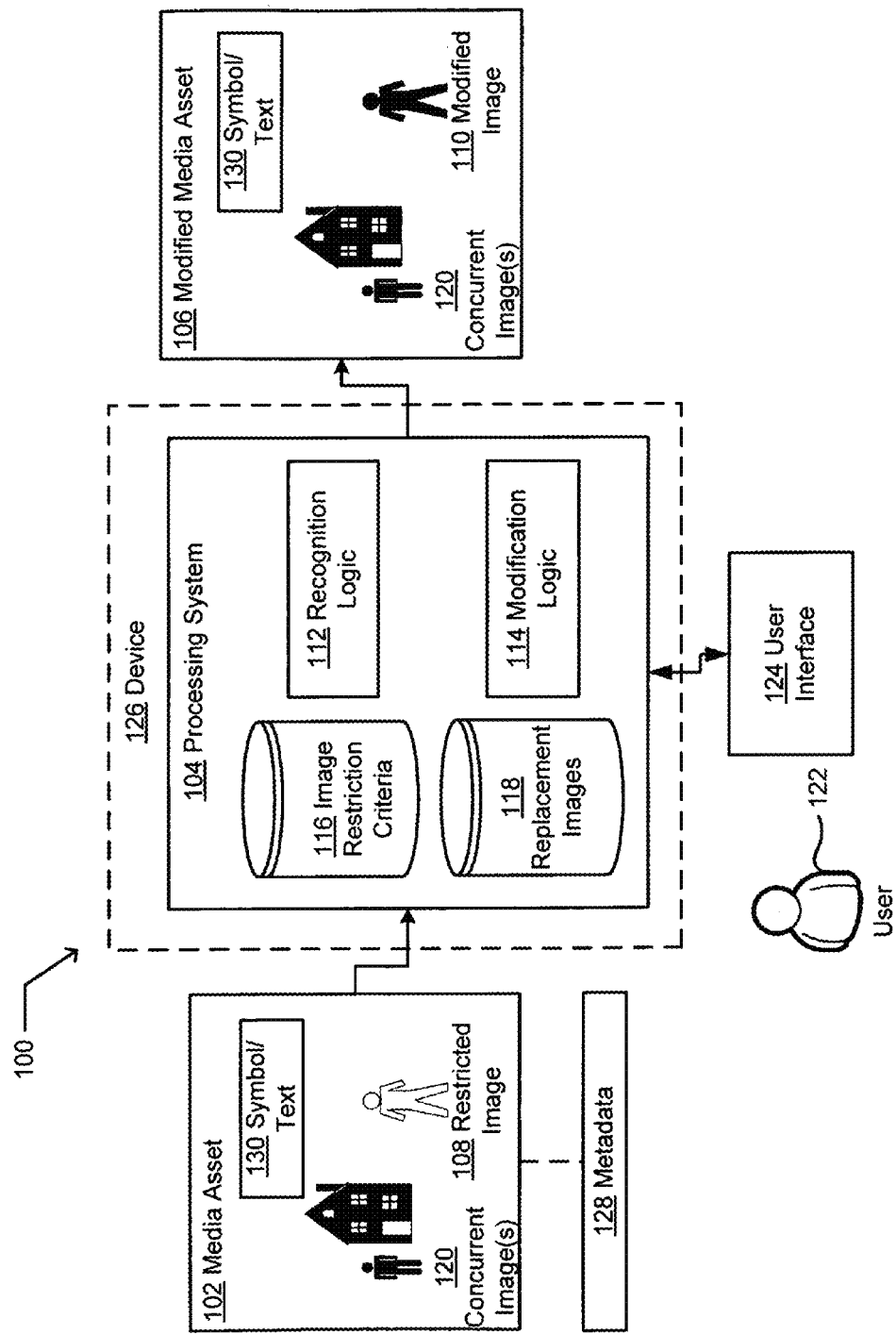
FIG. 1 illustrates an example system in which embodiments may be implemented, perhaps in a device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example system 100 in which embodiments may be implemented, perhaps in the context of a device. In FIG. 1, a media asset 102 is illustrated as being received at a processing system 104 and thereafter output by the processing system 104 as a modified media asset 106. More specifically, the media asset 102 includes a restricted image 108, and the processing system 104 is operable to determine that the restricted image 108 is, in fact, restricted.

The processing system 104 is further operable to modify the media asset 102, and in particular, to modify the restricted image 108, and thereafter output the modified media asset 106 having a modified image 110. In this way, for example, an identity or other information about the restricted image 108 may be protected, hidden, or obscured, while maintaining a general presentation context of the media asset 102. For example, a person who is a subject of the restricted image 108 may be made anonymous within the modified media asset 106, while inclusion of the modified image 110, which shares attributes of the restricted image 108 (or, at least, shares one common attribute of the restricted image 108), may serve to limit or prevent an observer of the modified media asset 106 from noticing that the modified media asset 110, has, in fact, been modified.

The processing system 104 includes recognition logic 112 that is operable to recognize the restricted nature of the restricted image 108. The processing system 104 also includes modification logic 114 that is operable to modify the media asset 102 (including the restricted image 108) to obtain the modified media asset 106 and the modified image 110.

As described in more detail below, the recognition logic 112 may determine the restricted image 108 within the media asset 102 using image restriction criteria 116. As also described in more detail below, the modification logic 114 may obtain/create the modified image 110 by accessing a number of stored or accessible replacement images 118. Specific examples of operations involving these elements of the processing system 104 are provided in the context of various operational flows.

Generally speaking, however, the recognition logic 112 may operate to analyze various attributes of the media asset 102, including attributes of the restricted image 108, in order to determine a restricted nature of the restricted image 108. One example of attributes of the media asset 102 that is illustrated in FIG. 1 includes concurrent image(s) 120, i.e., the recognition logic 112 may make a determination that the restricted image 108 is restricted based on a presence or absence of the concurrent image(s) 120, or based on the presence or absence of certain attributes of the concurrent image(s) 120. Of course, attributes of the media asset 102 are not necessarily limited to image characteristics of the media asset 102, and also may include, for example, metadata associated with the media asset 102, an identity of a person, place, or thing within or in association with the restricted image 108, or information related to a person and/or device involved in capturing the media asset 102.

Further in FIG. 1, a user 122 accesses the processing system 104 by way of a user interface 124. In this way, the user 122 may, for example, submit the media asset 102 to the processing system 104, or receive the modified media asset 106 from the processing system 104, or may become involved in operations of the processing system 104. The user interface 124 also may be used, for example, to define or modify the image restriction criteria 116, or to select the replacement images 118. The user interface 124 also may be used to control a type and/or extent of the recognition performed by the recognition logic 112, or to control a type and/or extent of the modifications performed by the modification logic 114.

Also in FIG. 1, a device 126 is shown in which the processing system 104 may operate. As described in more detail with respect to FIG. 2 and following Figures, the device 126 may include in some examples, an image capture device, a print device, a general-purpose computing device, or virtually any other device or combination of devices that may be used to store, transmit, display, or render a media asset.

The processing system 104 also may be operable to perform other processing of the media asset 102, such as, for example, enhancing, editing, displaying, or otherwise improving the media asset 102, or, in other example embodiments, such additional processing may be performed by other external systems (not shown), if needed.

FIG. 1 also illustrates the possibility that the media asset 102 may be associated with metadata 128. For example, a video stream may have an associated closed-captioning stream, or a web page may have metadata associated with content of the page. Typically, such metadata 128 may not be viewable to the user 122, or may only be viewable if some specific action is taken by the user 122. The metadata 128 may be intended by a designer or producer of the media asset 102, or by an intervening user of the media asset 102, to provide additional information or level of enjoyment to the user 122, and may be used by the processing system to assist in, for example, determining the restricted image 108, as described in more detail, below. The metadata 128 may or may not be included within the modified media asset 106.

A symbol or text 130, on the other hand, generally represents information that is included within the media asset 102 for normal viewing. For example, a web page may include a news article that names a person who is pictured in the article. By using the name text, the recognition logic 112 may be able to determine identity or other information regarding the restricted image 108, or the concurrent image (s) 120.

In FIG. 1, it should be understood that any and/or all of the illustrated elements, and other elements, not illustrated, may be in communication with one another according to any known methods, including but not limited to the various communication techniques discussed herein. As such, it should be understood that the various elements need not be located or co-located as illustrated in the example of FIG. 1. For example, in some embodiments, the recognition logic and/or the image restriction criteria 116 may be remote from the processing system 104. Similarly, the user interface 124 may be implemented at a local computing device of the user 122, remote from the processing system 104, or may be a part of the device 126 that may house the processing system 104, as well.

FIGS. 2A-2C illustrate certain alternative embodiments of the device 126 and/or processing system 104 of FIG. 1. In FIG. 2A, the device 126 is illustrated as a printer 126a, which includes the processing system 104 and a display 202. The display 202 may be used to display a preview of a media asset to be printed with the printer 126a, such as, for example, the media asset 102 and/or the modified media asset 106, and, of course, the printer 126a may be used to print the media asset 102 and/or the modified media asset 106 on paper 204, as well.

The display 202 also should be understood to function, in some example embodiments, as the user interface 124. For example, the display 202 may include touch-screen control for operating the printer 126a and/or the processing system 104, or various buttons, keys, or other selection/input devices (not shown) may be used. In additional or alternative embodiments, an external computing device may be connected to the printer 126a for control thereof, including control of the processing system 104.

In FIG. 2B, the device 126 is illustrated as a camera 126b, which, similarly to the printer 126a, includes some or all of the processing system 104, as well as a display 206. As with the printer 126a, the camera 126b (and/or the processing system 104) may be controlled by the user 122, either using the display 206 (and possibly associated controls), or using an external computing device.

In FIG. 2C, the processing system 104 is illustrated as part of a processing service 208, which may be remote from the user 122 at a computing station 210, and in communication therewith by way of a network 212. In such example embodiments, the user 122 may use the workstation 210 to transmit and receive the media asset 102 and/or the modified media asset 106, respectively, in order to obtain the various advantages described herein. In one example, discussed in more detail below, the processing service 208 may operate as a clearinghouse at which media assets of various types and captured by a number of users may be processed, so that any restricted images therein may be modified appropriately.

In FIG. 3 and in following Figures that include various examples of operational flows, discussion and explanation may be provided with respect to the above-described examples of FIGS. 1, 2A, 2B, and 2C, and/or with respect to other examples and contexts. However, it should be understood that the operational flows may be executed in a number of other environment and contexts, and/or in modified versions of FIGS. 1, 2A, 2B, and 2C. Also, although the various operational flows are presented in the sequence(s) illustrated, it should be understood that the various operations may be performed in other orders than those which are illustrated, or may be performed concurrently.

FIG. 3 illustrates an operational flow 300 representing example operations that produce the modified media asset 106. After a start operation, the operational flow 300 moves to a determining operation 310 where the restricted image 108 is determined to be included within the media asset 102. For example, the recognition logic 112 of the processing system 104 may determine that the restricted image 108 is of a person, place, or thing that is not to be included within produced (modified) versions of the media asset 102.

At a modifying operation 320, the restricted image 108 is modified to obtain a modified image that includes at least one shared image attribute of the restricted image. For example, as in FIG. 1, the modification logic 114 may operate to replace an image of a person or a part of a person with a new or separate image of another person. In this case, the shared image attribute could include one or more of a body (part) shape, a shared facial feature or skin tone, a shared gender or race, a shared hair color or body physique, or numerous other examples. Of course, the restricted image need not be of a person, but also may include virtually any object that may be imaged, including places, objects, or landmarks, to name just a few. Further, the restricted image need not be of a single one of these possibilities, but could include multiple people, places, or things, or combinations thereof. Other examples of restricted images and image attributes are provided below.

At an operation 330, the modified media asset 106 is produced that includes the modified image 110. For example, the processing system 104, which may be included in the print device 126a, the camera 126b, or the processing service 208, may output the modified media asset 106 for printing, viewing, storing, or transmitting, as the case may be, for use or enjoyment by, for example, the user 122. The operational flow 300 then moves to an end operation.

In some embodiments, the user 122 may include a person, an entity, and/or a government. Although a user may be shown herein as a single illustrated Figure, and/or be described in the singular, those skilled in the art will appreciate that the term user may be representative of one or more human user(s), robotic user(s) (e.g., computational entity), and/or substantially any combination thereof (e.g., a user may be assisted by one or more robotic agents). Further, the user, as set forth herein, even if shown as a single entity, may in fact be composed of two or more entities. Those skilled in the art will appreciate that, in general, the same may be said of "sender" and/or other entity-oriented terms as such terms may be used herein.

In some embodiments, the media asset 102 may include a visual image, a picture, a website, an audio recording, a video stream, and/or an audio stream. In additional or alternative embodiments, the media asset 102 also may include text. The media asset 102 may be embodied in various forms, including but not limited to digital files or transmissions, analog recordings or transmissions, or may be embodied in physical form, such as, for example, on paper, plastic, canvas, wood, or any other physical medium in which text, image, or other representations may be embodied.

The media asset 102 may be received, stored and/or transmitted using typical elements of a computer environment. The media asset 102 (and the modified media asset 106) may be transmitted over a network such as the network 212 of FIG. 2, which may represent, for example, a local area network (LAN), a wide area network (WAN), or a peer-to-peer (P2P) network, or the media asset 102 may be broadcast over the air.

The media asset 102 (and the modified media asset 106) may be captured, received, displayed and/or transmitted, for example and without limitation, using one or more of the following: an electronic device; an appliance; a computing device, such as a personal computer and a server; a limited resource computing device; a pervasive computing device; a personal digital assistant (PDA); a cell phone; a Blackberry appliance; a vehicle, such as a car, boat, and/or aircraft; an X-Box; a home gateway; a set-top box; a television, a radio, a camera; a printer; a digital video disc (DVD) recorder or burner; and a TiVo or other digital video recorder (DVR).

FIG. 4 illustrates alternative embodiments of the example operational flow 300 of FIG. 3. FIG. 4 illustrates example embodiments where the determining operation 310 may include at least one additional operation. Additional operations may include operation 402, operation 404, operation 406, operation 408, and/or operation 410.

At the operation 402, identity information associated with the restricted image 108 is determined. For example, the recognition logic 112 may determine identity information of a person within the restricted image information, which may include, for example, a name, an occupation, an association (e.g., as a spouse, relative, friend, or employer/employee), a race, a gender, a body physique, a height, a hair color or hair style, a style of dress, or any other distinguishing information that identifies the person, and, in some examples, that uniquely identifies the person.

Examples of techniques for performing the determining of identity information are described in more detail below. Also, examples of how such identity information may be used by the modification logic 114 to produce the modified image 110 are described in more detail below, although it may be mentioned here that, by determining identity information as described above, it follows that the modified image 110 may include or be associated with different identity information. For example, a person associated with the restricted image 108 may wish to remain anonymous, or otherwise should not be included in the media asset 102, and, in such cases, the modified image 110 may include an anonymized image in which the original identity information is hidden, obscured, replaced, and/or otherwise modified.

Additionally, since the modified image 110 maintains at least one, and possibly many, image attributes of the restricted image 108, and a presentation context of the media asset 102 may be maintained within the modified media asset 110, observers, users, or recipients of the modified media asset 110 may not be aware that such modification has, in fact, taken place.

Of course, similar comments apply not just to persons within the restricted image 108, but to virtually any object that may be imaged and associated with identity information. For example, the restricted image 108 may include a physical place, such as a public or private landmark, a building, or a sports arena, and the identity information associated therewith may be determined by the recognition logic 112. Similarly, any particular object having identity information, such as, for example, a car or type of car, a work of art, an animal, a computer or computing device, a piece of jewelry or clothing, or any other object, may have identity information associated therewith for determining that the associated image is restricted.

At the operation 404, at least a portion of the media asset 102 is associated with a user capture device used to capture the media asset, such as, for example, the camera 126b of FIG. 2. That is, for example, the recognition logic 112 may determine that the media asset 102 was captured by the camera 126b that is restricted from capturing certain images. For example, cameras in a high-security facility, or cameras at an event with a public figure(s) (e.g., a movie star, politician, or professional athlete) may be restricted from capturing images of certain people, places, or things.

At the operation 406, at least a portion of the media asset 102 is associated with a user known to have captured the media asset. In this case, as described in more detail below, the recognition logic 112 may associate the media asset 102 or a portion thereof with the user 122 by recognizing the metadata 128 associated with the media asset 102, such as, for example, a marker on the media asset 102 that was imposed by a camera of the user 122 when (or after) the media asset was obtained. In other examples, the user 122 may be required to identify him or herself to the processing system 104 before processing begins, so that the recognition logic 112 may react accordingly.

At the operation 408, at least a portion of the media asset 102 is associated with a setting content of the image. For example, the concurrent image(s) 120 of FIG. 1 may be considered to provide setting content within the media asset 102. In this way, for example, and as referenced above, media assets obtained in a certain location, as reflected within the content of the media asset 102, may be recognized by the recognition logic 112 as containing one or more restricted images. As with virtually all of the operational flows described herein, such an association may be combined for enactment within the recognition logic 112. For example, the recognition logic 112 may determine that if a content setting of the media asset 102 references a setting where certain public figures will be present, and if identity information associated with a person's image within the media asset 102 identifies that person as being a spouse of a public figure, then the recognition logic 112 may cue the modification logic to anonymize the spouse's image by, for example, replacing the spouse's image with that of a replacement image from the replacement images memory 118. Such replacements may be undertaken, for example, based on a wish of the, in this case, spouse, to maintain anonymity.

As another example, the recognition logic 112 may analyze the media asset 102 to determine that the setting content is such that all non-recognized persons should be anonymized.

At the operation 410, an attribute of a concurrently-imaged object within the media asset 102 is determined. For example, an attribute of the concurrent image(s) 120 may be determined, where the concurrent image(s) 120 may include virtually any item that may be imaged within the media asset 102. As mentioned above, the concurrently-imaged object(s) 120 also may be used to determine a setting content of the media asset 102, although the attribute of a concurrently-imaged object reference in operation 410 may refer to any particular imaged item, or attribute thereof, which may or may not be a part of a setting content of the media asset 102.

Figure 5:
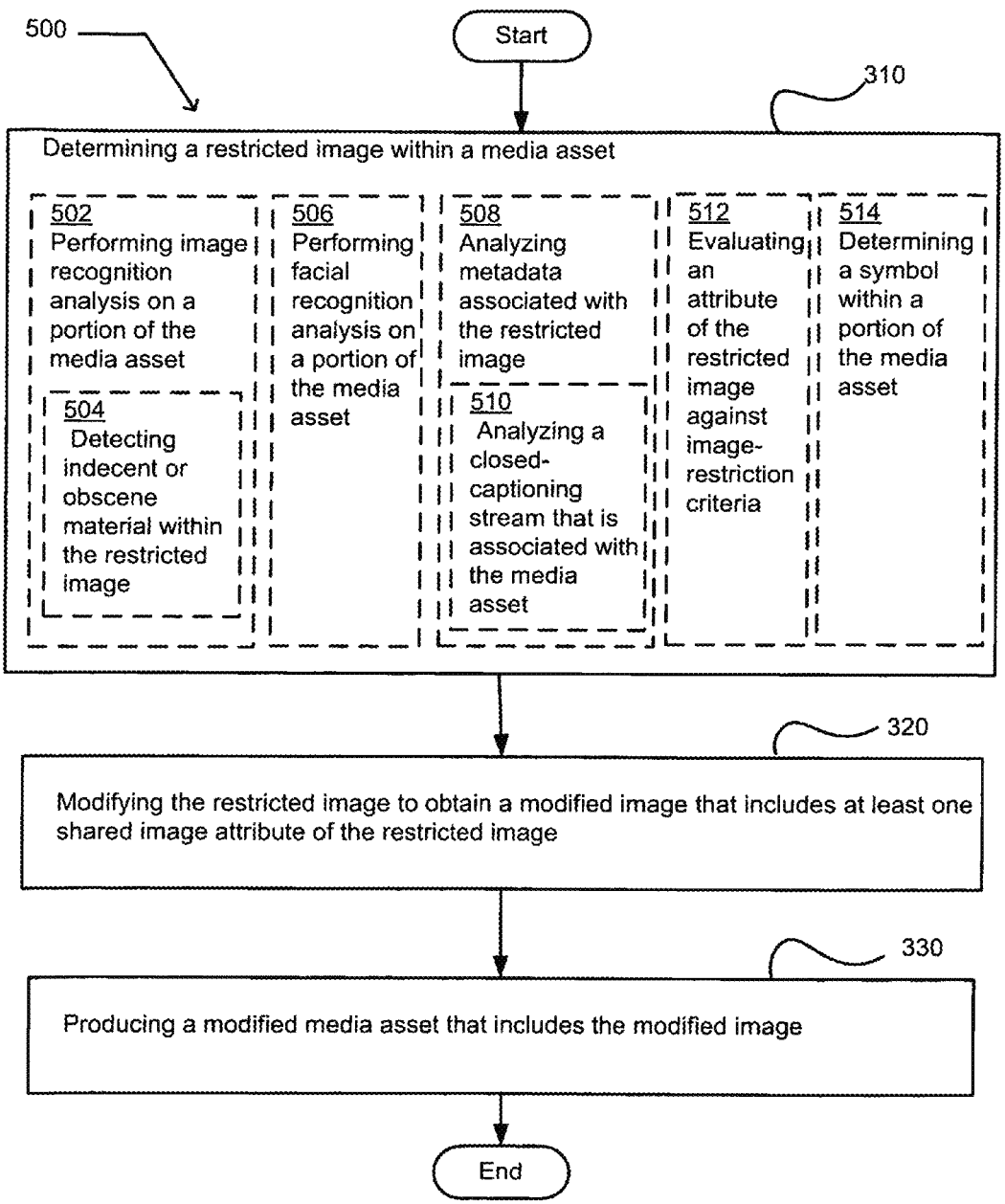
FIG. 5 illustrates another alternative embodiment of the example operational flow of FIG. 3.

FIG. 5 illustrates alternative embodiments of the example operational flow 300 of FIG. 3. FIG. 5 illustrates example embodiments where the determining operation 310 may include at least one additional operation. Additional operations may include operation 502, operation 504, operation 506, operation 508, operation 510, operation 512, and/or operation 514.

At the operation 502, image recognition analysis is performed on a portion of the media asset. For example, the recognition logic 112 may perform image recognition analysis on the restricted image 108 to determine that the restricted image 108 includes an image of a person, or portion thereof, or any other object that may be visually imaged. The image recognition analysis may include, for example, color analysis, pattern-matching, pattern-recognition, or any other technique for recognizing a particular image or type of image. In particular, in an example additional operation 504 that may be performed in addition to, or in association with, operation 502, indecent or obscene material may be detected. For example, the recognition logic 112 may recognize nudity or other restricted imagery within the restricted image 108. In this case, as described in more detail below, later modification of the restricted image 108 may include addition of clothes or other modification of the restricted image, where again, and as opposed to simple blurring or blocking of the restricted image, a presentation context of the restricted image 108 may be maintained, so that an observer of the modified media asset 106 may not notice that such a modification has taken place. As is apparent, moreover, such image recognition analyses may be performed on any part of the media asset 102, including, for example, the concurrent image(s) 120, as part of the determining operation 502.

At the operation 506, facial recognition analysis is performed on a portion of the media asset. For example, the recognition logic 112 may perform a facial recognition analysis on a person within the restricted image 108, or on any other portion of the media asset.

At the operation 508, metadata associated with the restricted image is analyzed. For example, the recognition logic 112 may analyze the media asset 102 to determine and consider any associated metadata 128. For example, where the media asset includes a web page, the recognition logic 112 may analyze portions of the web page, including source code associated with the web page, that may provide information about, for example, any of the factors mentioned herein, or other factors (e.g., identity information, a capturing user or device, a setting content, a concurrently-imaged object, or any other information about the media asset 102 that may be useful to the recognition logic 112 in determining the restricted image 108). In a further example of the operation 508, at the operation 510, a closed-captioning stream that is associated with the media asset 102 is analyzed. For example, the media asset 102 may represent a television show or movie that has an associated closed-captioning stream, which may be analyzed by the recognition logic 112 to assist in making a determination regarding the restricted image 108.

At the operation 512, an attribute of the restricted image is evaluated against image-restriction criteria. For example, the recognition logic 112 may communicate with the image restriction criteria 116 in order to assist in performing recognition processes. In this case, the attribute of the restricted image 108 may include any image attribute mentioned herein, or other attributes, including a size, shape, color, identity, race, gender, physique, an associated capture device or capturing user, or any other attribute. The image restriction criteria 116 may involve, for example, any of the various criteria described herein, such as identity information, setting content, image or facial recognition analysis, metadata, and so on, as well as criteria not explicitly mentioned here. Moreover, the image restriction criteria 116 and recognition logic 112 may interoperate to determine the restricted image 108 based on any combination of these criteria, as may be determined and configured by the user 122 by way of the user interface 124.

At the operation 514, a symbol is determined within a portion of the media asset 102. For example, the symbol or text 130 may be determined by way of text-recognition software, and thereby used to determine identity or other information related to the restricted image 108.

Figure 6:
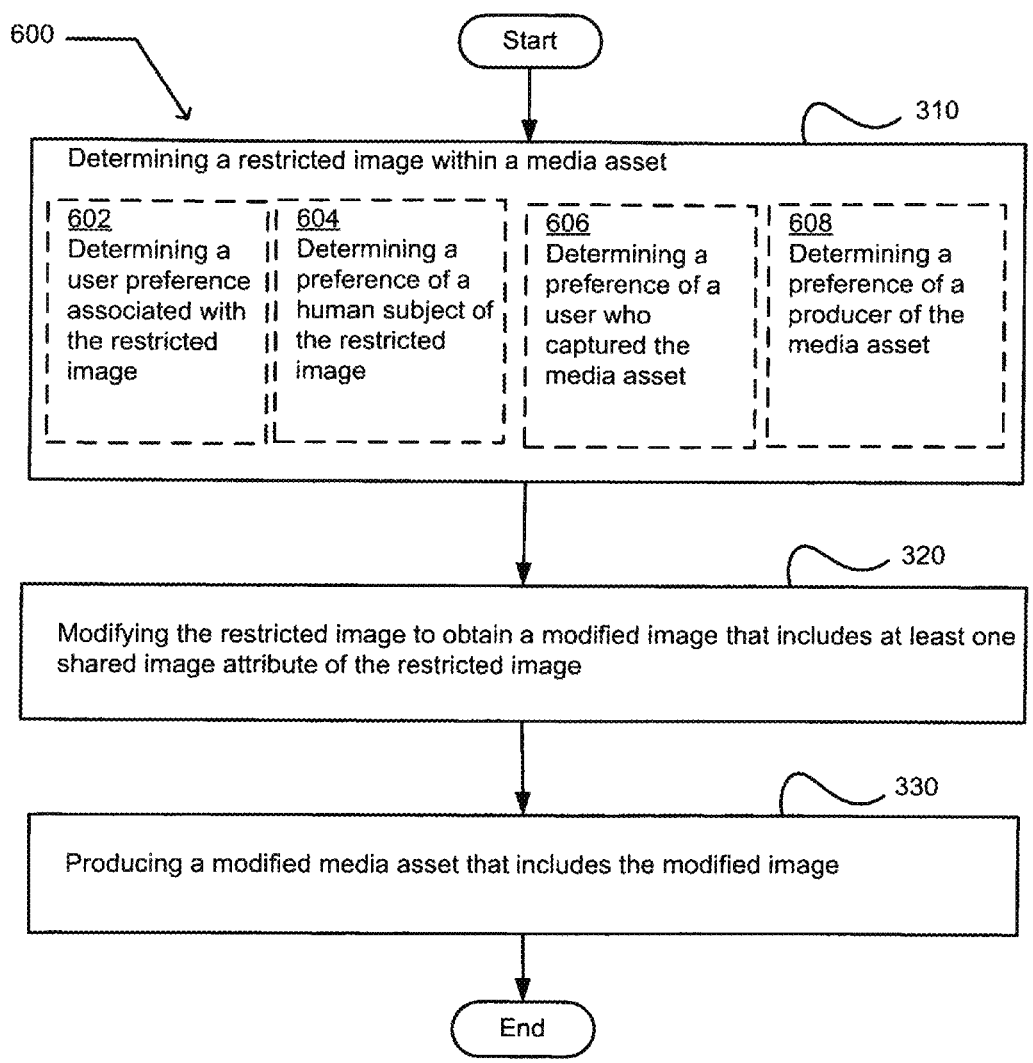
FIG. 6 illustrates another alternative embodiment of the example operational flow of FIG. 3.

FIG. 6 illustrates alternative embodiments of the example operational flow 300 of FIG. 3. FIG. 6 illustrates example embodiments where the determining operation 310 may include at least one additional operation. Additional operations may include operation 602, operation 604, operation 606, and/or operation 608.

At the operation 602, a user preference associated with the restricted image is determined. For example, the user 122 may express a preference as to whether the restricted image 108 should be restricted, and this preference may be coded into the image restriction criteria 116, e.g., again, using the interface 124. The user 122 may represent someone either capturing, transmitting, or reviewing the media asset 102, examples of which are described in more detail, below.

At the operation 604, a preference of a human subject of the restricted image is determined. For example, a public or private figure may express a desire not to be included in the media asset 102. Therefore, if such a person is, in fact, included in the media asset 102, then the recognition logic 112 may recognize the person and, perhaps based on the preference of the person as stored in the image restriction criteria 116, may anonymize the image of the person by, for example, replacing the image with one selected from the replacement images 118, or otherwise by modifying the image.

At the operation 606, a preference of a user who captured the media asset may be determined. For example, the user 122 may be a consumer who has captured several family photographs and wishes to distribute them to friends and relatives, but wishes to anonymize certain subjects of the photographs, perhaps dependent on who is to receive a particular one of the photographs. In this case and analogous cases, the user 122 may provide a preference(s) to the recognition logic 112 defining a level and/or type of anonymization to be provided, with respect to individual image subjects, and/or with respect to recipients of the modified media asset 106, or with respect to one or more other image-restriction criteria, various examples of which are provided herein.

At the operation 608, a preference of a producer of the media asset may be determined. For example, the user 122 may represent an editor of a newspaper who is reviewing a number of photographs taken by staff photographers, among which the media asset 102 may be included. In this case, although the editor may not have captured the media asset 102, he or she may be responsible for producing the modified media asset 106 using the processing system 104. As such, preferences of such a user defining a level and/or type of anonymization to be provided, with respect to the one or more criteria described herein, may be implemented by the recognition logic 112 in determining the restricted image 108 within the media asset 102.

Figure 7:
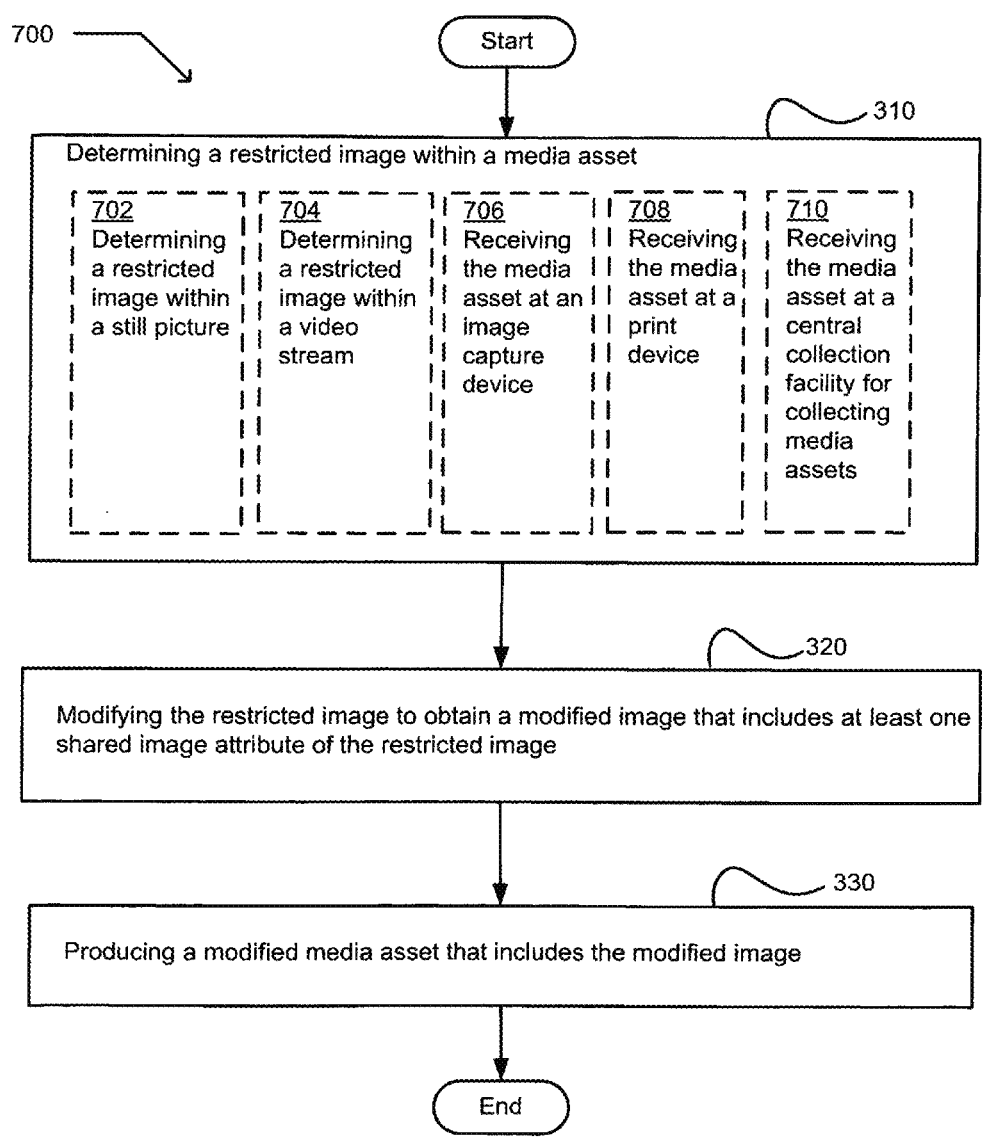
FIG. 7 illustrates another alternative embodiment of the example operational flow of FIG. 3.

FIG. 7 illustrates alternative embodiments of the example operational flow 300 of FIG. 3. FIG. 7 illustrates example embodiments where the determining operation 310 may include at least one additional operation. Additional operations may include operation 702, operation 704, operation 706, operation 708, and/or operation 710.

At the operation 702, a restricted image is determined within a still picture. For example, if the media asset 102 includes a still picture taken by a still camera, such as, for example, an embodiment of the camera 126b of FIG. 2, then the restricted image 108 may be determined to be any image within the still picture.

At the operation 704, a restricted image is determined within a video stream. For example, if the media asset includes any type of video, including Motion Pictures Experts Group (MPEG) video or other format, video recorded or transmitted for display on any television, computer, or other display, then the restricted image 108 may be determined as essentially any discernable element within the video. As just one example, the restricted image 108 may be determined as an image within one or more frames of the video image(s).

At the operation 706, the media asset is received at an image capture device. For example, the media asset 102 may be received at the image capture device 126b of FIG. 2B. As is apparent from the preceding discussion, the image capture device 126b may be any type of, for example, camera, digital camera, web camera (webcam) or video camera, where any of these and others may be disposed within or in association with one or more other devices, such as, for example, a cell phone or personal digital assistant (PDA).

At the operation 708, the media asset may be received at a print device. For example, the media asset 102 may be received at the print device 126a of FIG. 2A, such as when the media asset is downloaded thereto by way of an external computer, and/or by way of a memory card inserted into (or otherwise connected to) the print device 126a. In this way, for example, the print device 126a, as with the camera 126b, may be prevented from producing and/or capturing the restricted image 108.

At the operation 710, the media asset is received at a central collection facility for collecting media assets. For example, as referenced above, the processing service 208 of FIG. 2C may serve as a clearinghouse for a number of users, who may be employees of a single employer. In another example, the processing service 208 may be a commercial enterprise that received media assets from any number of disparate consumers.

Figure 8:
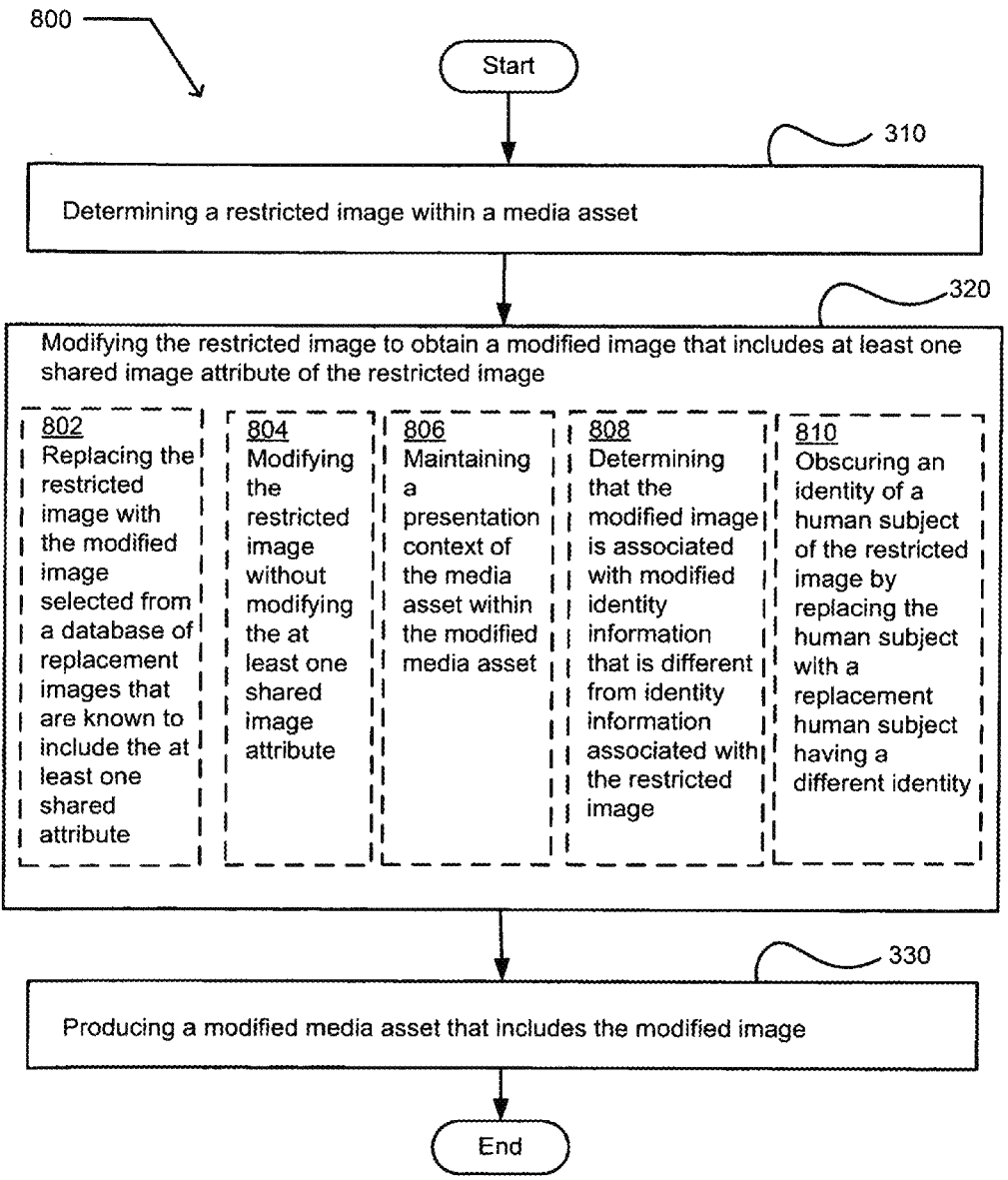
FIG. 8 illustrates an alternative embodiment of the example operational flow of FIG. 3.

FIG. 8 illustrates alternative embodiments of the example operational flow 300 of FIG. 3. FIG. 8 illustrates example embodiments where the modifying operation 320 may include at least one additional operation. Additional operations may include operation 802, operation 804, operation 806, operation 808, and/or operation 810.

At the operation 802, the restricted image is replaced with the modified image selected from a database of replacement images that are known to include the at least one shared attribute. For example, the modified image 110 may be selected from the replacement images memory 118 to overlay the restricted image 108, with appropriate scaling, warping, rotating, color-matching, or any other operation required by the modification logic 114 to insert the replacement image 110.

At the operation 804, the restricted image may be modified without modifying the at least one shared image attribute. For example, and somewhat contrary to the example just given, the restricted image may be altered without a full replacement of the image 108. For example, if the replacement image 108 includes a public figure having brown hair, a certain style of dress, or some other distinguishing characteristic, then such a characteristic may be maintained within the modified image 110. Thus, a person or other object in the restricted image 108 may be anonymized, with a minimum disruption to the media asset 102 as a whole.

At the operation 806, a presentation context of the media asset is maintained within the modified media asset. For example, not only may the concurrent image(s) 120 be maintained within the modified media asset 110, but the modified image 110 itself may be inserted with minimal or no disruption to a continuity of color, lighting, shading, clarity, or other aspects of presentation of the modified media asset.

At the operation 808, the modified image is determined to be associated with modified identity information that is different from identity information associated with the restricted image. For example, as referred to above, it may be the case that the processing system 104 is operable to anonymize a figure or object, e.g., a person, within the restricted image 108. By ensuring that the identity information (e.g., name, facial features, occupation, or any other identity information) associated with the modified image 110 is different from identity information associated with the restricted image 108, at least one aspect of the anonymization of the figure is provided.

At the operation 810, an identity of a human subject of the restricted image is obscured by replacing the human subject with a replacement human subject having a different identity. For example, and similarly to some of the examples already given, a human subject in the restricted image 108 of FIG. 1 may be replaced, perhaps using an image from the replacement images database 118, where the modification logic 114 is operable to determine the identity of the human subject, perhaps in conjunction with the image restriction criteria 116 and/or the recognition logic 112.

Figure 9:
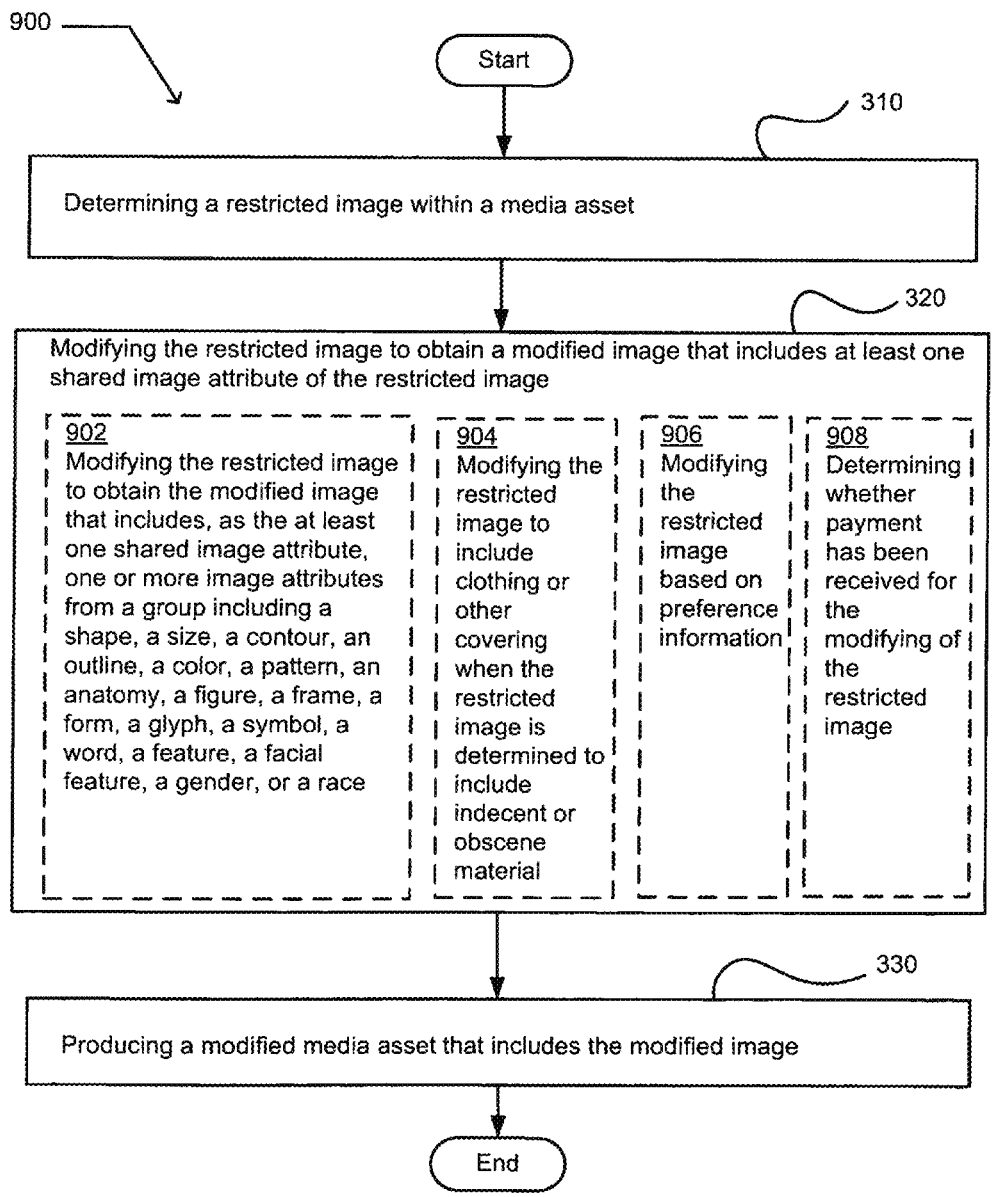
FIG. 9 illustrates an alternative embodiment of the example operational flow of FIG. 3.

FIG. 9 illustrates alternative embodiments of the example operational flow 300 of FIG. 3. FIG. 9 illustrates example embodiments where the modifying operation 320 may include at least one additional operation. Additional operations may include operation 902, operation 904, operation 906, and/or operation 908.

At the operation 902, the restricted image is modified to obtain the modified image that includes, as the at least one shared image attribute, one or more image attributes from a group including a shape, a size, a contour, an outline, a color, a pattern, an anatomy, a figure, a frame, a form, a glyph, a symbol, a word, a feature, a facial feature, a gender, or a race. For example, the recognition logic 112 may access the image restriction criteria 116 to determine one or more of these criteria, or other criteria, to determine the restricted image 108, as referenced above, and then the modification logic 114 may, perhaps in association with the replacement images 118, determine the modified image 110 in which at least one of the above attributes shared between the modified image 110 and the restricted image 108.

At the operation 904, the restricted image is modified to include clothing or other covering when the restricted image is determined to include indecent or obscene material. For example, if the media asset 102 includes a website that includes a restricted image 108 that includes nudity, then the recognition logic may so recognize, and the modification logic 114 may add clothing or other covering to the restricted image 108. In this way, a general appearance of the website may be maintained.

At the operation 906, the restricted image may be modified based on preference information. For example, a number of types of preference information are described above, including preferences of the user who captured or created the media asset 102, or preferences of a human subject of the media asset 102, or preferences of a user who is in charge of producing, storing, transmitting, or delivering the media asset 102. Although such preference information was described above in terms of determining the restricted image 108, the operation 906 and examples provided herein also illustrate that such preferences, and other preferences, also may be used to determine a type or extent of modification that is performed by, for example, the modification logic 114.

At the operation 908, it is determined whether payment has been received for the modifying of the restricted image. For example, the user 122 may access the processing service 208 as part of a paid service in which the user 122 obtains modification of the media asset 102 in exchange for payment.

In this context, payment may refer generally to any type of monetary compensation, and/or non-monetary compensation, and/or economic value exchange. Such payment may, for example, occur between any pair of entities and/or other group of entities. By way of example and not limitation, a payment may include a non-monetary payment, such as a credit or coupon that may be exchanged for goods or services, a reduced or eliminated cost to a user or users for related or non-related goods or services. In another example, a payment may include granting a party certain rights or permissions as payment, such as information-related permissions. The user also may accept cash or cash-equivalents as payment from the provider for providing such entitlements, rights, or permissions. Thus, by providing and/or receiving monetary or non-monetary value, in an amount that may be designated as part of an agreement between the relevant parties, the parties may gain advantages and benefits that are mutually acceptable to both.

Figure 10:
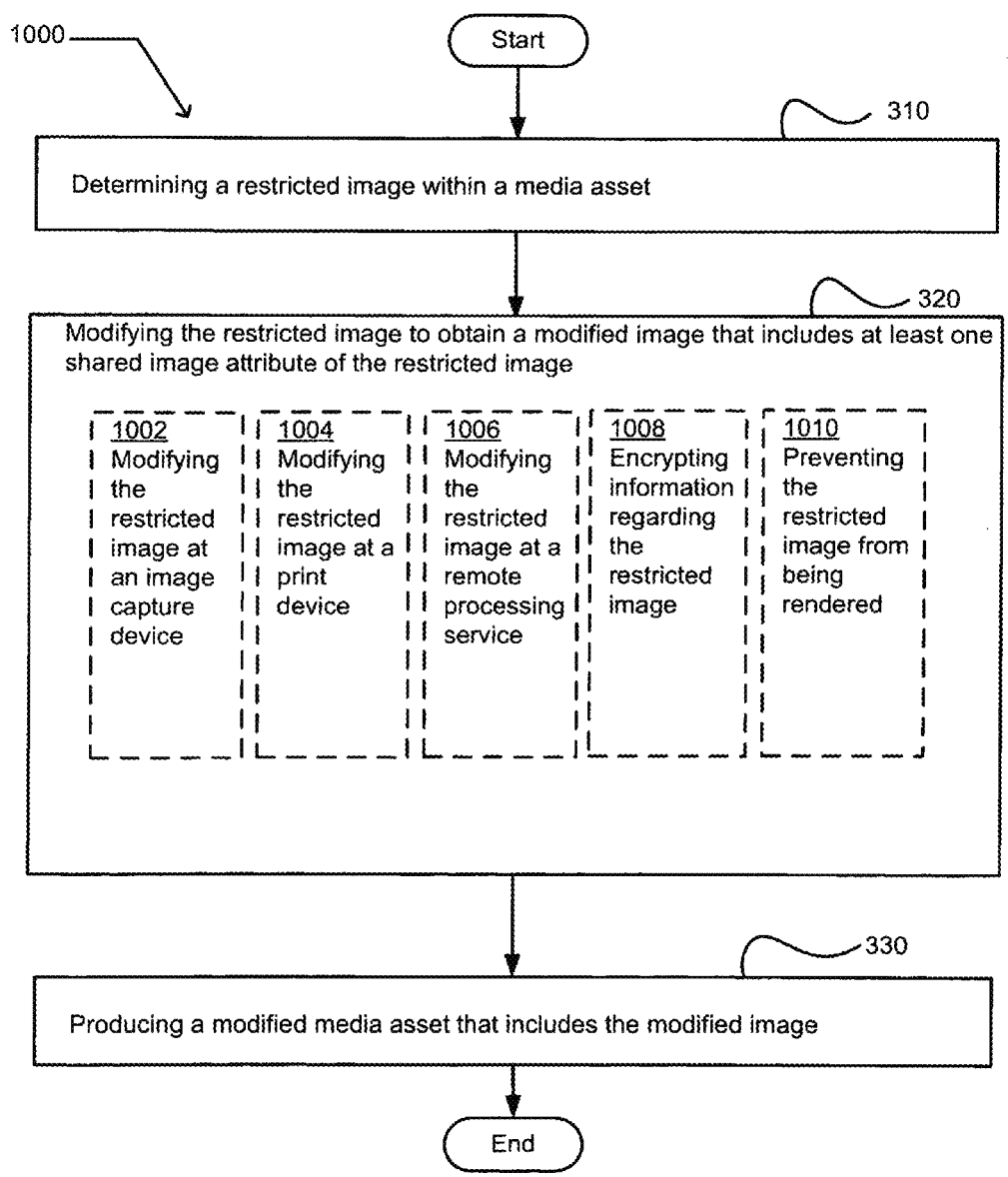
FIG. 10 illustrates an alternative embodiment of the example operational flow of FIG. 3.

FIG. 10 illustrates alternative embodiments of the example operational flow 300 of FIG. 3. FIG. 10 illustrates example embodiments where the modifying operation 320 may include at least one additional operation. Additional operations may include operation 1002, operation 1004, operation 1006, operation 1008, and/or operation 1010.

At the operation 1002, the restricted image is modified at an image capture device. For example, the restricted image 108 is modified at the processing system 104 within the camera 126b of FIG. 2B. Further, at the operation 1004, the restricted image is modified at a print device. For example, the restricted image 108 may be modified at the processing system 104 by the print device 126a of FIG. 2A. Further, at the operation 1006, the restricted image may be modified at a remote processing service. For example, the restricted image 108 may be modified at a processing system 104 of the processing service 208 of FIG. 2C.

At the operation 1008, information regarding the restricted image may be encrypted. For example, the modification logic 114 may be operable to encrypt the media asset 102 and/or the restricted image 108, prior to, or in conjunction with, producing the modified media asset 110. For example, the encrypted restricted image 108 may be aggregated with the modified media asset for output, or the encrypted restricted image 108 may be stored remotely from the modified media asset 110.

At the operation 1010, the restricted image is prevented from being rendered. For example, the modification logic 114 may corrupt information regarding the restricted image 108 such that the information is not, or can not be, stored for later access. In this way, for example, the anonymity of a person in the restricted image 108 may be maintained in full confidence.

Figure 11:
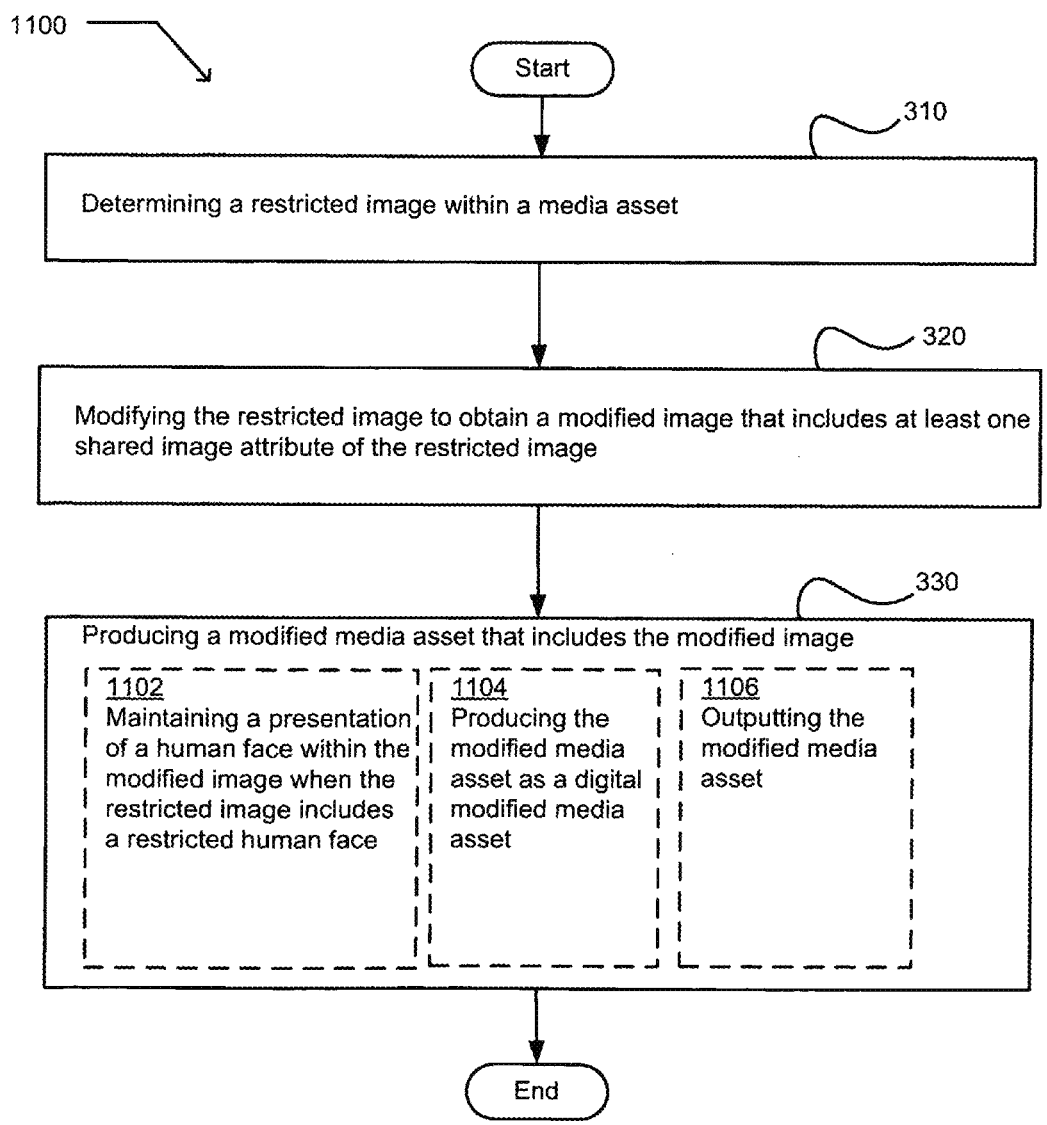
FIG. 11 illustrates an alternative embodiment of the example operational flow of FIG. 3.

FIG. 11 illustrates alternative embodiments of the example operational flow 300 of FIG. 3. FIG. 11 illustrates example embodiments where the producing operation 330 may include at least one additional operation. Additional operations may include operation 1102, operation 1104, and/or operation 1106.

At the operation 1102, a presentation of a human face is maintained within the modified image when the restricted image includes a restricted human face. For example, if the restricted image 108 includes a human face of a public figure or some other individual who has requested some level of anonymity, then that face may be replaced or otherwise modified, perhaps using the replacement images 118, by the modification logic 114.

At the operation 1104, the modified media asset is produced as a digital modified media asset. For example, the modification logic 114 may be operable to output the modified media asset 110 as a digital media asset.

At the operation 1106, the modified media asset is output. For example, the modified media asset 110 may be output to the user 122, who, as is apparent from the above discussion, may represent someone who has captured the media asset, someone who is reviewing the media asset, someone who is receiving the media asset, or anyone else who may have cause to receive the media asset.

Figure 12:
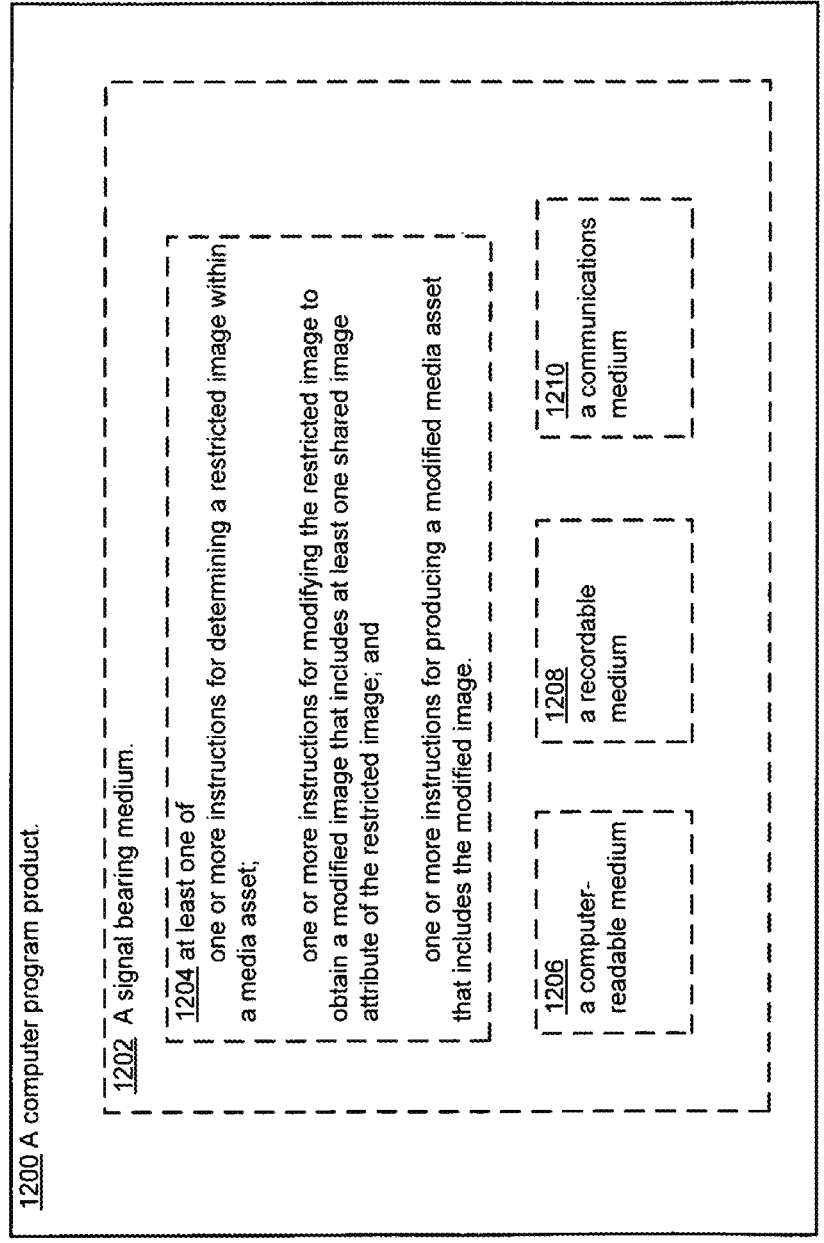
FIG. 12 illustrates a partial view of an example computer program product that includes a computer program for executing a computer process on a computing device.

FIG. 12 illustrates a partial view of an exemplary computer program product 1200 that includes a computer program 1204 for executing a computer process on a computing device. An embodiment of the exemplary computer program product 1200 is provided using a signal bearing medium 1202, and may include at least one of one or more instructions for determining a restricted image within a media asset, one or more instructions for modifying the restricted image to obtain a modified image that includes at least one shared image attribute of the restricted image, and one or more instructions for producing a modified media asset that includes the modified image. The one or more instructions may be, for example, computer executable and/or logic-implemented instructions. In one implementation, the signal-bearing medium 1202 may include a computer-readable medium 1206. In one implementation, the signal-bearing medium 1202 may include a recordable medium 1208. In one implementation, the signal-bearing medium 1202 may include a communications medium 1210.

Figure 13:
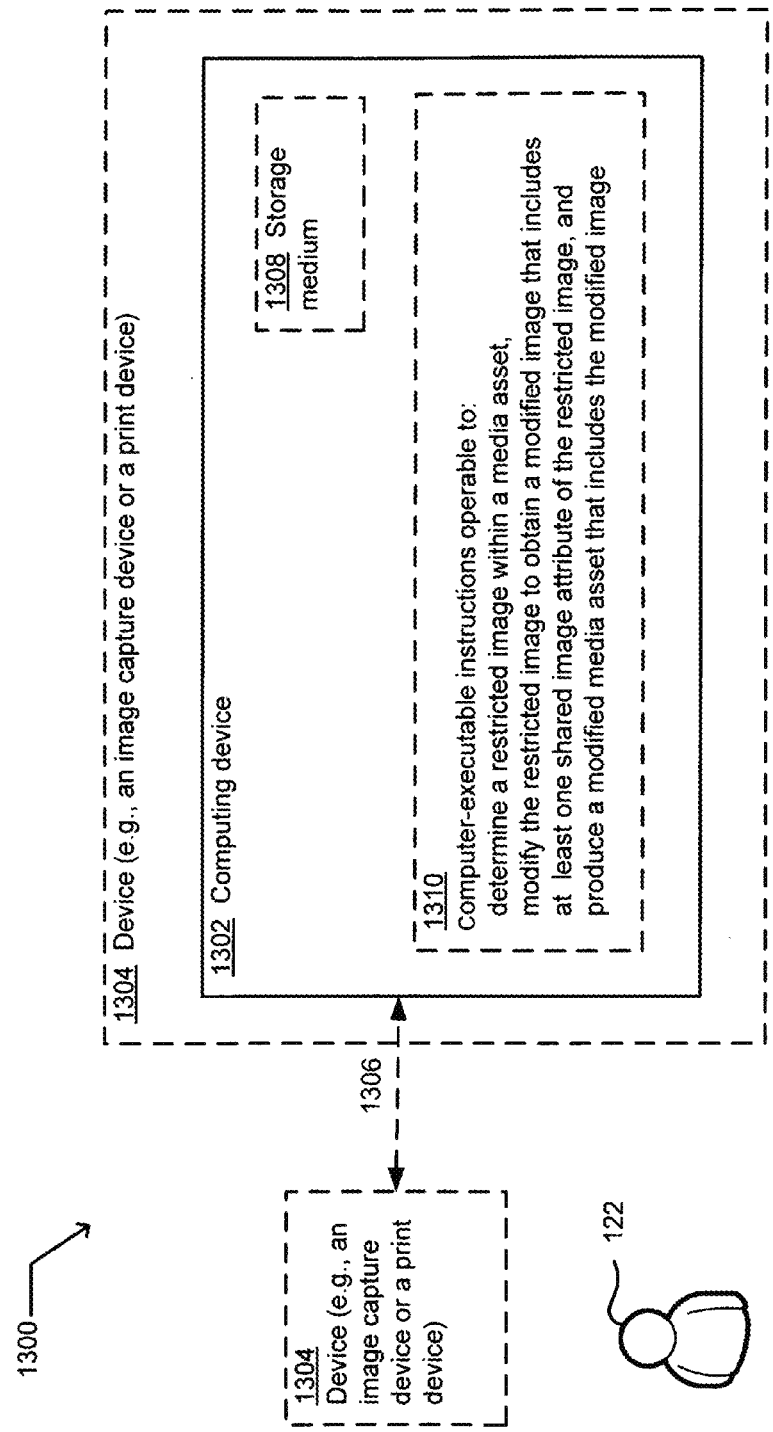
FIG. 13 illustrates an example device in which embodiments may be implemented.

FIG. 13 illustrates an exemplary system 1300 in which embodiments may be implemented. The system 1300 includes a computing system environment. The system 1300 also illustrates the user 122 using a user device 1304, which is optionally shown as being in communication with a computing device 1302 by way of an optional coupling 1306. The optional coupling 1306 may represent a local, wide-area, or peer-to-peer network, or may represent a bus that is internal to a computing device (e.g., in example embodiments in which the computing device is contained in whole or in part within the user device 1304. A storage medium 1308 may be any computer storage media.

The computing device 1302 includes an operability to receive the media asset 102. The computing device 1302 also includes computer executable instructions 1310 that when executed on the computing device 1302 causes the computing device 1302 to determine a restricted image within a media asset, modify the restricted image to obtain a modified image that includes at least one shared image attribute of the restricted image, and produce a modified media asset that includes the modified image.

As referenced above and as shown in FIG. 13, in some examples, the computing device 1302 may optionally be contained in whole or in part within the user device 1304, and may include the image-capture device (camera) 126*b* or the printer 126*a*. For example, the user device 1304 may include a cell phone, and the computing device 1302 may be included as part of a digital camera included within the cell phone. In another example embodiment, the computing device 1302 is operable to communicate with the user device 1304 associated with the user 122 to receive the media asset 102 from the user 122 and to provide the modified media asset 106 to the user 122.

Figure 14:
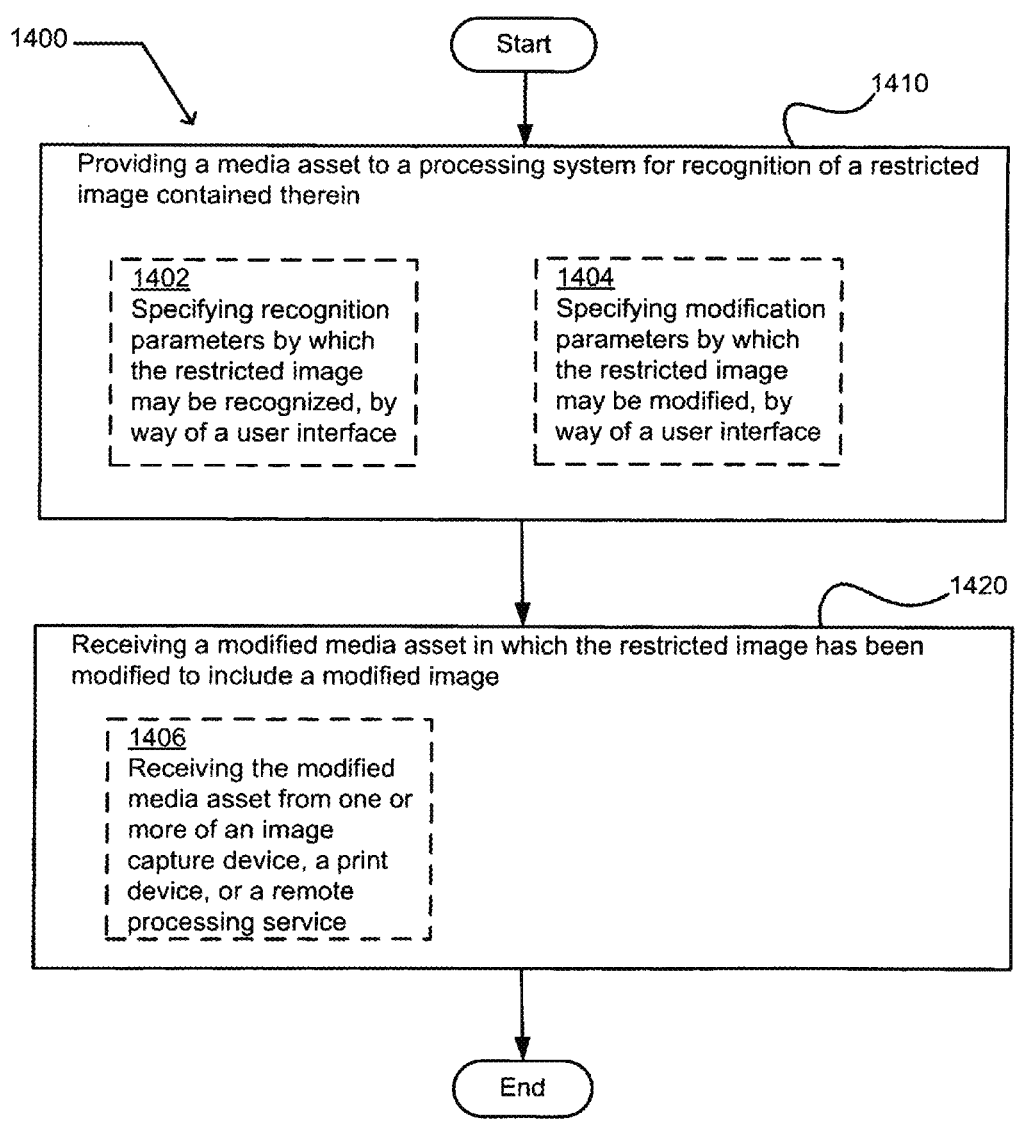
FIG. 14 illustrates an operational flow representing example operations by which a user receives a modified media asset that includes a modified image.

FIG. 14 illustrates an operational flow 1400 representing example operations by which the user 122 obtains the modified media asset 106 that includes the modified image 110. At operation 1410, a user provides a media asset to a processing system for recognition of a restricted image contained therein. For example, the user 122 may provide the media asset 102 to the processing system 104 for recognition of the restricted image 108 by the recognition logic 112. At operation 1420, a modified media asset is received in which the restricted image has been modified to include a modified image. For example, the modified media asset 106 may be received in which the restricted image 108 has been modified to include the modified image 110.

The operation 1410 may include one or more additional operations. For example, the operation 1410 may include an operation 1402 in which recognition parameters by which the restricted image may be recognized are specified by way of a user interface. For example, the user 122 may set parameters of the recognition logic 112.

Also, the operation 1410 may include an operation 1404, in which modification parameters by which the restricted image may be modified are specified by way of a user interface. For example, the user 122 may specify parameters of the modification logic 114, by way of the user interface 124.

The operation 1420 may include one or more operations. For example, the operation 1420 may include an operation 1406, in which the modified media asset is received from one or more of an image capture device, a print device, or a remote processing service. For example, the user 122 may receive the modified media asset 106 by way of the print device 126*a*, the camera 126*b*, or the remote processing system 208.

Of course, the user 122 may receive the modified media asset 106 in other ways. For example, the modified media asset 106 may be received as stored on a memory device. For example, the user may capture an audio and/or visual file using an image capture device or by way of downloading from a website or other location. The user may store the resulting digital file on a memory card, memory stick, CD, DVD, or other storage media.

Figure 15:
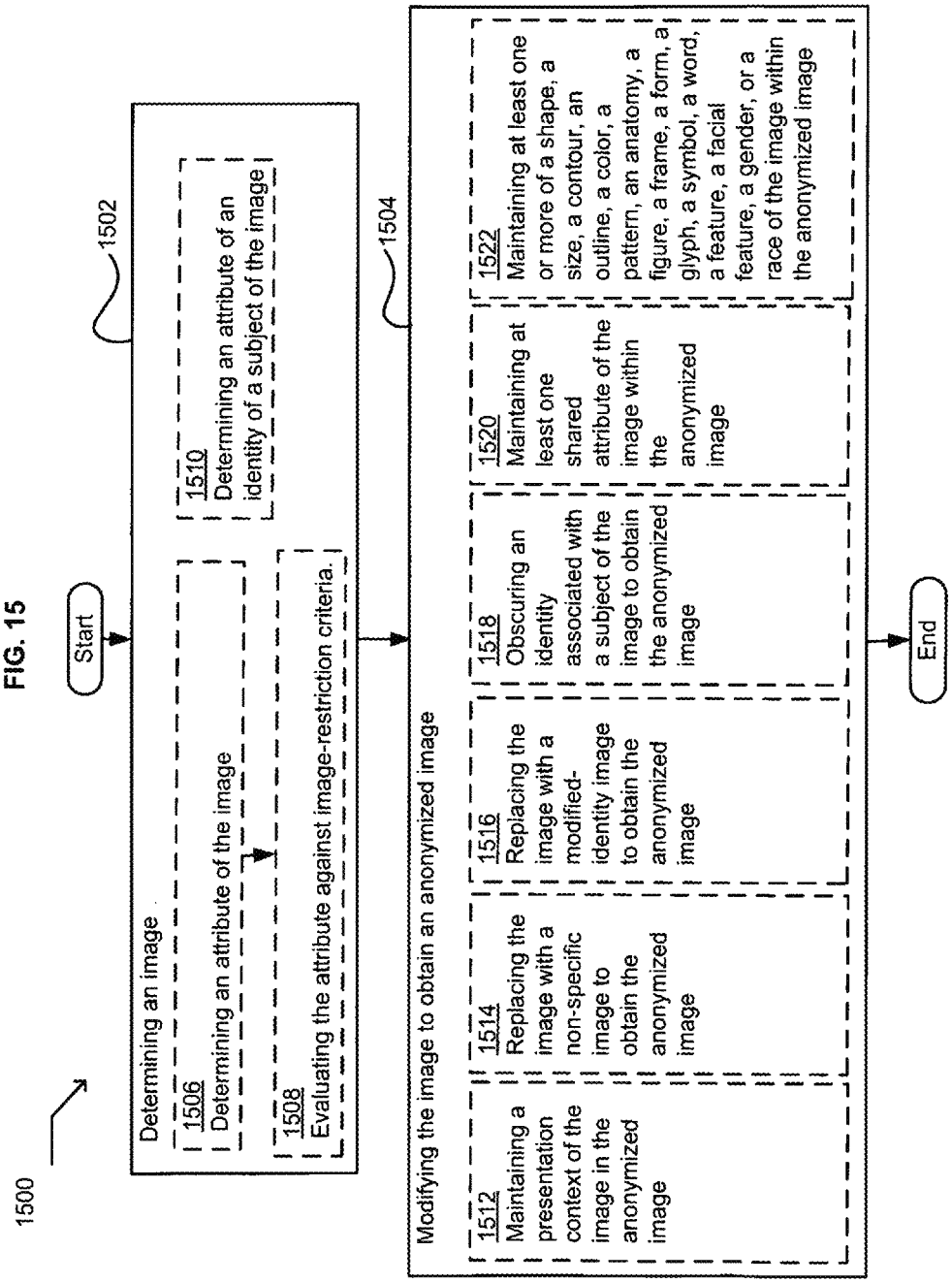
FIG. 15 illustrates an operational flow representing example operations that produce an anonymized image.

FIG. 15 illustrates an operational flow 1500 representing example operations that produce the modified media asset 106. After a start operation, the operational flow 1500 moves to a determining operation 1502 where an image is determined. For example, the image 108 may be determined to exist within the media asset 102. At the operation 1504, the image is modified to obtain an anonymized image. For example, as described in various contexts above, one image may be altered or changed such that a subject of the image is protected from inclusion therein, yet without alerting a user in a normal or anticipated use of the image from noticing the protection.

The operational flow 1500 may include additional operations. For example, the operational flow 1500 may include operations 1506, 1508, 1510, 1512, 1514, 1516, 1518, 1520, and 1522.

At the operations 1506 and 1508, respectively, and as an alternative embodiment of the determining operation 1502, an attribute of the image is determined, and the attribute is evaluated against image-restriction criteria. For example, the recognition logic 112 may determine an attribute(s) of the media asset 102, or of the image 108 itself, including any of the numerous attributes discussed herein, or others not specifically discussed. Then, the recognition logic 112 may evaluate the attribute against the image restriction criteria 116.

At the operation 1510, an attribute of an identity of a subject of the image is determined. For example, a subject of the image 108 may be a public figure, or someone else who has specified (or about whom it has been specified) that any or certain images of him or herself should be anonymized. The recognition logic 112 may thus determine an attribute of an identity of this person, including those mentioned herein such as name, occupation, physical trait, or others.

The modifying operation 1504 may include alternative embodiments, as well. For example, at the operation 1512, a presentation context of the image in the anonymized image is preserved. For example, the modified image 110 may be presented with a same or similar clarity, resolution, contrast, color, or balance as the image 108 (as opposed to, e.g., simply blocking out or blurring the image 108), and/or the concurrent image(s) 120 may be maintained.

At the operation 1514, the image may be replaced with a non-specific image to obtain the anonymized image. For example, a non-specific image, e.g., an image that is not specific to the media asset 102, and/or to a subject of the image 108, may be selected from the replacement images 118.

At the operation 1516, the image may be replaced with a modified-identity image to obtain the anonymized image. For example, the modified image 110 may be associated with a subject having an identity different from that of an identity of the image 108.

At the operation 1518, an identity associated with a subject of the image may be obscured to obtain the anonymized image. For example, an identity of the subject of the image 108 may be obscured, as opposed to the image 108 itself being obscured in the sense of being blocked out, covered, or blurred.

At the operation 1520, at least one shared attribute of the image may be maintained within the anonymized image. Also, at the operation 1522, at least one or more of a shape, a size, a contour, an outline, a color, a pattern, an anatomy, a figure, a frame, a form, a glyph, a symbol, a word, a feature, a facial feature, a gender, or a race of the image may be maintained within the anonymized image. For example, any of the above attributes, or combinations thereof, or other attributes, may be maintained within the anonymized image 110 with respect to the image 108.

Figure 16:
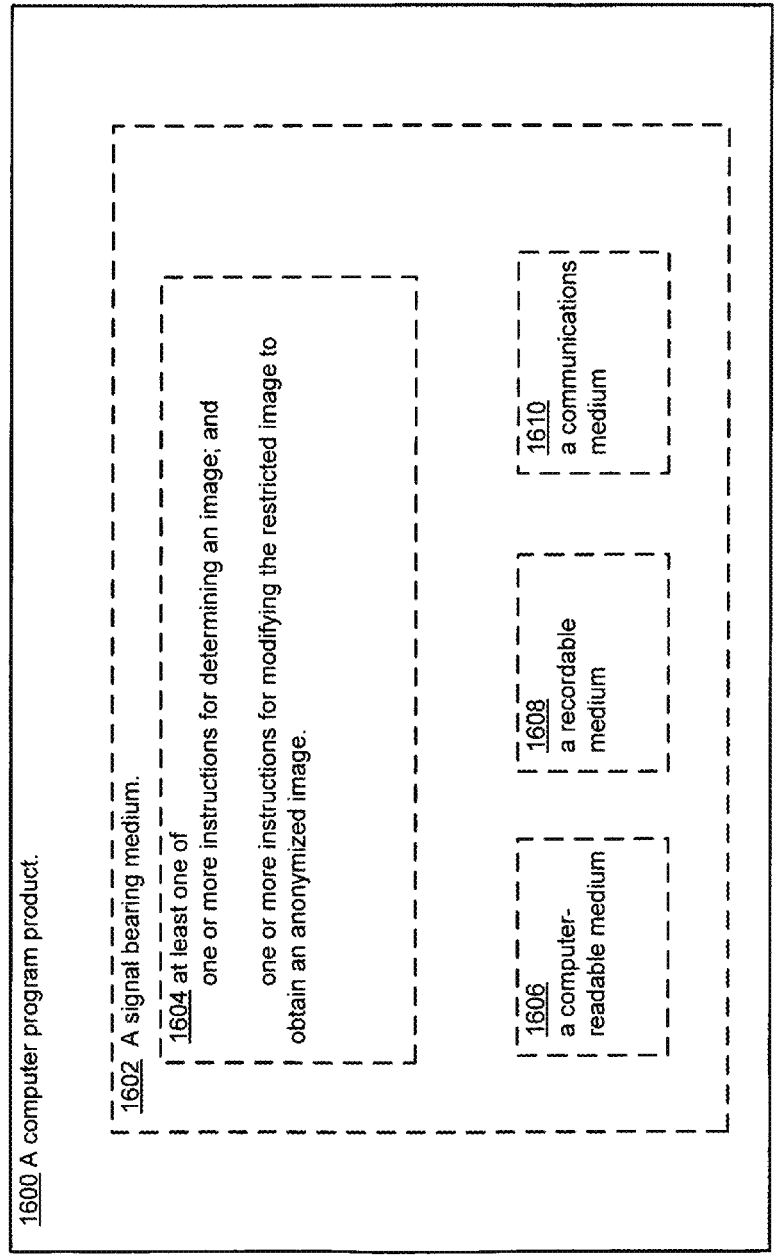
FIG. 16 illustrates a partial view of an example computer program product that includes a computer program for executing a computer process on a computing device.

FIG. 16 illustrates a partial view of an exemplary computer program product 1600 that includes a computer program 1604 for executing a computer process on a computing device. An embodiment of the exemplary computer program product 1600 is provided using a signal bearing medium 1602, and may include at least one of one or more instructions for determining an image, and one or more instructions for modifying the image to obtain an anonymized image. The one or more instructions may be, for example, computer executable and/or logic-implemented instructions. In one implementation, the signal-bearing medium 1602 may include a computer-readable medium 1606. In one implementation, the signal-bearing medium 1602 may include a recordable medium 1608. In one implementation, the signal-bearing medium 1602 may include a communications medium 1610.

Figure 17:
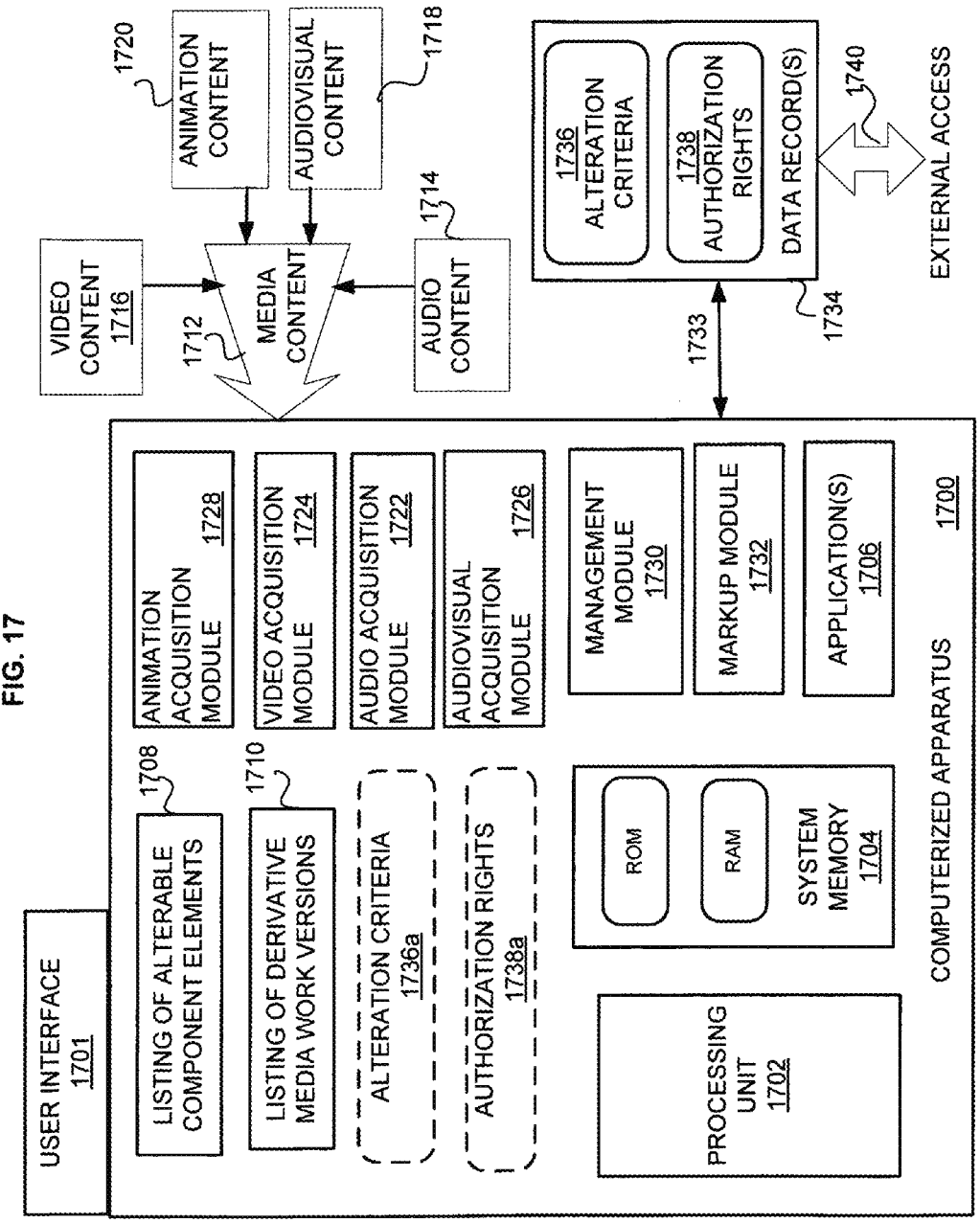
FIG. 17 is a schematic block diagram showing an exemplary embodiment for implementing possible content alteration of a media work.

Referring to the schematic block diagram of FIG. 17, an exemplary embodiment may include computerized apparatus 1700 having a processing unit 1702, system memory 1704, and one or more program applications 1706. Access may be provided via user interface 1701. Possible data records may include a listing of alterable component elements 1708 of a media work, and a listing of derivative media work versions 1710.

Media content 1712 available to the computerized apparatus 1700 may include audio content 1714, video content 1716, audiovisual content 1718, and animation content 1720. Such content may be received by audio acquisition module 1722, video acquisition module 1724, audiovisual acquisition module 1726, and animation acquisition module 1728. The various component elements and designated aspects of the media content 1712 may be manipulated and processed by management module 1730 and markup module 1732 in accordance with applicable criteria and authorization procedures.

Additional separate data records 1734 illustrated in FIG. 17 may be accessible to computerized apparatus 1700 through a communication link 1733. Such additional data records 1734 may also be available via an external access link 1740. Pertinent informational data records for one or more derivative versions of a composite media work may include records regarding alteration criteria 1736 and records regarding authorization rights 1738. It will be understood that various storage locations may be provided for pertinent information records related to possible alteration of the composite media work. In some instances the computerized apparatus 1700 may include local data records for alteration criteria 1736a and local records for authorization rights 1738a as well as additional local data records, depending on the circumstances.

Figure 18:
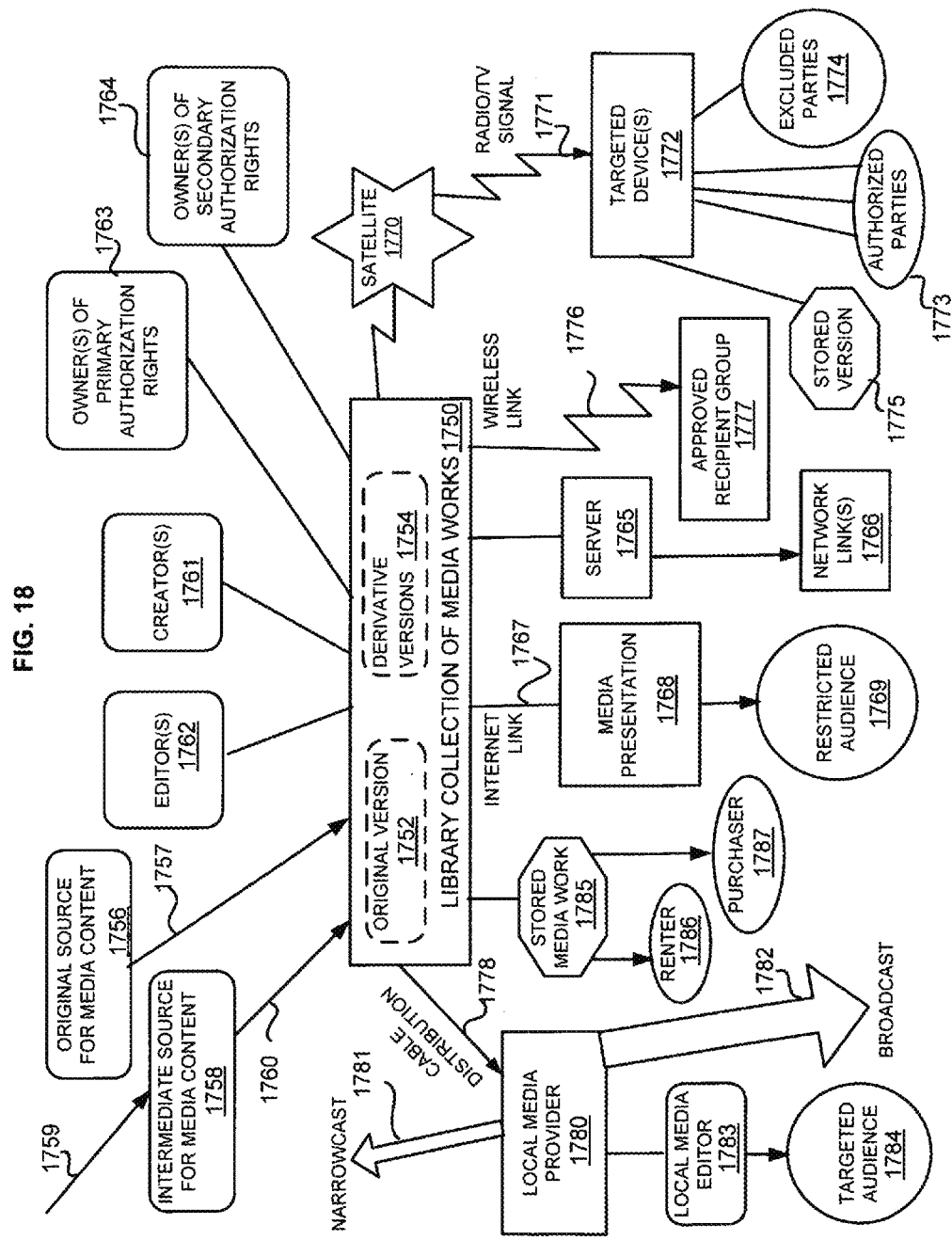
FIG. 18 is a schematic representation of various exemplary options for distribution of derivative versions of media works that incorporate content alterations.

The schematic representation of FIG. 18 illustrates various possible embodiment features for a library collection of media works 1750 that may include an original version 1752 of a media work as well as derivative versions 1754. Such media works may have capability for the addition, deletion, modification, and replacement of media element components as well as one or more designated aspects of the media content, as disclosed in more detail herein.

Some media works may be provided from an original source for media content 1756 via communication link 1757. In some instances a media work may have originated elsewhere and be transferred (e.g., delivered, downloaded, etc.) as shown by arrow 1759 to an intermediate source for media content 1758, and ultimately via communication link 1760 to be included in the library collection of media works 1750. Of course the library collection is shown schematically as a centralized block only for illustrative purposes, and can be collectively or randomly dispersed as deemed appropriate.

Organization and categorization of media content for purposes of possible alteration as well as implementation of such content alteration may be done by content creators 1761, editors 1762 and the like. In many instances it will be necessary to have direct or indirect participation by one or more owners of primary authorizations rights 1763 regarding an existing media work. It may also be necessary to have direct or indirect participation by one or more owners of secondary authorization rights 1764 regarding substitute content (e.g., already incorporated, scheduled for possible incorporation, in process of being created or selected for incorporation, etc.) for a derivative version of the media works.

For purposes of clarity, it will be understood that a "derivative version" as used herein is deemed to include all derived or iterative versions of a published or unpublished work including so-called "original" or "master" versions of a media work.

As further illustrated in FIG. 18, it will be understood that there are many possible embodiment features related to possible distribution channels for derivative versions that incorporate content alterations or are candidates for content alterations. For example, such distribution may be implemented by a server 1765 having one or more network links 1766. Another possible distribution channel may be provided by an Internet link 1767 for a media presentation 1768 to a restricted audience 1769.

A further possible distribution channel may be provided by satellite transmission 1770 of a radio or television signal 1771 to one or more targeted devices 1772. Such targeted devices 1772 may provide further controlled distribution to authorized parties 1773 as well as prevent distribution (e.g., access) to excluded parties 1774. In some instances a stored version 1775 may be approved and appropriate for future availability.

A wireless link 1776 may be available in some locations for distribution to an approved recipient group 1777. A further distribution channel may include cable distribution 1778 to a local media provider 1780 for re-transmittal via a narrowcast 1781 or a broadcast 1782 to potential viewers or listeners. In some instances additional content alteration of component elements or designated aspects may be accomplished by a local media editor 1783 for further distribution to a targeted audience 1784.

Another possible distribution technique may be implemented by making a stored media work 1785 available to a renter 1786 or a purchaser 1787 in accordance with applicable criteria and authorization rights. Of course, other distribution channels and techniques may be implemented, and the examples shown and described are not intended to be limiting.

Figure 19:
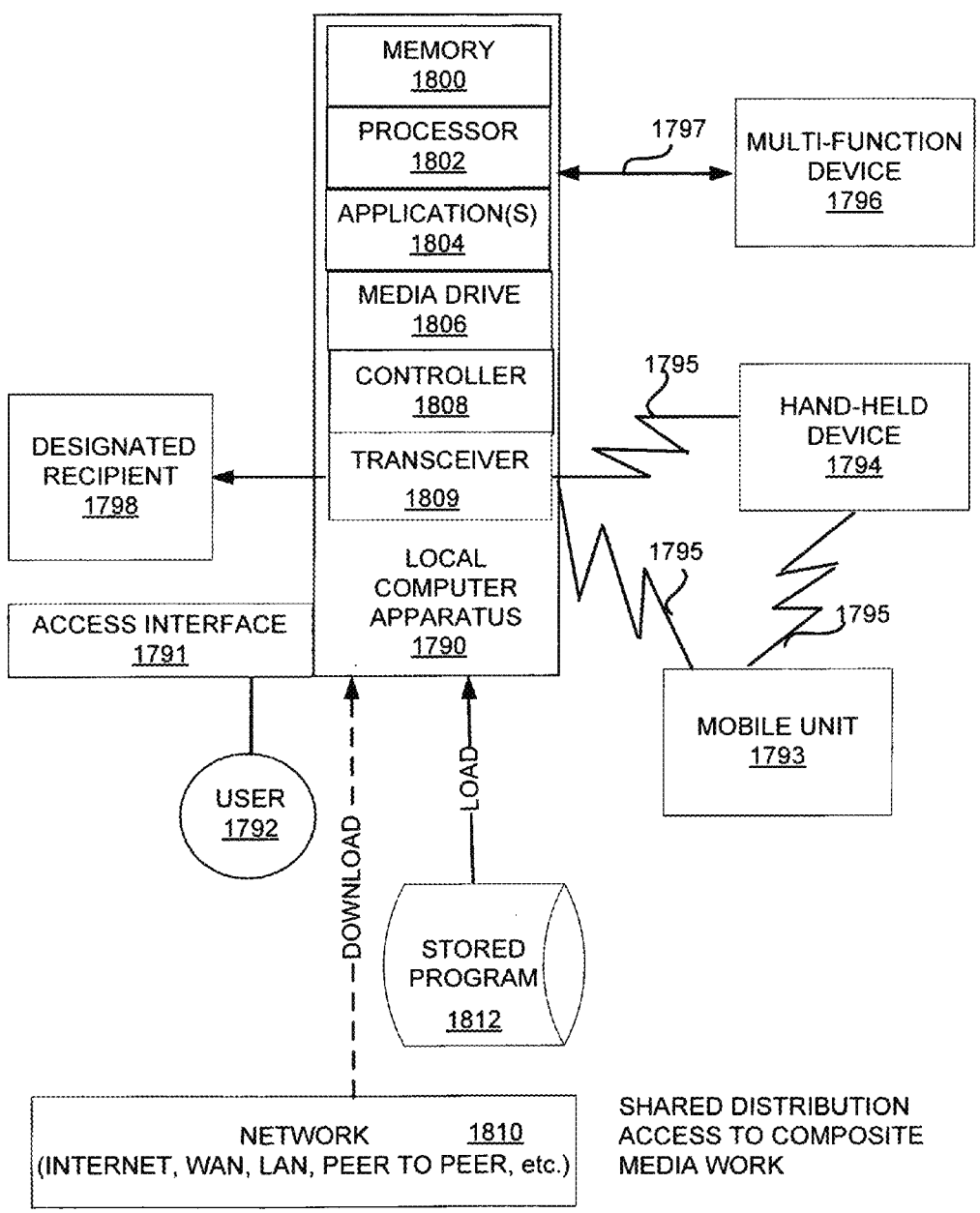
FIG. 19 is a schematic block diagram showing an exemplary embodiment that provides shared access to derivative versions of media works.

Referring to the schematic block diagram of FIG. 19, other exemplary features that may be implemented in connection with shared distribution access to composite media works having alterable content. For example, local computer apparatus 1790 may have an access interface 1791 for a user 1792. Additional features of computer apparatus 1790 may include memory 1800, processor 1802, one or more applications 1804, media drive 1806, controller 1808, and transceiver 1809.

The composite media work may already reside in the local computer apparatus 1790 or may be available via network 1810 (e.g., Internet, WAN, LAN, Peer to Peer, etc.). In some instances the composite media work may be partially or wholly available by loading a stored program 1812.

Shared distribution (e.g., access) of the composite media work may be implemented via wireless links 1795 to mobile unit 1793 and to hand-held device 1794. Other shared distribution may be accomplished via communication link 1797 to multi-function device 1796, and also via a separate communication link to a designated recipient 1798. Other types of shared distribution accessibility may be implemented depending on the circumstances, and in some instances depending on the available communication terminals approved by the owners of primary or secondary authorization rights for the derivative version of the composite media work.

Figure 20:
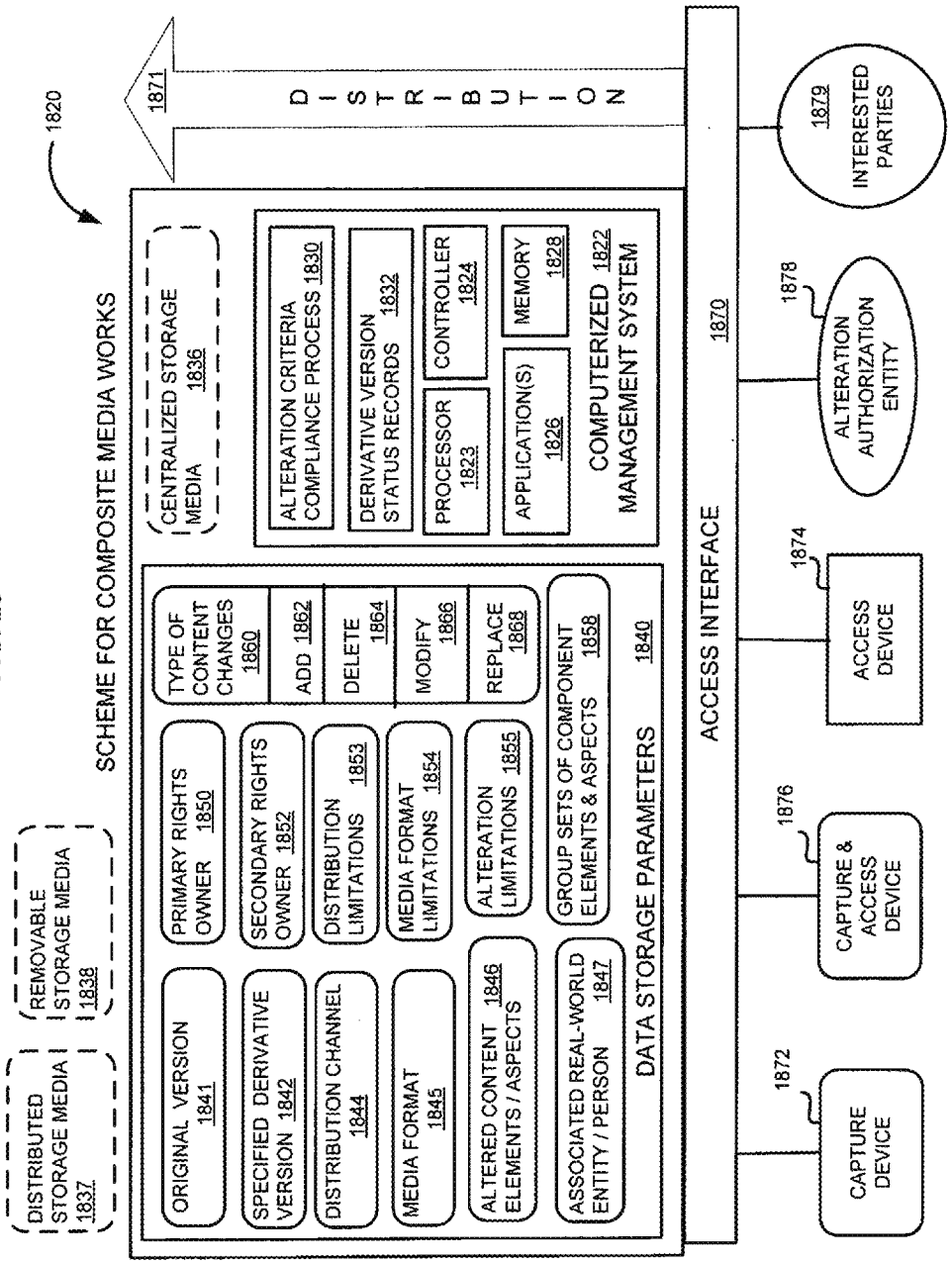
FIG. 20 is a schematic block diagram showing exemplary features of an embodiment scheme for management of media works that incorporate content alterations.

The schematic block diagram of FIG. 20 illustrates a possible embodiment 1820 of an exemplary scheme for composite media works capable of altered content. A computerized management system 1822 may include processor 1823, controller 1824, one or more applications 1826, and memory 1828. Additional modules may implement an alteration criteria compliance process 1830 and may maintain derivative version status records 1832.

There are many possible storage arrangements that may include but are not limited to centralized storage media 1836, distributed storage media 1837, and removable storage media 1838.

Data storage parameters 1840 may be organized with respect to an original media work version 1841, a specified derivative version 1842, a distribution channel 1844, and a media format 1845. Additional possible storage parameters may be organized to include informational data with respect to altered content elements or aspects 1846 and with respect to associated real-world entities or persons 1847.

Possible informational data records may relate to a primary rights owner 1850, a secondary rights owner 1852, distribution limitations 1853, media format limitations 1854, and alteration limitations 1855. Other informational data records may relate to group sets of component elements and aspects 1858 for the composite media works capable of altered content.

Further possible data storage parameter records for some embodiments may relate to specified types of content changes 1860 such as the capability to add 1862, delete 1864, modify 1866, and replace 1868 alterable component elements or designated aspects that are feasible for alteration.

As illustrated in FIG. 20, an access interface 1870 may provide a communication link to a capture device 1872, access device 1874, and capture/access device 1876. Additional links may be provided for an alteration authorization entity 1878 as well as for interested parties 1879 that may need read and/or write accessibility to the computerized management system 1822 as well as to the informational data represented by the data storage parameters 1840.

It will be understood by those skilled in the art that appropriate distribution 1871 of various altered or alterable derivative versions of the composite media works may be initiated, controlled, or monitored by the computerized management system 1822. In some instances oversight or interaction or monitoring may be provided by external communications via the access interface 1870.

Figure 21:
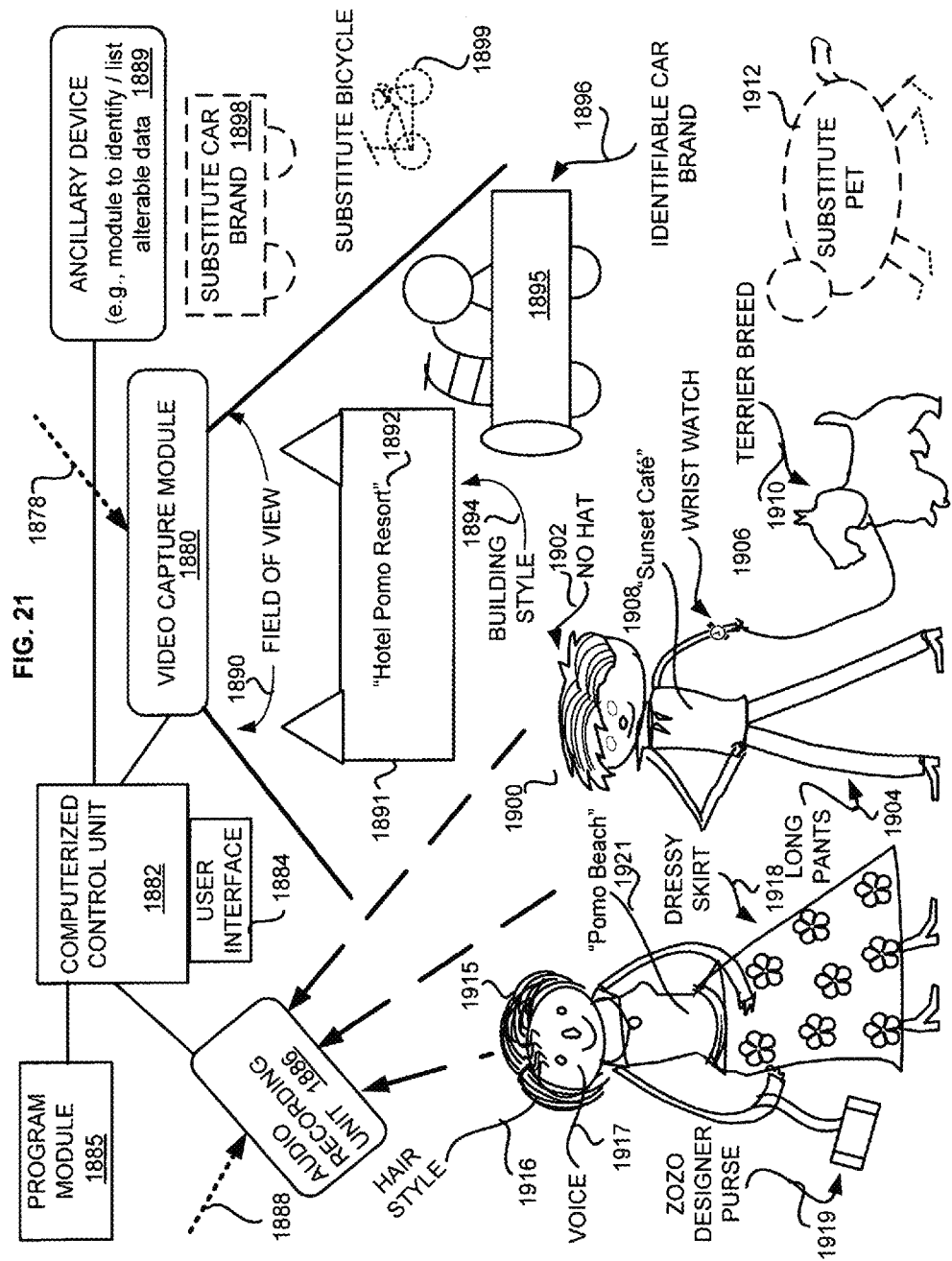
FIG. 21 is a schematic representation that illustrates an exemplary system for capturing potentially alterable content to be incorporated in a composite media work.

The schematic representation of FIG. 21 illustrates an exemplary embodiment for providing alterable content in a media work. Embodiment features include video capture module 1880, computerized control unit 1882 with user interface 1884, program module 1885, audio recording unit 1886, and ancillary device 1889. A field of view 1890 for the video capture module 1880 and for the audio recording unit 1886 enables ongoing capture of audiovisual content that includes audio and visual aspects of multiple objects and people.

The computerized control unit 1882 is operably coupled with the program module 1885 as well as the audio recording unit 1886 and video capture module 1880 to capture the scene depicted in FIG. 21. The computerized control unit 1882 is also operably coupled with the ancillary device 1889 to identify and in some instances list alterable data content that may be available for subsequent alteration in accordance with applicable criteria and authorization rights.

It will be understood that some embodiments may include possible supplemental video data 1878 as an additional input to video capture module 1880 to create a desired visual content for the composite media work. Similarly some embodiments may include possible supplemental audio data 1888 as an additional input to audio recording unit 1886 to create a desired audio content for the composite media work. In some instances, some or all of such additional inputs 1878, 1888 may be identified or listed as alterable content and therefore subject to possible future deletion, modification or replacement in accordance with applicable alteration criteria and applicable authorization rights.

Various examples of possible alterable content are illustrated in FIG. 21. Such alterable content may include an alterable building component element 1891 having designated aspects such as a name "Hotel Pomo Resort" 1892 and a building style 1894. Additional alterable content may include an alterable vehicle component element 1895 having one or more identifiable aspects such as an identifiable car brand 1896. Possible substitute objects that may be available as a replacement for the alterable vehicle component element 1895 are shown in phantom lines, and may include a substitute car brand 1898 and a substitute bicycle 1899.

A male character 1900 is shown as an alterable component element having designated alterable aspects such as no hat 1902, long pants 1904, wrist watch 1906 and a shirt display of a name "Sunset Café" 1908. The male character has a pet component element shown as a terrier breed 1910 that may be alterable. For example, a possible substitute pet 1912 is illustrated in phantom lines.

A female character 1915 is shown as an alterable component element having designated alterable aspects such as hair style 1916, voice 1917, dressy skirt 1918, a "ZoZo" brand designer purse 1919, and a blouse logo "Pomo Beach" 1921.

It will be understood that the exemplary embodiment features of alterable content as well as possible substitute content are not intended to be limiting, but are disclosed for purposes of illustration only. Many other types of alterable content and substitute content may be incorporated in composite media works pursuant to the disclosure set forth herein.

Figure 22:
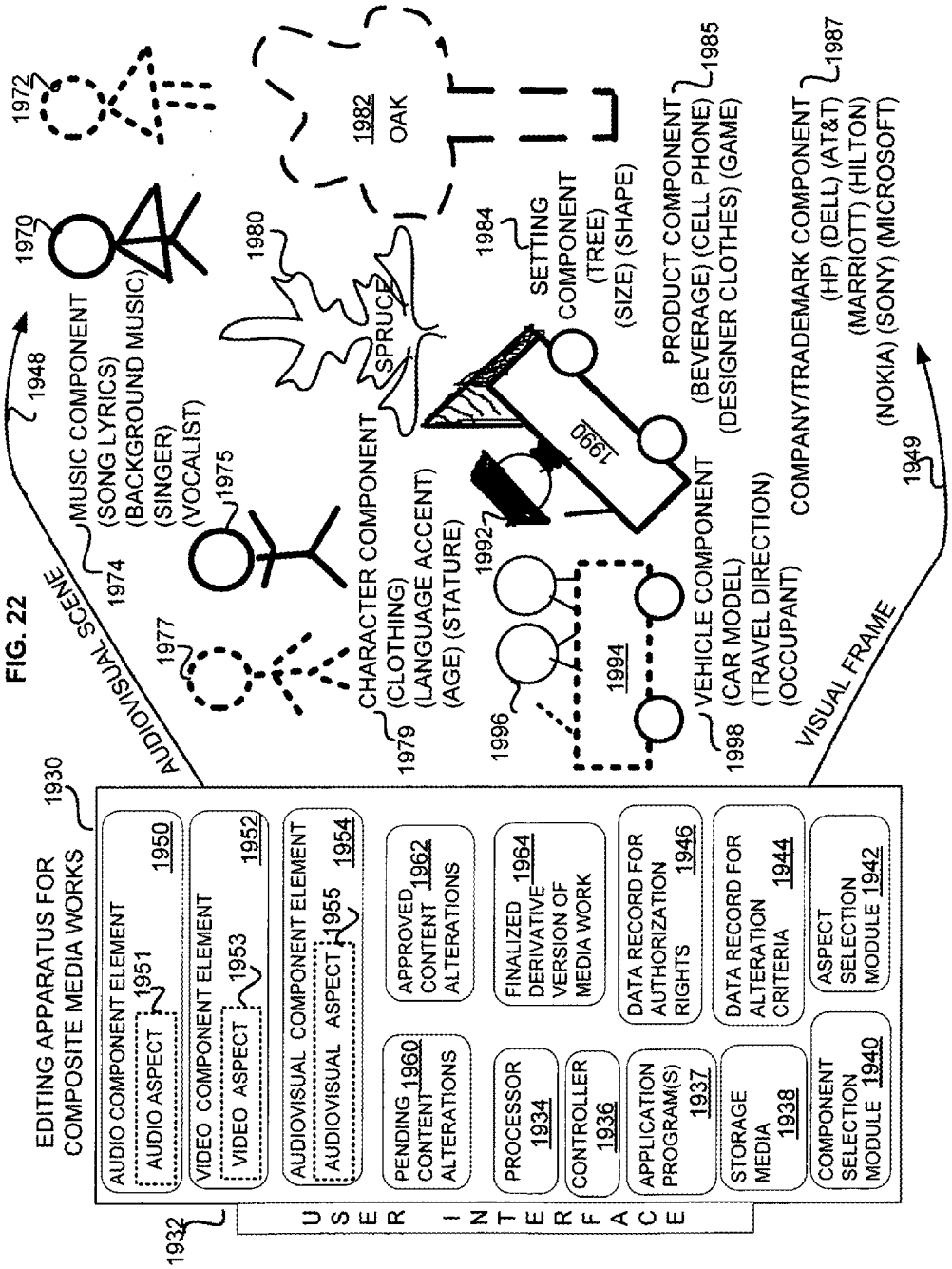
FIG. 22 is a schematic representation that illustrates an exemplary editing apparatus for processing informational data related to a composite media work that includes alterable content.

The schematic depiction of FIG. 22 illustrates additional possible embodiment features regarding possible alteration of content in media works. For example, an editing apparatus 1930 for composite media works may include user interface 1932, processor 1934, controller 1936, one or more application programs 1937, and storage media 1938. The editing apparatus 1930 may also include a data record for the alteration criteria 1944 and a data record for the authorization rights 1946 applicable to a composite media work as well as various derivative versions thereof.

The user interface 1932 may provide accessibility to interested parties involved in providing substitute content and editing derivative versions, as well as accessibility to interested parties seeking information regarding compliance with alteration criteria and authorization rights.

Additional possible features of the illustrated editing apparatus 1930 may include a component selection module 1940 and an aspect selection module 1942. Such selection modules 1940, 1942 may be configured to select (e.g., identify) existing component elements or designated aspects that are feasible for alteration, and may be further configured to select (e.g., identify, retrieve, etc.) substitute content for consideration and possible incorporation in a derivative version of the composite media work.

A possible audiovisual scene 1948 as well as one or more individual visual frames 1949 may include alterable content that may be subject to alteration criteria and authorization rights. Such alterable content may include an audio component element 1950 that includes one or more designated audio aspects 1951. Such alterable content may further include a video component element 1952 that includes one or more designated video aspects 1953. Such alterable content may additionally include an audiovisual component element 1954 that includes one or more audiovisual aspects 1955.

Informational data may also be processed and made available by the editing apparatus 1930, including status data regarding pending content alterations 1960, approved content alterations 1962, and finalized derivative versions of a media work 1964.

Examples of alterable content are illustrated in FIG. 22. For example, an illustrated female character 1970 (e.g., live actress, animated personage, live singing, dubbed singing, live music, synthesized music, etc.) may be identified as an alterable component element that may be replaced by a substitute live or animated female character 1972. A different type of content alteration may be a partial or hybrid modification of certain designated aspects of a musical component element 1974 related to such female character 1970. Possible alterable designated aspects may include song lyrics, background music, singing character, and actual vocalist.

A further illustrated example of alterable content may be a male person 1975 (e.g., self-portrayed person, live actor, animated personage, etc.) that is identified as an alterable component element that may be replaced by a substitute male person 1977. A different type of content alteration may be a partial or hybrid substitution of certain designated aspects of a character component element 1979 related to such male person. Possible alterable designated aspects may include clothing, language accent, age, and stature.

Yet another illustrated example of alterable content may be a scene setting component element 1984 that includes certain designated alterable aspects. The applicable alteration criteria may already require in some circumstances a replacement of a spruce tree 1980 with a pre-determined substitute oak tree 1982. Other possible alterable designated aspects may include a size or shape of the spruce tree 1980 as well as a size or shape of the replacement oak tree 1982.

Referring again to FIG. 22, an additional illustrated example of alterable content may be a vehicle component element 1990 that includes certain designated alterable aspects. Such designated alterable aspects may be combined together to provide a basis for an optional pre-determined substitute replacement 1994 (e.g., modified car model, travel direction and bare-headed double occupancy 1996). Alternatively, certain individual designated alterable aspects in the existing vehicle component element 1998 (single occupancy, hat 1992, car model, travel direction, occupancy, etc.) may be modified separately in accordance with applicable alteration criteria.

Another exemplary type of alterable component element that may be incorporated in the audiovisual scene 1948 and the visual frame 1949 is referenced as product component element 1985. Possible designated aspects of such a product component element may include a type of beverage, cell phone, designer clothes, and game.

A further exemplary type of alterable component is referenced in FIG. 22 as a company or trademark component 1987. Possible substitute content pursuant to applicable alteration criteria and authorization rights may include addition, deletion, modification or replacement of recognizable entity trade names as indicated in the drawing Figure (e.g., HP, Dell, AT&T, Marriott, Hilton, Nokia, Sony, Microsoft) as well as many others. This type of content alteration may also involve negotiation and agreement regarding terms and conditions included in a compensation arrangement with such recognizable entities.

Figure 23:
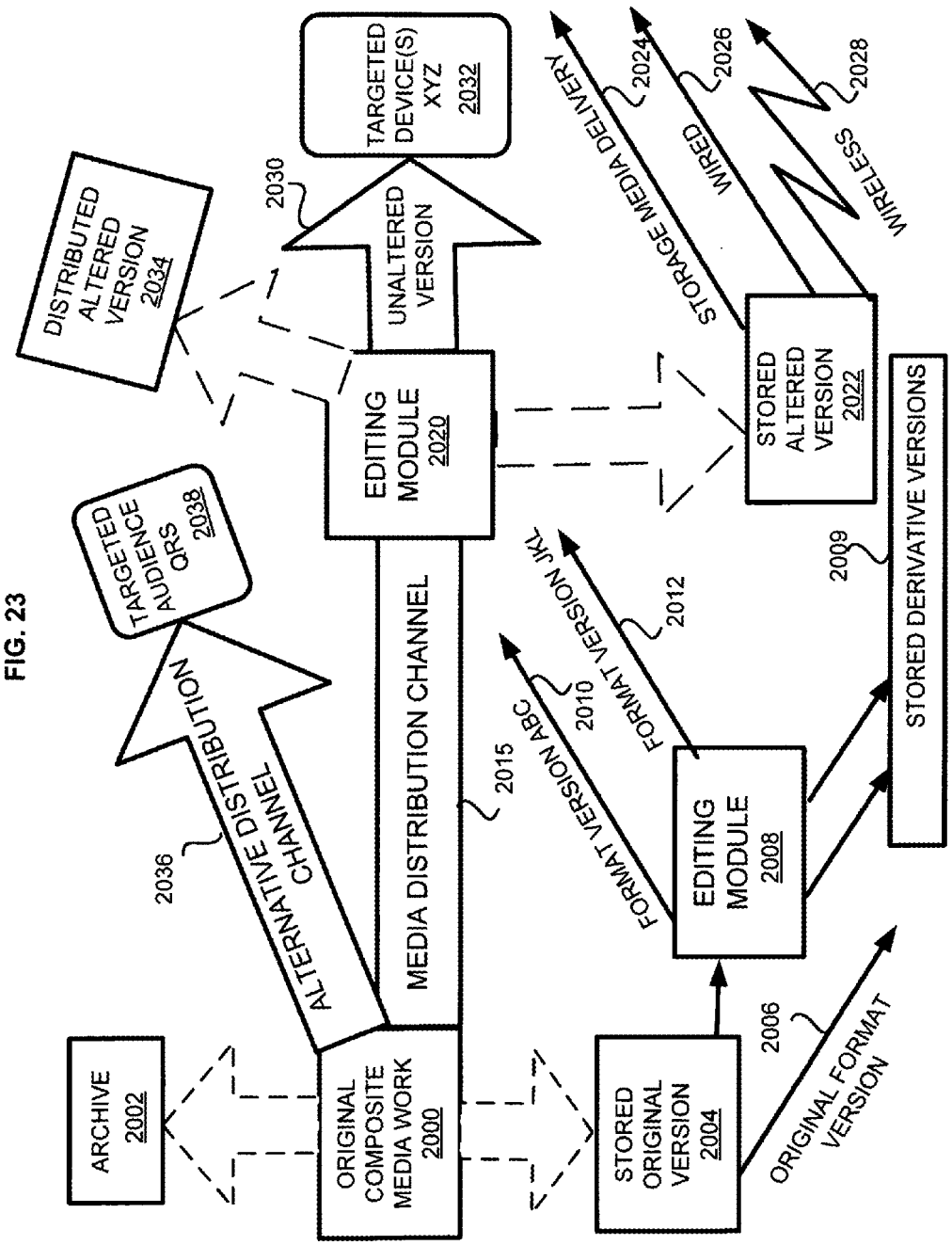
FIG. 23 is a schematic representation of further exemplary options for distribution of composite media works having alterable content.

The schematic representation of FIG. 23 illustrates optional embodiment features for distribution possibilities regarding media works having alterable content. For example, an original composite media work 2000 may be retained in archive 2002 for future reference or use. A stored original version 2004 may provide a basis for distribution of an original format version 2006, and may also be transferred to editing module 2008.

An altered derivative version may be available from editing module 2008 for distribution in format version ABC (see 2010) as well as in a different format version JKL (see 2012). Editing module 2008 may also provide output for additional stored derivative versions 2009.

A possible media distribution channel 2015 may provide an unaltered version 2030 to one or more targeted devices XYZ (see 2032). An editing module 2020 may have a communication link to media distribution channel 2015, and process the original composite media work 2000 in order to provide a distributed altered version 2034 as well as a stored altered version 2022. Additional distribution of the stored altered version 2022 may be accomplished with storage media delivery 2024, wired transfer 2026, and wireless transmission 2028.

An alternative distribution channel 2036 may provide an additional communication link for transferring a version of the original composite media work 2000 to a targeted audience QRS (see 2038).

It will be understood that the various altered derivative versions, media formats, and distribution channels as depicted in FIG. 23 may be subject to limitations and compensation requirements pursuant to applicable alteration criteria as well as to applicable authorization rights.

The tabular depiction of FIG. 24 illustrates an exemplary embodiment for feasible content alterations 2040. Possible alterable component elements 2042 may involve music 2046, setting 2050, hero 2054, heroine 2058, and villain 2062. Additional possible alterable component elements 2042 may involve clothing 2066, vehicle 2070, company 2074, and animal 2078. Further types of component elements that may be alterable may include food 2082, product 2086, brand 2090, and dialogue 2094.

It will be understood that each composite media work may include a standardized type of alterable component elements and a related group of designated alterable aspects. However in many instances the type of alterable component elements and related group of designated alterable aspects may be customized for a particular media work or group of media works. The examples of alterable content disclosed in FIG. 23 and elsewhere herein are therefore not intended to be limiting, but are provided by way of example only.

As shown in the tabular depiction 2044 of FIG. 24, some exemplary designated alterable aspects that may be included within an alterable music component element 2046 are song lyrics, background music, vocalist, and instruments (see 2048). Other exemplary designated alterable aspects that may be included within an alterable setting component element 2050 are beach, apartment, hotel, urban, airport, college, and store (see 2052).

Some possible exemplary designated alterable aspects that may be included within an alterable hero component element 2054 are age, stature, hair style, ethnic group, voice accent, and affluence (see 2056). Other exemplary designated alterable aspects that may be included within an alterable heroine component element 2058 are age, personality, jewelry, family status, career, and hobby (see 2060). Further exemplary designated alterable aspects that may be included within an alterable villain component element 2062 are voice, weapon, addiction, job, scars, tattoos, and profanity (see 2064).

Some exemplary designated alterable aspects that may be included within an alterable clothing component element 2066 are 1920s era, expensive, stylish, gaudy, military, athletic, and hats (see 2068). Other exemplary designated alterable aspects that may be included within an alterable vehicle component element 2070 are airplane, motorcycle, limousine, train, model T car, and sailboat (see 2072).

As further shown in FIG. 24, some exemplary designated alterable aspects that may be included within an alterable company component element 2074 are Western Union, Barnum & Bailey, Union Pacific, and Ford Motor (see 2076). Other exemplary designated alterable aspects that may be included within an alterable animal component element 2078 are collie dog, Siamese cat, parakeet, race horse, and walrus (see 2080).

Some additional exemplary designated alterable aspects that may be included within an alterable food component element 2082 are soup, fish & chips, sausage, plum pudding and sauerkraut (see 2084). Further exemplary designated alterable aspects that may be included within an alterable product component element 2086 are telephone, radio, piano, pistol, magazines, and newspaper (see 2088).

Other exemplary designated alterable aspects that may be included within an alterable brand component element 2090 are Sears Roebuck, RCA, Westinghouse, GE, PanAm, and Kodak (see 2092). Additional exemplary designated alterable aspects that may be included within an alterable dialogue component element 2094 are U.S. English, German, cockney accent, southern drawl, and slang (see 2096).

It will be understood that the various informational data of the type depicted in FIG. 24 may be maintained in various centralized and dispersed locations for accessibility, status review, management and editing of derivative versions of composite media works with alterable or altered content.

Figure 25:
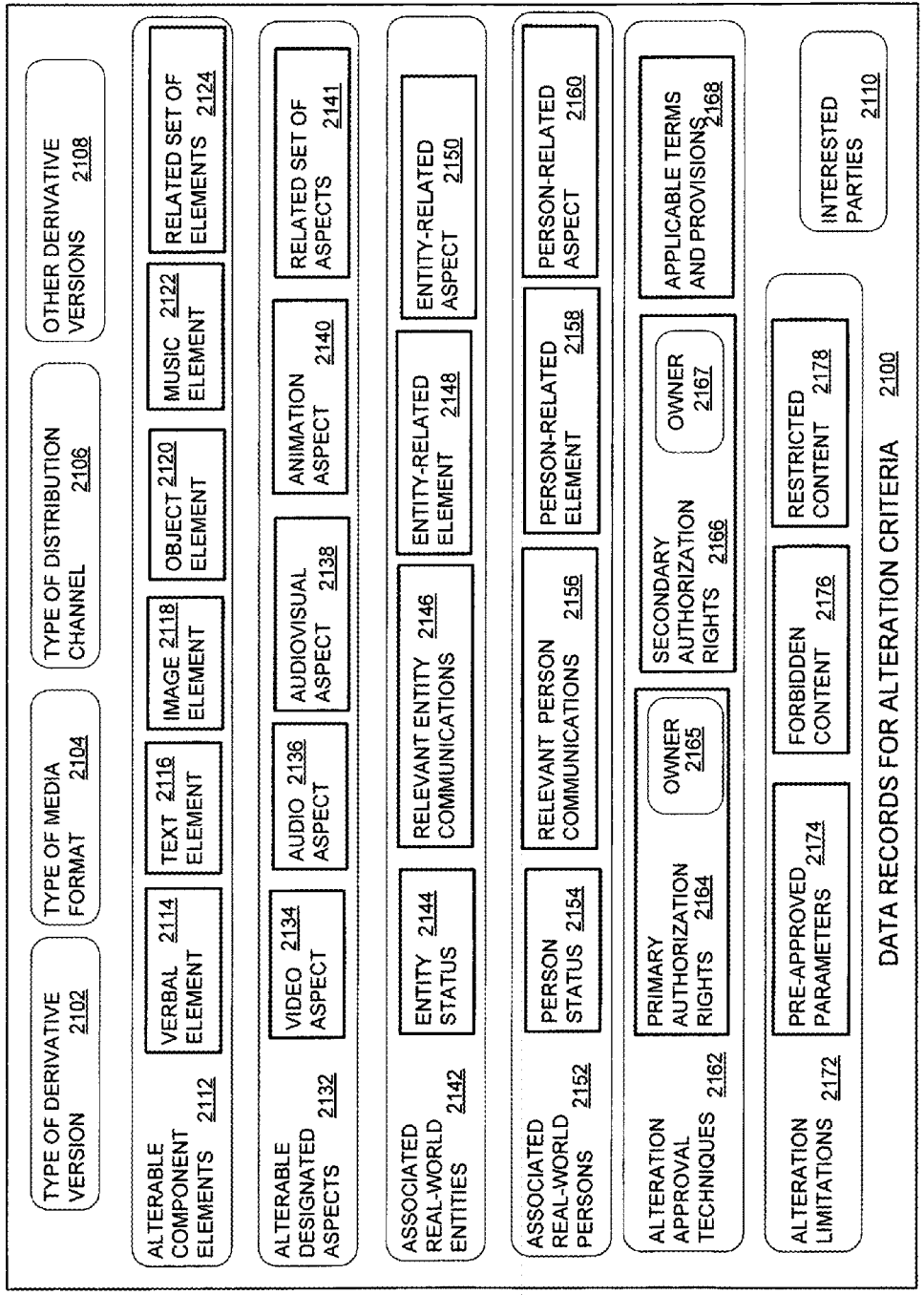
FIG. 25 is a schematic representation that illustrates exemplary types of data records that may be used in connection with an alteration criteria embodiment for media works.

The schematic representation of FIG. 25 shows exemplary types of data records for alteration criteria 2100. For example, certain data records in some embodiments may include a type of derivative version 2102, type of media format 2104, type of distribution channel 2106, and other derivative versions 2108. Additional possible data record types may include a listing of interested parties 2110 that may request or require access to such data records for alteration criteria 2100.

Further possible data records for alteration criteria 2100 in some embodiments may include a listing of alterable component elements 2112 including but not limited to verbal element 2114, text element 2116, image element 2118, object element 2120, music element 2122, and related set of element 2124. Other possible data record types may include a listing of alterable designated aspects 2132 including but not limited to video 2134, audio 2136, audiovisual 2138, animation 2140 and related set of aspects 2141.

Some embodiments may include data records regarding various associated real-world entities 2142 for related types of objects depicted in a composite media work capable of alterable content. Specific categories of data records for associated real-world entities 2142 may include entity status 2144, relevant entity communications 2146, one or more entity-related elements 2148, and one or more entity-related aspects 2150.

Some embodiments may include data records regarding various associated real-world persons 2152 for related types of objects depicted in a composite media work capable of alterable content. Specific categories of data records for associated real-world persons 2152 may include person status 2154, relevant person communications 2156, one or more person-related elements 2158, and one or more person-related aspects 2160.

Additional types of possible data records may include alteration approval techniques 2162 for substituted content. Related categories of data records may include primary authorization rights 2164 and information regarding an owner 2165 of such primary authorization rights. Other related categories of data records may include secondary authorization rights 2166 and information regarding an owner 2167 of such secondary authorization rights. A further related category of data records may include applicable terms and provisions 2168 regarding primary and secondary authorization rights 2164, 2166.

Other possible types of data records for alteration criteria 2100 may relate to alteration limitations 2172. Particular categories of data records may include pre-approved parameters 2174, forbidden content 2176, and restricted content 2178.

It will be understood that the various informational data of the type depicted in FIG. 25 may be maintained in various centralized and dispersed locations for accessibility, status review, management and editing of derivative versions of composite media works with alterable or altered content.

It will be further understood that some data record categories in the illustrated embodiments herein may not be necessary in some circumstances, and in some instances additional data record categories may be deemed to be helpful. The need for such data record flexibility is contemplated and the exemplary data file names and categories disclosed herein are not intended to be limiting.

Referring to embodiment features of FIG. 26, an exemplary tabular representation of data records for authorization rights 2180 may includes a listing of alterable elements 2190 and alterable aspects 2192 for a particular derivative version of a composite media work capable of content alteration. Such data records for authorization rights 2180 may further include specified data records regarding type of derivative version 2182, type of media form 2183, type of distribution channel 2184, and other derivative versions 2185.

Additional data records may provide informational data regarding an associated real-world entity 2186 for related alterable objects, and also regarding an associated real-world person 2187 for related alterable objects.

It will be understood that informational data regarding ownership of primary original content rights 2193 may involve related informational data of applicable provisions for original content rights 2194. Similarly informational data regarding ownership of secondary substituted content rights 2196 may involve different informational data of applicable provisions for substituted content rights 2198.

In some embodiments the ownership status and the related applicable provisions may vary with respect to different types or categories of alterable content. For example, separate informational listings regarding ownership rights and their related provisions (e.g., term, conditions, compensation, limitations, authorization procedure, contact agent, etc.) may be separately maintained for individually identifiable alterable component elements including but not limited to a person or character 2202, an actor or actress 2204, an object or item 2206, and a product category 2208.

As a further example, separate informational listings regarding ownership rights and their related provisions (e.g., term, conditions, compensation, limitations, authorization procedure, contact agent, etc.) may be maintained for individually identifiable alterable aspects including but not limited to video 2210, audio 2212, audiovisual 2214, animation 2216, and set of related aspects 2218.

It will be understood that the various informational data of the type depicted in FIG. 26 may be maintained in various centralized and dispersed locations for accessibility, status review, management and editing of derivative versions of composite media works with alterable or altered content.

It will be understood from the exemplary embodiments disclosed herein that various system implementations may include combined or separate listings of alterable component elements and alterable designated aspects feasible for alteration. Other possible data listings may include a further listing of the one or more of the following type of possible content alterations: related set of designated aspects, related set of alterable components, identical objects, same object in different scenes, and same object in different settings. A further possible listing may include one or more of the following type of possible content alterations: textual, verbal, visual, image, audio, musical, and animation.

Some system embodiments may include a data record that includes informational data regarding a specified derivative version of the composite media work, wherein the specified derivative version includes capability for incorporating substituted content. A further system data record may include informational data to identify a specified derivative version incorporating previously altered content; and another system data record may include informational data to identify a specified derivative version having capability to incorporate future substituted content.

A further possible system embodiment feature may include a management module to coordinate compliance with the criteria for possible content alteration. Other possible system embodiment features may include further data records that identify one or more of the following: alteration limitation applicable to a derivative version of the composite media work; media format limitation applicable to a derivative version of the composite work; distribution limitation applicable to a derivative version of the composite work; a group or set of related component elements capable of alteration; and a group or set of designated aspects capable of alteration.

Further possible system embodiment features may include a further data record that identifies an entity, or a person, associated with substituted content incorporated in a derivative version of the composite media work.

Content alteration of different types of media works may involve various types of procedural guidelines and consent requirements regarding the substituted content as well respecting its integration into a composite media work. In some instances compliance with alteration criteria may constitute sufficient approval to proceed with a content alteration of a composite media work. Under some circumstances there may be multiple approvals required that may involve both compliance with alteration criteria as well as consent by an owner of primary authorization rights. In other instances it may be possible to merely obtain such consent by an owner of primary authorization rights without having to comply with additional alteration criteria. It will be understood that features of the exemplary embodiments disclosed herein may be adapted for implementation in existing media works as well as in newly created media works.

Some system embodiments may include a listing of alterable content that is subject to authorization rights. In some instances an exemplary implementation may include a further listing of the one or more of the following type of alterable content subject to the authorization rights: related set of designated aspects, related set of alterable components, identical objects, same object in different scenes, and same object in different settings. Another possible system feature may include a further listing of the one or more of the following type of alterable content subject to the authorization rights: textual, verbal, visual, image, audio, musical, and animation.

Additional exemplary features of a system embodiment may include a data record that includes authorization rights applicable to one or more of the following targeted categories for the composite media work: geographic distribution, distribution channel, audience, time period, and demographic distribution. Other exemplary system features may include a data record that includes authorization rights regarding possible content alteration of one or more of the following type of content associated with a real-world entity: brand, trademark, service mark, copyrighted work, name, company name, identity, symbol, commercial symbol, icon, logotype, trade logo, trade dress, packaging, label, emblem, insignia, acronym, abbreviation, certification, slogan, jingle, animation, animated character, copyrighted item, and personage.

Further exemplary system enhancements may include a data record that includes authorization rights regarding possible content alteration of one or more of the following type of content associated with a real-world person: name, face, personal characteristics, identity, residence, title, achievement, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Another exemplary system embodiment may include a management module to coordinate compliance with the authorization rights. Other possible embodiments may include an additional data record of secondary authorization rights applicable to substitute content for the composite media work. Some related system data records may include secondary authorization rights applicable to a substitute component element or a substitute designated aspect incorporated as a content alteration in the composite media work.

Figure 27:
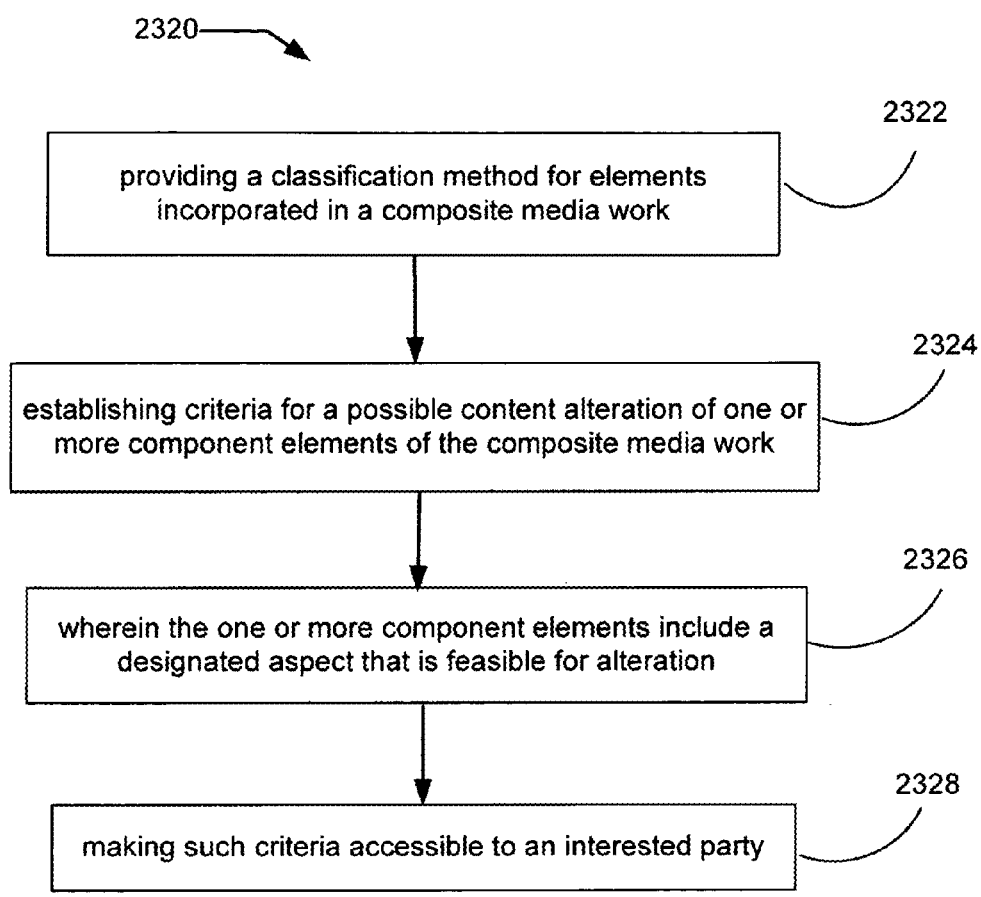
FIG. 27 is a high level flow chart for an exemplary process embodiment for media content alteration.

The high level flow chart of FIG. 27 illustrates an embodiment 2320 that provides a classification method for elements incorporated in a composite media work (block 2322), including establishing criteria for possible content alteration of one or more component elements of the composite media work (block 2322), wherein the one or more component elements include a designated aspect that is feasible for alteration (block 2324); and making such criteria accessible to an interested party (block 2328).

Figure 28:
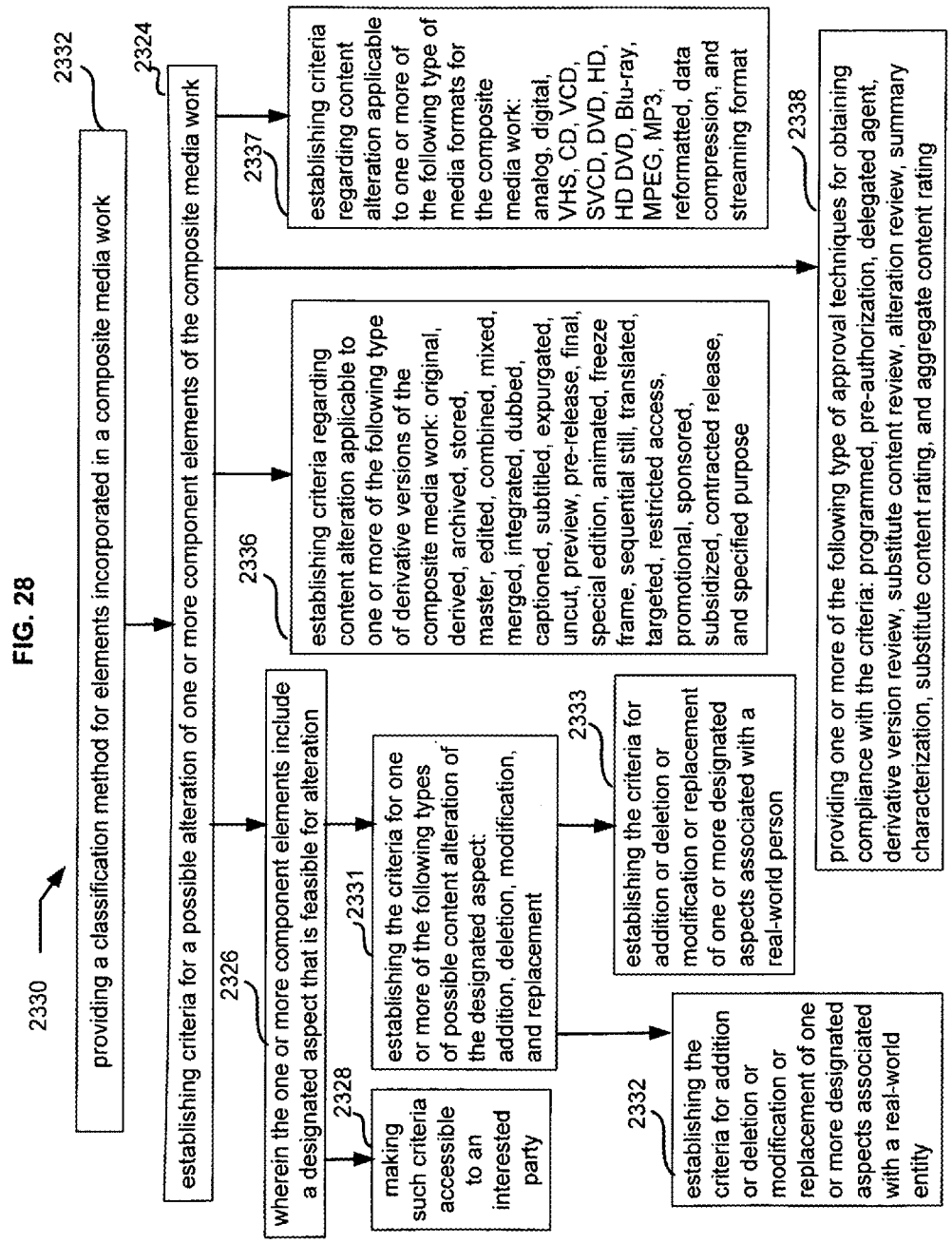
FIGS. 28-33 are more detailed flow charts illustrating various exemplary process features regarding media content alteration.

Referring to another process embodiment 2330 illustrated in the detailed flow chart of FIG. 28, exemplary features may include previously described process components 2322, 2324, 2326, 2328 in combination with establishing the criteria for one or more of the following types of possible content alteration of the designated aspect: addition, deletion, modification, and replacement (block 2331).

Some implementations may also include establishing the criteria for addition or deletion or modification or replacement of one or more designated aspects associated with a real-world entity (block 2332), or associated with a real-world person (block 2333). A further possible implementation provides one or more of the following type of approval techniques for obtaining compliance with the criteria: programmed, pre-authorization, delegated agent, derivative version review, substitute content review, alteration review, summary characterization, substitute content rating, and aggregate content rating (block 2338).

Other possible process enhancements may include establishing criteria regarding content alteration applicable to one or more of the following type of derivative versions of the composite media work: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose (block 2336).

Additional exemplary features may include establishing criteria regarding content alteration applicable to one or more of the following type of media formats for the composite media work: analog, digital, VHS, CD, VCD, SVCD, DVD, HD, HD DVD, Blu-ray, MPEG, MP3, reformatted, data compression, and streaming format (block 2337).

Figure 29:
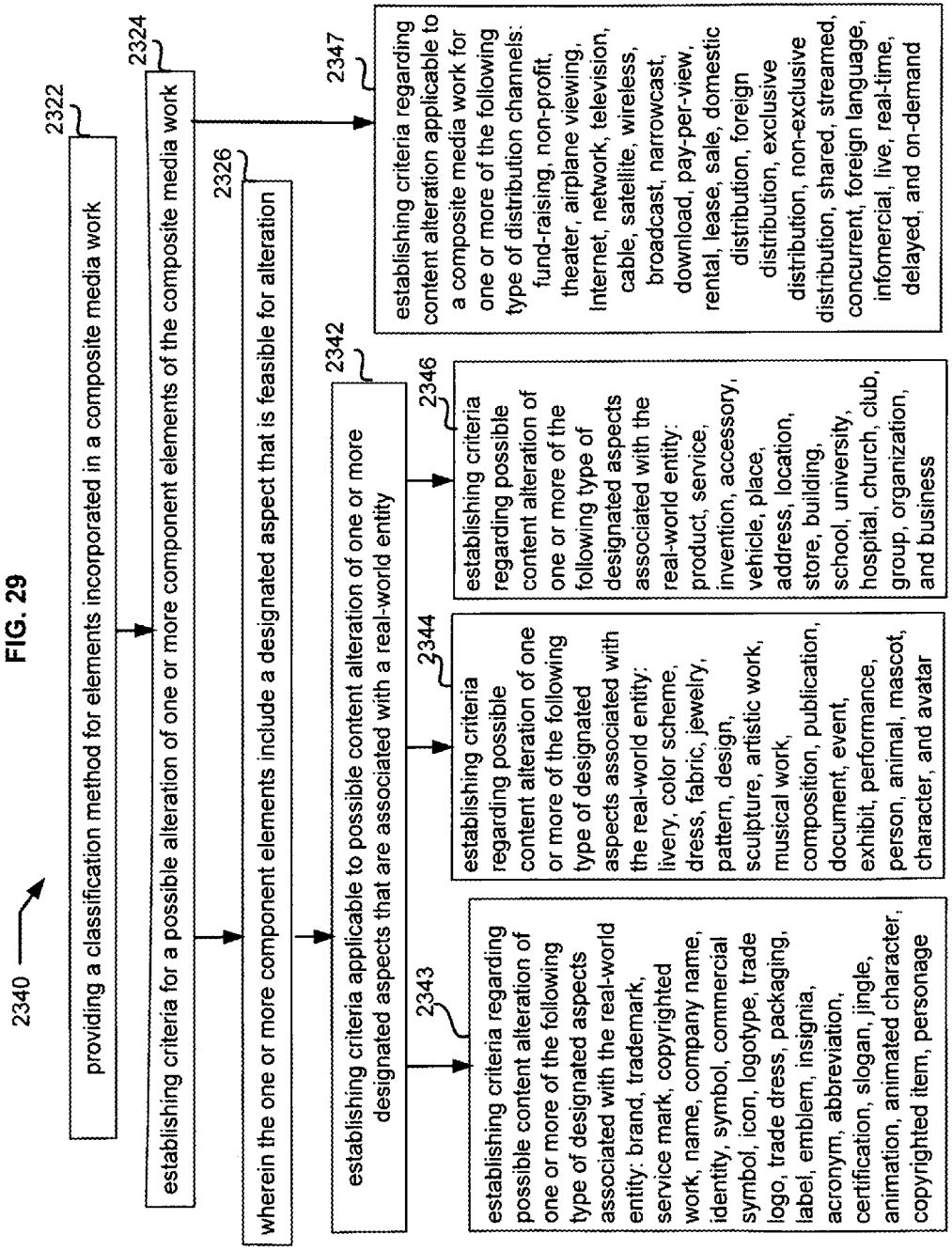

Referring to the exemplary embodiment features 2340 of FIG. 29, previously described process features 2322, 2324, 2326 are illustrated along with additional possible enhancements regarding criteria for possible content alterations. For example, some process embodiments may include establishing criteria regarding content alteration applicable to a composite media work for one or more of the following type of distribution channels: fund-raising, non-profit, theater, airplane viewing, Internet, network, television, cable, satellite, wireless, broadcast, narrowcast, download, pay-per-view, rental, lease, sale, domestic distribution, foreign distribution, exclusive distribution, non-exclusive distribution, shared, streamed, concurrent, foreign language, infomercial, live, real-time, delayed, and on-demand (block 2347).

A further enhancement feature may include establishing criteria applicable to possible content alteration of one or more designated aspects that are associated with a real-world entity (block 2342). Related possible enhancements may establish criteria regarding possible content alteration of one or more of the following type of designated aspects associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, slogan, jingle, animation, animated character, copyrighted item, and personage (block 2343).

Another exemplary implementation may establish establishing criteria regarding possible content alteration of one or more of the following type of designated aspects associated with the real-world entity: livery, color scheme, dress, fabric, jewelry, pattern, design, sculpture, artistic work, musical work, composition, publication, document, event, exhibit, performance, person, animal, mascot, character, and avatar (block 2344). Further possible features may include establishing criteria regarding possible content alteration of one or more of the following type of designated aspects associated with the real-world entity: product, service, invention, accessory, vehicle, place, address, location, store, building, school, university, hospital, church, club, group, organization, and business (block 2346).

Figure 30:
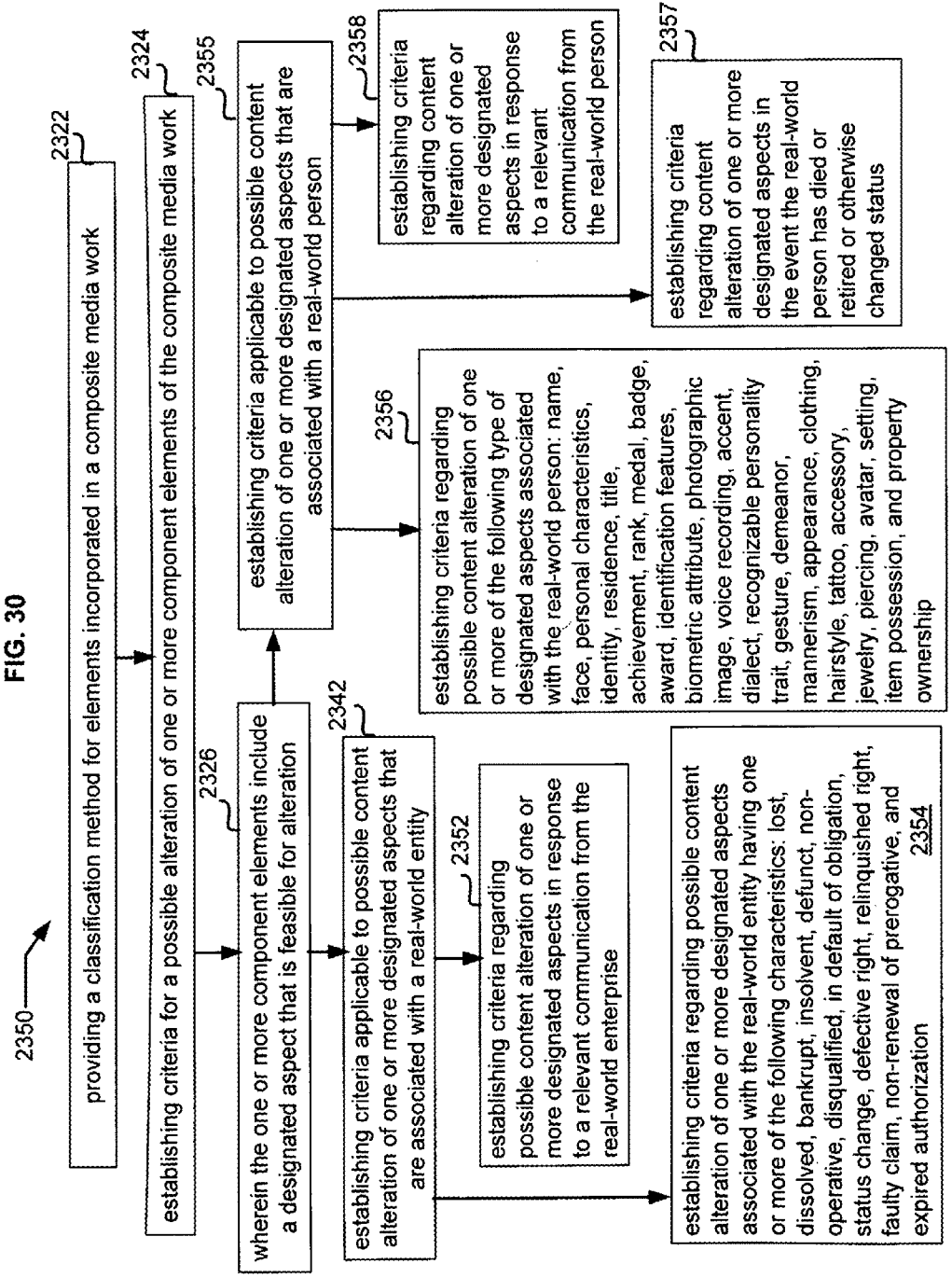

Referring to additional embodiment features 2350 illustrated in FIG. 30, previously described process components 2322, 2324, 2326 2342 are depicted along with another exemplary process feature establishing criteria regarding possible content alteration of one or more designated aspects in response to a relevant communication from the real-world enterprise (block 2352).

Further exemplary process features may include establishing criteria regarding possible content alteration of one or more designated aspects associated with the real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization (block 2354).

The flow chart of FIG. 30 also depicts additional exemplary enhancements related to establishing criteria applicable to possible content alteration of one or more designated aspects that are associated with a real-world person (block 2355). An additional possible enhancement may include establishing criteria regarding possible content alteration of one or more of the following type of designated aspects associated with the real-world person: name, face, personal characteristics, identity, residence, title, achievement, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 2356).

Further possible related features may include establishing criteria regarding content alteration of one or more designated aspects in the event the real-world person has died or retired or otherwise changed status (block 2357), and establishing criteria regarding content alteration of one or more designated aspects in response to a relevant communication from the real-world person (block 2358).

Figure 31:
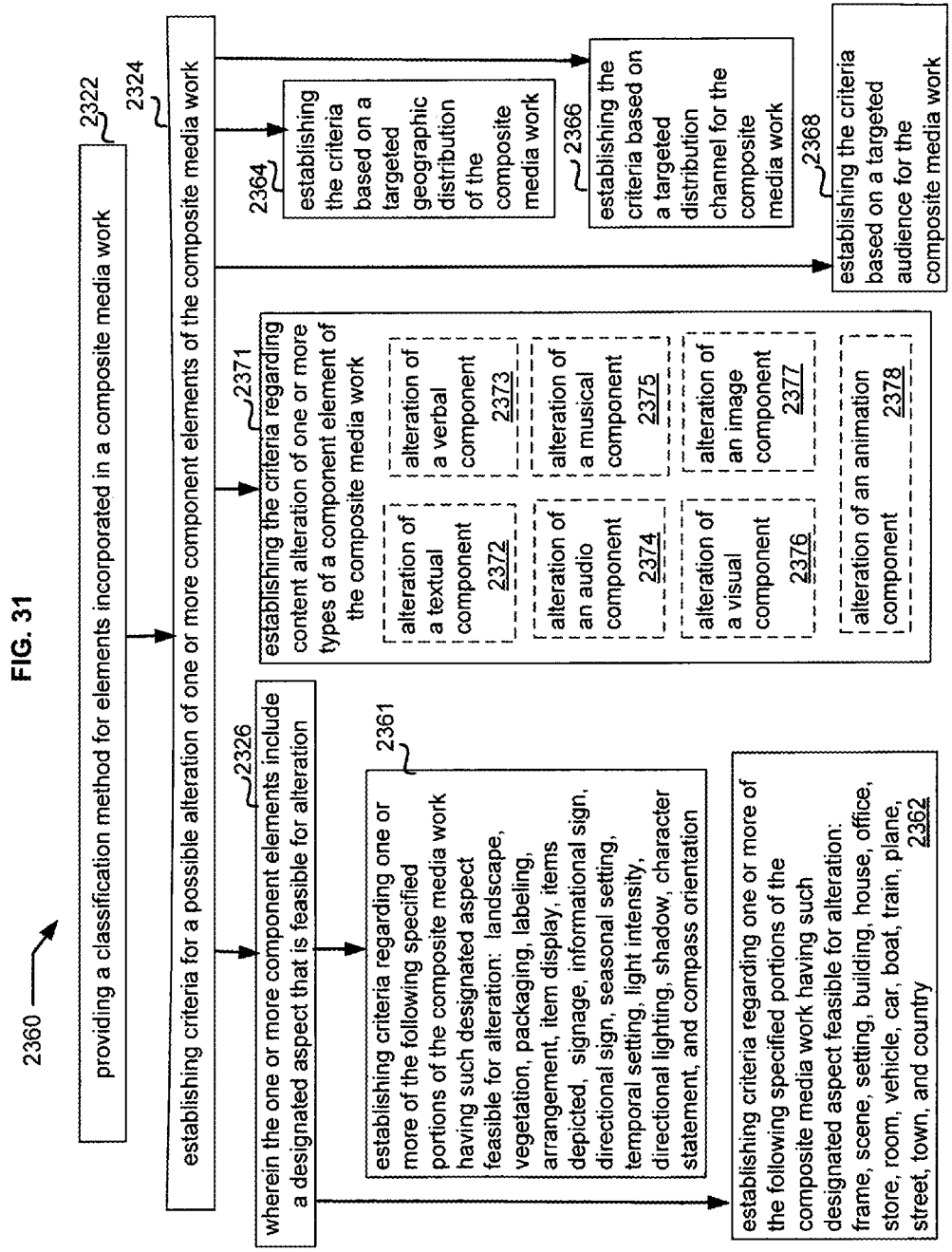

The detailed flow chart of FIG. 31 illustrates exemplary embodiment features 2360 that include previously described process features 2322, 2324, 2326 along with establishing criteria regarding one or more of the following specified portions of the composite media work having such designated aspect feasible for alteration: frame, scene, setting, building, house, office, store, room, vehicle, car, boat, train, plane, street, town, and country (block 2362).

Additional process enhancements may include establishing criteria regarding one or more of the following specified portions of the composite media work having such designated aspect feasible for alteration: landscape, vegetation, packaging, labeling, arrangement, item display, items depicted, signage, informational sign, directional sign, seasonal setting, temporal setting, light intensity, directional lighting, shadow, character statement, and compass orientation (block 2361).

Other exemplary enhancements depicted include establishing criteria based on a targeted geographic distribution of the composite media work (block 2364), or a targeted distribution channel for the composite media work (block 2366), or a targeted audience for the composite media work (block 2368).

FIG. 31 further illustrates possible process features that establish the criteria regarding content alteration of one or more types of a component element of the composite media work (block 2371). Such exemplary types of content alteration of a component element may include content alteration of a textual component (block 2372), a verbal component (block 2373), an audio component (block 2374), a musical component (block 2375), a visual component (block 2376), an image component (block 2377) or an animation component (block 2378), as well as various combinations of such components.

Figure 32:
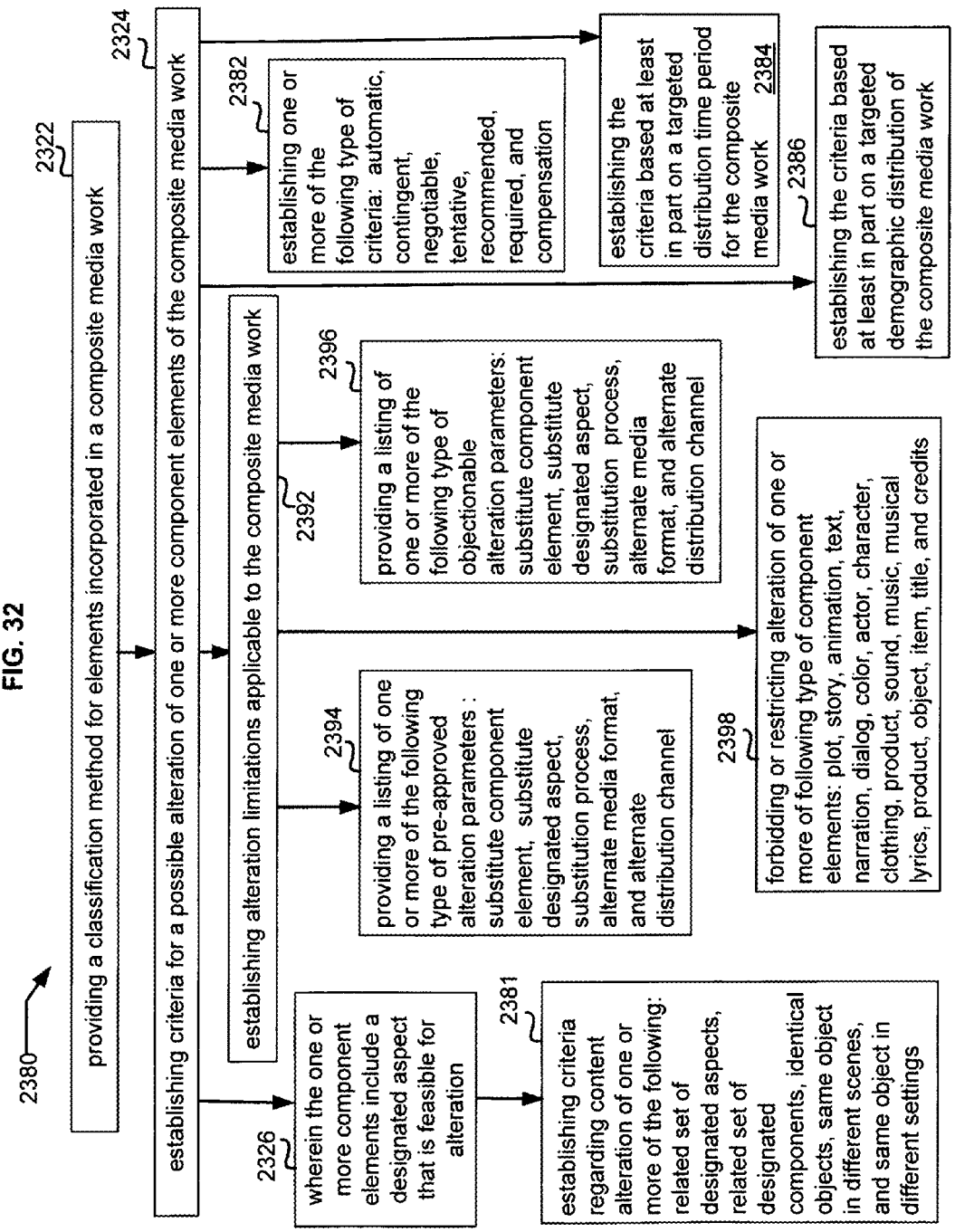

Referring to the illustrated embodiment features 2380 of FIG. 32, previously described component features 2322, 2324, 2326 are combined with possible enhancements that include establishing criteria regarding content alteration of one or more of the following: related set of designated aspects, related set of designated components, identical objects, same object in different scenes, and same object in different settings (block 2381).

Additional possible implementation features may relate to establishing alteration limitations applicable to the composite media work (block 2392). For example, some exemplary features may include providing a listing of one or more of the following type of objectionable alteration parameters: substitute component element, substitute designated aspect, substitution process, alternate media format, and alternate distribution channel (block 2396). Additional exemplary features may include forbidding or restricting alteration of one or more of following type of component elements: plot, story, animation, text, narration, dialog, color, actor, character, clothing, product, sound, music, musical lyrics, product, object, item, title, and credits (block 2398).

Additional possible implement features may include providing a listing of one or more of the following type of pre-approved alteration parameters: substitute component element, substitute designated aspect, substitution process, alternate media format, and alternate distribution channel (block 2394).

FIG. 32 further illustrates additional possible features related to criteria for possible alteration of one or more component elements of the composite media work. For example, in some instances an exemplary process feature may establishing one or more of the following type of criteria: automatic, contingent, negotiable, tentative, recommended, required, and compensation (block 2382). Other exemplary process features may establish the criteria based at least in part on a targeted distribution time period for the composite media work (block 2384), or may establish the criteria based at least in part on a targeted demographic distribution of the composite media work (block 2386).

Figure 33:
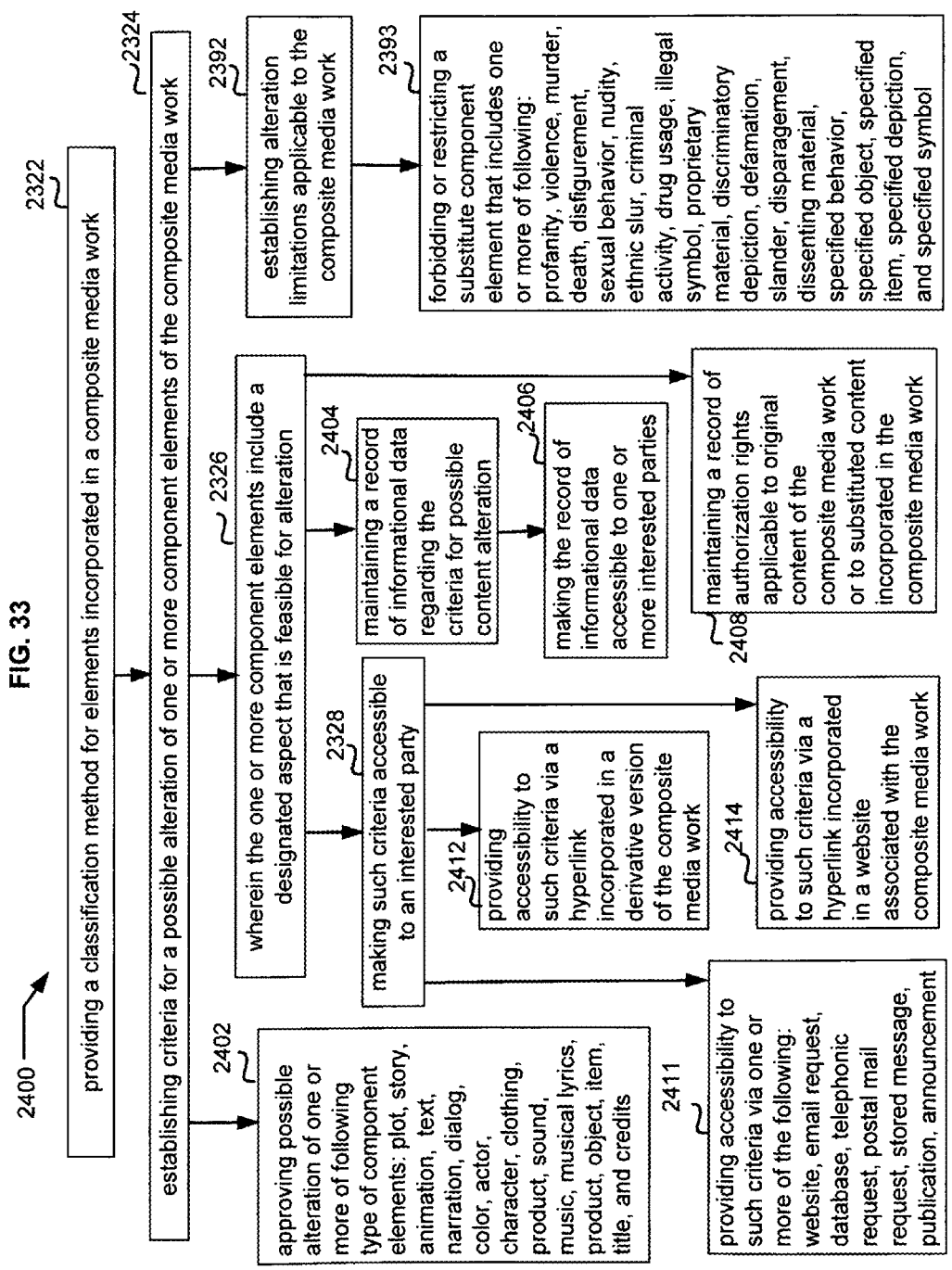

The detailed embodiment features 2400 of FIG. 33 include previously described process components 2322, 2324, 2326, 2328, 2392 along with possible process features establishing exemplary criteria. For example, an exemplary feature may include approving possible alteration of one or more of following type of component elements: plot, story, animation, text, narration, dialog, color, actor, character, clothing, product, sound, music, musical lyrics, product, object, item, title, and credits (block 2402).

Additional exemplary enhancements regarding the establishment of alteration limitations may include forbidding or restricting a substitute component element that includes one or more of following: profanity, violence, murder, death, disfigurement, sexual behavior, nudity, ethnic slur, criminal activity, drug usage, illegal symbol, proprietary material, discriminatory depiction, defamation, slander, disparagement, dissenting material, specified behavior, specified object, specified item, specified depiction, and specified symbol (block 2393).

Further possible implementation features relating to accessibility of the criteria to an interested party may include providing accessibility to such criteria via one or more of the following: website, email request, database, telephonic request, postal mail request, stored message, publication, and announcement (block 2411). Other related implementation possibilities may include providing accessibility to such criteria via a hyperlink incorporated in a derivative version of the composite media work (block 2412), and providing accessibility to such criteria via a hyperlink incorporated in a website associated with the composite media work (block 2414).

Other exemplary process features may include maintaining a record of informational data regarding the criteria for possible content alteration (block 2404), and making the record of informational data accessible to one or more interested parties (block 2406). A further possible enhancement may include maintaining a record of authorization rights applicable to original content of the composite media work or to substituted content incorporated in the composite media work (block 2408).

It will be understood by those skilled in the art that the various components and elements disclosed in the block diagrams herein as well as the various steps and sub-steps disclosed in the flow charts herein may be incorporated together in different claimed combinations in order to enhance possible benefits and advantages.

It is to be further understood that various aspects of the methods and processes disclosed in FIGS. 3-11, 14-15, 27-33, 36-42, 45-54, 57-66, 69-74, 76-83, 86-88, 91-96, and 98-103 can be incorporated in one or more different types of computer program products wherein computer readable media have program instructions encoded thereon for executing the methods and processes. Some exemplary computer program products may be implemented in storage carrier media having program instructions encoded thereon. In some instances exemplary computer program products may be implemented in communication carrier media having program instructions encoded thereon.

Figure 34:
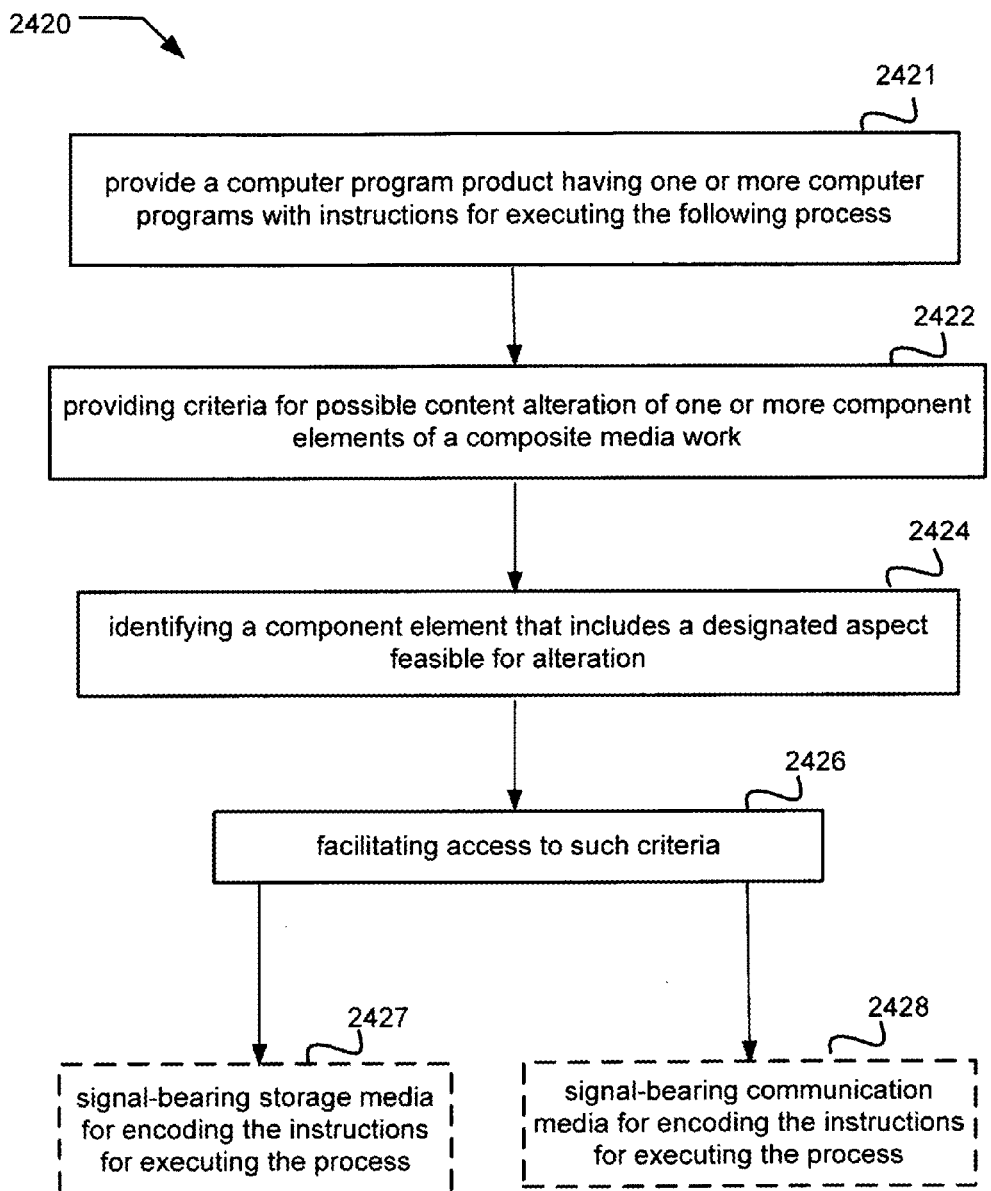
FIG. 34 is a diagrammatic flow chart for an exemplary computer program product embodiment.

The flow chart of FIG. 34 illustrates an embodiment 2420 that provides a computer program product having one or more computer programs with instructions for executing a process (block 2421). Such an exemplary process may include providing criteria for possible content alteration of one or more component elements of a composite media work (block 2422), identifying a component element that includes a designated aspect feasible for alteration (block 2424), and facilitating access to such criteria (block 2426). Further possible features may include providing signal-bearing storage media for encoding instructions for executing such an exemplary process (block 2427); and providing signal-bearing communication media for encoding instructions for executing such an exemplary process (block 2428).

Additional possible computer program product features may include providing criteria that identifies one or more of the following type of targeted categories for a derivative version of the composite media work wherein the derivative version includes capability for incorporating substituted content: geographic distribution, distribution channel, audience, recipient group, targeted device, time period, and demographic distribution.

A further possible computer program process feature may include providing criteria that identifies one or more of the following type of limitations for a derivative version of the composite media work wherein the derivative version includes capability for incorporating substituted content: distribution, media format, pre-approved alteration parameter, objectionable alteration, restricted alteration, and forbidden alteration.

Another possible process feature that may be incorporated in a computer program product includes maintaining a record of criteria regarding possible content alteration, wherein the record of criteria that includes forbidding or restricting a substitute component element that includes one or more of following: profanity, violence, murder, death, disfigurement, sexual behavior, nudity, ethnic slur, criminal activity, drug usage, illegal symbol, proprietary material, discriminatory depiction, defamation, slander, disparagement, dissenting material, specified behavior, specified object, specified item, specified depiction, and specified symbol.

Additional exemplary process features that may be incorporated in a computer program product include providing criteria for possible content alteration of a group set of related component elements or designated aspects capable of alteration.

Of course various other process aspects disclosed herein may also be incorporated into one or more computer program products, depending on the circumstances.

Figure 35:
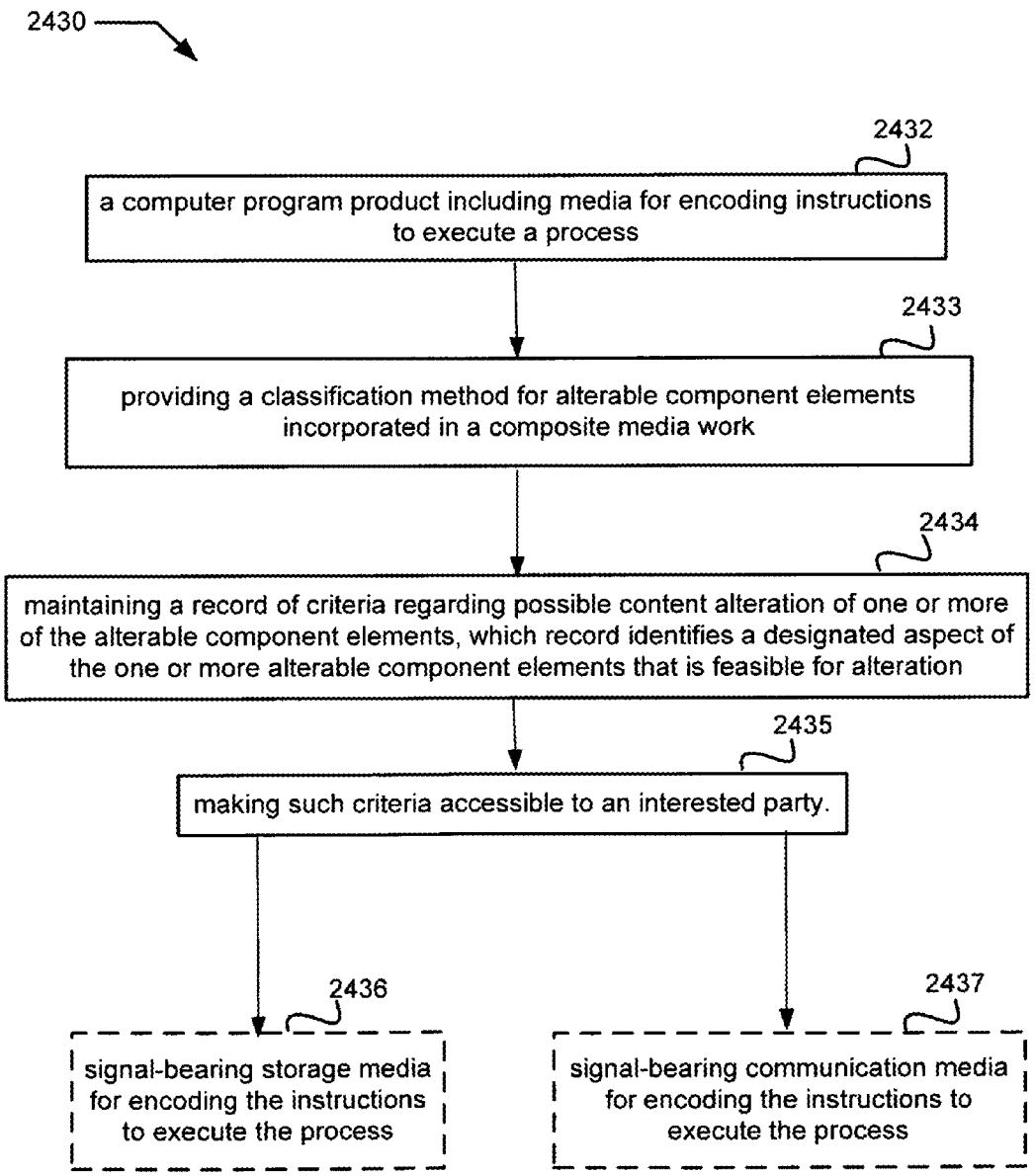
FIG. 35 is a diagrammatic flow chart for another exemplary computer program product embodiment.

The flow chart of FIG. 35 illustrates another embodiment 2430 for a computer program product including media for encoding instructions to execute a process (block 2432). Such an exemplary process may include providing a classification method for alterable component elements incorporated in a composite media work (block 2433); maintaining a record of criteria regarding possible content alteration of one or more of the alterable component elements, which record identifies a designated aspect of the one or more alterable component elements that is feasible for alteration (block 2434); and making such criteria accessible to an interested party (block 2435).

Additional possible features may include signal-bearing storage media for encoding the instructions to execute the process (block 2436), and signal-bearing communication media for encoding the instructions to execute the process (block 2437).

Other possible process features for incorporation in a computer program product may include maintaining a record of criteria applicable to one or more of the following type of possible content alteration: textual, verbal, visual, image, audio, musical, and animation. Additional exemplary process features for computer program embodiments may include maintaining a record of criteria applicable to one or more of the following type of alterable component elements: music, setting, hero, heroine, villain, clothing, vehicle, company, animals, food, product, brand, and dialogue.

Exemplary computer program instructions may also implement a process that includes maintaining a record of criteria applicable to possible content alteration of one or more of the following: related set of designated aspects, related set of alterable components, identical objects, same object in different scenes, and same object in different settings.

As a further example of process components that may be incorporated in a computer program product, such a process component may provide a classification system that identifies the following categories of alterable content incorporated in the composite media work: brand, trademark, service mark, copyrighted work, name, company name, identity, symbol, commercial symbol, icon, logotype, trade logo, trade dress, packaging, label, emblem, insignia, acronym, abbreviation, certification, slogan, jingle, animation, animated character, copyrighted item, and personage.

A further exemplary process feature for possible incorporation in a computer program product may include maintaining a record of criteria for addition or deletion or modification or replacement of an alterable component element or a designated aspect which are associated with a real-world entity, or in some instances which are associated with a real-world person.

Other possible computer program processes may include providing a classification system that identifies the following type of alterable content associated with a real-world entity: livery, color scheme, dress, fabric, jewelry, pattern, design, sculpture, artistic work, musical work, composition, publication, document, event, exhibit, performance, person, animal, mascot, character, and avatar. Additional program process features may identify the following type of alterable content associated with a real-world entity: product, service, invention, accessory, vehicle, place, address, location, store, building, school, university, hospital, church, club, group, organization, and business.

Some computer program embodiments may include a classification method that identifies the following type of alterable content associated with a real-world person: name, face, personal characteristics, identity, residence, title, achievement, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

In some computer program product embodiments, process instructions may facilitate accessibility to alteration criteria via one or more of the following: website, email request, database, telephonic request, postal mail request, stored message, publication, and announcement.

Figure 36:
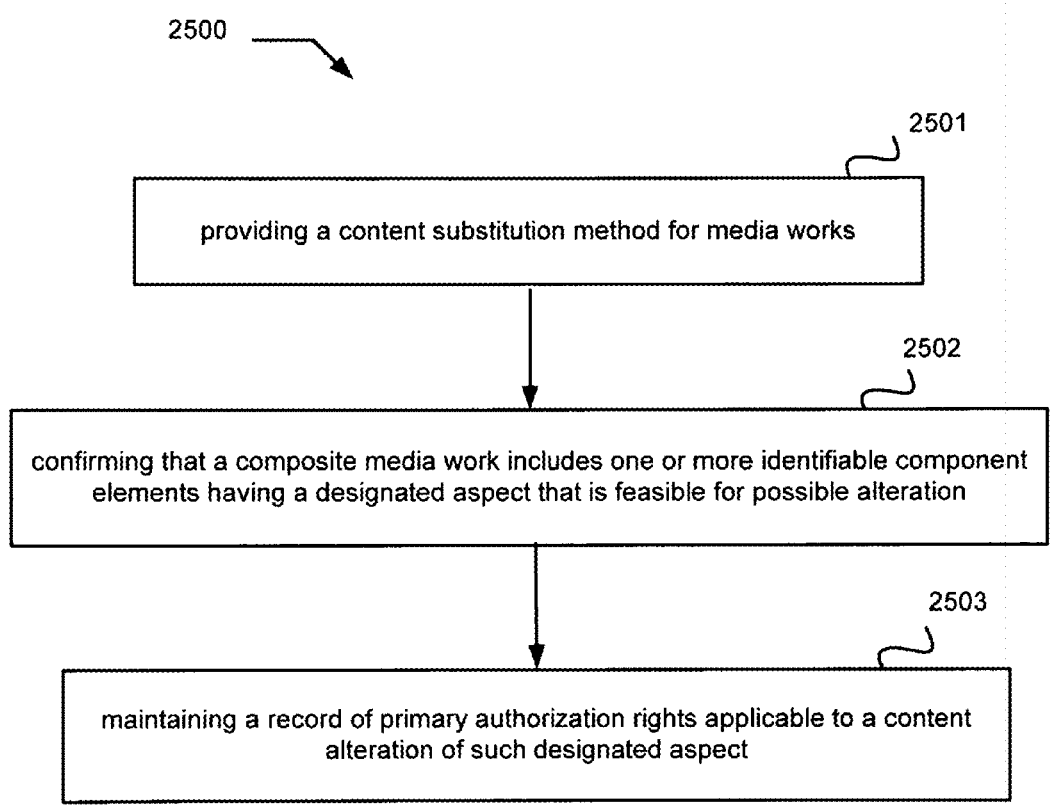
FIGS. 36-42 are more detailed flow charts illustrating various exemplary process features regarding authorization for media content alteration.

Referring to the high level flow chart of FIG. 36, an exemplary process embodiment 2500 may include providing a content substitution method for media works (block 2501), confirming that a composite media work includes one or more identifiable component elements having a designated aspect that is feasible for possible alteration (block 2502), and maintaining a record of primary authorization rights applicable to a content alteration of such designated aspect (block 2503).

Figure 37:
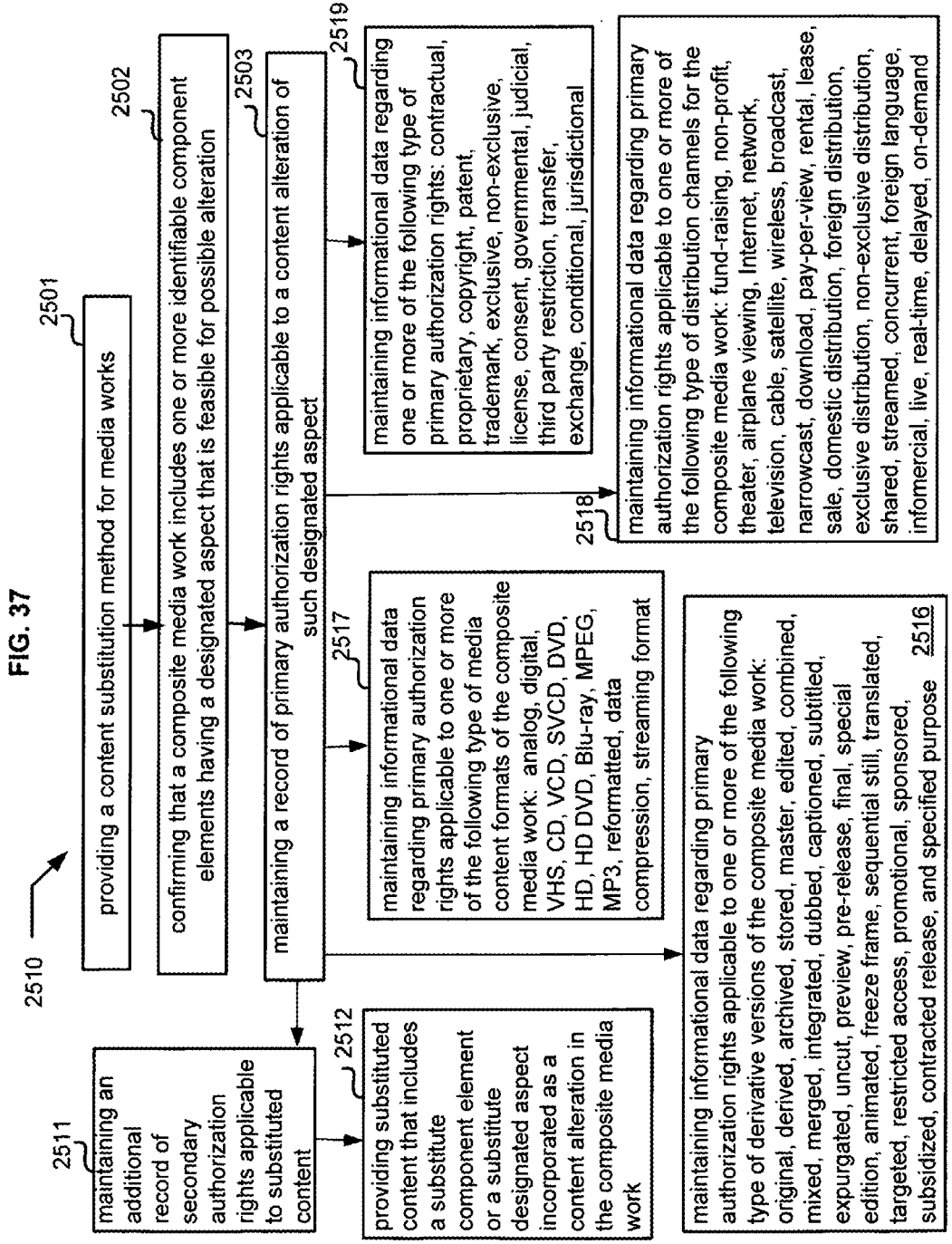

FIG. 37 is a more detailed flow chart illustrating exemplary embodiment features 2510 that include previously described process components 2501, 2502, 2503 along with maintaining an additional record of secondary authorization rights applicable to substituted content (block 2511). A related feature may include providing substituted content that includes a substitute component element or a substitute designated aspect incorporated as a content alteration in the composite media work (block 2512).

Another possible implementation feature may include maintaining informational data regarding the primary authorization rights applicable to one or more of the following type of derivative versions of the composite media work: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose (block 2516).

Further exemplary process features may include maintaining informational data regarding the primary authorization rights applicable to one or more of the following type of media content formats of the composite media work: analog, digital, VHS, CD, VCD, SVCD, DVD, HD, HD DVD, Blu-ray, MPEG, MP3, reformatted, data compression, and streaming format (block 2517). Additional exemplary enhancements may include maintaining informational data regarding one or more of the following type of primary authorization rights: contractual, proprietary, copyright, patent, trademark, exclusive, non-exclusive, license, consent, governmental, judicial, third party restriction, transfer, exchange, conditional, and jurisdictional (block 2519).

Another possible process component may include maintaining informational data regarding primary authorization rights applicable to one or more of the following type of distribution channels for the composite media work: fundraising, non-profit, theater, airplane viewing, Internet, network, television, cable, satellite, wireless, broadcast, narrowcast, download, pay-per-view, rental, lease, sale, domestic distribution, foreign distribution, exclusive distribution, non-exclusive distribution, shared, streamed, concurrent, foreign language, infomercial, live, real-time, delayed, and on-demand (block 2518).

Figure 38:
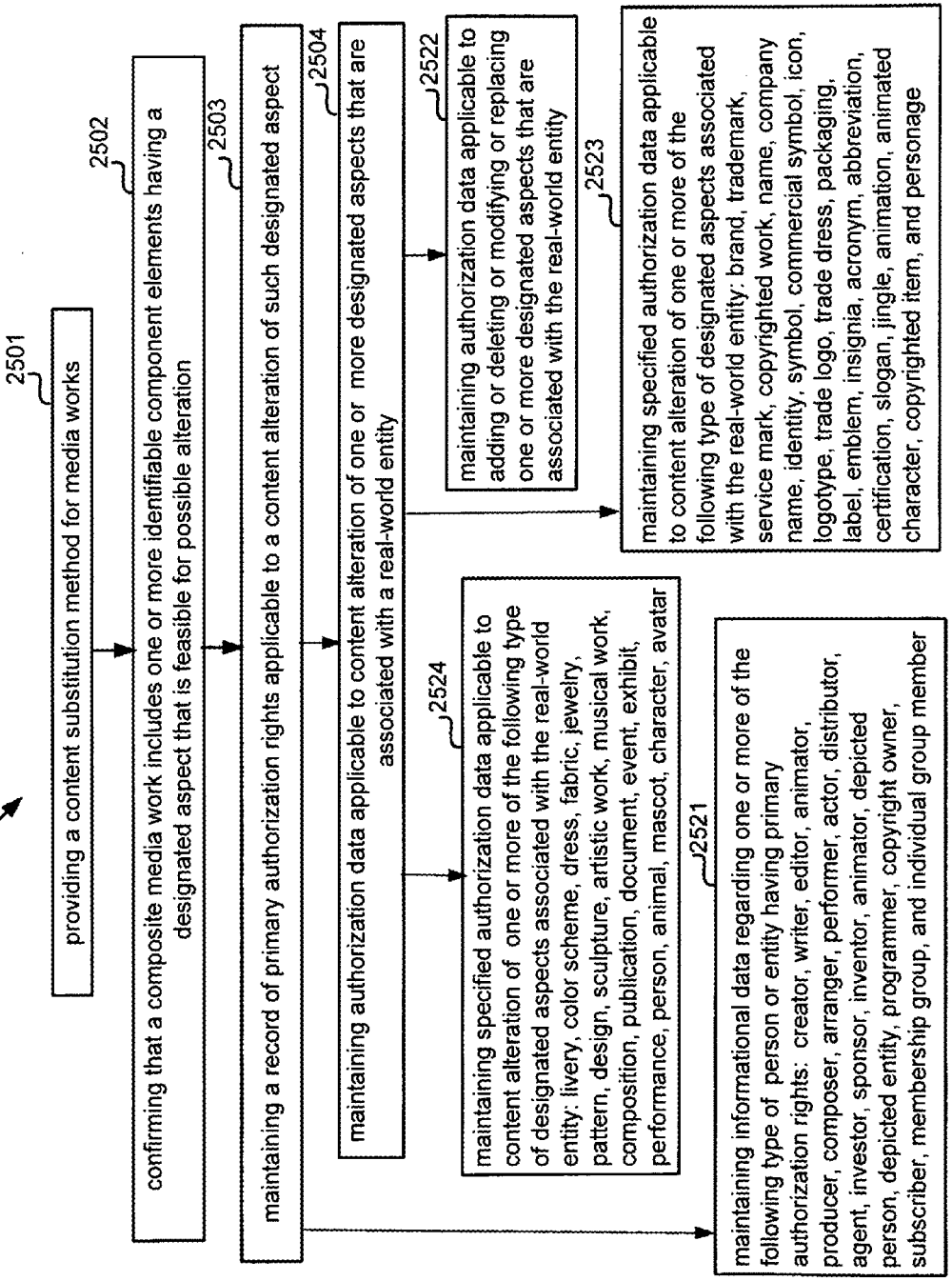

Referring to FIG. 38, an exemplary embodiment 2520 is depicted that includes previously described process components 2501, 2502, 2503 in combination with maintaining informational data regarding one or more of the following type of person or entity having primary authorization rights: creator, writer, editor, animator, producer, composer, arranger, performer, actor, distributor, agent, investor, sponsor, inventor, animator, depicted person, depicted entity, programmer, copyright owner, subscriber, membership group, and individual group member (block 2521).

Other possible process features relate to maintaining authorization data applicable to content alteration of one or more designated aspects that are associated with a real-world entity (block 2504). For example, some implementation features may include maintaining authorization data applicable to adding or deleting or modifying or replacing one or more designated aspects that are associated with the real-world entity (block 2522).

Additional possible enhancements may include maintaining specified authorization data applicable to content alteration of one or more of the following type of designated aspects associated with the real-world entity: brand, trademark, service mark, name, company name, identity, symbol, commercial symbol, icon, logotype, trade logo, trade dress, packaging, label, emblem, insignia, acronym, abbreviation, certification, slogan, jingle, animation, animated character, and personage (block 2523).

Further possible process features illustrated in FIG. 38 may include maintaining specified authorization data applicable to content alteration of one or more of the following type of designated aspects associated with the real-world entity: livery, color scheme, dress, fabric, jewelry, pattern, design, sculpture, artistic work, musical work, composition, publication, document, event, exhibit, performance, person, animal, mascot, character, and avatar (block 2524).

Figure 39:
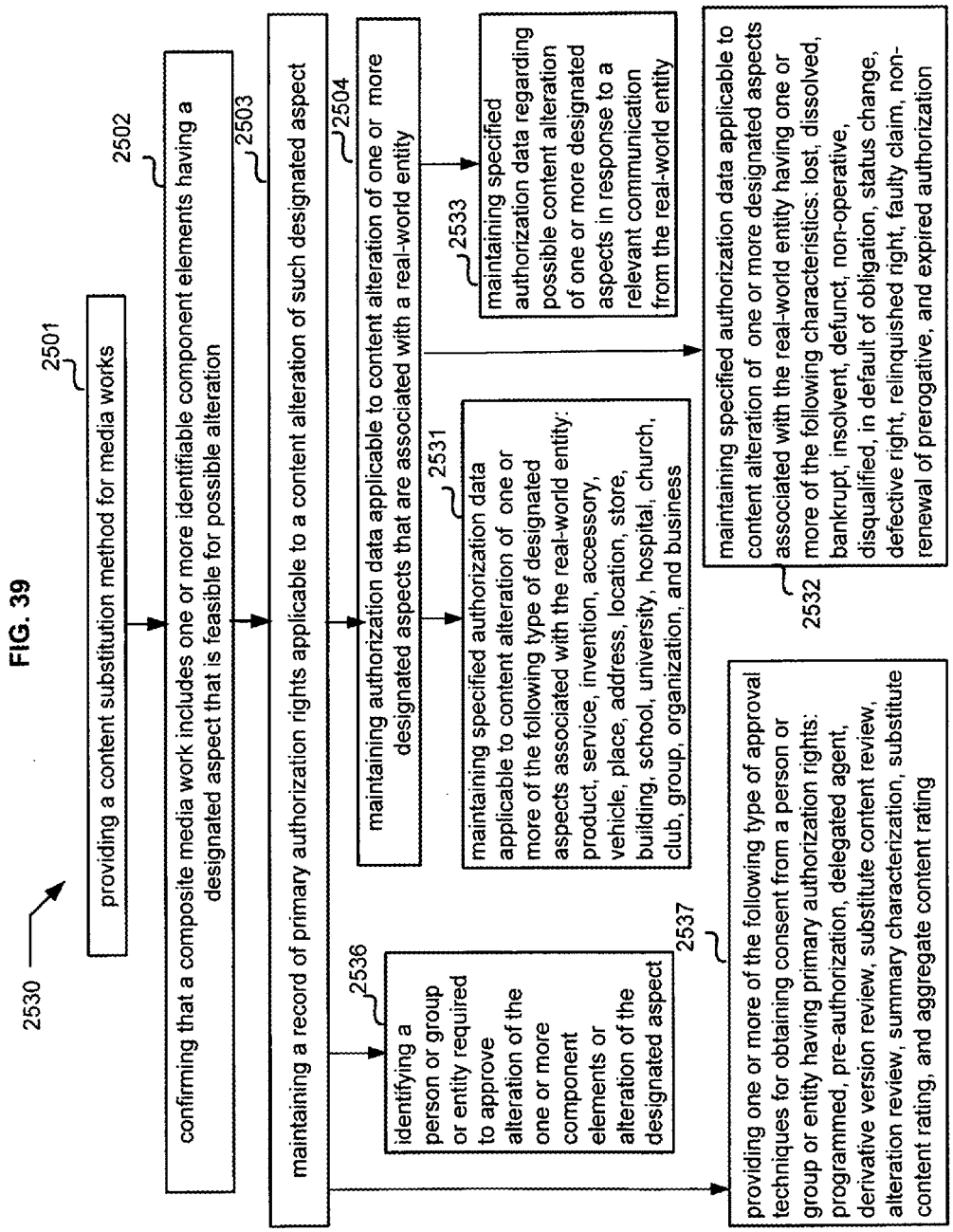

The illustrated embodiment features 2530 of FIG. 39 depict previously described process components 2501, 2502, 2503, 2504 along with maintaining specified authorization data applicable to content alteration of one or more of the following type of designated aspects associated with the real-world entity: product, service, invention, accessory, vehicle, place, address, location, store, building, school, university, hospital, church, club, group, organization, and business (block 2531).

Another possible process feature may include maintaining specified authorization data applicable to content alteration of one or more designated aspects associated with the real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization (block 2532). Additional possible enhancements may include maintaining specified authorization data regarding possible content alteration of one or more designated aspects in response to a relevant communication from the real-world entity (block 2533).

As further illustrated in FIG. 39, some embodiments may include identifying a person or group or entity required to approve alteration of the one or more component elements or alteration of the designated aspect (block 2536). Other possible process features may include providing one or more of the following type of approval techniques for obtaining consent from a person or group or entity having primary authorization rights: programmed, pre-authorization, delegated agent, derivative version review, substitute content review, alteration review, summary characterization, substitute content rating, and aggregate content rating (block 2537).

Figure 40:
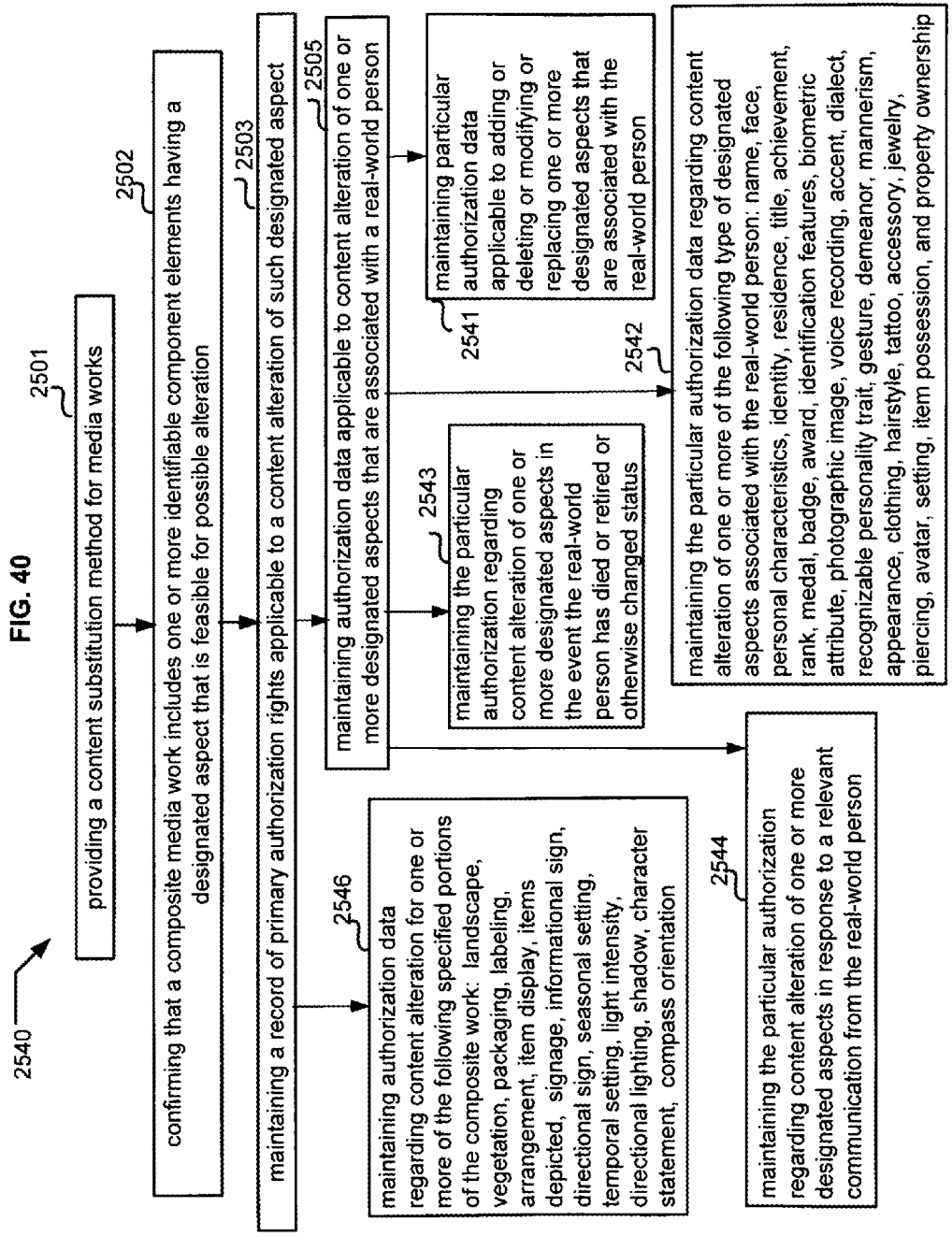

The detailed flow chart of FIG. 40 depicts various illustrated embodiment features 2540 including previously described process components 2501, 2502, 2503 along with maintaining particular authorization data applicable to content alteration of one or more designated aspects that are associated with a real-world person (block 2505). Some related possible implementation features may include maintaining particular authorization data applicable to adding or deleting or modifying or replacing one or more designated aspects that are associated with the real-world person (block 2541).

Another exemplary process feature may include maintaining the particular authorization data regarding content alteration of one or more of the following type of designated aspects associated with the real-world person: name, face, personal characteristics, identity, residence, title, achievement, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 2542).

Further possible enhancements may include maintaining the particular authorization regarding content alteration of one or more designated aspects in the event the real-world person has died or retired or otherwise changed status (block 2543), and maintaining the particular authorization regarding content alteration of one or more designated aspects in response to a relevant communication from the real-world person (block 2544).

Additional possible implementation features may include maintaining authorization data regarding content alteration for one or more of the following specified portions of the composite work: landscape, vegetation, packaging, labeling, arrangement, item display, items depicted, signage, informational sign, directional sign, seasonal setting, temporal setting, light intensity, directional lighting, shadow, character statement, and compass orientation (block 2546).

Figure 41:
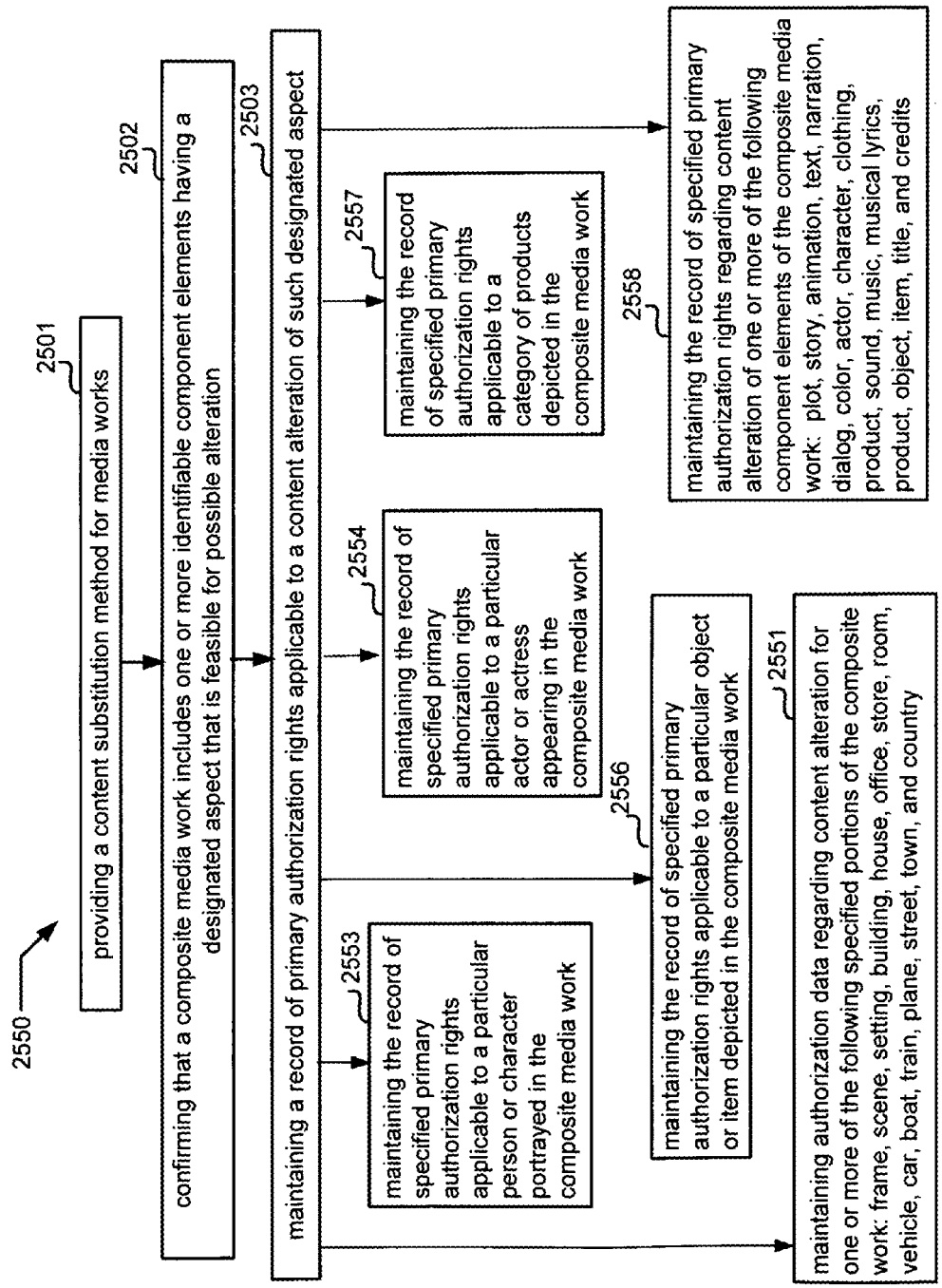

Referring to the illustrated embodiment features 2550 of FIG. 41, previously described process components 2501, 2502, 2503 are depicted in combination with maintaining authorization data regarding content alteration for one or more of the following specified portions of the composite work: frame, scene, setting, building, house, office, store, room, vehicle, car, boat, train, plane, street, town, and country (block 2551).

Another possible enhancement may include maintaining a record of specified primary authorization rights applicable to a particular person or character portrayed in the composite media work (block 2553). A related exemplary enhancement may include maintaining the record of specified primary authorization rights applicable to a particular actor or actress appearing in the composite media work (block 2554)

Additional exemplary process features may include maintaining the record of specified primary authorization rights applicable to a particular object or item depicted in the composite media work (block 2556). Related exemplary features may include maintaining the record of specified primary authorization rights applicable to a particular category of products depicted in the composite media work (block 2557).

A further possible feature may include maintaining the record of specified primary authorization rights regarding content alteration of one or more of the following component elements of the composite media work: plot, story, animation, text, narration, dialog, color, actor, character, clothing, product, sound, music, musical lyrics, product, object, item, title, and credits (block 2558).

Figure 42:
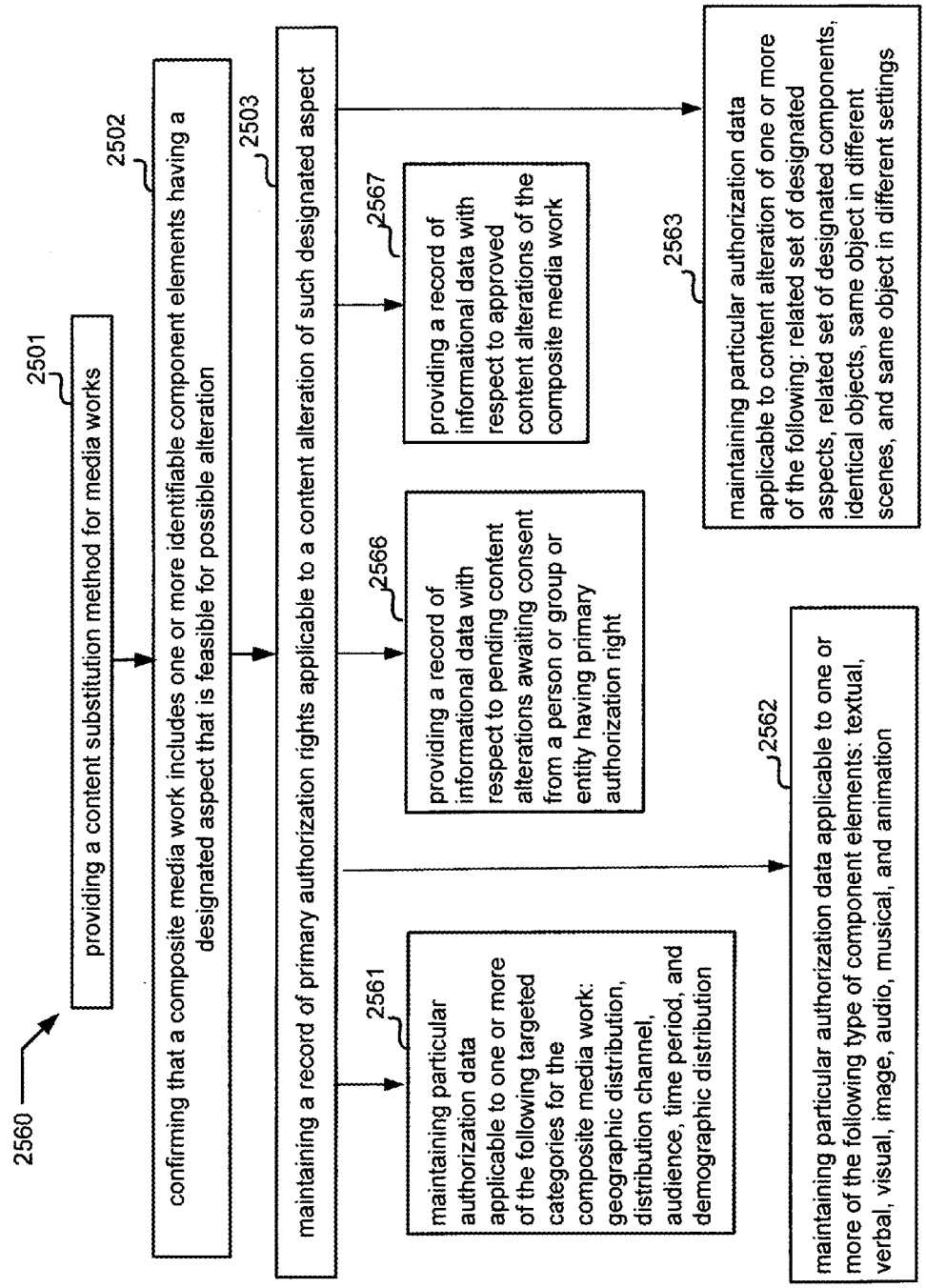

FIG. 42 illustrates various process embodiment features 2560 including previously depicted process components 2501, 2502, 2503 along with maintaining particular authorization data applicable to one or more of the following targeted categories for the composite media work: geographic distribution, distribution channel, audience, time period, and demographic distribution (block 2561). Other possible enhancements may include maintaining particular authorization data applicable to one or more of the following type of component elements: textual, verbal, visual, image, audio, musical, and animation (block 2562).

Additional implementation features may include maintaining particular authorization data applicable to content alteration of one or more of the following: related set of designated aspects, related set of designated components, identical objects, same object in different scenes, and same object in different settings (block 2563). Further possible features may include providing a record of informational data with respect to pending content alterations awaiting consent from a person or group or entity having primary authorization rights (block 2566), and providing a record of informational data with respect to approved content alterations of the composite media work (block 2567).

Figure 43:
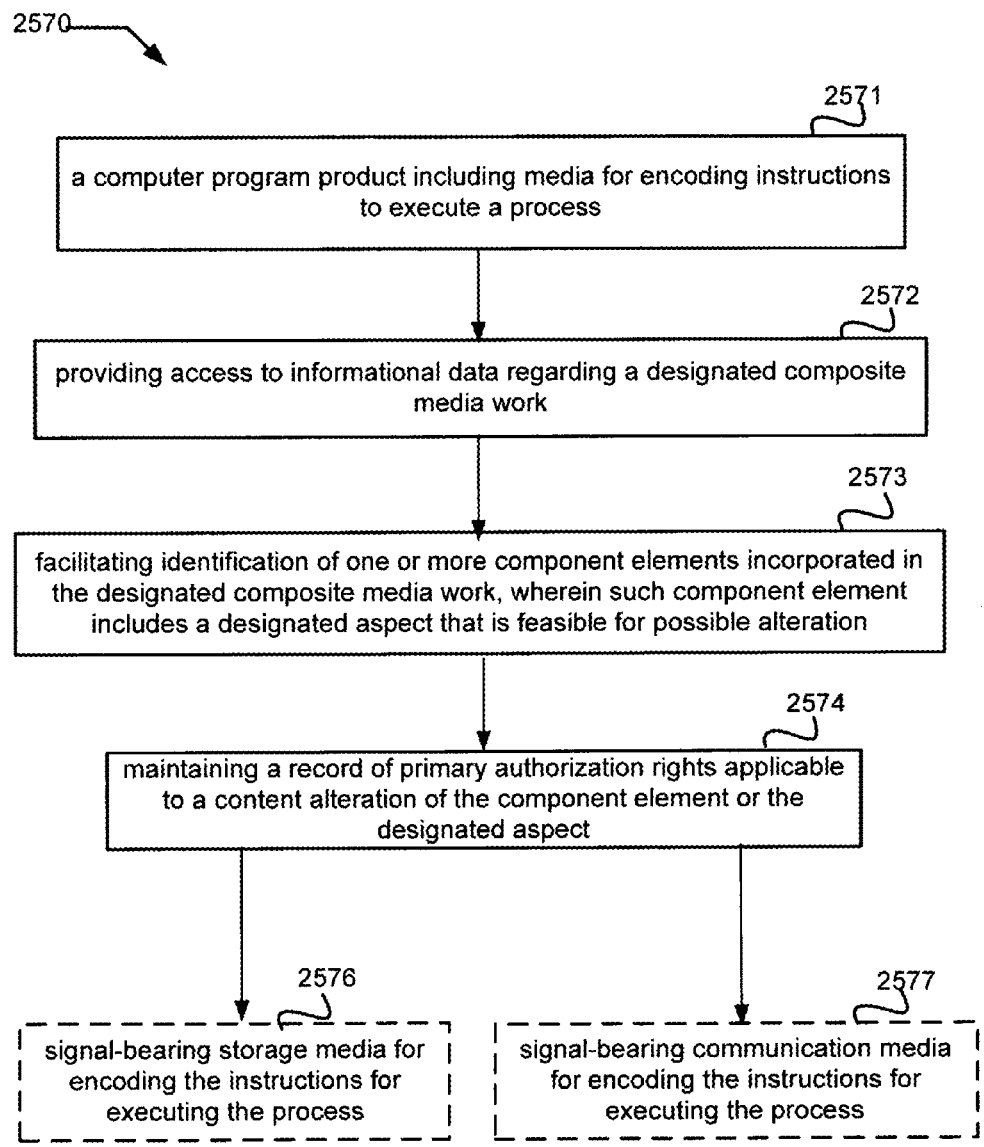
FIG. 43 is a diagrammatic flow chart for further exemplary computer program product embodiment.

Referring to FIG. 43, another exemplary embodiment 2570 may provide a computer program product including media for encoding instructions to execute a process (block 2571). Such a process may include providing access to informational data regarding a designated composite media work (block 2572); facilitating identification of one or more component elements incorporated in the designated composite media work, wherein such component element includes a designated aspect that is feasible for possible alteration (block 2573); and maintaining a record of primary authorization rights applicable to a content alteration of the component element or the designated aspect (block 2574).

Related possible features may include providing signal-bearing storage media for encoding the instructions for executing the process (block 2576), and providing signal-bearing communication media for encoding the instructions for executing the process (block 2577).

Further possible process features that may be incorporated in a program product embodiment include maintaining a record of primary authorization rights for addition or deletion or modification or replacement of an alterable component element or a designated aspect which are associated with a real-world entity, or in some instances which are associated with a real-world person.

Another exemplary feature of a program product embodiment may include maintaining specified authorization data applicable to alteration of one or more of the following type of content associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, slogan, jingle, animation, animated character, copyrighted item, and personage.

A further exemplary process feature of a program product embodiment may include maintaining specified authorization data applicable to alteration of one or more of the following type of content associated with a real-world entity: product, service, invention, accessory, vehicle, place, address, location, store, building, school, university, hospital, church, club, group, organization, and business.

Additional exemplary process features of a program product embodiment may include maintaining the particular authorization data regarding alteration of one or more of the following type of content associated with a real-world person: name, face, personal characteristics, identity, residence, title, achievement, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Further possible process features in a program product embodiment may include maintaining a record of primary authorization rights applicable to one or more of the following type of possible content alteration: textual, verbal, visual, image, audio, musical, and animation. Other exemplary computer program product features may include maintaining a record of primary authorization rights applicable to one or more of the following type of alterable component elements: music, setting, hero, heroine, villain, clothing, vehicle, company, animals, food, product, brand, and dialogue.

Another exemplary feature of a program product embodiment may include maintaining a record of primary authorization rights applicable to possible content alteration of one or more of the following: related set of designated aspects, related set of alterable component elements, identical objects, same object in different scenes, and same object in different settings.

Further exemplary program product features may include maintaining a record of primary authorization rights that identifies one or more of the following type of targeted categories for a derivative version of the composite media work wherein the derivative version includes capability for incorporating substituted content: geographic distribution, distribution channel, audience, recipient group, targeted device, time period, and demographic distribution.

Additional possible process features implemented in a computer program product may include maintaining informational data regarding the primary authorization rights applicable to one or more of the following type of derivative versions of the composite media work capable of incorporating substitute content: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose Another exemplary feature of a program product embodiment may include maintaining informational data regarding the primary authorization rights applicable to one or more of the following type of media content formats of the composite media work capable of incorporating substitute content: analog, digital, VHS, CD, VCD, SVCD, DVD, HD, HD DVD, Blu-ray, MPEG, MP3, reformatted, data compression, and streaming format.

Other exemplary computer program products may include maintaining informational data regarding primary authorization rights applicable to one or more of the following type of distribution channels for the composite media work capable of incorporating substitute content: fund-raising, non-profit, theater, airplane viewing, Internet, network, television, cable, satellite, wireless, broadcast, narrowcast, download, pay-per-view, rental, lease, sale, domestic distribution, foreign distribution, exclusive distribution, non-exclusive distribution, shared, streamed, concurrent, foreign language, infomercial, live, real-time, delayed, and on-demand.

Further possibilities for a program product implementation may include providing a record of primary authorization rights that includes maintaining informational data regarding one or more of the following type of primary authorization rights: contractual, proprietary, copyright, patent, trademark, exclusive, non-exclusive, license, consent, governmental, judicial, third party restriction, transfer, exchange, conditional, and jurisdictional.

It will be understood that a computer program product embodiment may further include maintaining a record of informational data regarding one or more of the following type of person or entity having primary authorization rights: creator, writer, editor, animator, producer, composer, arranger, performer, actor, distributor, agent, investor, sponsor, inventor, animator, depicted person, depicted entity, programmer, copyright owner, subscriber, membership group, and individual group member.

Additional process features for a computer program product embodiment may include implementing one or more of the following type of approval techniques for obtaining consent from a person or group or entity having primary authorization rights: programmed, pre-authorization, delegated agent, derivative version review, substitute content review, alteration review, summary characterization, substitute content rating, and aggregate content rating. Another program product feature may include maintaining a record of primary authorization rights applicable to one or more of the following: particular person or character portrayed in the composite media work; particular actor of actress appearing in the composite work; particular object or item depicted in the composite media work; and a particular category of products depicted in the composite media work.

In some implementations, a program product feature may include maintaining a record of specified primary authorization rights regarding alteration of one or more of the following type of content in the composite media work: plot, story, animation, text, narration, dialog, color, actor, character, clothing, product, sound, music, musical lyrics, product, object, item, title, and credits. Another possible program product feature may further include maintaining a record that includes particular authorization data applicable to one or more of the following targeted categories for the composite media work: geographic distribution, distribution channel, audience, time period, and demographic distribution.

A further process feature of a computer program product embodiment may include maintaining an additional record of secondary authorization rights applicable to substitute content for the designated composite media work.

Figure 44:
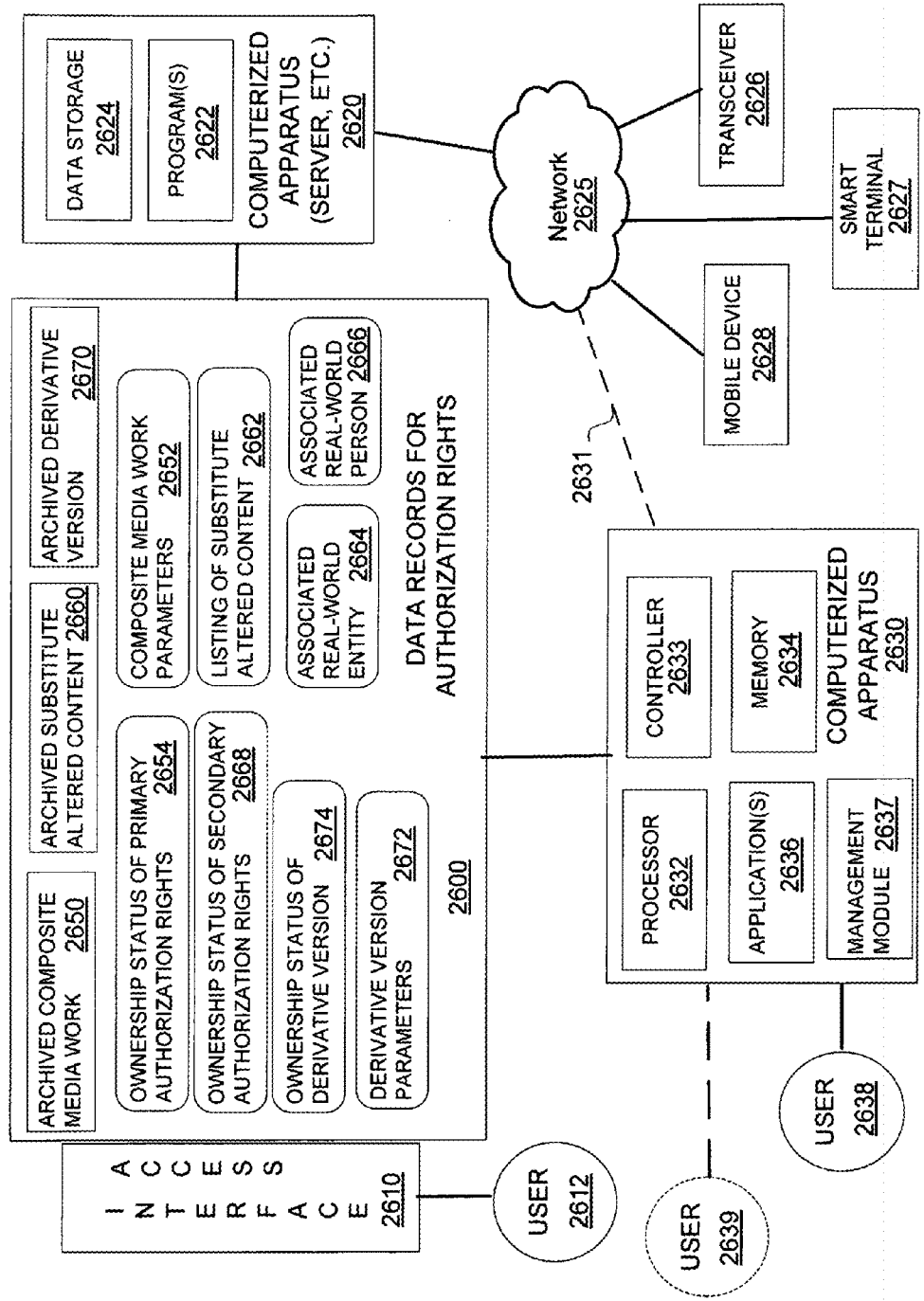
FIG. 44 is a schematic block diagram illustrating an exemplary embodiment that provides accessibility and management of data records for authorization rights regarding media content alteration.

The exemplary embodiments shown in the schematic block diagram of FIG. 44 depict various modes of accessibility to data records for authorization rights 2600 that relate to substitute media content. Such accessibility modes are not intended to be limiting, and are provided only for purposes of illustration. For example, user 2612 may have direct accessibility to a local storage location for the data records for authorization rights 2600 via access interface 2610. In some instances such accessibility may be password protected or otherwise restricted in order to maintain satisfactory data security.

Additional data record accessibility may be provided by computerized apparatus 2620 that includes typical server functionality including but not limited to programs 2622 for data management as well as data storage 2624. Such data storage 2624 could also provide backup storage as well as supplemental or replacement storage for some of the data records for authorization rights 2600. The computerized apparatus 2620 may have communication links via network 2625 (e.g., WAN, LAN, Internet, Peer-to-Peer, etc.) to many different types of access devices such as transceiver 2626, smart terminal 2627, mobile device 2628, and the like. It will be understood by those skilled in the art that future network accessibility may become ubiquitous, and the network access devices shown are for purposes of illustration only.

Further data record accessibility may be provided to active user 2638 and inactive user 2639, both of whom may operate computerized apparatus 2630, which includes an optional communication link 2631 to network 2625 as well as a direct link to the data records for authorization rights 2600. Additional data management functions may be provided by processor 2632, controller 2633, memory 2634, applications 2636, and management module 2637.

The topical categories of data records for authorization rights 2600 may include an archived composite media work 2650, related composite media work parameters 2652, and informational data regarding ownership status of primary authorization rights 2654. Other topical categories may include archived substitute altered content 2660, related listing of substitute altered content 2662, identity data for an associated real-world entity 2664, identity data for an associated real-world person 2666, and informational data regarding ownership status of secondary authorization rights 2668.

Further possible topical categories may include an archived derivative version 2670, related derivative version parameters 2672, and informational data regarding ownership status of derivative version 2674. Of course other possible topical categories may be included, and some data categories may not be required, depending on the circumstances.

It will be understood from the exemplary system embodiments disclosed herein that a system for media content alteration may include a listing that identifies substitute altered content to be incorporated in a derivative version of a composite media work, wherein the composite media work includes one or more component elements or designated aspects feasible for possible alteration. Such a listing may further include a record of one or more of the following types of substitute altered content to be incorporated in the derivative version: addition, deletion, modification, and replacement.

Additional possible system features that identify substitute altered content may include a further listing of the one or more of the following type of substitute altered content to be incorporated in the derivative version: related set of designated aspects, related set of alterable components, identical objects, same object in different scenes, and same object in different settings. Another exemplary system feature may include a further listing of the one or more of the following type of substitute altered content to be incorporated in the derivative version: textual, verbal, visual, image, audio, musical, live action, reenactment, simulation, and animation.

An exemplary system embodiment may further include a data record regarding ownership status of secondary authorization rights applicable to the substitute altered content. Such a system data record may also include ownership status information applicable to a derivative version that has incorporated the substitute altered content. Additional possible system data records may include secondary authorization rights applicable to one or more of the following targeted categories for the derivative version: geographic distribution, distribution channel, audience, MPAA rating, ESRB rating, proprietary rating, government rating, time period, and demographic distribution.

As rating systems become more widespread in various countries of the world, it will be understood that some traditional rating systems may be revised and in some instances adapted for new media categories. Also new rating systems may be developed and accepted by various media content entities. The current rating standards developed by MPAA (Motion Picture Association of America) are therefore included by way of example only (e.g., G, PG, PG-13, R, NC-17) and may be modified in the future. Similarly the current rating standards developed by ESRB (Entertainment Software Rating Board) are also included by way of example only (e.g., Early Childhood, Everyone, Everyone 10+, Teen, Mature, Adults Only) and may modified in the future. Similarly so-called proprietary and government rating systems are included by way of example only and are not intended to be limiting.

Similarly, new/revised distribution channels as well as new/revised media formats may be developed in the future, and the indicated distribution channels and media formats are included by way of example only and are not intended to be limiting.

Further system data records may include secondary authorization rights regarding one or more of the following type of substitute altered content associated with a real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

Other possible system data record information may include secondary authorization rights regarding one or more of the following type of substitute altered content associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

In some instances an exemplary system data record may include informational data regarding a specified derivative version of the composite media work, wherein the specified derivative version already includes the substitute altered content. Other possible system data records may include informational data to identify a specified derivative version having capability to incorporate future substitute content in addition to the substitute altered content. Another possible system embodiment component may include a management module to coordinate compliance with the secondary authorization rights.

It will be further understood from the exemplary system features disclosed herein that some embodiments may provide computerized apparatus operably coupled to some of the various types of data records and informational listings. User access to such data record and informational listings may be provided via an access interface to the computerized apparatus.

Figure 45:
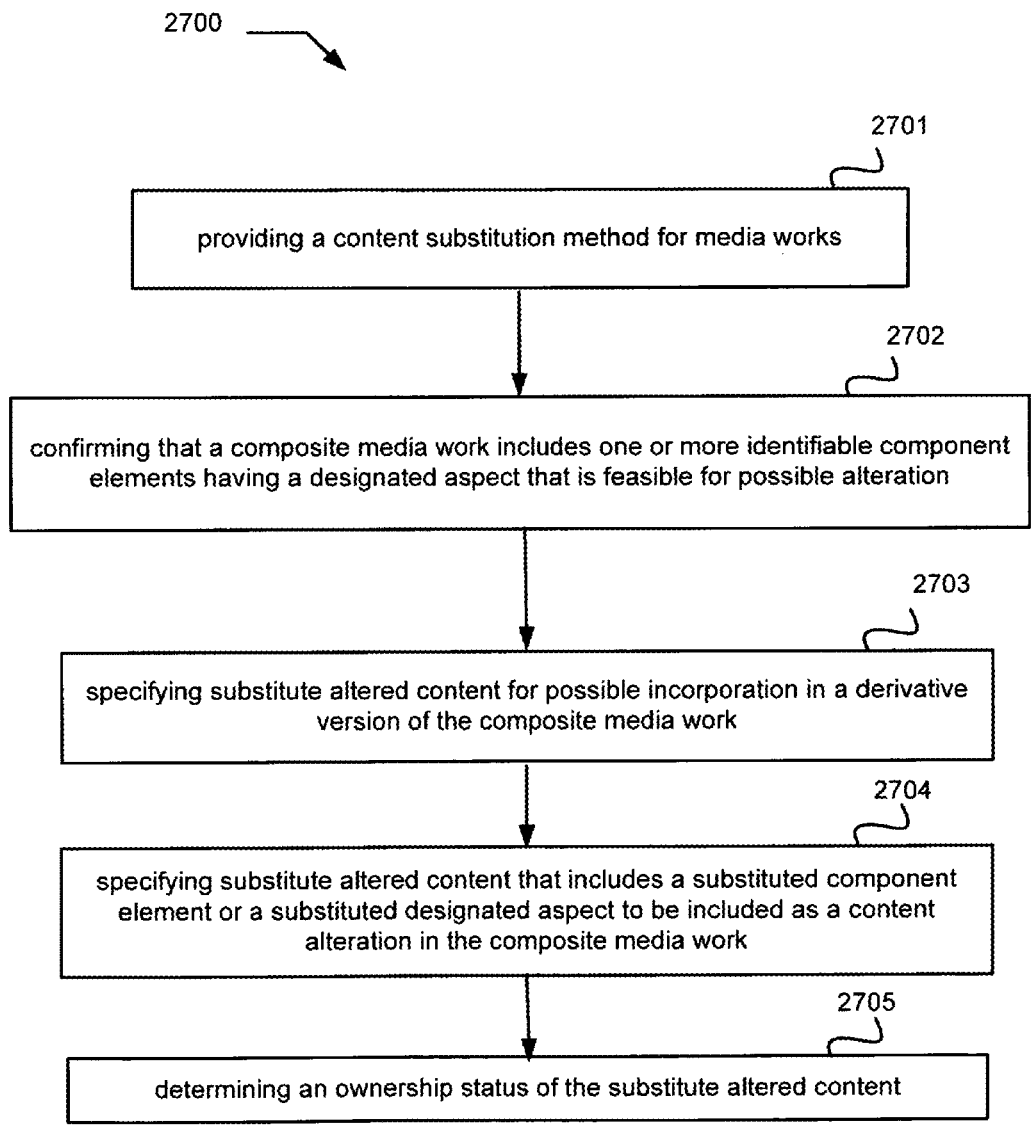
FIG. 45 is high level flow chart illustrating another exemplary process embodiment for content substitution in media works.

Referring to an exemplary process embodiment 2700 in FIG. 45, an implementation may provide a content substitution method for media works (block 2701), including confirming that a composite media work includes one or more identifiable component elements having a designated aspect that is feasible for possible alteration (block 2702), and specifying substitute altered content for possible incorporation in a derivative version of the composite media work (block 2703). Other exemplary features may include specifying substitute altered content that includes a substituted component element or a substituted designated aspect to be included as a content alteration in the composite media work (block 2704), and determining an ownership status of the substitute altered content (block 2705).

Figure 46:
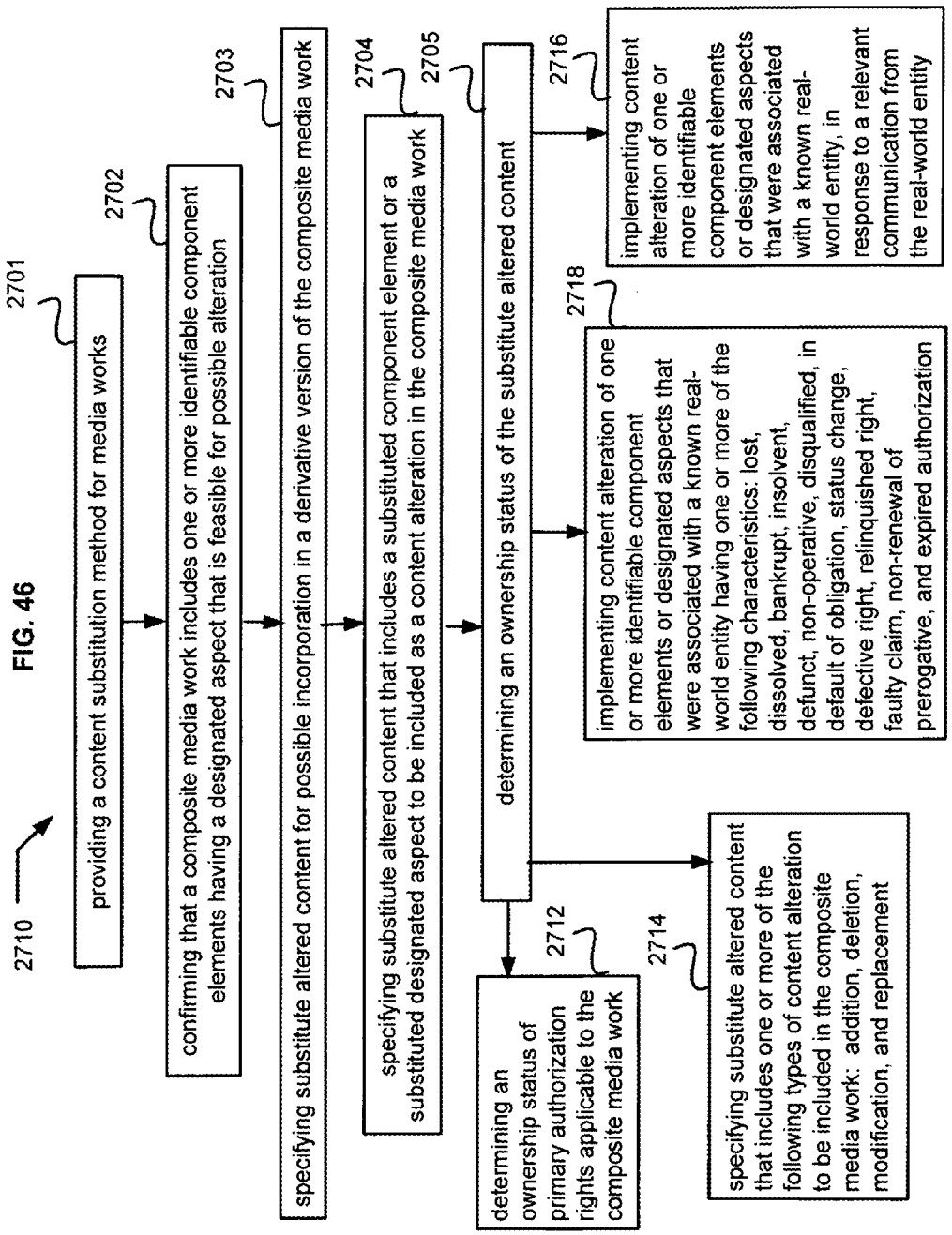
FIGS. 46-54 are more detailed flow charts illustrating management of authorization rights regarding substitute altered content for media works.

Additional detailed embodiment implementations 2710 illustrated in FIG. 46 include previously described process features 2701, 2702, 2703, 2704, 2405 in combination with determining an ownership status of primary authorization rights applicable to the composite media work (block 2712), and specifying substitute altered content that includes one or more of the following types of content alteration to be included in the composite media work: addition, deletion, modification, and replacement (block 2714).

Another possible process feature may include implementing content alteration of one or more identifiable component elements or designated aspects that were associated with a known real-world entity, in response to a relevant communication from the real-world entity (block 2716). Further possible enhancements may include implementing content alteration of one or more identifiable component elements or designated aspects that were associated with a known real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization (block 2718).

Figure 47:
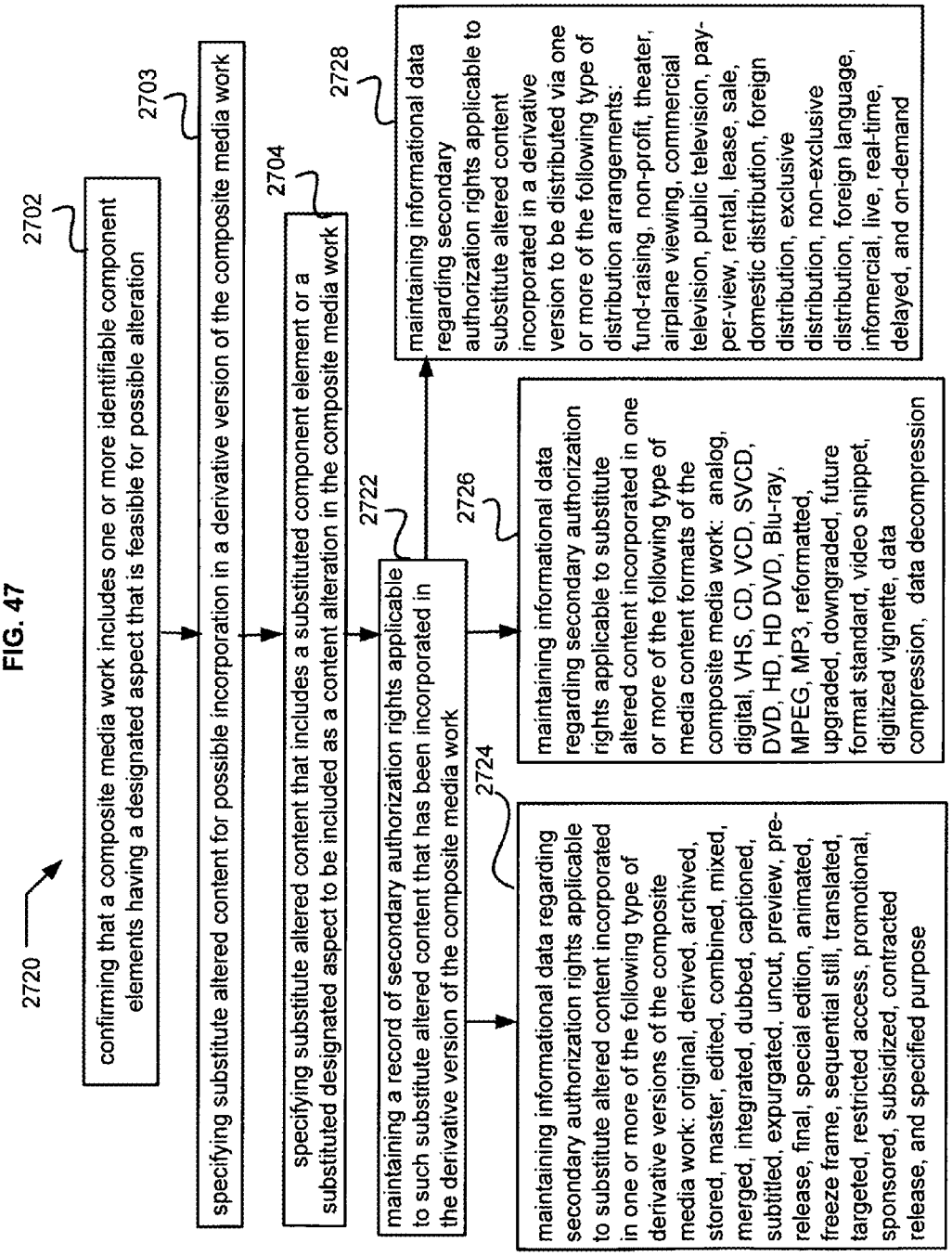

Referring to illustrated embodiments 2720 in FIG. 47, previously described process features 2702, 2703, 2704 may be combined with maintaining a record of secondary authorization rights applicable to such substitute altered content that has been incorporated in the derivative version of the composite media work (block 2722). A related exemplary feature may include maintaining informational data regarding secondary authorization rights applicable to substitute altered content incorporated in one or more of the following type of derivative versions of the composite media work: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose (block 2724).

Additional process features may include maintaining informational data regarding secondary authorization rights applicable to substitute altered content incorporated in one or more of the following type of media content formats of the composite media work: analog, digital, VHS, CD, VCD, SVCD, DVD, HD, HD DVD, Blu-ray, MPEG, MP3, reformatted, upgraded, downgraded, future format standard, video snippet, digitized vignette, data compression, and data decompression (block 2726).

Further possible implementations may include maintaining informational data regarding secondary authorization rights applicable to substitute altered content incorporated in a derivative version to be distributed via one or more of the following type of distribution arrangements: fund-raising, non-profit, theater, airplane viewing, commercial television, public television, pay-per-view, rental, lease, sale, domestic distribution, foreign distribution, exclusive distribution, non-exclusive distribution, foreign language, infomercial, live, real-time, delayed, and on-demand (block 2728).

Figure 48:
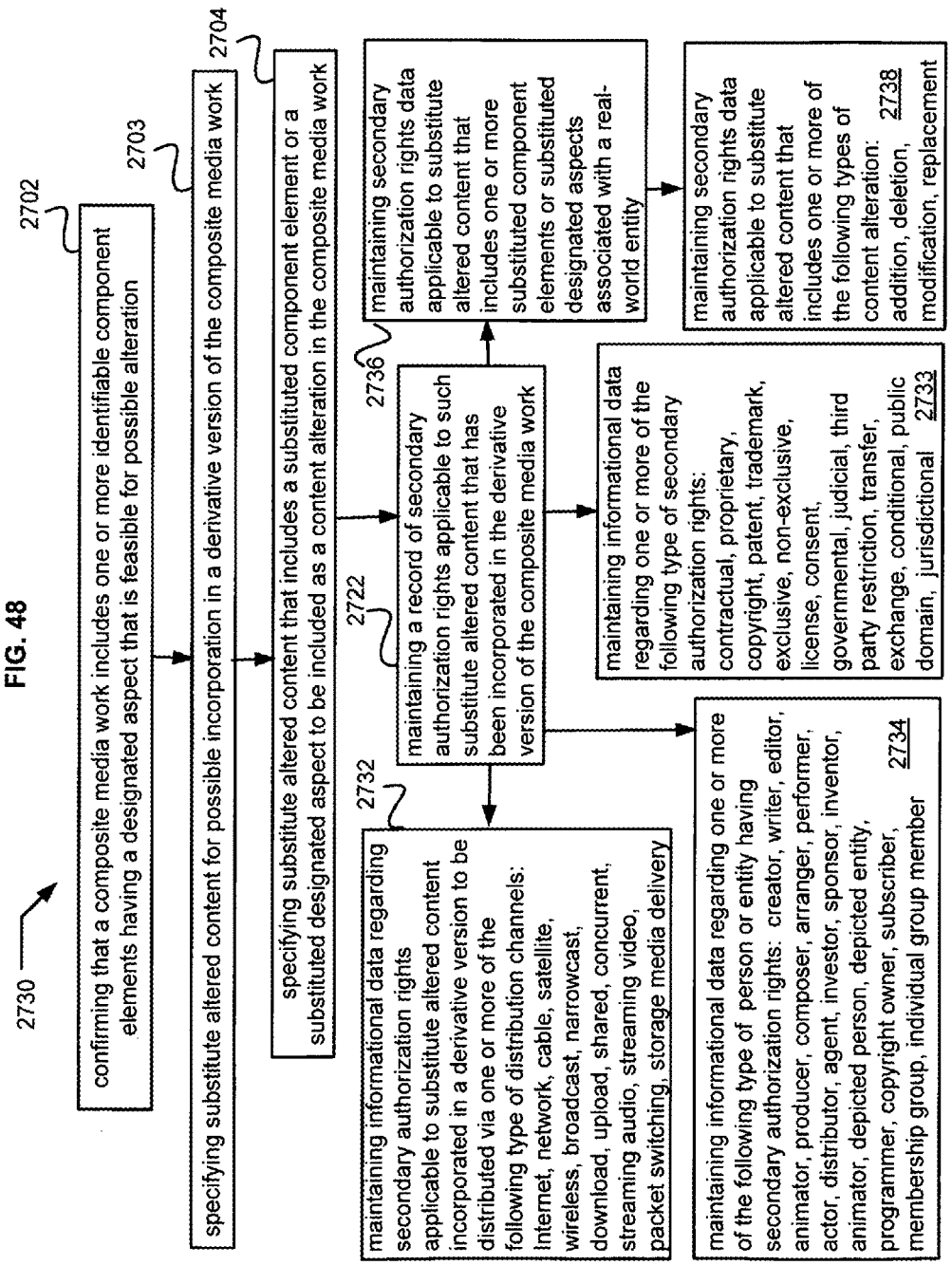

The various exemplary embodiments 2730 disclosed in FIG. 48 include previously described process features 2702, 2703, 2704, 2722 along with maintaining informational data regarding secondary authorization rights applicable to substitute altered content incorporated in a derivative version to be distributed via one or more of the following type of distribution channels: Internet, network, cable, satellite, wireless, broadcast, narrowcast, download, upload, shared, concurrent, streaming audio, streaming video, packet switching, and storage media delivery (block 2732).

Another possible enhancement may include maintaining informational data regarding one or more of the following type of secondary authorization rights: contractual, proprietary, copyright, patent, trademark, exclusive, non-exclusive, license, consent, governmental, judicial, third party restriction, transfer, exchange, conditional, public domain, and jurisdictional (block 2733).

Further exemplary features may include maintaining informational data regarding one or more of the following type of person or entity having secondary authorization rights: creator, writer, editor, animator, producer, composer, arranger, performer, actor, distributor, agent, investor, sponsor, inventor, animator, depicted person, depicted entity, programmer, copyright owner, subscriber, membership group, and individual group member (block 2734).

The flow chart of FIG. 48 further depicts additional process features including maintaining secondary authorization rights data applicable to substitute altered content that includes one or more substituted component elements or substituted designated aspects associated with a real-world entity (block 2736), and maintaining secondary authorization rights data applicable to substitute altered content that includes one or more of the following types of content alteration: addition, deletion, modification, and replacement (block 2738).

Figure 49:
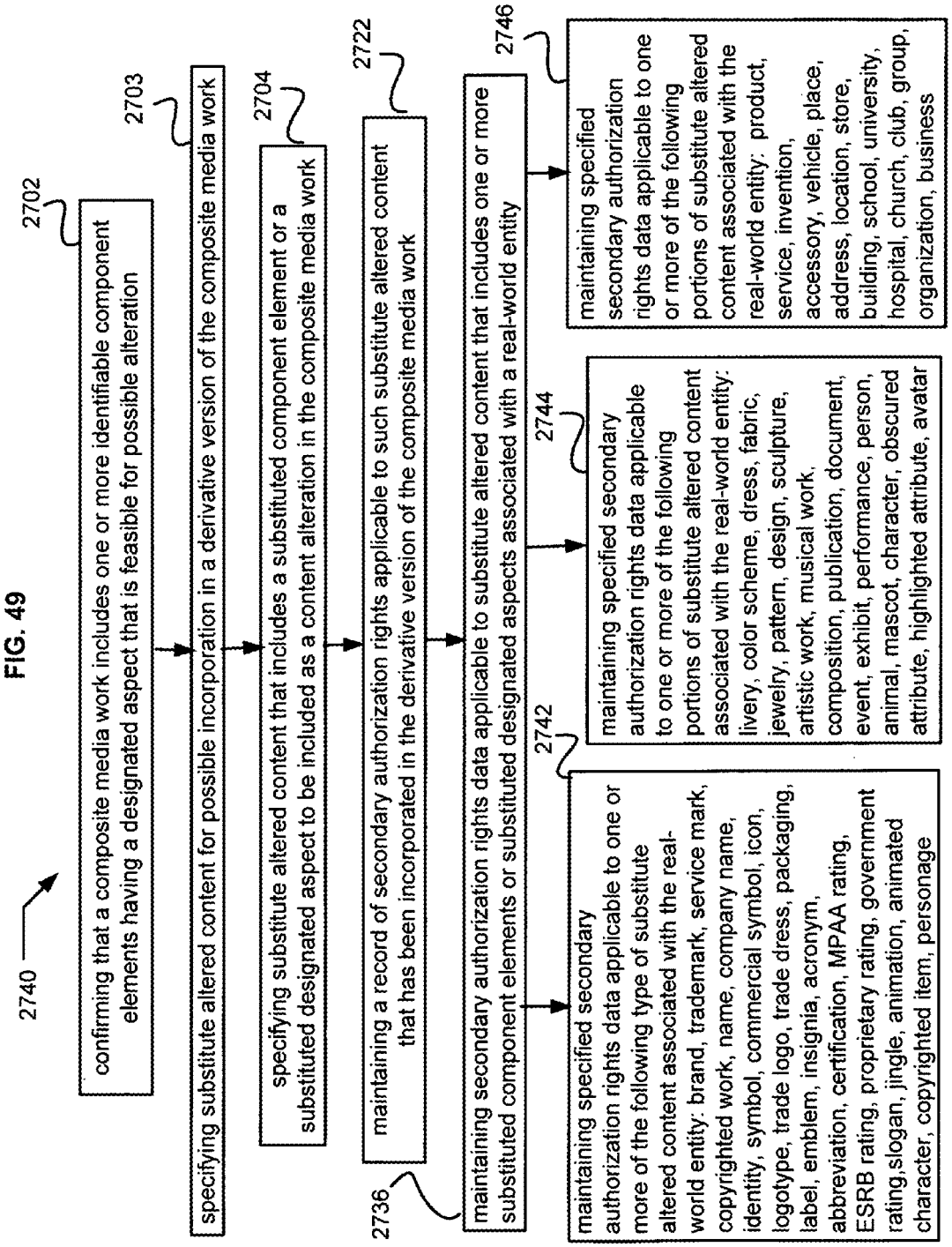

The detailed embodiments 2740 illustrated in FIG. 49 include previously described process features 2702, 2703, 2704, 2722, 2736 as well as maintaining specified secondary authorization rights data applicable to one or more of the following type of substitute altered content associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage (block 2742).

Further possible enhancements may include maintaining specified secondary authorization rights data applicable to one or more of the following portions of substitute altered content associated with the real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar (block 2744), and maintaining specified secondary authorization rights data applicable to one or more of the following portions of substitute altered content associated with the real-world entity: product, service, invention, accessory, vehicle, place, address, location, store, building, school, university, hospital, church, club, group, organization, and business (block 2746).

Figure 50:
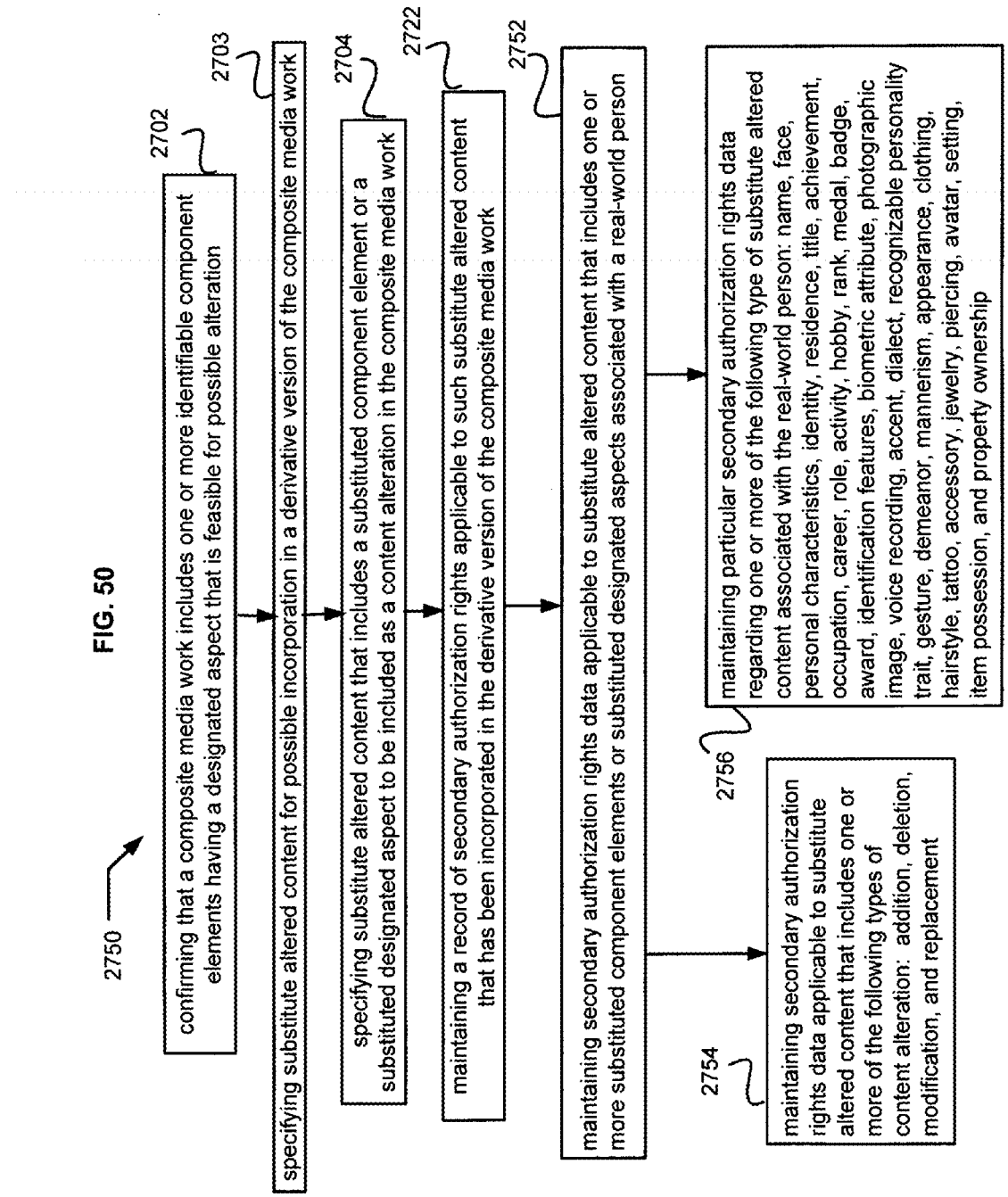

The exemplary embodiments 2750 disclosed in FIG. 50 include previously described process features 2702, 2703, 2704, 2722, in combination with maintaining secondary authorization rights data applicable to substitute altered content that includes one or more substituted component elements or substituted designated aspects associated with a real-world person (block 2752). Another possible implementation feature may include maintaining secondary authorization rights data applicable to substitute altered content that includes one or more of the following types of content alteration: addition, deletion, modification, and replacement (block 2754).

Further possibilities may include maintaining particular secondary authorization rights data regarding one or more of the following type of substitute altered content associated with the real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 2756).

Figure 51:
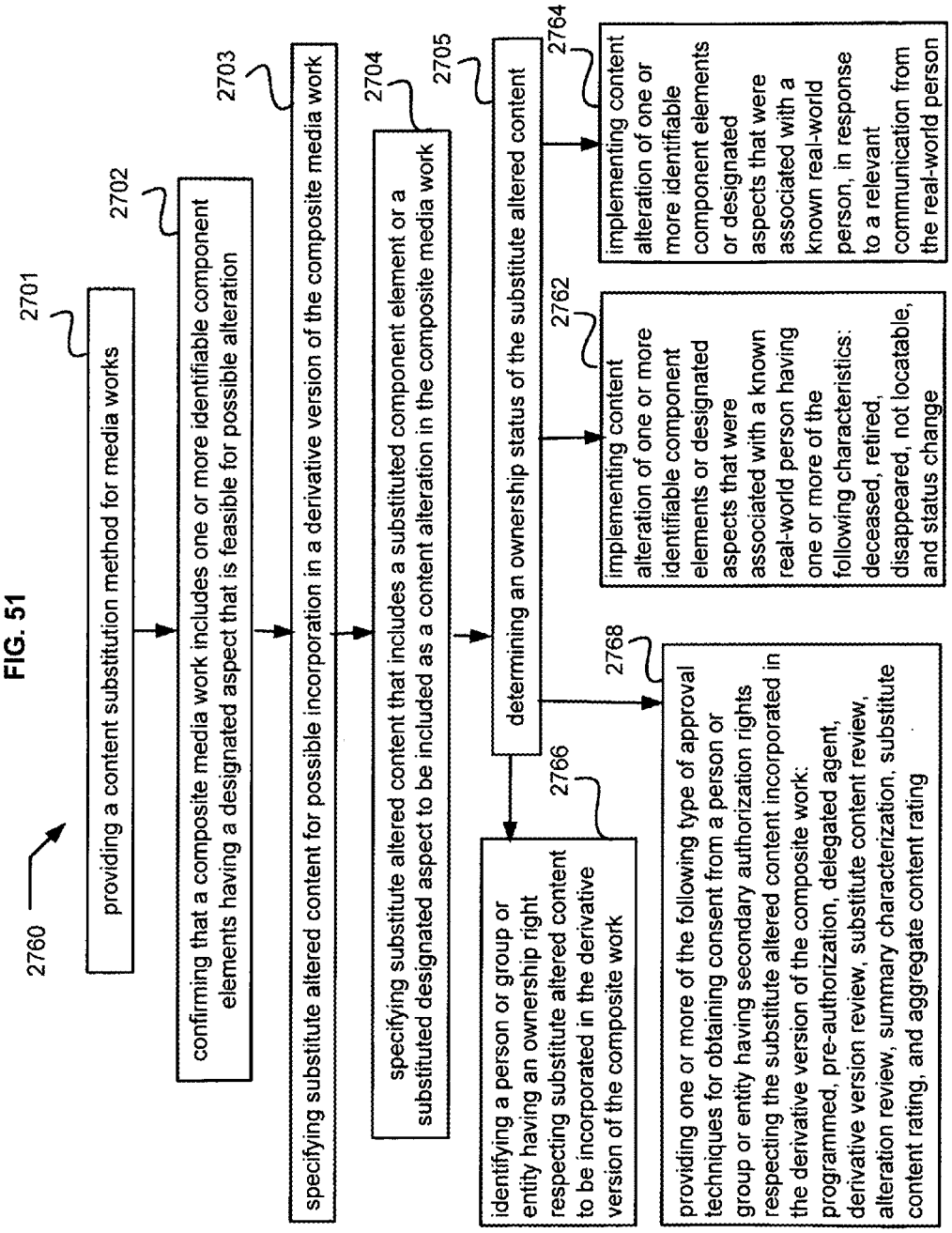

The exemplary embodiments 2760 disclosed in FIG. 51 include previously described process features 2701, 2702, 2703, 2704, 2705 as well as implementing content alteration of one or more identifiable component elements or designated aspects that were associated with a known real-world person having one or more of the following characteristics: deceased, retired, disappeared, not locatable, and status change (block 2762). Additional implementation enhancements may include implementing content alteration of one or more identifiable component elements or designated aspects that were associated with a known real-world person, in response to a relevant communication from the real-world person (block 2764).

Other exemplary features disclosed in FIG. 51 include identifying a person or group or entity having an ownership right respecting substitute altered content to be incorporated in the derivative version of the composite work (block 2766), and providing one or more of the following type of approval techniques for obtaining consent from a person or group or entity having secondary authorization rights respecting the substitute altered content incorporated in the derivative version of the composite work: programmed, pre-authorization, delegated agent, derivative version review, substitute content review, alteration review, summary characterization, substitute content rating, and aggregate content rating (block 2768).

Figure 52:
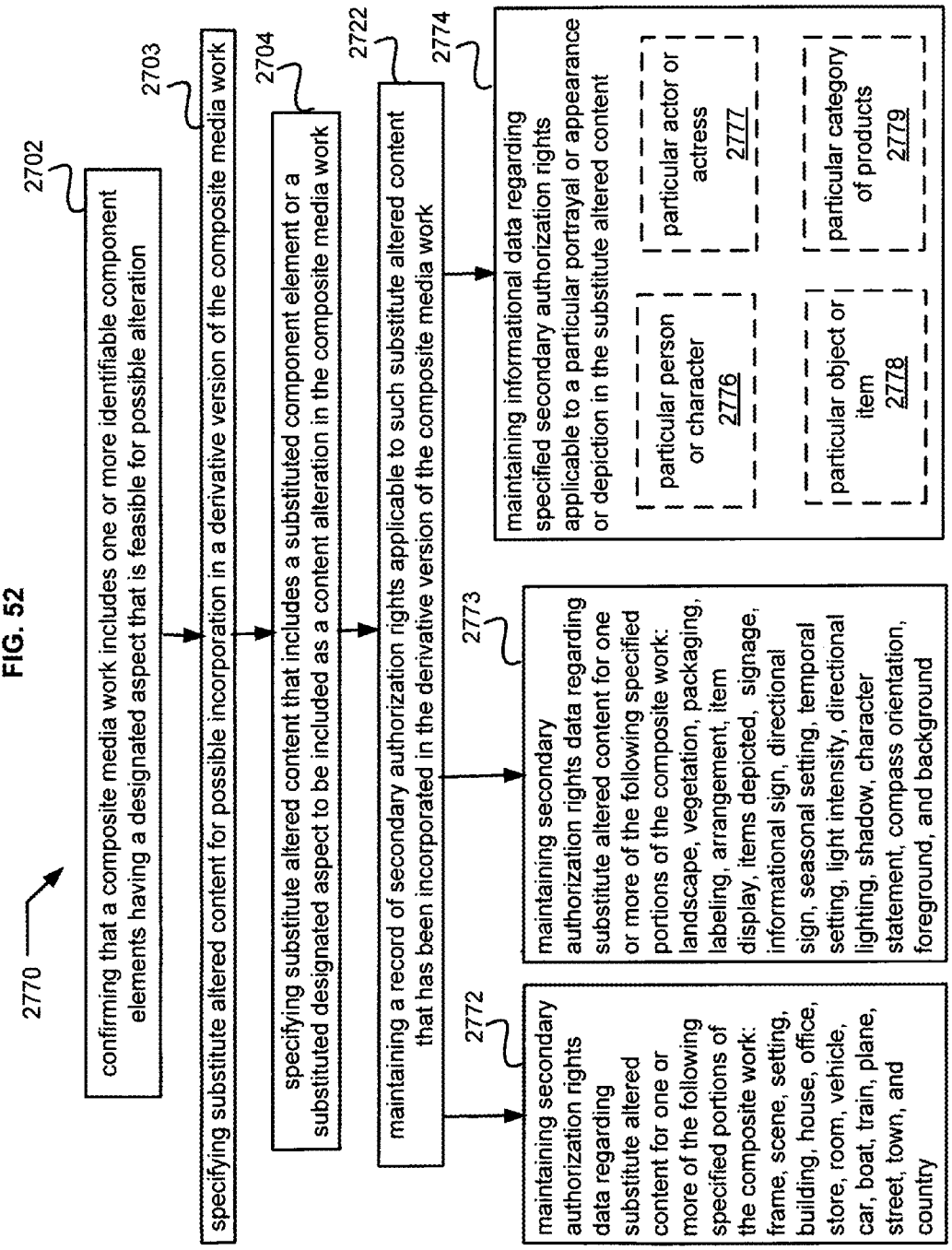

The flow chart of FIG. 52 illustrates further exemplary embodiments 2770 that include previously described possibilities 2702, 2703, 2704, 2722 along with maintaining secondary authorization rights data regarding substitute altered content for one or more of the following specified portions of the composite work: frame, scene, setting, building, house, office, store, room, vehicle, car, boat, train, plane, street, town, and country (block 2772).

Another possible implementation may include maintaining secondary authorization rights data regarding substitute altered content for one or more of the following specified portions of the composite work: landscape, vegetation, packaging, labeling, arrangement, item display, items depicted, signage, informational sign, directional sign, seasonal setting, temporal setting, light intensity, directional lighting, shadow, character statement, compass orientation, foreground, and background (block 2773).

The flow chart of FIG. 52 also illustrates other exemplary possibilities including maintaining informational data regarding specified secondary authorization rights applicable to a particular portrayal or appearance or depiction in the substitute altered content (block 2774). For example, such informational data may be applicable to a portrayal of a particular person or character (block 2776), an appearance by a particular actor or actress (block 2777), a depiction of a particular object or item (block 2778), and a depiction of a particular category of products (block 2779).

Figure 53:
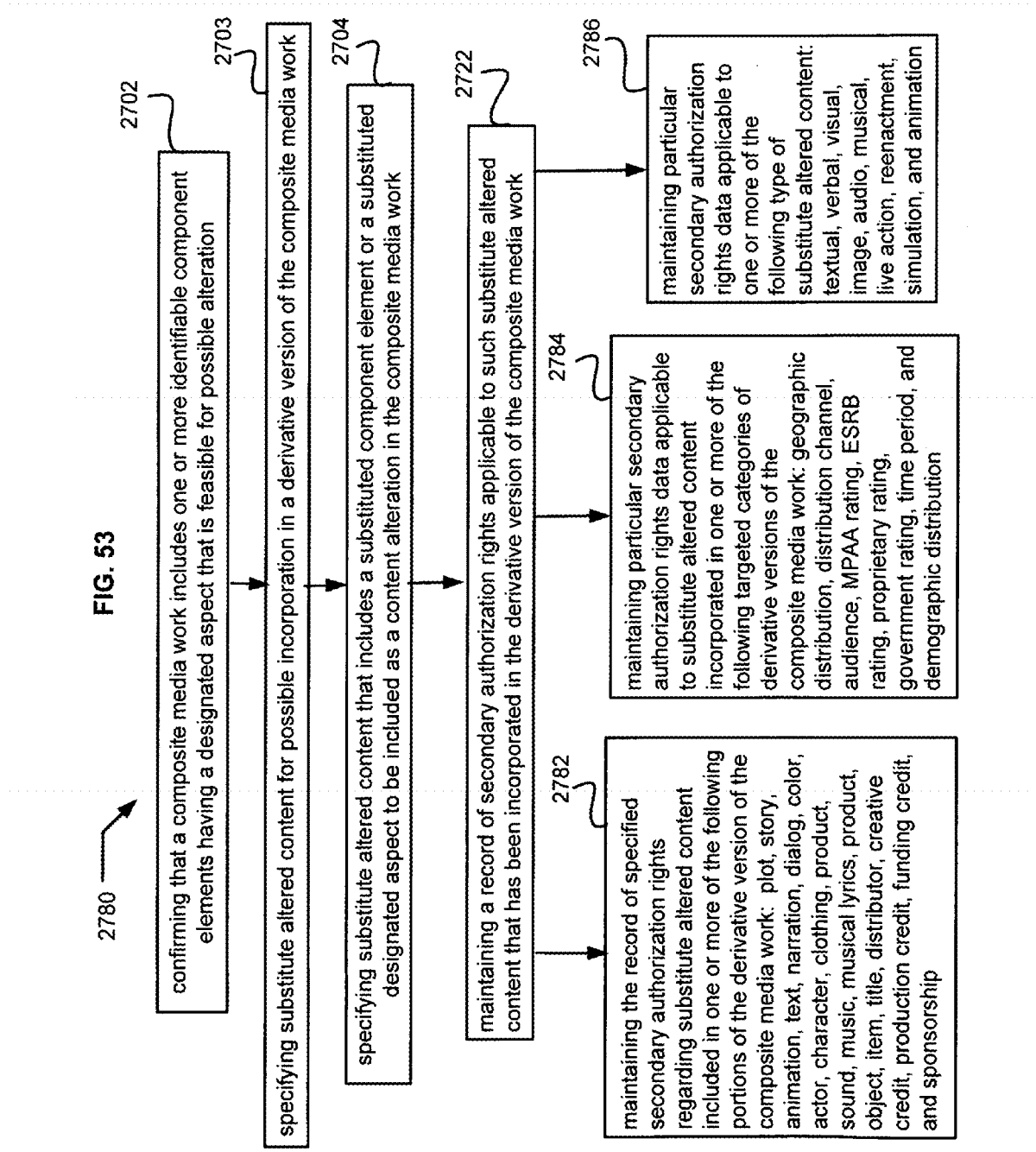

The detailed exemplary features 2780 illustrated in the flow chart of FIG. 53 include previously described features 2702, 2703, 2704, 2722 in combination with maintaining the record of specified secondary authorization rights regarding substitute altered content included in one or more of the following portions of the derivative version of the composite media work: plot, story, animation, text, narration, dialog, color, actor, character, clothing, product, sound, music, musical lyrics, product, object, item, title, distributor, creative credit, production credit, funding credit, and sponsorship (block 2782).

Other possible implementation enhancements may include maintaining particular secondary authorization rights data applicable to substitute altered content incorporated in one or more of the following targeted categories of derivative versions of the composite media work: geographic distribution, distribution channel, audience, MPAA rating, ESRB rating, proprietary rating, government rating, time period, and demographic distribution (block 2784). In some instances an exemplary embodiment may further include maintaining particular secondary authorization rights data applicable to one or more of the following type of substitute altered content: textual, verbal, visual, image, audio, musical, live action, reenactment, simulation, and animation (block 2786).

Figure 54:
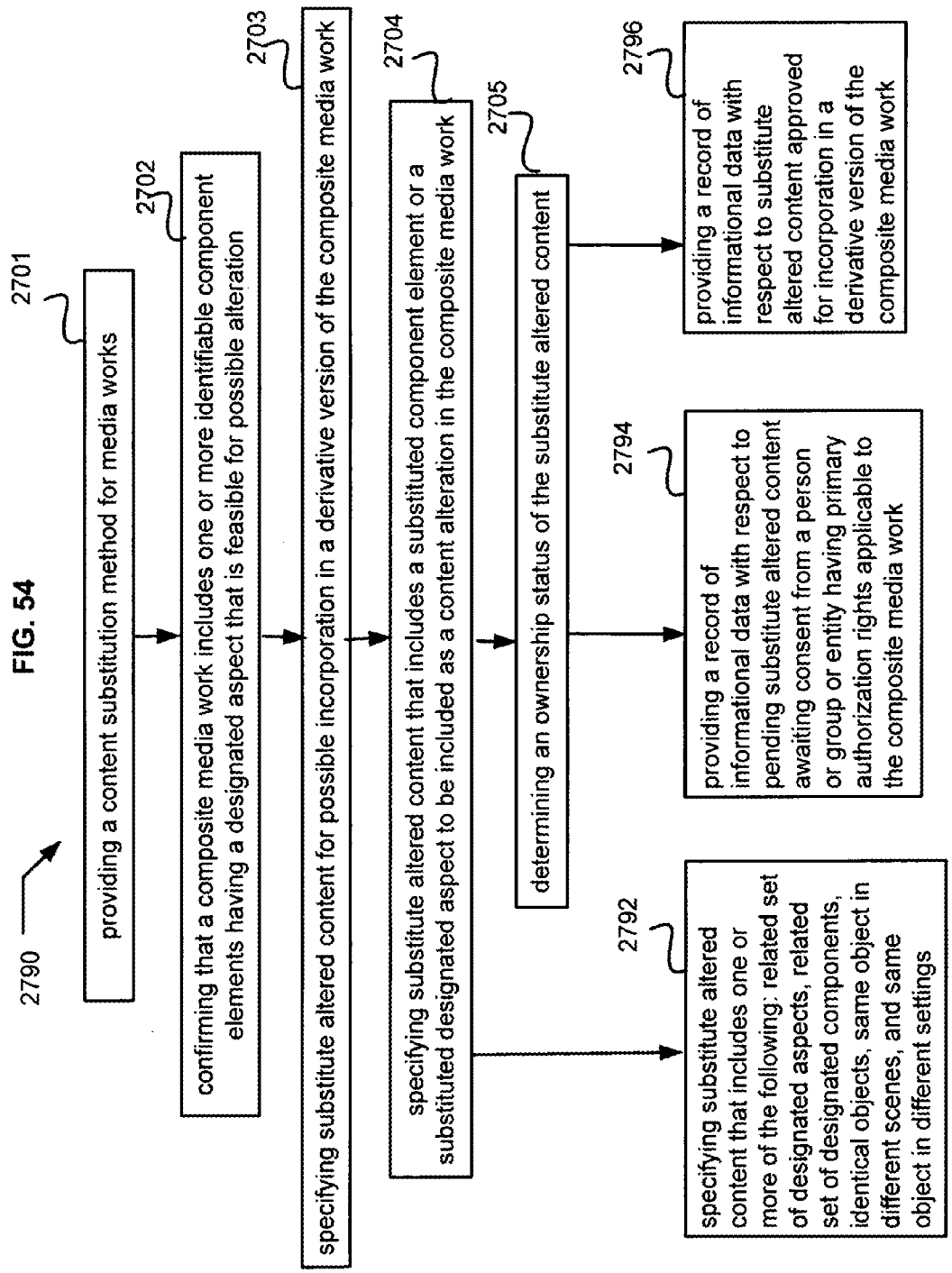

As shown in the illustrated embodiments 2790 of FIG. 54, exemplary possible features may include those previously described 2701, 2702, 2703, 2704, 2705 as well as specifying substitute altered content that includes one or more of the following: related set of designated aspects, related set of designated components, identical objects, same object in different scenes, and same object in different settings (block 2792).

In some instances various enhancements relating to records may be provided, including providing a record of informational data with respect to pending substitute altered content awaiting consent from a person or group or entity having primary authorization rights applicable to the composite media work (block 2794), and providing a record of informational data with respect to substitute altered content approved for incorporation in a derivative version of the composite media work (block 2796).

Figure 55:
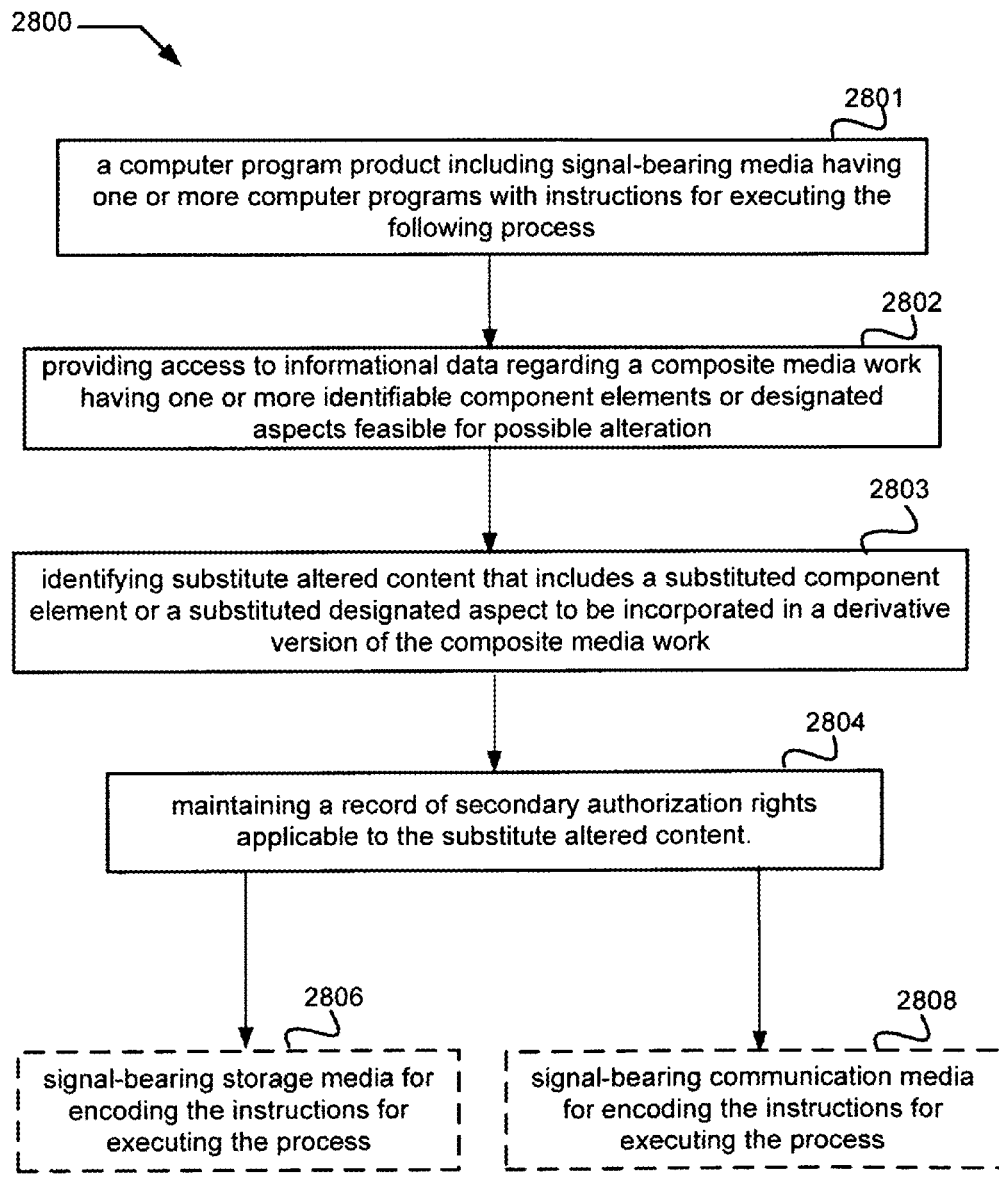
FIG. 55 is a diagrammatic flow chart for another exemplary computer program product embodiment.

The flow chart diagram of FIG. 55 illustrates an exemplary embodiment 2800 for a computer program product, including signal-bearing media having one or more computer programs with instructions for executing a process (block 2801). Such a process may include providing access to informational data regarding a composite media work having one or more identifiable component elements or designated aspects feasible for possible alteration (block 2802), identifying substitute altered content that includes a substituted component element or a substituted designated aspect to be incorporated in a derivative version of the composite media work (block 2803), and maintaining a record of secondary authorization rights applicable to the substitute altered content (block 2804).

Additional possible features may include signal-bearing storage media for encoding the instructions for executing the process (block 2806), and in some instances may include signal-bearing communication media for encoding the instructions for executing the process (block 2808).

Some computer program product implementations regarding substitute altered content may include various combinations of process features in order to achieve the desired benefits. For example, a program process may include maintaining a record of secondary authorization rights applicable to substitute altered content that includes one or more of the following types of content alteration: addition, deletion, modification, and replacement.

Further program product embodiments may identify substitute altered content associated with a real-world entity, and may further maintain specified secondary authorization data applicable to one or more of the following type of substitute altered content associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

Other program product embodiments may maintain specified secondary authorization data applicable to one or more of the following portions of substitute altered content associated with the real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar. Additional possible program product features may include implementing content alteration of one or more identifiable component elements or designated aspects that were associated with a known real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization.

In some instances, a program product feature may maintain specified secondary authorization data applicable to one or more of the following portions of substitute altered content associated with the real-world entity: product, service, invention, accessory, vehicle, place, address, location, store, building, school, university, hospital, church, club, group, organization, and business.

Further program product possibilities may include identifying substitute altered content associated with a real-world person. For example, a program product embodiment may in some instances maintain particular authorization data applicable to one or more of the following type of substitute altered content associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Other possible program product features regarding substitute altered content may include implementing content alteration of one or more identifiable component elements or designated aspects that were associated with a known real-world person having one or more of the following characteristics: deceased, retired, disappeared, not locatable, and status changed. Another program product embodiment feature may maintain a record of secondary authorization rights applicable to substitute altered content incorporated in one or more of the following portions of a derivative version of the composite media work: textual, verbal, visual, image, audio, musical, live action, reenactment, simulation, and animation.

Some program product embodiments may maintain a record of secondary authorization rights applicable to substitute altered content incorporated in one or more of the following portions of a derivative version of the composite media work: music, setting, hero, heroine, villain, clothing, vehicle, company, animals, food, product, brand, and dialogue. In some instances a further program product feature may include maintaining a record of secondary authorization rights applicable to one or more of the following type of substitute altered content: related set of designated aspects, related set of component elements, identical objects, same object in different scenes, and same object in different settings.

A further possible program product enhancement may include maintaining a record of secondary authorization rights applicable to substitute altered content incorporated in one or more of the following targeted categories of derivative versions of the composite media work: geographic distribution, distribution channel, audience, recipient group, targeted device, time period, and demographic distribution. Other program product possibilities may include maintaining informational data regarding secondary authorization rights applicable to substitute altered content incorporated in one or more of the following type of derivative versions of the composite media work: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose.

Additional exemplary program product embodiments may maintain informational data regarding the secondary authorization rights applicable to substitute altered content incorporated in one or more of the following type of media content formats of the composite media work: analog, digital, VHS, CD, VCD, SVCD, DVD, HD, HD DVD, Blu-ray, MPEG, MP3, reformatted, upgraded, downgraded, future format standard, video snippet, digitized vignette, data compression, and data decompression.

Some program product implementations may maintain informational data regarding secondary authorization rights applicable to substitute altered content incorporated in a derivative version for one or more of the following type of distribution arrangements: fund-raising, non-profit, theater, airplane viewing, commercial television, public television, rental, lease, sale, domestic distribution, foreign distribution, exclusive distribution, non-exclusive distribution, foreign language, infomercial, live, real-time, delayed, and on-demand.

Further possibilities for program product features may include maintaining informational data regarding secondary authorization rights applicable to substitute altered content incorporated in a derivative version for one or more of the following type of distribution channels: Internet, network, cable, satellite, wireless, broadcast, narrowcast, download, upload, shared, concurrent, streaming audio, streaming video, packet switching, and storage media delivery. Other possible program product embodiments may maintain informational data regarding one or more of the following type of secondary authorization rights: contractual, proprietary, copyright, patent, trademark, exclusive, non-exclusive, license, consent, governmental, judicial, third party restriction, transfer, exchange, conditional, public domain, and jurisdictional.

Some implementations for program product embodiments may include maintaining informational data regarding one or more of the following type of person or entity having secondary authorization rights: creator, writer, editor, animator, producer, composer, arranger, performer, actor, distributor, agent, investor, sponsor, inventor, animator, depicted person, depicted entity, programmer, copyright owner, subscriber, membership group, and individual group member.

A further example of program product features may include implementing one or more of the following type of approval techniques for obtaining consent from a person or group or entity having secondary authorization rights: programmed, pre-authorization, delegated agent, derivative version review, substitute content review, alteration review, summary characterization, substitute content rating, and aggregate content rating. Other examples of program product features may include maintaining a record of secondary authorization rights applicable to one or more of the following: particular person or character portrayed in the substitute altered content; particular actor of actress appearing in the substitute altered content; particular object or item depicted in the substitute altered content; and particular category of products depicted in the substitute altered content;

Additional exemplary embodiments of program products may maintain a record of specified secondary authorization rights regarding substitute altered content incorporated in one or more of the following portions of a derivative version of the composite media work: plot, story, animation, text, narration, dialog, color, actor, character, clothing, product, sound, music, musical lyrics, product, object, item, title, and credits. Further program product possibilities may include maintaining particular secondary authorization data applicable to substitute altered content incorporated in one or more of the following targeted categories of derivative versions of the composite media work: geographic distribution, distribution channel, audience, MPAA rating, ESRB rating, proprietary rating, government rating, time period, and demographic distribution.

Figure 56:
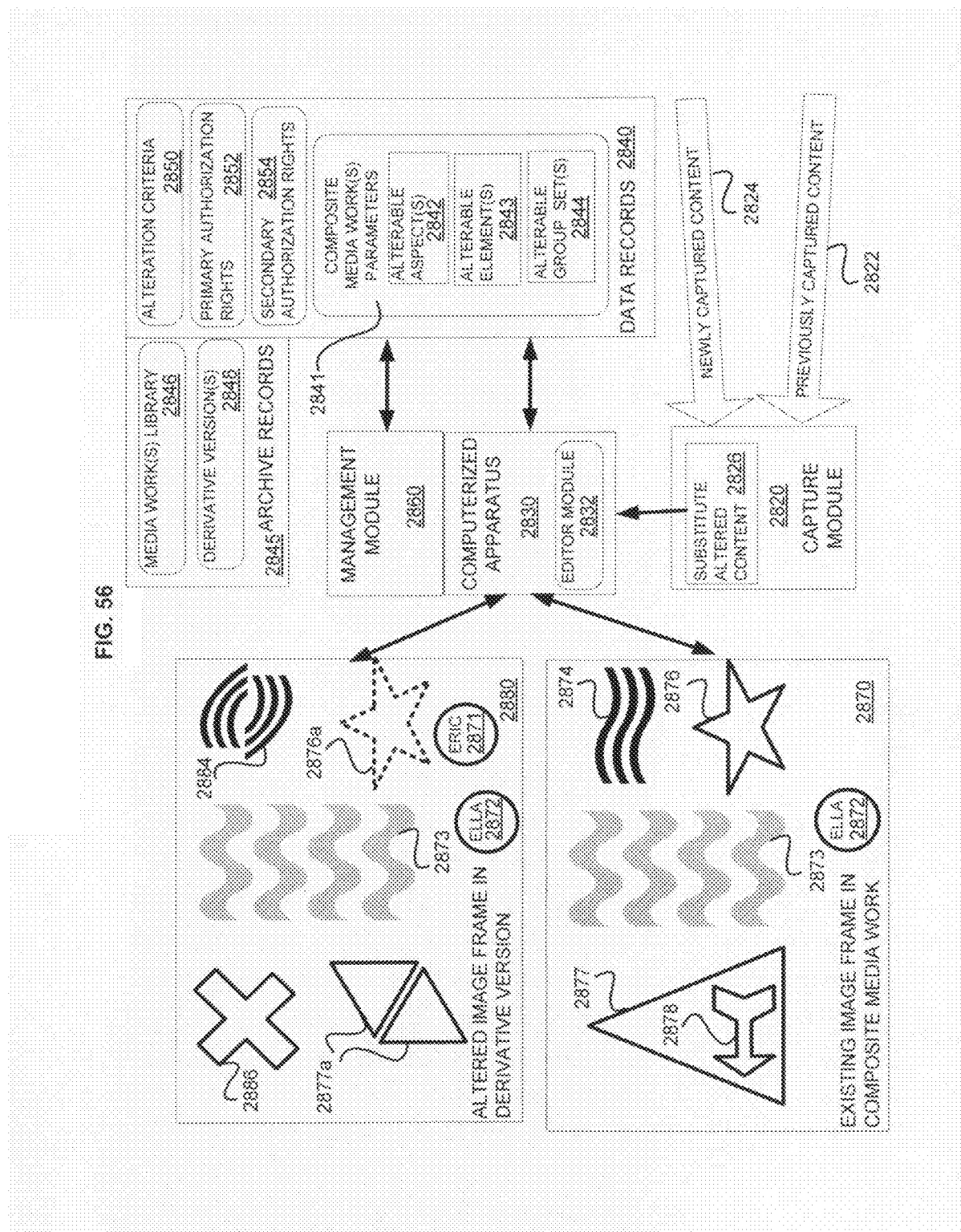
FIG. 56 is a schematic block diagram illustrating further exemplary techniques for incorporation of substitute altered content in a derivative version of a media work.

Referring to the schematic block diagram of FIG. 56, an exemplary system embodiment includes capture module 2820 capable of obtaining previously captured content 2822 or newly captured content 2824 or in some instances combinations thereof in order to create appropriate substitute altered content 2826 for possible incorporation in a derivative version of a composite media work. The capture module may be operably coupled to computerized apparatus 2830 for further processing of the substitute altered content 2826.

As shown in the exemplary embodiment features of FIG. 56, the computerized apparatus 2840 is operably coupled to exemplary data records 2840 that include various informational data that may be helpful in connection with implementing an addition or deletion or modification or replacement of existing content in the composite media work. For example, informational data regarding composite media work parameters 2841 may identify content portions of the composite media work that are feasible for alteration including one or more alterable aspects 2842, one or more alterable elements 2843, as well as one or more alterable group sets 2844.

Additional archive records 2845 may include a media works library 2846 for various original media works as well as a collection of one or more derivative versions 2848. Related data records may include alteration criteria 2850, primary authorization rights 2852, and secondary authorization rights 2854, all of which individually and collectively provide modification guidelines for the media works library 2846 and for derivative versions 2848.

As further shown in FIG. 56, an exemplary management module 2860 is operably coupled to the computer apparatus 2830 and is configured for access to the data records 2840 and to coordinate compliance with the alteration criteria 2850 and with applicable primary authorization rights 2852 and secondary authorization rights 2854.

The exemplary computer apparatus 2830 includes an editor module 2832 to incorporate the substitute altered content 2826 in a derivative version of the composite media work. A schematic diagram portion of FIG. 56 depicts a possible function of the editor module 2832 wherein an existing image frame 2870 in a composite media work has been transformed to a corresponding altered image frame 2880 in a derivative version. Of course various different types of content substitution that may be accomplished in accordance with the alteration techniques disclosed herein, and the examples depicted in FIG. 56 are for illustration only and are not intended to be limiting.

The symbolic representations in existing image frame 2870 include a character component Ella 2872, background elements 2873, foreground elements 2874, a product 2876, and a close-up view of a vehicle 2877 with a logo aspect 2878. In accordance with applicable modification guidelines (e.g., alteration criteria 2850, primary authorization rights 2852, secondary authorization rights 2854, etc.), the background elements 2873 and the character component Ella 2872 are not feasible for alteration, and therefore are shown to be unchanged in the altered image frame 2880.

However various system components including computerized apparatus 2830 with editor module 2832 have implemented alteration of other elements and aspects in the altered image frame 2880 of the derivative version. For example, logo aspect 2878 has been deleted, and the close-up view of vehicle 2877 has been replaced with a medium-distance view of two such vehicles 2877*a*. A new character component Eric 2871 has been added, and a new product 2886 has also been added.

Other alterations shown include a modified product 2876*a* having a different position or appearance (e.g., portions obscured, textual aspect changed, etc.) in altered image frame 2880. Another alteration shown includes a depiction of modified foreground elements 2884 with a somewhat different appearance as compared to the original foreground elements 2874.

Some system data record embodiment features may include different types of informational data, depending on the circumstances. For example, some implementations may provide a listing of at least one designated aspect of the one or more component elements of a composite media work, which aspect is feasible for alteration. Other implementations may include informational data regarding applicable alteration criteria that identifies one or more alteration limitations applicable to the substitute altered content incorporated in a derivative version of the composite media work.

Additional possible system data records for content alteration may include applicable alteration criteria regarding a media format limitation for the derivative version that incorporates the substitute altered content. Related date records may include applicable alteration criteria regarding a limitation allowing or precluding one or more of the following media formats: analog, digital, VHS, CD, VCD, SVCD, DVD, HD, HD DVD, Blu-ray, MPEG, MP3, reformatted, upgraded, downgraded, future format standard, video snippet, digitized vignette, data compression, and data decompression.

Further data record feature enhancements for content alteration may provide informational data regarding applicable alteration criteria that includes one or more distribution channel limitations for the derivative version that incorporates the substitute altered content. Related data record features may include applicable alteration criteria regarding a limitation allowing or precluding one or more of the following distribution channels: Internet, network, cable, satellite, wireless, broadcast, narrowcast, download, upload, shared, concurrent, streaming audio, streaming video, packet switching, and storage media delivery.

Additional exemplary system data records may include informational data that identifies an entity and/or a person associated with substituted content incorporated in the derivative version of the composite media work.

It will be understood that various other system embodiments may be implemented in accordance with the content substitution techniques disclosed herein. For example, an editor module may configured to incorporate in a derivative version one or more of the following categories of substitute altered content: related set of designated aspects, related set of alterable components, identical objects, same object in different scenes, and same object in different settings. As a further example, an editor module may be configured to incorporated substitute altered content in a derivative version targeted for one or more of the following: geographic area, demographic category, ethnic group, restricted audience, specified devices, group membership, subscriber, distribution channel, distribution time period, and media provider.

Additional possible system embodiments may include an editor module configured to incorporated substitute altered content in the derivative version targeted for one or more of the following distribution channels: Internet, network, cable, satellite, wireless, broadcast, narrowcast, download, upload, shared, concurrent, streaming audio, streaming video, packet switching, and storage media delivery.

Some system embodiments may include a capture module capable of obtaining one or more of the following type of substitute altered content: textual, verbal, visual, image, audio, musical, live action, reenactment, simulation, and animation. Other exemplary capture modules may have capability to obtain substitute altered content having one or more of the following type of designated aspects associated with a real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

Additional exemplary system embodiments may provide a capture module capable of obtaining substitute altered content having one or more of the following type of designated aspects associated with a real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar. Further exemplary capture module capabilities may include obtaining substitute altered content having one or more of the following type of designated aspects associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Further possible system embodiment features may include a management module operably coupled to computer apparatus and configured to coordinate compliance with applicable alteration criteria as well as compliance with certain primary authorization rights regarding the composite media work.

Figure 57:
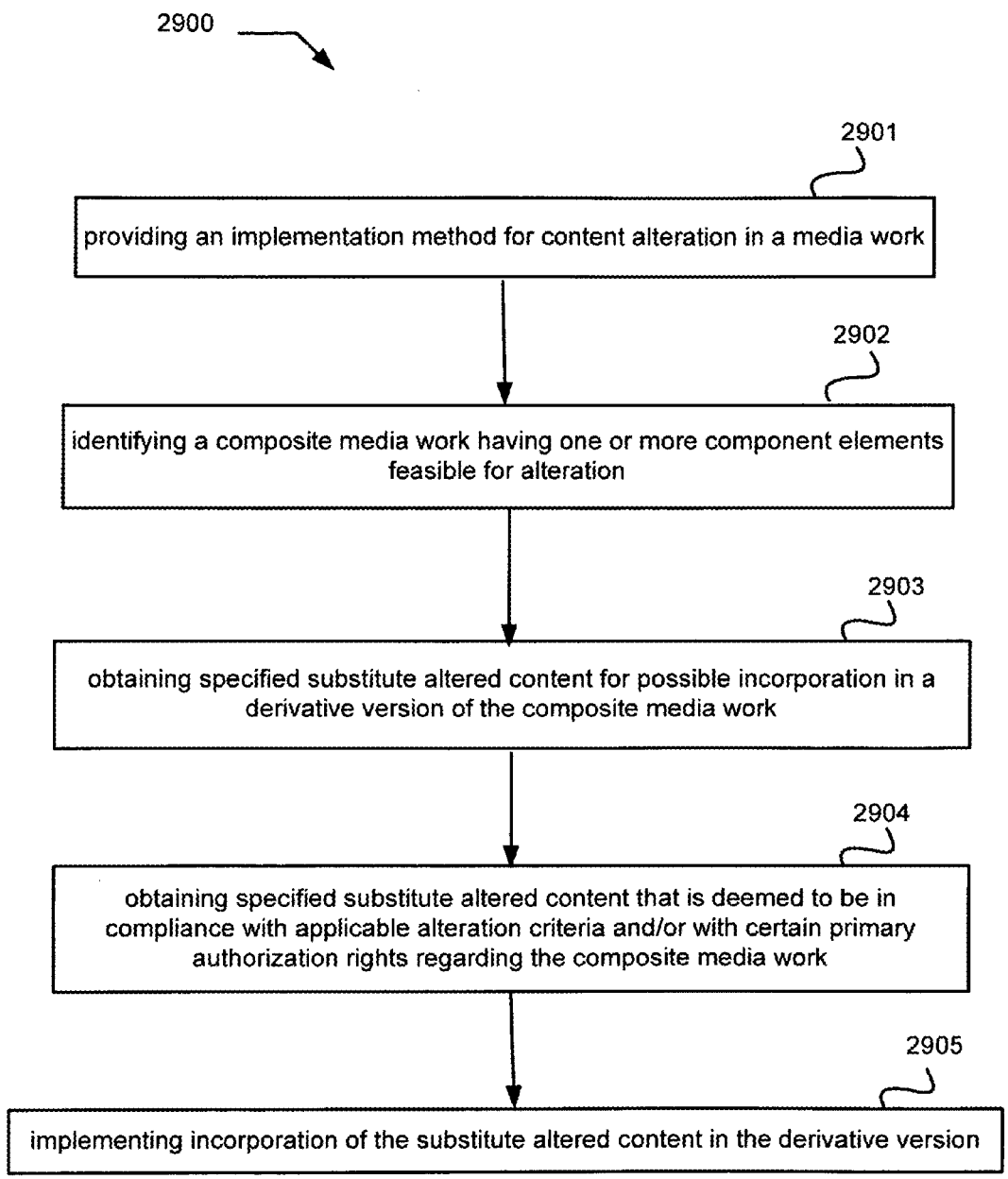
FIG. 57 is a high level flow chart illustrating an additional exemplary process embodiment for content alteration of a media work.

The high level flow chart of FIG. 57 illustrates an exemplary process embodiment 2900 that provides an implementation method for content alteration in a media work (block 2901), including identifying a composite media work having one or more component elements feasible for alteration (block 2902), and obtaining specified substitute altered content for possible incorporation in a derivative version of the composite media work (block 2903). Additional possible features may include obtaining specified substitute altered content that is deemed to be in compliance with applicable alteration criteria and/or with certain primary authorization rights regarding the composite media work (block 2904), and implementing incorporation of the substitute altered content in the derivative version (block 2905).

Figure 58:
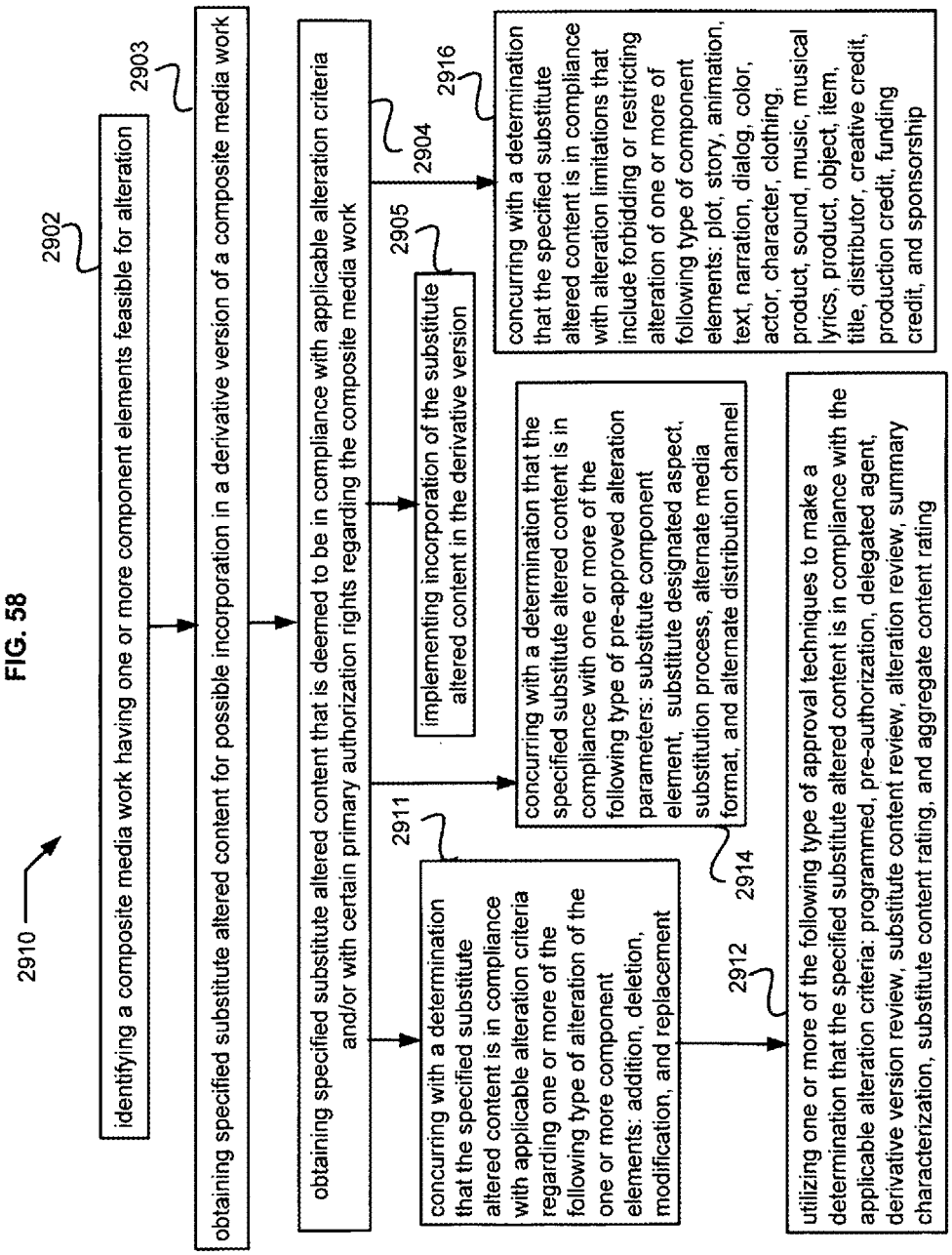
FIGS. 58-64 are more detailed flow charts illustrating further exemplary process features that may be incorporated in media content alteration embodiments.

Referring to detailed exemplary embodiment features 2910 shown in FIG. 58, a possible implementation may include previously described process features 2902, 2903, 2904, 2905, and may further include concurring with a determination that the specified substitute altered content is in compliance with applicable alteration criteria regarding one or more of the following type of alteration of the one or more component elements: addition, deletion, modification, and replacement (block 2911). A possible related feature may include utilizing one or more of the following type of approval techniques to make a determination that the specified substitute altered content is in compliance with the applicable alteration criteria: programmed, pre-authorization, delegated agent, derivative version review, substitute content review, alteration review, summary characterization, substitute content rating, and aggregate content rating (block 2912).

Additional disclosed possibilities may include concurring with a determination that the specified substitute altered content is in compliance with one or more of the following type of pre-approved alteration parameters: substitute component element, substitute designated aspect, substitution process, alternate media format, and alternate distribution channel (block 2914). In some instances a further possible enhancement may include concurring with a determination that the specified substitute altered content is in compliance with alteration limitations that include forbidding or restricting alteration of one or more of following type of component elements: plot, story, animation, text, narration, dialog, color, actor, character, clothing, product, sound, music, musical lyrics, product, object, item, title, distributor, creative credit, production credit, funding credit, and sponsorship (block 2916).

Figure 59:
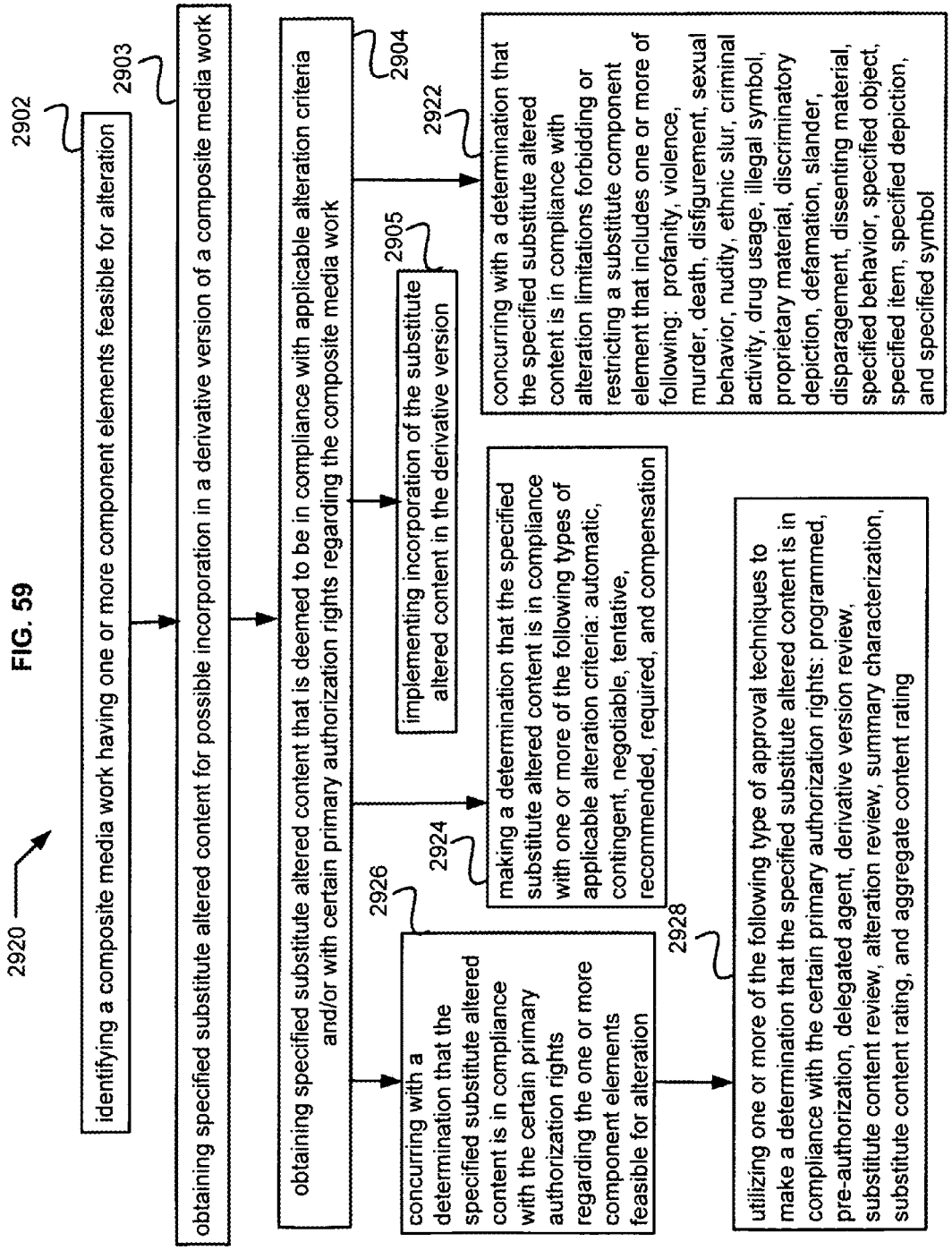

Additional possible embodiments 2920 are depicted in FIG. 59, including previously described process features 2902, 2903, 2904, 2905 as well as further enhancements that may include concurring with a determination that the specified substitute altered content is in compliance with alteration limitations forbidding or restricting a substitute component element that includes one or more of following: profanity, violence, murder, death, disfigurement, sexual behavior, nudity, ethnic slur, criminal activity, drug usage, illegal symbol, proprietary material, discriminatory depiction, defamation, slander, disparagement, dissenting material, specified behavior, specified object, specified item, specified depiction, and specified symbol (block 2922).

Other possibilities may include making a determination that specified substitute altered content is in compliance with one or more of the following types of applicable alteration criteria: automatic, contingent, negotiable, tentative, recommended, required, and compensation (block 2924). Further exemplary features may include concurring with a determination that the specified substitute altered content is in compliance with the certain primary authorization rights regarding the one or more component elements feasible for alteration (block 2926).

The flow chart of FIG. 59 also illustrates a further possible enhancement including utilizing one or more of the following type of approval techniques to make a determination that the specified substitute altered content is in compliance with certain primary authorization rights: programmed, pre-authorization, delegated agent, derivative version review, substitute content review, alteration review, summary characterization, substitute content rating, and aggregate content rating (block 2928).

Figure 60:
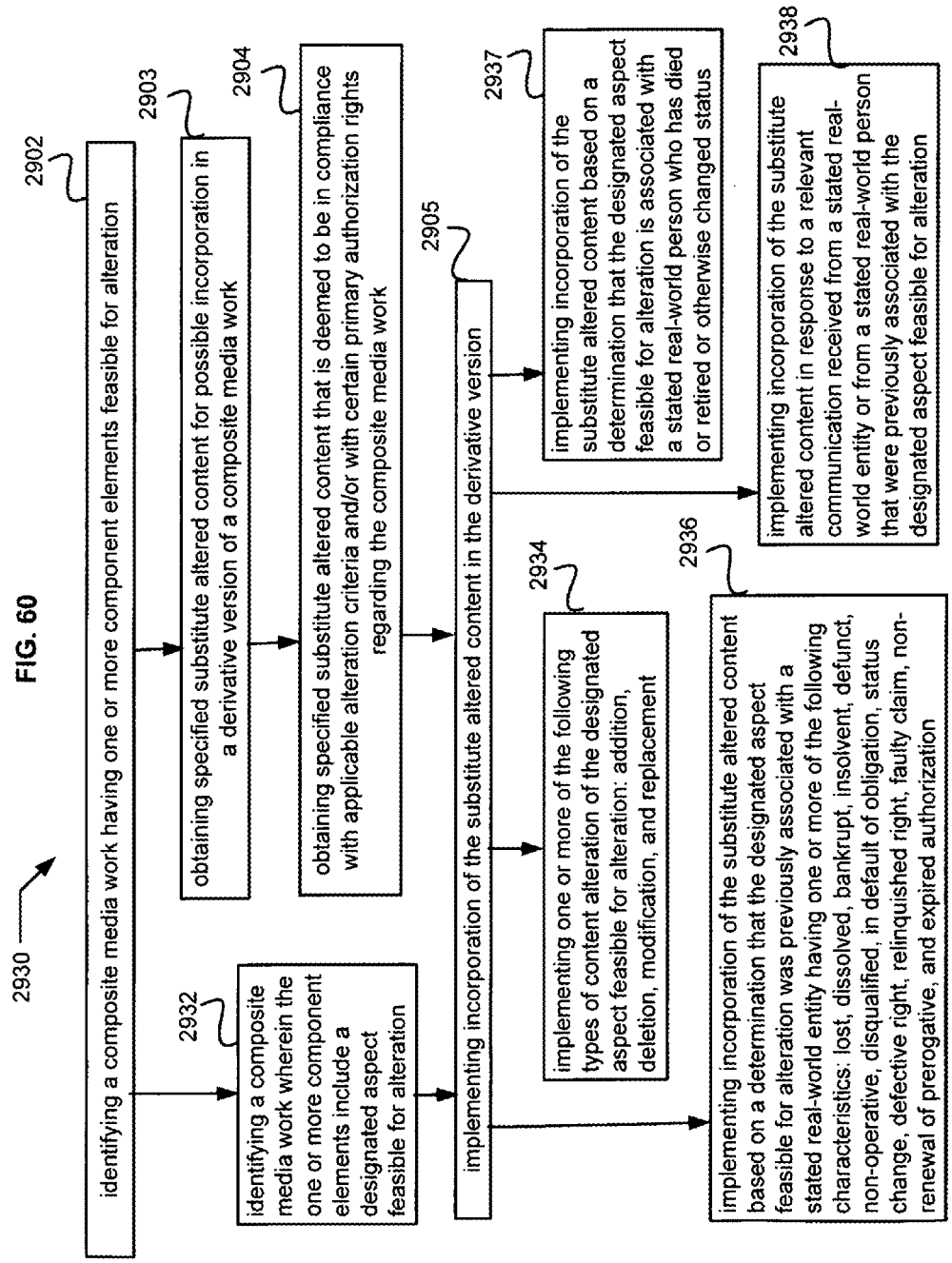

The various exemplary embodiment features 2930 shown in FIG. 60 include previously described features 2902, 2903, 2904, 2905 in combination with identifying a composite media work wherein the one or more component elements include a designated aspect feasible for alteration (block 2932). Further possibilities may include implementing one or more of the following types of content alteration of the designated aspect feasible for alteration: addition, deletion, modification, and replacement (block 2934).

Additional enhancements may include implementing incorporation of the substitute altered content based on a determination that the designated aspect feasible for alteration was previously associated with a stated real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization (block 2936).

As further shown in FIG. 60, in some instances a process embodiment may include implementing incorporation of the substitute altered content based on a determination that the designated aspect feasible for alteration is associated with a stated real-world person who has died or retired or otherwise changed status (block 2937). Other related possible features may include implementing incorporation of the substitute altered content in response to a relevant communication received from a stated real-world entity or from a stated real-world person that were previously associated with the designated aspect feasible for alteration (block 2938).

Figure 61:
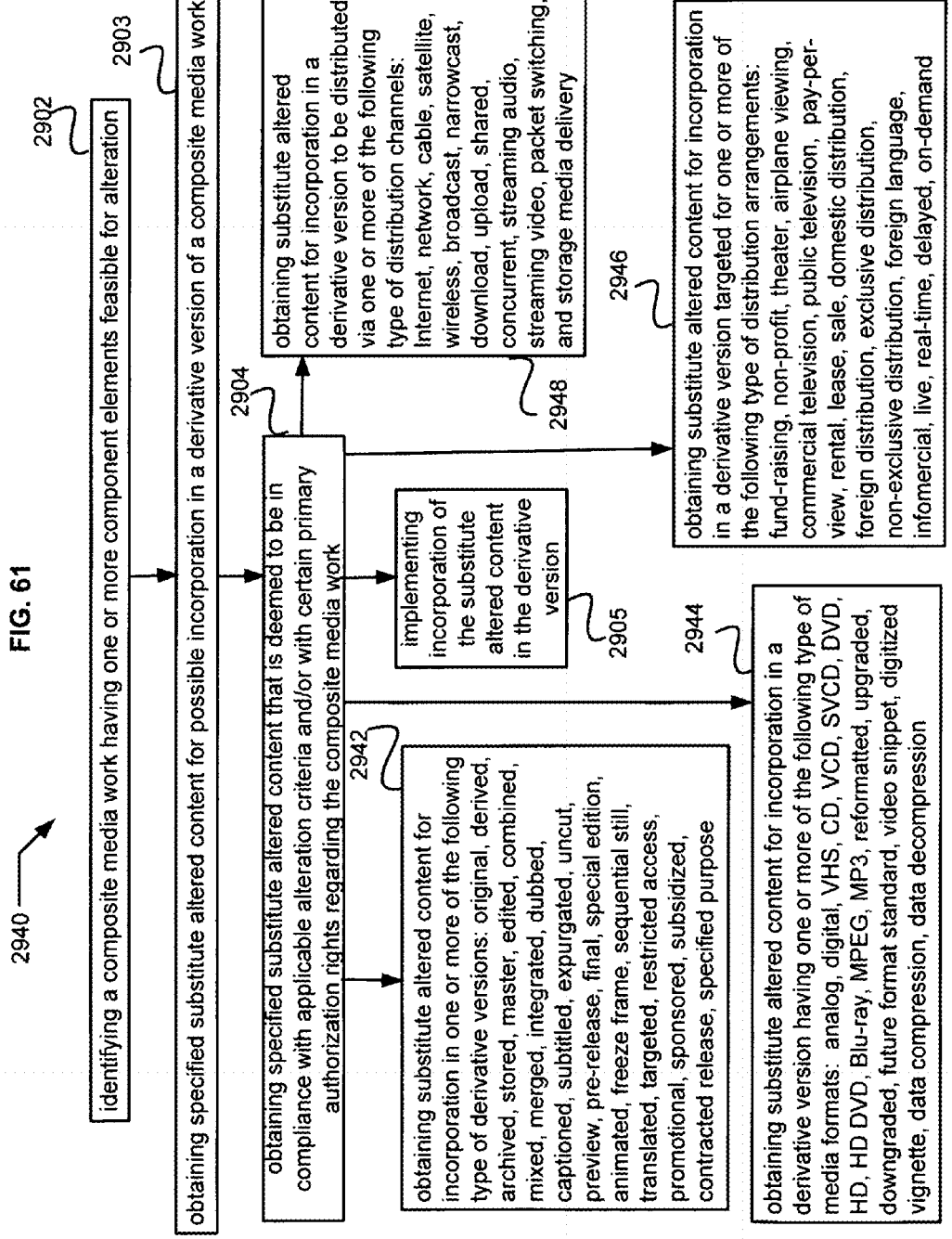

Referring to the detailed flow chart of FIG. 61, additional embodiment features 2940 depicted include previously described process possibilities 2902, 2903, 2904, 2905 in combination with obtaining substitute altered content for incorporation in one or more of the following type of derivative versions: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose (block 2942).

Additional possible process implementation features may include obtaining substitute altered content for incorporation in a derivative version having one or more of the following type of media formats: analog, digital, VHS, CD, VCD, SVCD, DVD, HD, HD DVD, Blu-ray, MPEG, MP3, reformatted, upgraded, downgraded, future format standard, video snippet, digitized vignette, data compression, and data decompression (block 2944). Other exemplary possibilities may include obtaining substitute altered content for incorporation in a derivative version targeted for one or more of the following type of distribution arrangements: fund-raising, non-profit, theater, airplane viewing, commercial television, public television, pay-per-view, rental, lease, sale, domestic distribution, foreign distribution, exclusive distribution, non-exclusive distribution, foreign language, infomercial, live, real-time, delayed, and on-demand (block 2946).

Further process enhancements may include obtaining substitute altered content for incorporation in a derivative version to be distributed via one or more of the following type of distribution channels: Internet, network, cable, satellite, wireless, broadcast, narrowcast, download, upload, shared, concurrent, streaming audio, streaming video, packet switching, and storage media delivery (block 2948).

Figure 62:
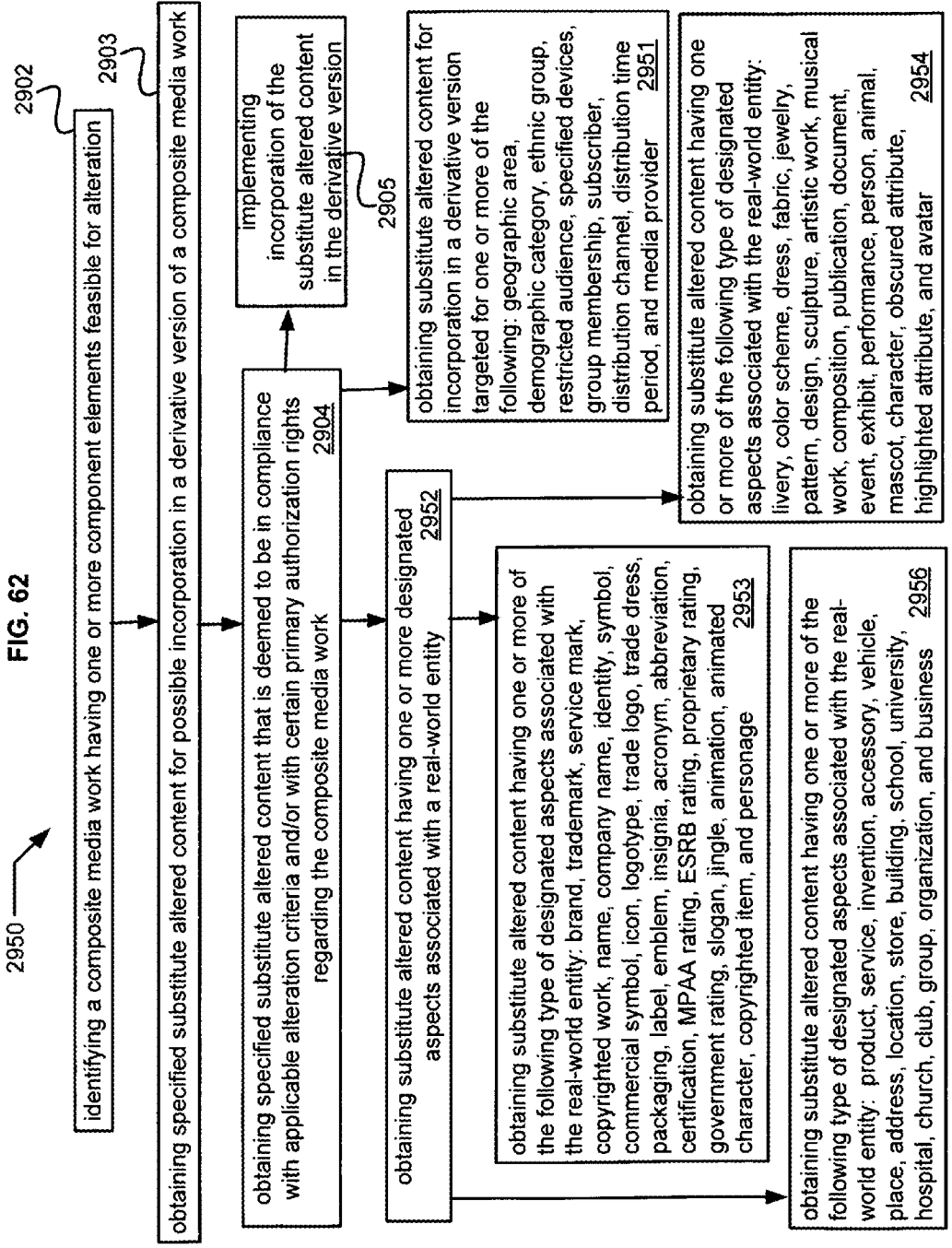

The detailed flow chart of FIG. 62 shows additional exemplary features 2950 that may be included in a process embodiment, including previously described operations 2902, 2903, 2904, 2905 along with obtaining substitute altered content for incorporation in a derivative version targeted for one or more of the following: geographic area, demographic category, ethnic group, restricted audience, specified devices, group membership, subscriber, distribution channel, distribution time period, and media provider (block 2951).

Additional process enhancements may include obtaining substitute altered content having one or more designated aspects associated with a real-world entity (block 2952). A related enhancement may further include obtaining substitute altered content having one or more of the following type of designated aspects associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage (block 2953).

Other process possibilities may include obtaining substitute altered content having one or more of the following type of designated aspects associated with the real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar (block 2954). Additional possible process features may include obtaining substitute altered content having one or more of the following type of designated aspects associated with the real-world entity: product, service, invention, accessory, vehicle, place, address, location, store, building, school, university, hospital, church, club, group, organization, and business (block 2956).

Figure 63:
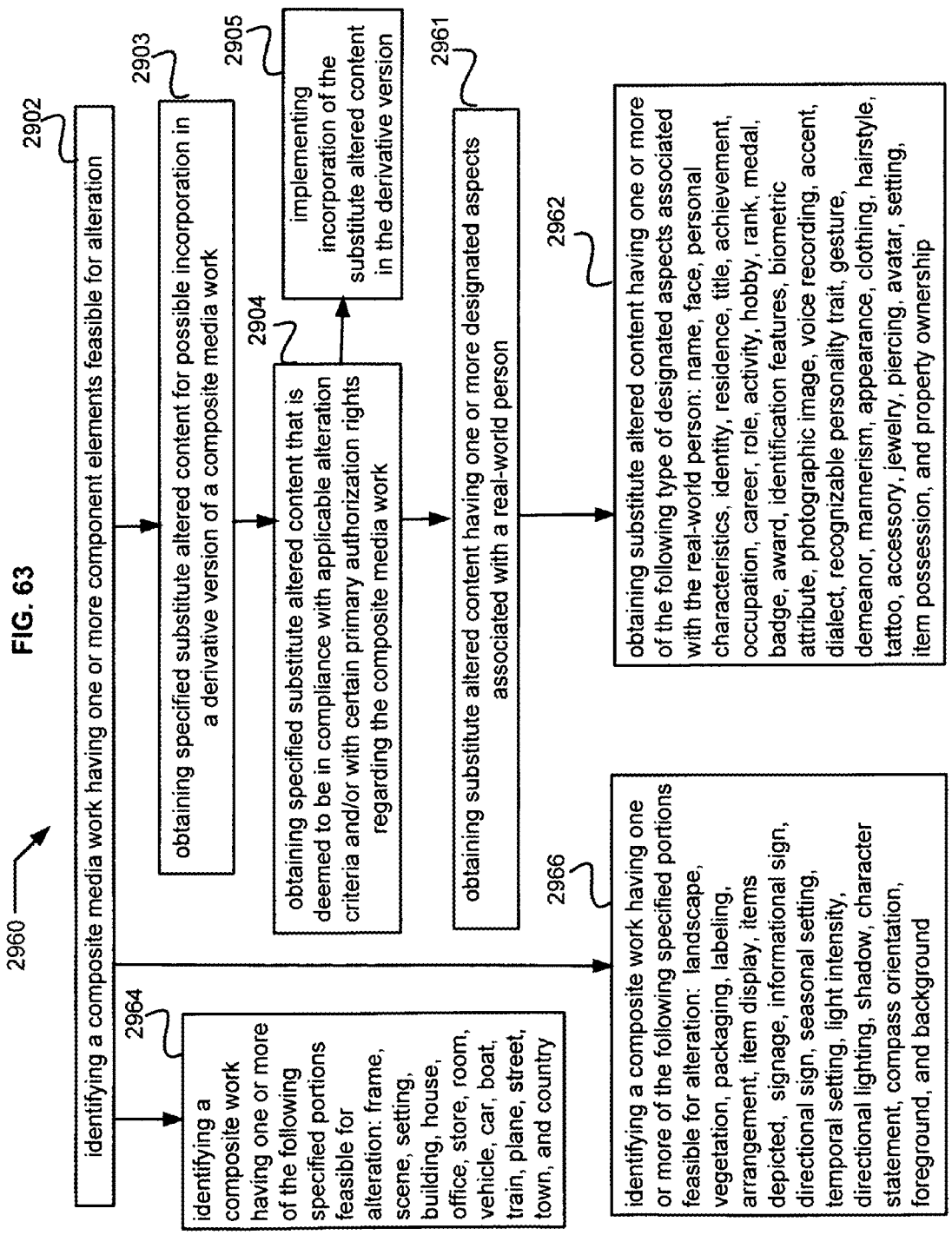

Referring to the exemplary embodiments 2960 depicted in FIG. 63, some process implementations may include previously described features 2902, 2903, 2904, 2905 in combination with obtaining substitute altered content having one or more designated aspects that are associated with a real-world person (block 2961). Further related enhancement possibilities may include obtaining substitute altered content having one or more of the following type of designated aspects associated with the real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 2962).

Other exemplary process features may include identifying a composite work having one or more of the following specified portions feasible for alteration: frame, scene, setting, building, house, office, store, room, vehicle, car, boat, train, plane, street, town, and country (block 2964), and identifying a composite work having one or more of the following specified portions feasible for alteration: landscape, vegetation, packaging, labeling, arrangement, item display, items depicted, signage, informational sign, directional sign, seasonal setting, temporal setting, light intensity, directional lighting, shadow, character statement, compass orientation, foreground, and background (block 2966).

Figure 64:
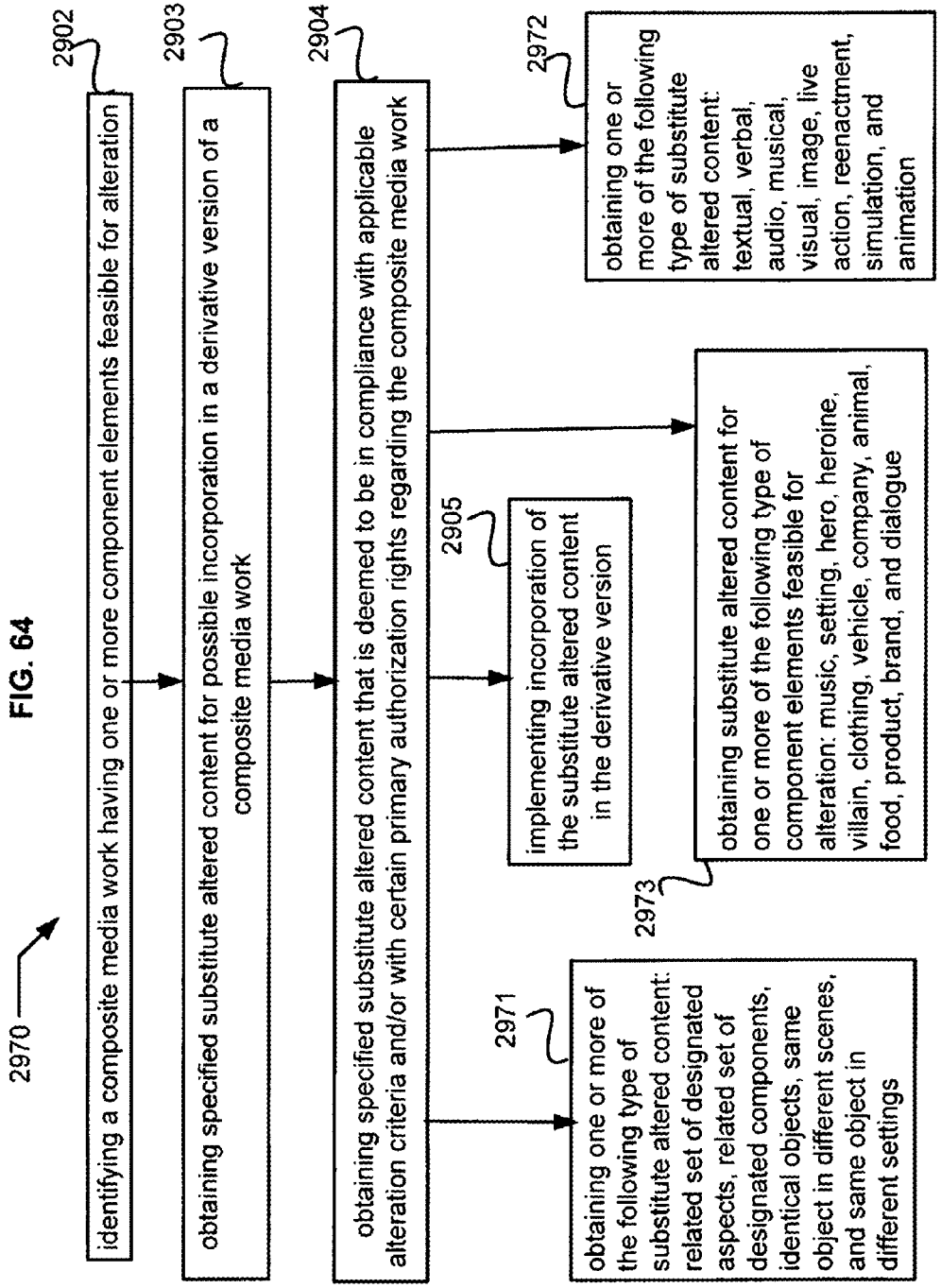

Referring to the flow chart of FIG. 64, additional exemplary embodiment features 2970 may include previously described process operations 2902, 2903, 2904, 2905 as well as other features relating to various types of substitute altered content. For example, some implementations may include obtaining one or more of the following type of substitute altered content: related set of designated aspects, related set of designated components, identical objects, same object in different scenes, and same object in different settings (block 2971). Other possible implementations may include obtaining one or more of the following type of substitute altered content: textual, verbal, audio, musical, visual, image, live action, reenactment, simulation, and animation (block 2972). Additional possible enhancements may include obtaining substitute altered content for one or more of the following type of component elements feasible for alteration: music, setting, hero, heroine, villain, clothing, vehicle, company, animal, food, product, brand, and dialogue (block 2973).

Figure 65:
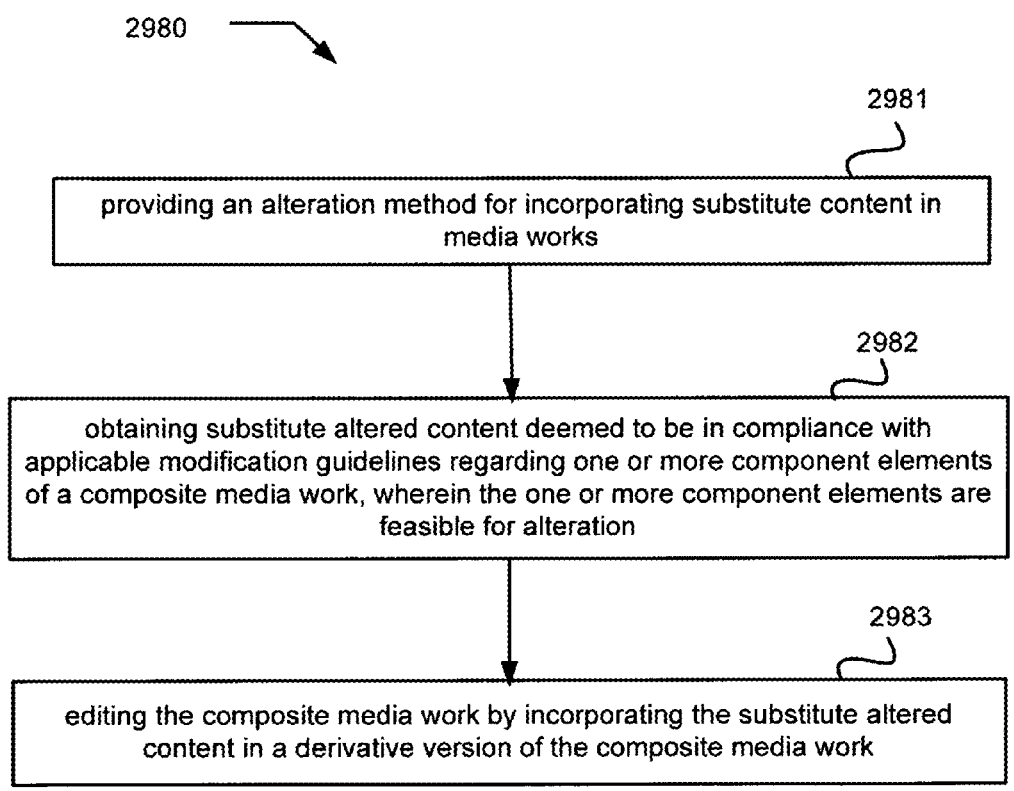
FIG. 65 is high level flow chart illustrating yet another exemplary process embodiment for content alteration of a media work.

The high level flow chart of FIG. 65 illustrates a further exemplary process 2980 providing an alteration method for incorporating substitute content in media works (block 2981). Other exemplary features may include obtaining substitute altered content deemed to be in compliance with applicable modification guidelines regarding one or more component elements of a composite media work, wherein the one or more component elements are feasible for alteration (block 2982). Further possibilities may include editing the composite media work by incorporating the substitute altered content in a derivative version of the composite media work (block 2983).

Additional possible process features 2985 shown in FIG. 66 may include previously described operations 2981, 2982, 2983 along with further enhancements related to applicable modification guidelines for a composite media work. For example, some embodiments may include obtaining previously captured substitute content that is deemed to be in compliance with the applicable modification guidelines (block 2986), and obtaining one or more of the following types of previously captured substitute content: textual, visual, image, audio, musical, live action, reenactment, simulation, and animation (block 2987).

Other possible embodiment features may include obtaining newly captured substitute content that is deemed to be in compliance with the applicable modification guidelines (block 2988), and obtaining one or more of the following types of newly captured substitute content: textual, visual, image, audio, musical, live action, reenactment, simulation, and animation (block 2989).

As further illustrated in FIG. 66, additional possible enhancements may include identifying an existing composite media work having the one or more component elements feasible for alteration (block 2974), creating a newly captured composite media work having the one or more component elements feasible for alteration (block 2976), and making a determination that the specified substitute altered content is in compliance with one or more of the following types of applicable modification guidelines: automatic, contingent, negotiable, tentative, recommended, required, and compensation (block 2978).

The embodiment 2990 illustrated in FIG. 67 provides a computer program product including one or more computer programs with instructions encoded on signal-bearing media to execute a process (block 2991). Such a process may include identifying a composite media work having one or more component elements feasible for alteration (block 2992), obtaining access to substitute altered content suitable for an addition or deletion or modification or replacement of existing content in a component element (block 2993), confirming that the substitute altered content is deemed to be in compliance with applicable alteration criteria and/or with certain primary authorization rights regarding the composite media work (block 2994), and implementing incorporation of the substitute altered content in a derivative version of the composite media work (block 2995).

Further possible features may include signal-bearing storage media for encoding the instructions to execute the process (block 2996), and signal-bearing communication media for encoding the instructions to execute the process (block 2998).

It will be understood that computer program product embodiments that implement content alteration have many operational possibilities. For example, some program embodiments may implement incorporation of the substitute altered content in a derivative version targeted for one or more of the following: geographic area, demographic category, ethnic group, restricted audience, specified devices, group membership, subscriber, distribution channel, distribution time period, and media provider.

Additional program product embodiments may confirm compliance regarding one or more of the following type of limitations for the derivative version incorporating the substitute altered content: distribution, media format, pre-approved alteration parameter, objectionable alteration, restricted alteration, and forbidden alteration. Further possible program product features may include implementing incorporation in a derivative version of one or more of the following type of substitute altered content: related set of designated aspects, related set of designated components, identical objects, same object in different scenes, and same object in different settings.

Other exemplary program product embodiments may implement in a derivative version the incorporation of one or more of the following type of substitute altered content: textual, verbal, visual, image, audio, musical, live action, reenactment, simulation, and animation. Other possible program product features may include implementing incorporation of one or more of the following type of substitute altered content: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

Further possibilities for program product features include implementing in a derivative version the incorporation of one or more of the following portion of substitute altered content associated with a real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar. Other program product embodiments may include implementing in a derivative version the incorporation of one or more of the following portion of substitute altered content associated with a real-world entity: product, service, invention, accessory, vehicle, place, address, location, store, building, school, university, hospital, church, club, group, organization, and business.

Additional content substitution possibilities for program product embodiments may include implementing in a derivative version the incorporation of one or more of the following type of substitute altered content associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

In some instances a computer program product embodiment may provide for maintenance of beneficial data records regarding implementation of media content substitution in a derivative version. Possible exemplary features may include maintaining a record of a real-world entity and/or a real-world person associated with substitute altered content that is incorporated in the derivative version of the composite media work. In other instances a program product embodiment may include maintenance of a record of criteria applicable to one or more of the following type of alterable component elements incorporated in a derivative version: music, setting, hero, heroine, villain, clothing, vehicle, company, animals, food, product, brand, and dialogue.

Other implementations of beneficial records regarding implementation of content substitution may include maintenance of a record of criteria that includes forbidding or restricting a substitute component element that includes one or more of following: profanity, violence, murder, death, disfigurement, sexual behavior, nudity, ethnic slur, criminal activity, drug usage, illegal symbol, proprietary material, discriminatory depiction, defamation, slander, disparagement, dissenting material, specified behavior, specified object, specified item, specified depiction, and specified symbol.

Figure 68:
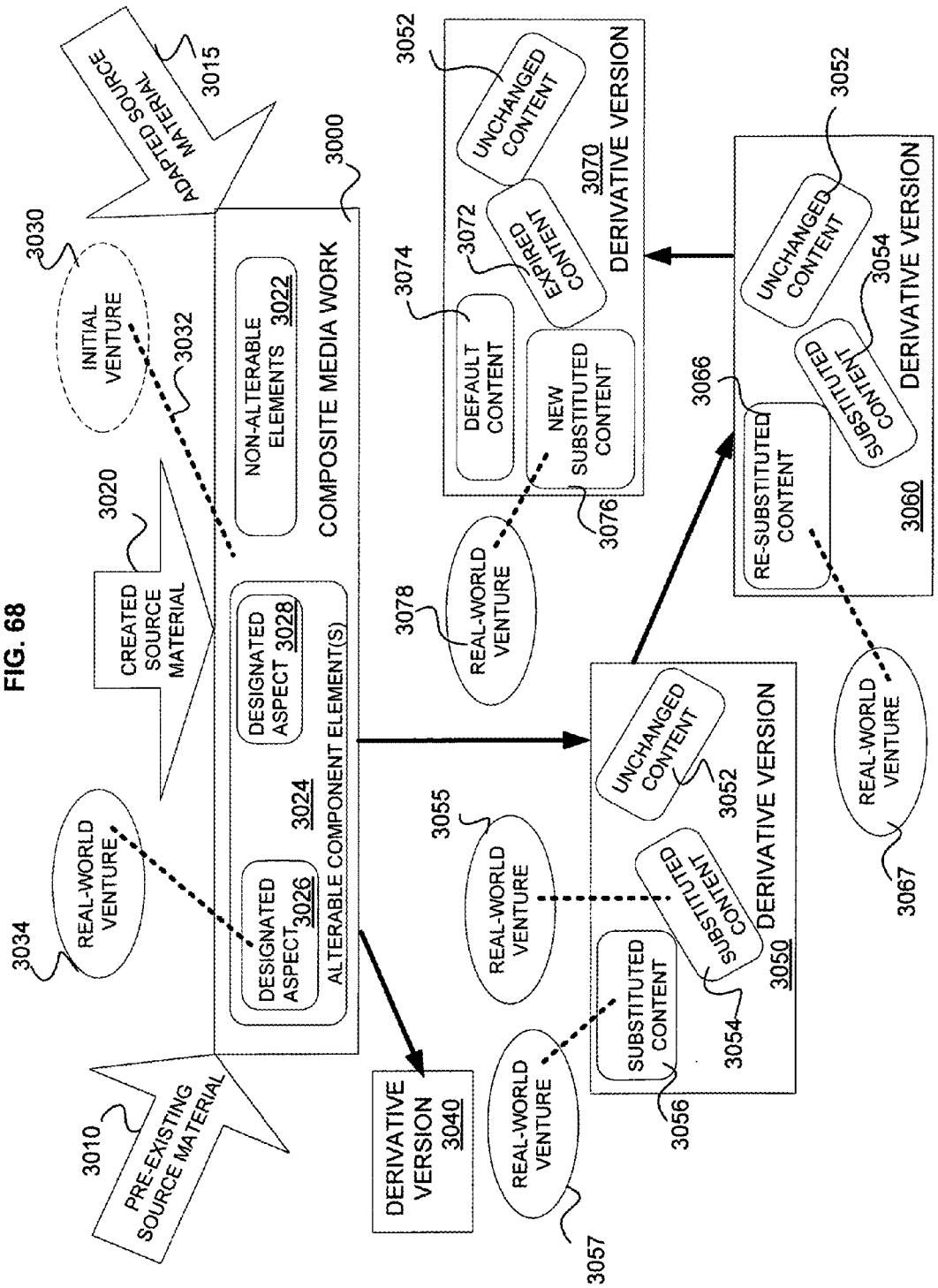
FIG. 68 is a schematic block diagram illustrating other exemplary embodiments that incorporate substitute content in different versions of a media work.

The schematic block diagram of FIG. 68 illustrates various exemplary embodiment features for content substitution in composite media works. An exemplary composite media work 3000 may include contributions from many persons and diverse sources, including but not limited to pre-existing source material 3010, adapted source material 3015, as well as created source material 3020. In some instances an initial venture 3030 may have sole responsibility for the entire composite media work 3000 or may delegate much (possibly all) of that responsibility to other entities or persons. In some circumstances an additional party such as real-world venture 3034 may have direct responsibility for a particular designated aspect 3026 included as part of one or more alterable component elements 3024. Nevertheless another designated aspect 3028 also included as part of alterable component elements 3024 may be the responsibility of a different party. In view of such combined derivation and control, it will be understood that a so-called "original" composite media work is included within the meaning of the term "derivative version" for definitional purposes of the detailed description and claims herein.

Under some circumstances, initial venture 3030 may own primary authorization rights to composite media work 3000 while at the same time world-venture 3034 may own primary authorization rights to a designated aspect 3026. As depicted in FIG. 68, composite media work 3000 may also include some traditional non-alterable elements 3022 as well as one or more alterable component elements 3024.

As further illustrated in FIG. 68, content of alterable component elements 3024 and/or their designated aspects 3026, 3028 may in accordance with applicable guidelines be modified in connection with the creation or production of various types of derivative versions 3040, 3050, 3060, 3070. For example, derivative version 3050 may include unchanged content 3052 as well as altered content such as substituted content 3054 associated with a real-world venture 3055. Other substituted content 3056 in derivative version 3050 may be associated with a different real-world venture 3057.

As a further example, derivative version 3060 may include unchanged content 3052 as well as the same substituted content 3054, and may include some re-substituted content 3066 associated with yet another real-world venture 3067.

As another example, derivative version 3070 may include unchanged content 3052 as well as expired content 3072, some initial default content 3074, and in addition may include new substituted content 3076 associated with still another real-world venture 3078.

It will be understood that such content changes in composite media works as disclosed herein are dependent upon compliance with applicable content alteration guidelines that may specifically include primary authorization rights, secondary authorization rights, as well as content alteration/modification criteria.

As disclosed in various exemplary system embodiments herein, a system for content alteration may be implemented with respect to a group of related component elements that are included in a constituent portion of a composite media work. System data records may include applicable alteration guidelines regarding collective replacement of such a group of related alterable component elements, and such replacement may include an addition or deletion or modification or replacement in a proposed derivative version. For example, a composite media work may include one or more of the following categories of related component elements: related set of designated aspects, related set of alterable components, identical objects, same object in different scenes, and same object in different settings.

In some system embodiments, a composite media work may include a group of one or more of the following type of related component elements associated with a real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage. Other exemplary composite media work embodiments may include a group of one or more of the following type of related component elements associated with a real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar.

In some system implementations, an exemplary composite media work may include a group of one or more of the following type of related component elements associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Other possible types of system records may include informational data regarding one or more of the following type of limitations applicable to a proposed derivative version: alteration limitation, media format limitation, and distribution limitation.

Of course, other grouped categories of related alterable component elements in a composite media work (e.g. derivative versions thereof, etc.) are possible, as well as related data records for groupings of such related alterable component elements. It will therefore be understood that the examples disclosed herein are for purposes of illustration only and are not intended to be limiting.

Figure 69:
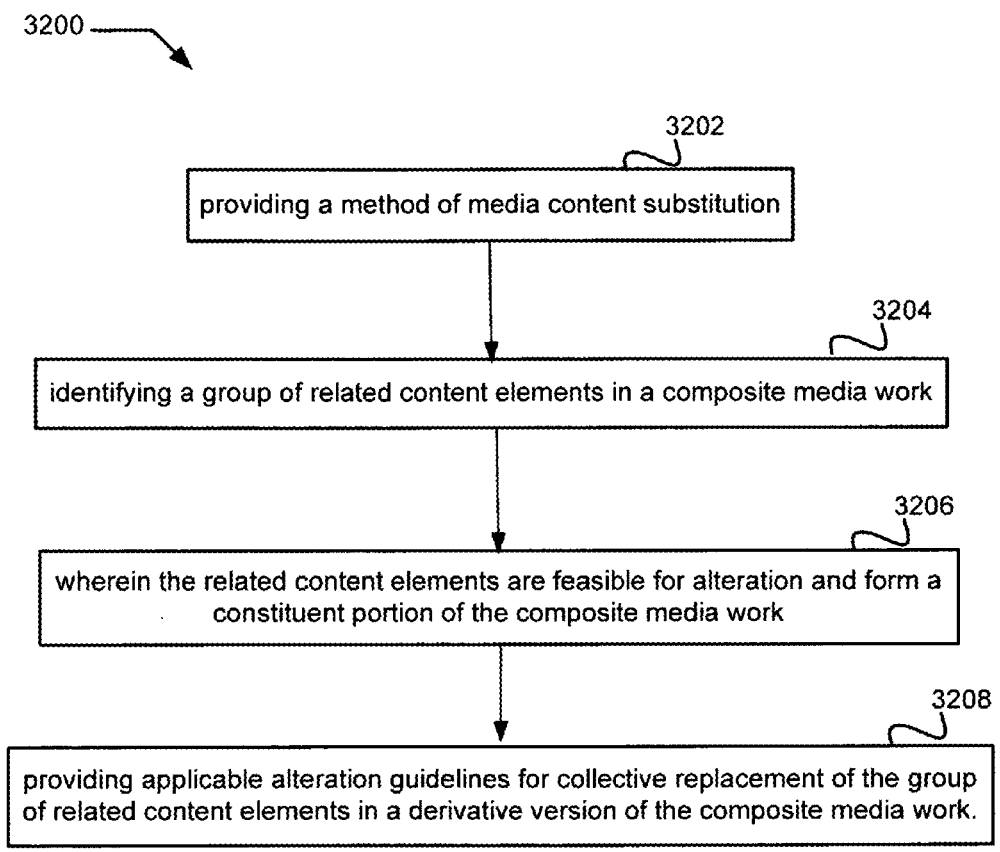
FIG. 69 is a high level flow chart illustrating another exemplary process embodiment for providing applicable alteration guidelines for a derivative version of a media work.

The exemplary embodiment 3200 of FIG. 69 provides a method of media content substitution (block 3202) including identifying a group of related content elements in a composite media work (block 3204), wherein the related content elements are feasible for alteration and form a constituent portion of the composite media work (block 3206); and providing applicable alteration guidelines for collective replacement of the group of related content elements in a derivative version of the composite media work (block 3208).

Figure 70:
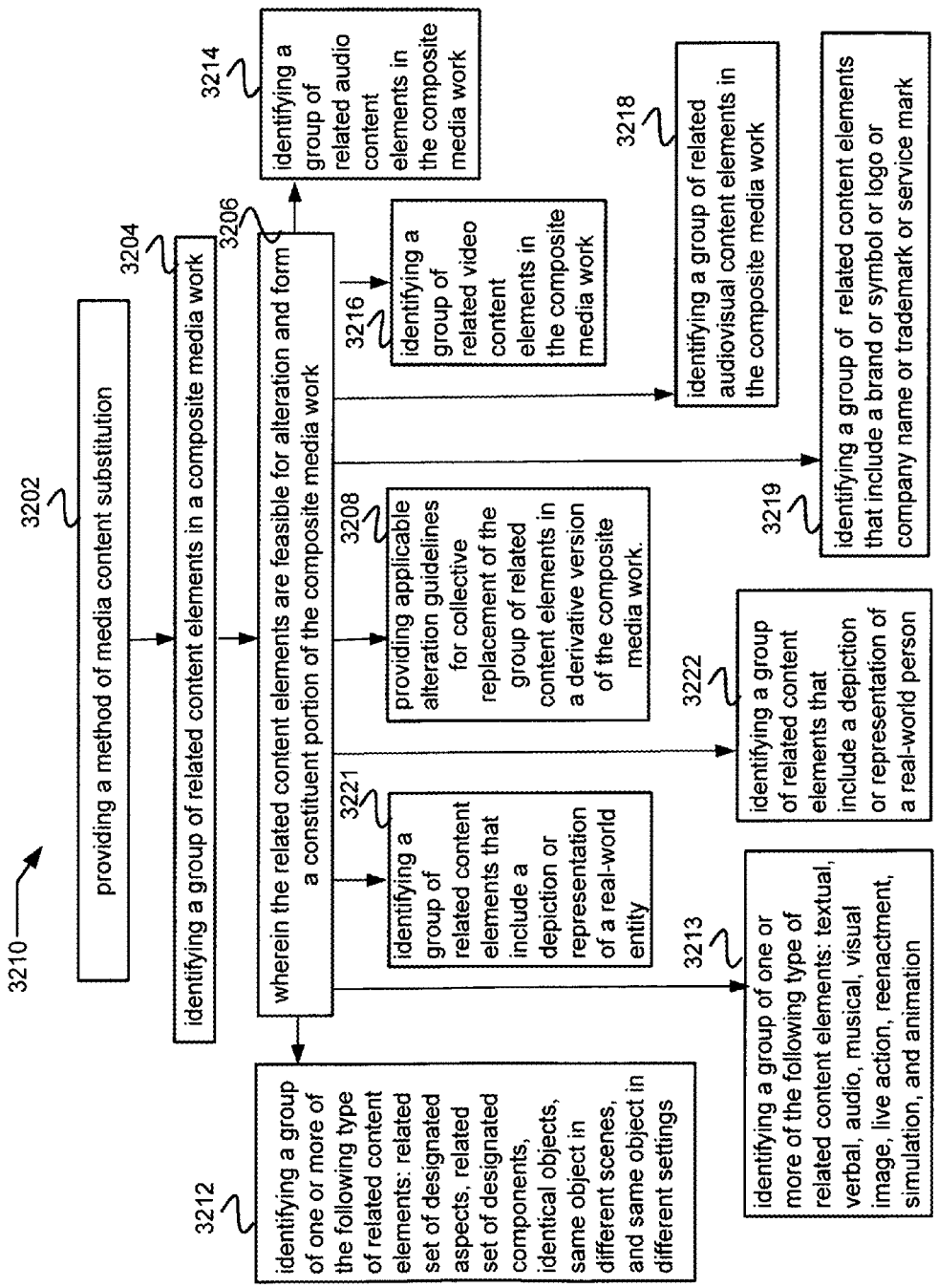
FIGS. 70-74 are more detailed flow charts illustrating additional possible features that may be included in an exemplary process embodiment.

The more detailed embodiments 3210 of FIG. 70 include previously described process features 3202, 3204, 3206 along with identifying a group of one or more of the following type of related content elements: related set of designated aspects, related set of designated components, identical objects, same object in different scenes, and same object in different settings (block 3212). Other depicted enhancements may include identifying a group of one or more of the following type of related content elements: textual, verbal, audio, musical, visual image, live action, reenactment, simulation, and animation (block 3213).

Additional possible process features may include identifying a group of related audio content elements (block 3214) and video content elements (block 3216) and audiovisual content elements (block 3218) in the composite media work. Further implementation features may include identifying a group of related content elements that include a brand or symbol or logo or company name or trademark or service mark (block 3219). Other possible enhancements may include identifying a group of related content elements that include a depiction or representation of a real-world entity (block 3221) and a depiction or representation of a real-world person (block 3222).

Figure 71:
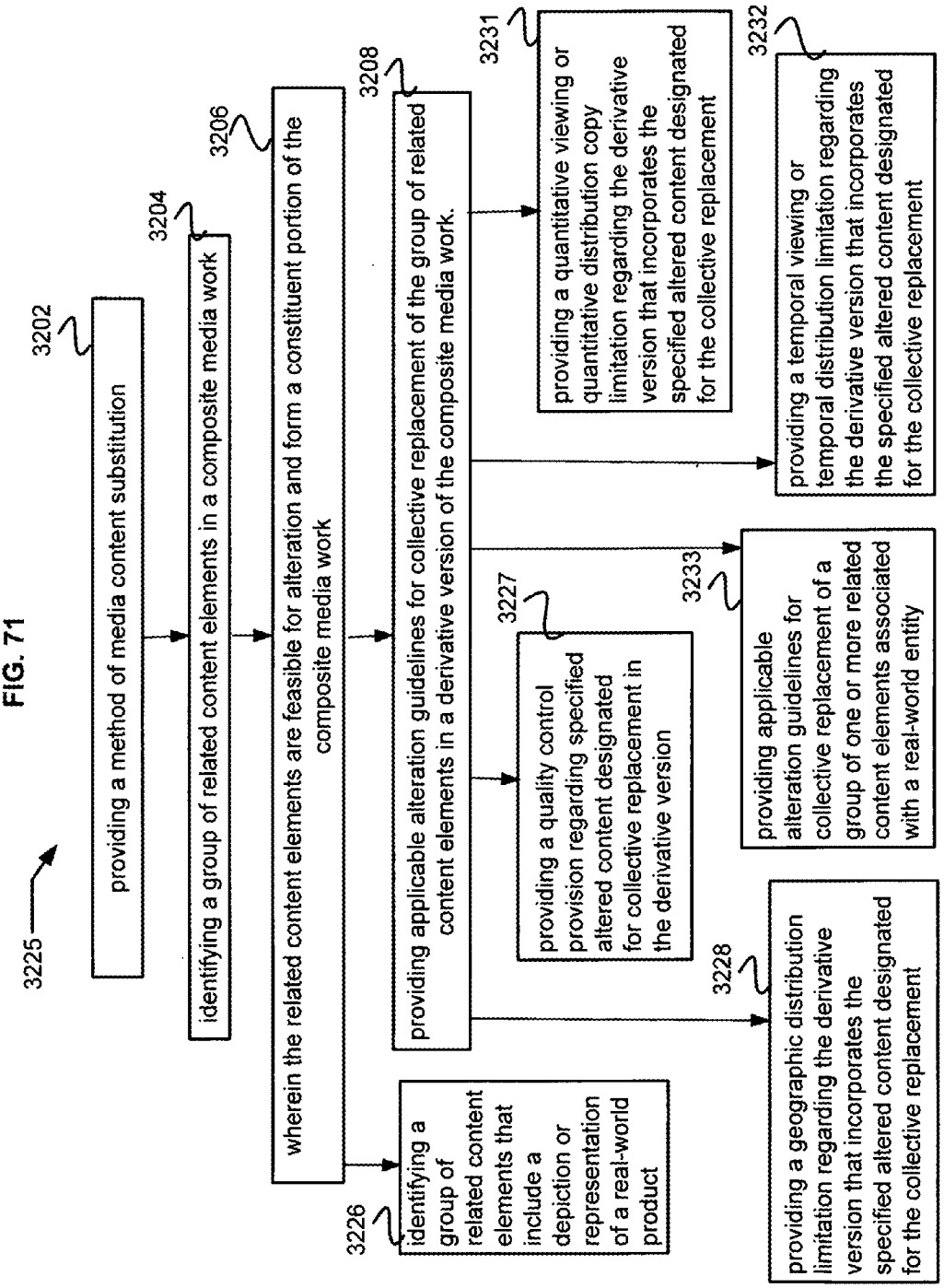

The detailed flow chart of FIG. 71 depicts various exemplary features 3220 including previously described operations 3202, 3204, 3206, 3208 along with identifying a group of related content elements that include a depiction or representation of a real-world product (block 3226), and providing a quality control provision regarding specified altered content designated for collective replacement in the derivative version (block 3227).

Additional possible process features may include providing a geographic distribution limitation regarding the derivative version that incorporates the specified altered content designated for the collective replacement (block 3228), and providing a quantitative viewing or quantitative distribution copy limitation regarding the derivative version that incorporates the specified altered content designated for the collective replacement (block 3231). Other exemplary enhancements may include providing a temporal viewing or temporal distribution limitation regarding the derivative version that incorporates the specified altered content designated for the collective replacement (block 3232).

Figure 72:
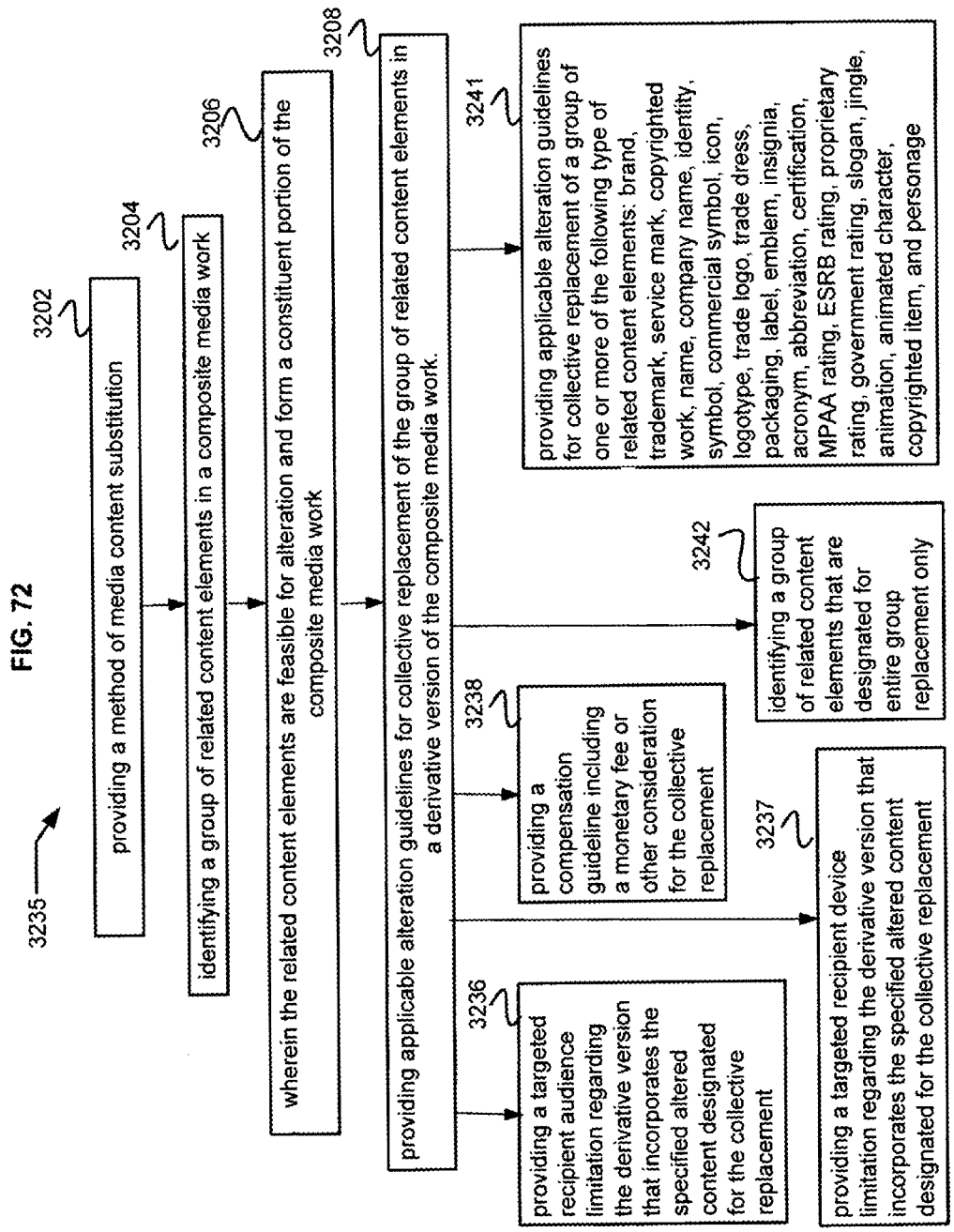

Referring to FIG. 72, exemplary embodiment features 3225 may include previously described operations 3202, 3204, 3206, 3208 in combination with providing a targeted recipient audience limitation (block 3236) and a targeted recipient device (block 3237) regarding the derivative version that incorporates the specified altered content designated for the collective replacement. Other possible implementation features may include providing a compensation guideline including a monetary fee or other consideration for the collective replacement (block 3238), and identifying a group of related content elements that are designated for entire group replacement only (block 3242).

FIG. 72 also illustrates additional possible process features that include providing applicable alteration guidelines for collective replacement of a group of one or more of the following type of related content elements: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage (block 3241).

Figure 73:
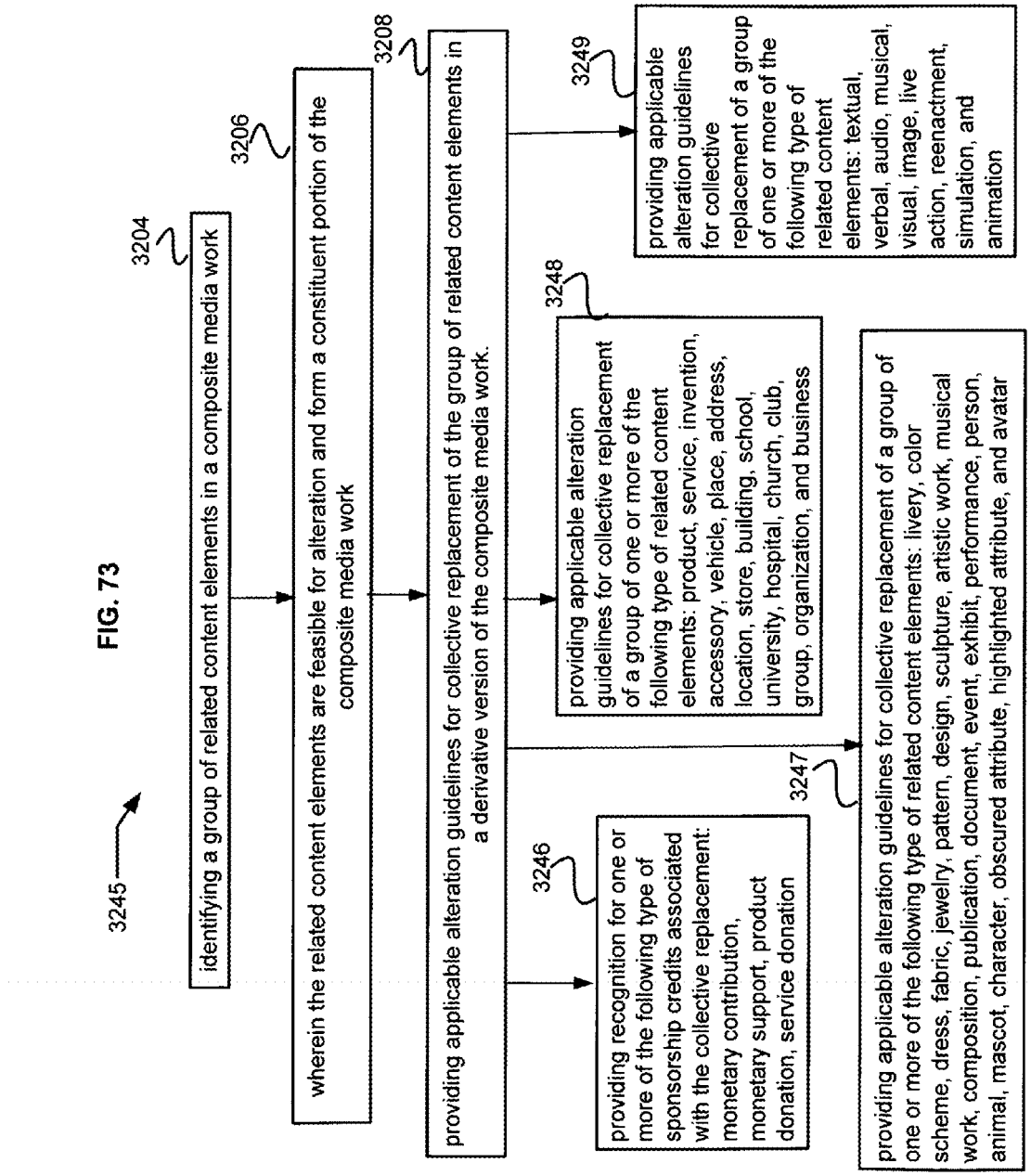

Referring to exemplary embodiment features 3245 of FIG. 73, previously described process features 3204, 3206, 3208 are illustrated along with a possibility of providing recognition for one or more of the following type of sponsorship credits associated with the collective replacement: monetary contribution, monetary support, product donation, and service donation (block 3246). Other possible features are illustrated including providing applicable alteration guidelines for collective replacement of a group of one or more of the following type of related content elements: livery, color scheme, dress, fabric, jewelry, pattern, design, sculpture, artistic work, musical work, composition, publication, document, event, exhibit, performance, person, animal, mascot, character, obscured attribute, highlighted attribute, and avatar (block 3247).

Additional possibilities may include providing applicable alteration guidelines for collective replacement of a group of one or more of the following type of related content elements: product, service, invention, accessory, vehicle, place, address, location, store, building, school, university, hospital, church, club, group, organization, and business (block 3248). Further exemplary enhancements may provide applicable alteration guidelines for collective replacement of a group of one or more of the following type of related content elements: textual, verbal, audio, musical, visual, image, live action, reenactment, simulation, and animation (block 3249).

Figure 74:
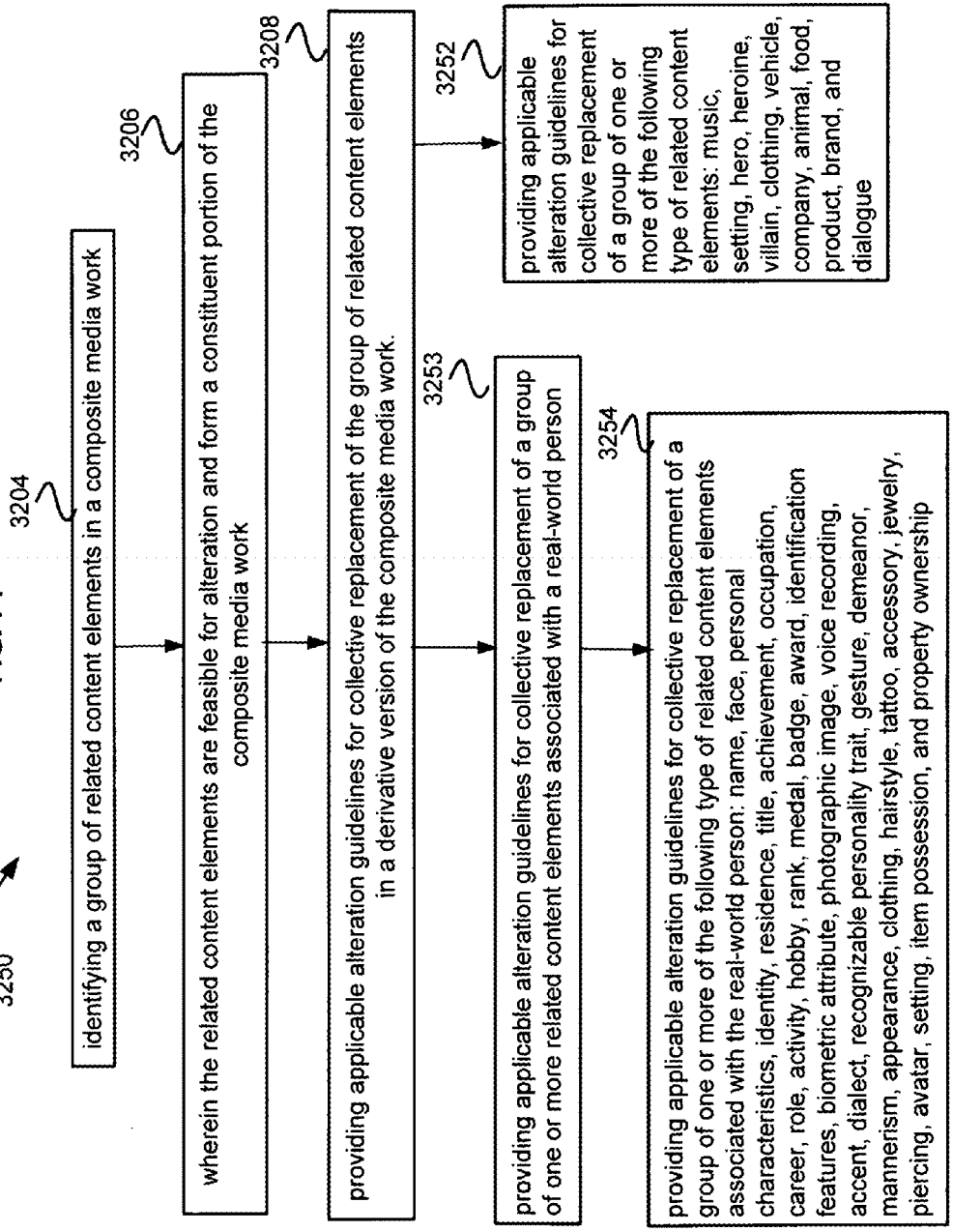

Referring to FIG. 74, a further combination of exemplary process features 3250 may include previously described operations 3204, 3206, 3208 along with providing applicable alteration guidelines for collective replacement of a group of one or more of the following type of related content elements: music, setting, hero, heroine, villain, clothing, vehicle, company, animal, food, product, brand, and dialogue (block 3252). Another possibility may include providing applicable alteration guidelines for collective replacement of a group of one or more related content elements associated with a real-world person (block 3253).

FIG. 74 also depicts additional enhancements including providing applicable alteration guidelines for collective replacement of a group of one or more of the following type of related content elements associated with the real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 3254).

Figure 75:
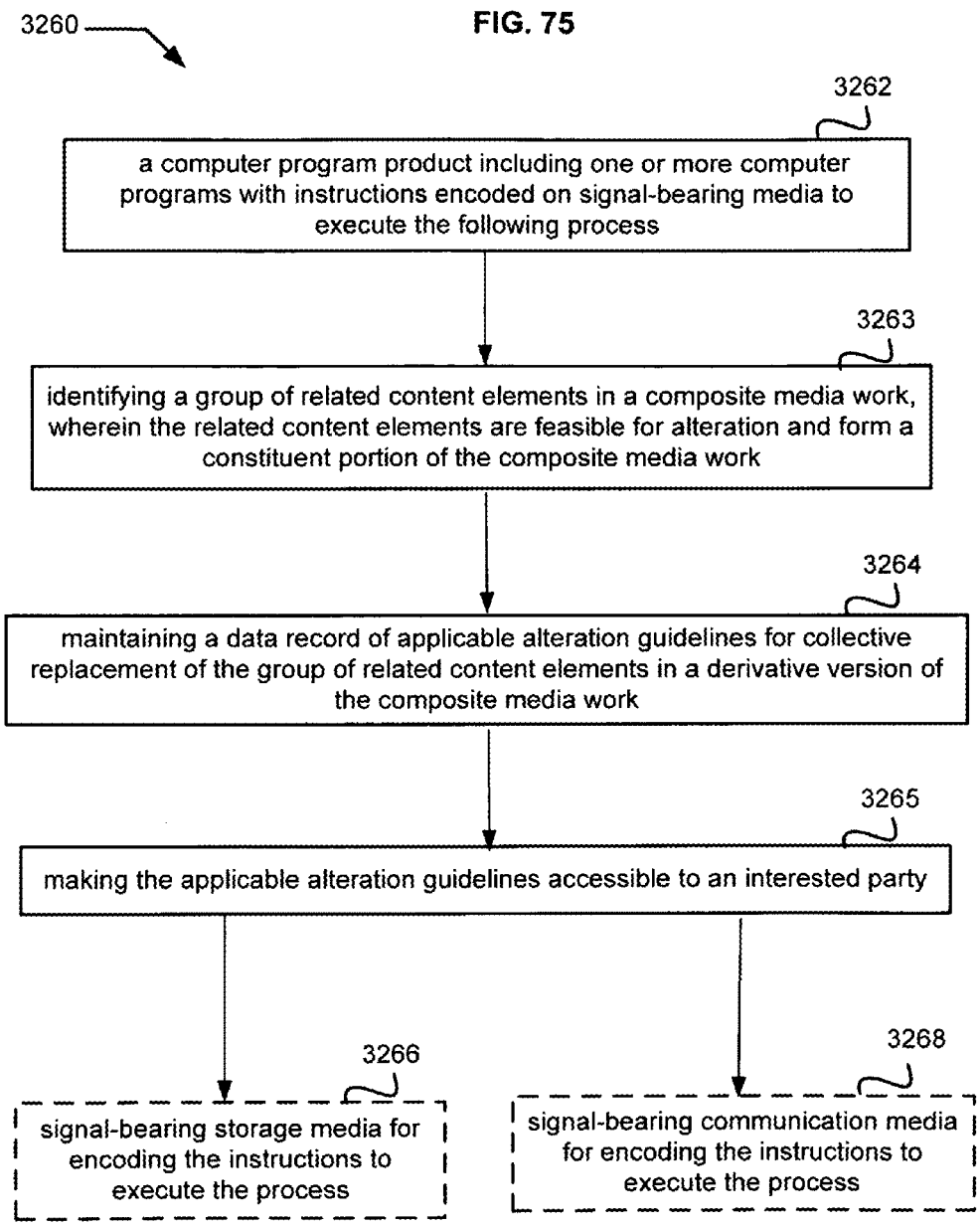
FIG. 75 is a diagrammatic flow chart for another exemplary computer program product embodiment.

An exemplary computer program product embodiment 3260 in FIG. 75 may include one or more computer programs with instructions encoded on signal-bearing media to execute a process (block 3262), including identifying a group of related content elements in a composite media work, wherein the related content elements are feasible for alteration and form a constituent portion of the composite media work (block 3263). Additional exemplary programmed process features may include maintaining a data record of applicable alteration guidelines for collective replacement of the group of related content elements in a derivative version of the composite media work, and making the applicable alteration guidelines accessible to an interested party (block 3265).

Further illustrated features may include signal-bearing storage media for encoding the instructions to execute the process ((block 3266) and signal-bearing communication media for encoding the instructions to execute the process (block 3268).

Figure 76:
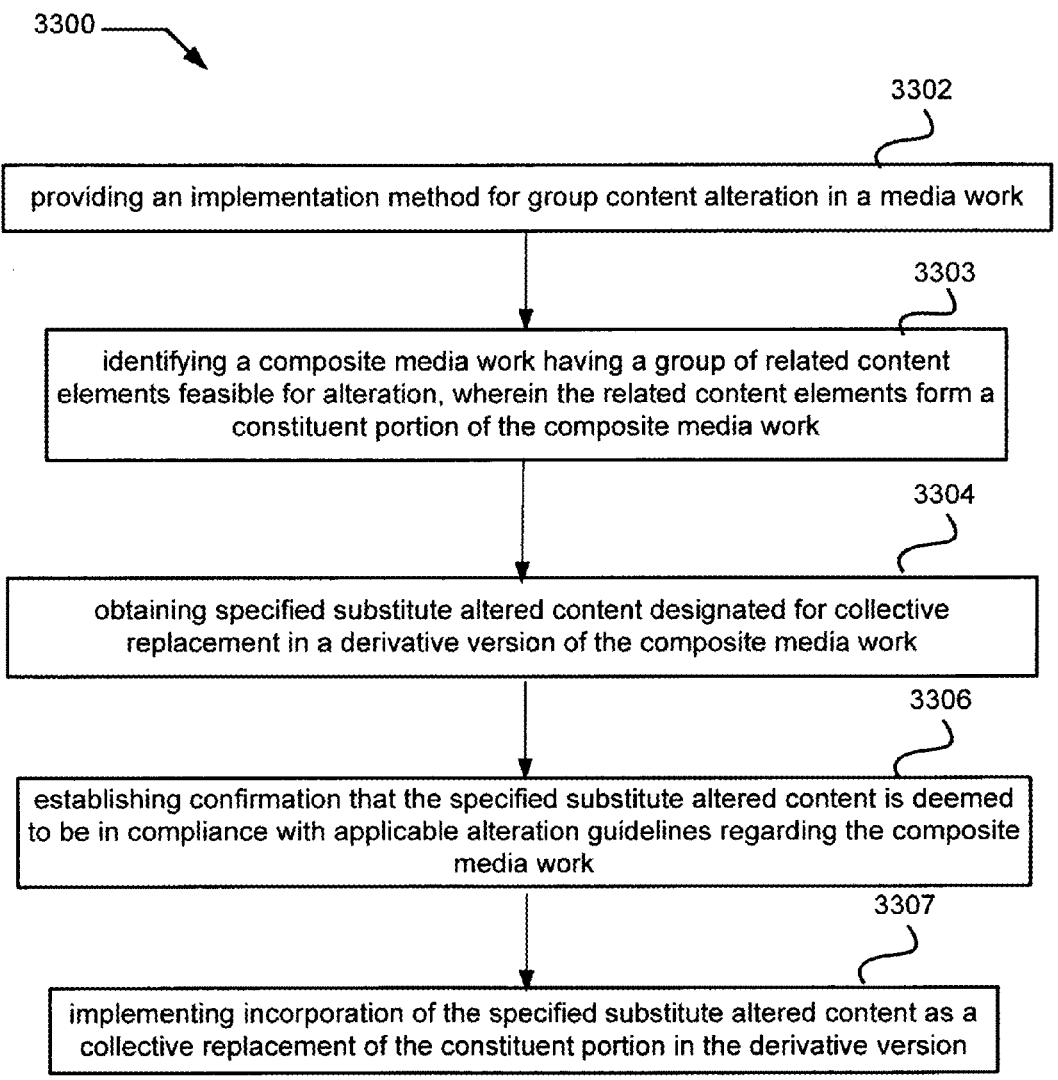
FIG. 76 is a high level flow chart illustrating a further exemplary process embodiment for implementing a content alteration in a derivative version of a media work.

Referring to an illustrated embodiment 3300 depicted in the flow chart of FIG. 76, an exemplary process may provide an implementation method for group content alteration in a media work (block 3302), including identifying a composite media work having a group of related content elements feasible for alteration, wherein the related content elements form a constituent portion of the composite media work (block 3303); and obtaining specified substitute altered content designated for collective replacement in a derivative version of the composite media work (block 3304). Additional possible features may include establishing confirmation that the specified substitute altered content is deemed to be in compliance with applicable alteration guidelines regarding the composite media work (block 3306), and implementing incorporation of the specified substitute altered content as a collective replacement of the constituent portion in the derivative version (block 3307).

The exemplary process features 3310 illustrated in FIG. 77 include previously described operations 3303, 3304, 3306 along with concurring with a determination that the specified substitute altered content is in compliance with applicable alteration criteria regarding one or more of the following type of alteration of the group of related content elements: addition, deletion, modification, and replacement (block 3312). Other possible enhancements may include utilizing one or more of the following type of approval techniques to make a determination that the collective replacement in the derivative version is in compliance with the applicable alteration guidelines: programmed, pre-authorization, delegated agent, derivative version review, substitute content review, alteration review, summary characterization, substitute content rating, and aggregate content rating (block 3313).

Other possible implementation features may include concurring with a determination that the collective replacement in the derivative version is in compliance with one or more of the following type of pre-approved alteration parameters: substitute component element, substitute designated aspect, substitution process, alternate media format, and alternate distribution channel (block 3314). In some instances a process embodiment may include concurring with a determination that the collective replacement in the derivative version is in compliance with applicable alteration guidelines that include forbidding or restricting alteration of one or more of following type of component elements: plot, story, animation, text, narration, dialog, color, actor, character, clothing, product, sound, music, musical lyrics, product, object, item, title, distributor, creative credit, production credit, funding credit, and sponsorship (block 3316).

FIG. 77 also depicts additional exemplary process enhancements that may include making a determination that the collective replacement in the derivative version is in compliance with one or more of the following types of applicable alteration criteria: automatic, contingent, negotiable, tentative, recommended, required, and compensation (block 3318).

Figure 78:
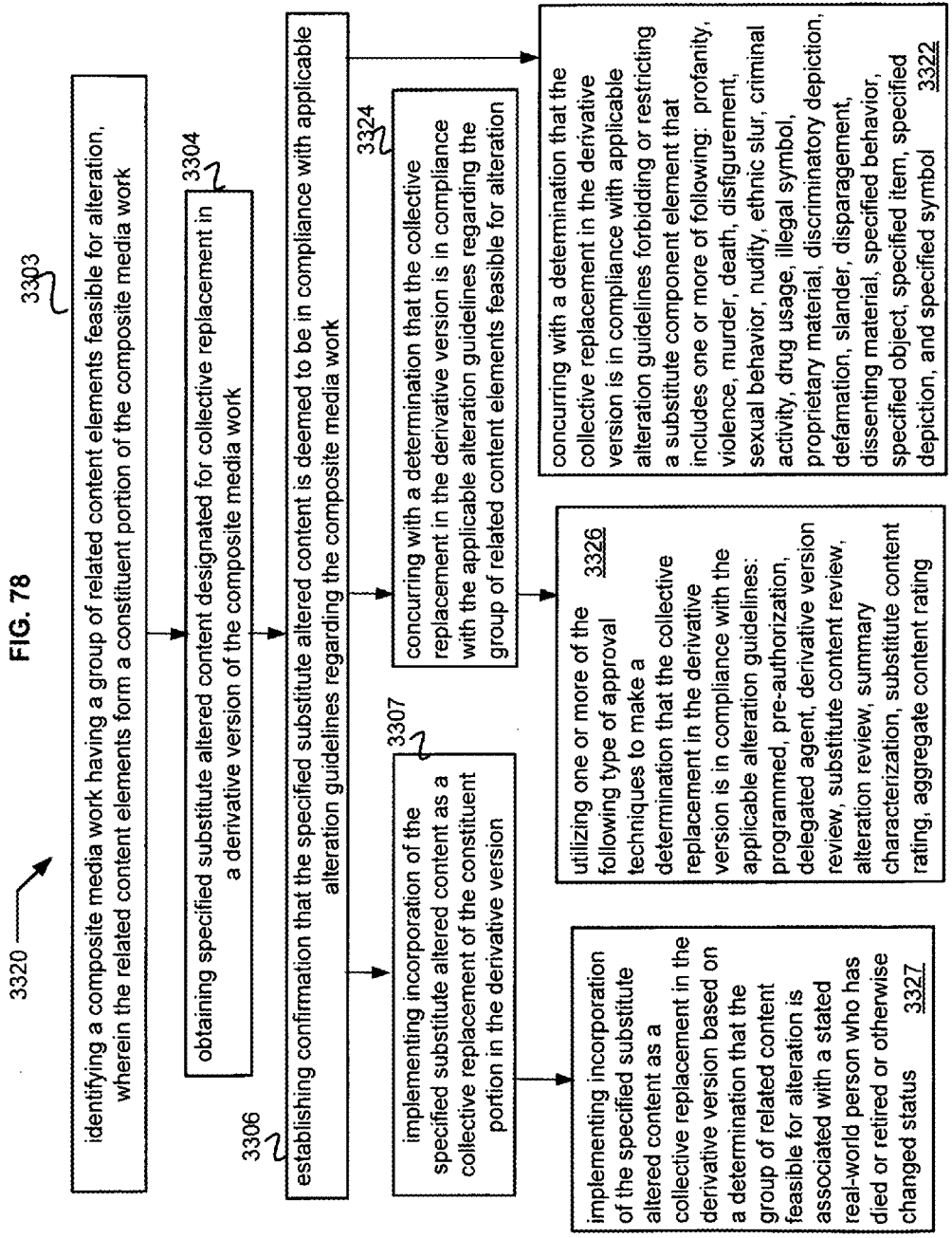

Referring to detailed embodiment features 3320 depicted in FIG. 78, a possible implementation may include previously described process operations 3303, 3304, 3307 as well as concurring with a determination that the collective replacement in the derivative version is in compliance with applicable alteration guidelines forbidding or restricting a substitute component element that includes one or more of following: profanity, violence, murder, death, disfigurement, sexual behavior, nudity, ethnic slur, criminal activity, drug usage, illegal symbol, proprietary material, discriminatory depiction, defamation, slander, disparagement, dissenting material, specified behavior, specified object, specified item, specified depiction, and specified symbol (block 3322).

Other possible process enhancements may include concurring with a determination that the collective replacement in the derivative version is in compliance with the applicable alteration guidelines regarding the group of related content elements feasible for alteration (block 3324), and utilizing one or more of the following type of approval techniques to make a determination that the collective replacement in the derivative version is in compliance with the applicable alteration guidelines: programmed, pre-authorization, delegated agent, derivative version review, substitute content review, alteration review, summary characterization, substitute content rating, and aggregate content rating (block 3326).

Additional possibilities may include implementing incorporation of the specified substitute altered content as a collective replacement in the derivative version based on a determination that the group of related content feasible for alteration is associated with a stated real-world person who has died or retired or otherwise changed status (block 3327).

Figure 79:
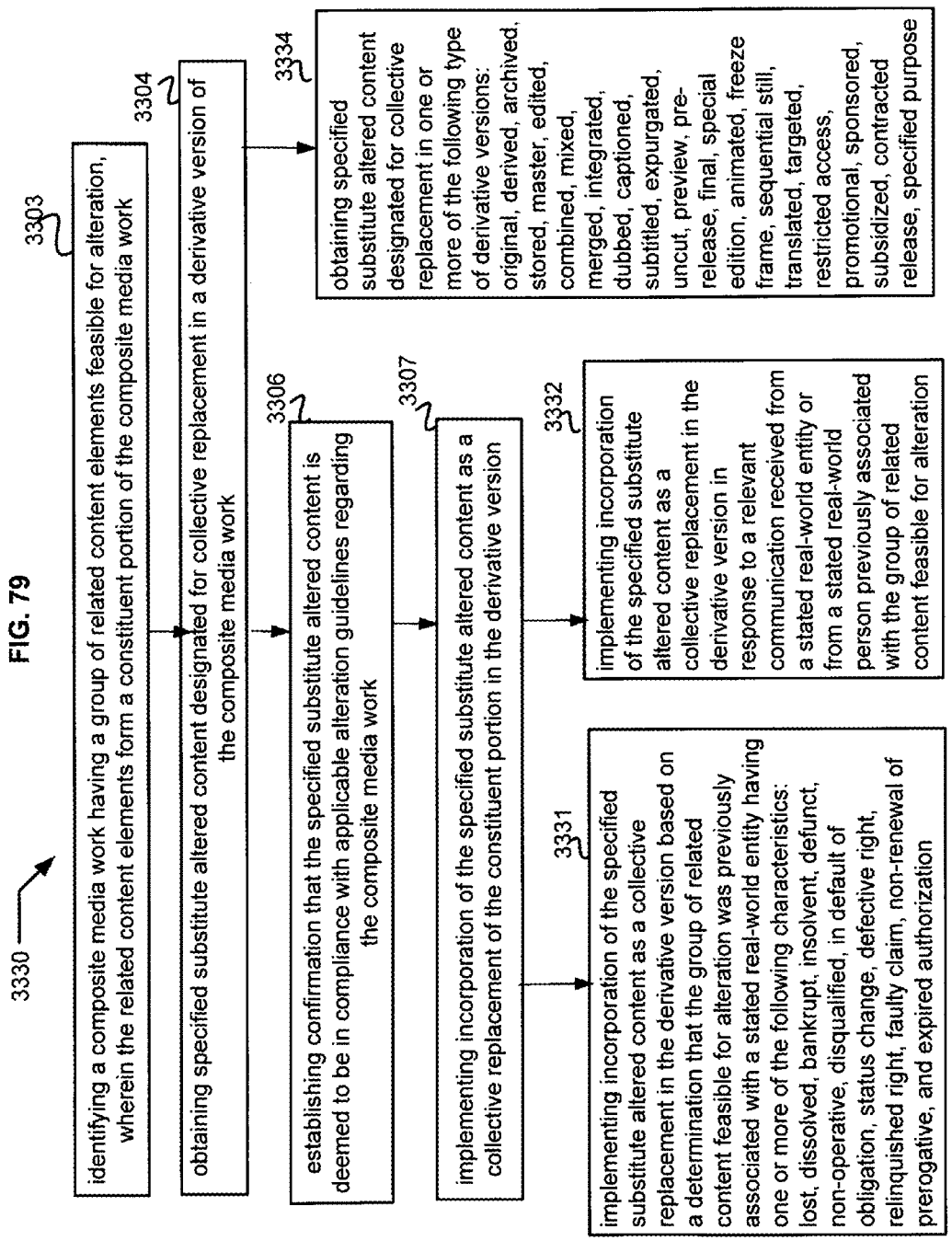

Referring to FIG. 79, additional possible exemplary process features 3330 are illustrated, include previously described operations 3303, 3304, 3306, 3307 along with implementing incorporation of the specified substitute altered content as a collective replacement in the derivative version based on a determination that the group of related content feasible for alteration was previously associated with a stated real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization (block 3331).

Other possible process enhancements may include implementing incorporation of the specified substitute altered content as a collective replacement in the derivative version in response to a relevant communication received from a stated real-world entity or from a stated real-world person previously associated with the group of related content feasible for alteration (block 3332). Additional exemplary features may include obtaining specified substitute altered content designated for collective replacement in one or more of the following type of derivative versions: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose (block 3334).

Figure 80:
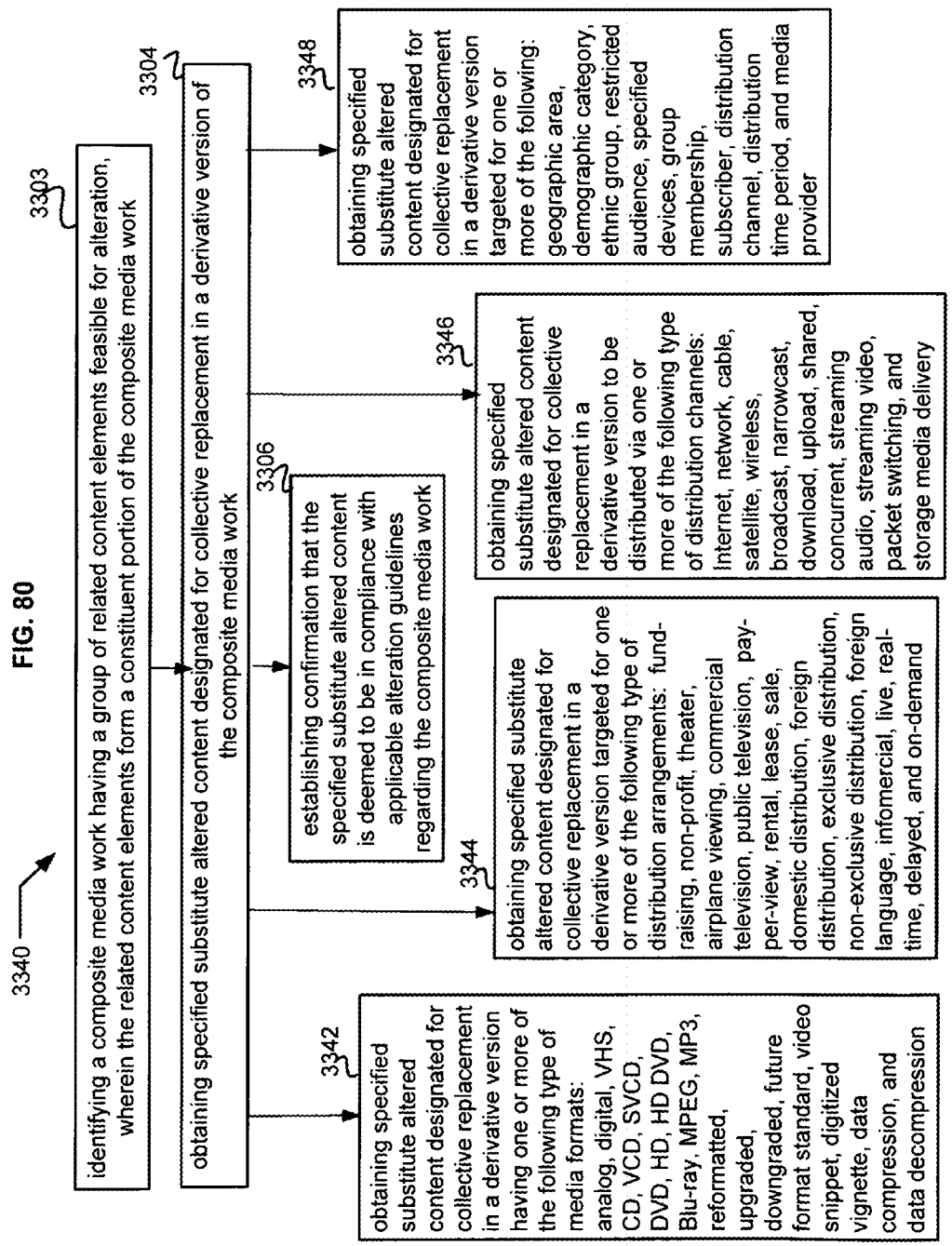

The flow chart of FIG. 80 depicts further exemplary embodiment features 3340 including previously described process operations 3303, 3304, 3306 in combination with obtaining specified substitute altered content designated for collective replacement in a derivative version having one or more of the following type of media formats: analog, digital, VHS, CD, VCD, SVCD, DVD, HD, HD DVD, Blu-ray, MPEG, MP3, reformatted, upgraded, downgraded, future format standard, video snippet, digitized vignette, data compression, and data decompression (block 3342).

Additional possible implementation features may include obtaining specified substitute altered content designated for collective replacement in a derivative version targeted for one or more of the following type of distribution arrangements: fund-raising, non-profit, theater, airplane viewing, commercial television, public television, pay-per-view, rental, lease, sale, domestic distribution, foreign distribution, exclusive distribution, non-exclusive distribution, foreign language, infomercial, live, real-time, delayed, and on-demand (block 3344).

Some embodiments may further include obtaining specified substitute altered content designated for collective replacement in a derivative version to be distributed via one or more of the following type of distribution channels: Internet, network, cable, satellite, wireless, broadcast, narrowcast, download, upload, shared, concurrent, streaming audio, streaming video, packet switching, and storage media delivery (block 3346). Additional process features may include obtaining specified substitute altered content designated for collective replacement in a derivative version targeted for one or more of the following: geographic area, demographic category, ethnic group, restricted audience, specified devices, group membership, subscriber, distribution channel, distribution time period, and media provider (block 3348).

Figure 81:
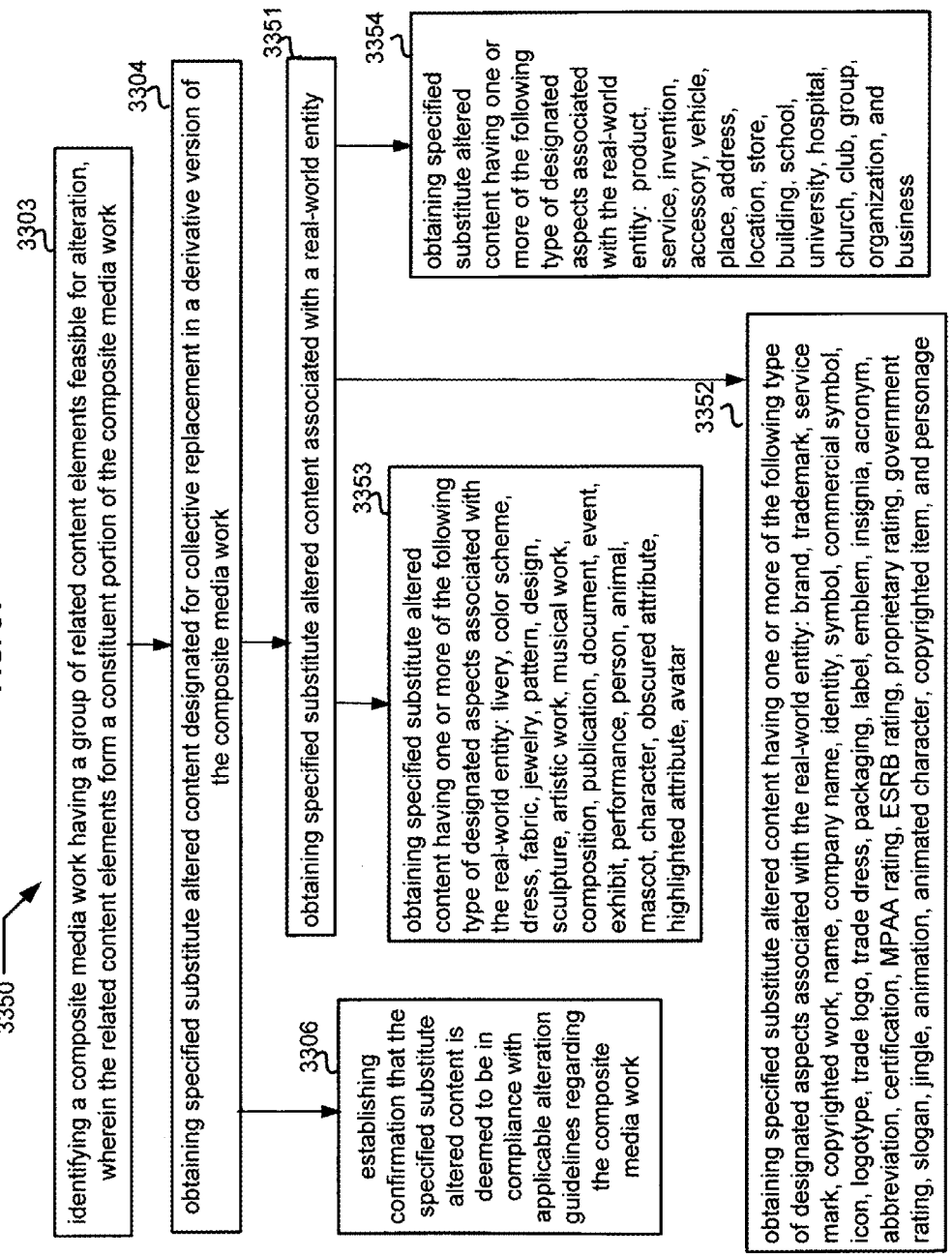

Exemplary embodiment features 3350 illustrated in FIG. 81 include previously described operations 3303, 3304, 3306 as well as obtaining specified substitute altered content associated with a real-world entity (block 3351). An additional possibility may include obtaining specified substitute altered content having one or more of the following type of designated aspects associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage (block 3352).

Other process enhancements may include obtaining specified substitute altered content having one or more of the following type of designated aspects associated with the real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar (block 3353). Further exemplary features may include obtaining specified substitute altered content having one or more of the following type of designated aspects associated with the real-world entity: product, service, invention, accessory, vehicle, place, address, location, store, building, school, university, hospital, church, club, group, organization, and business (block 3354).

Figure 82:
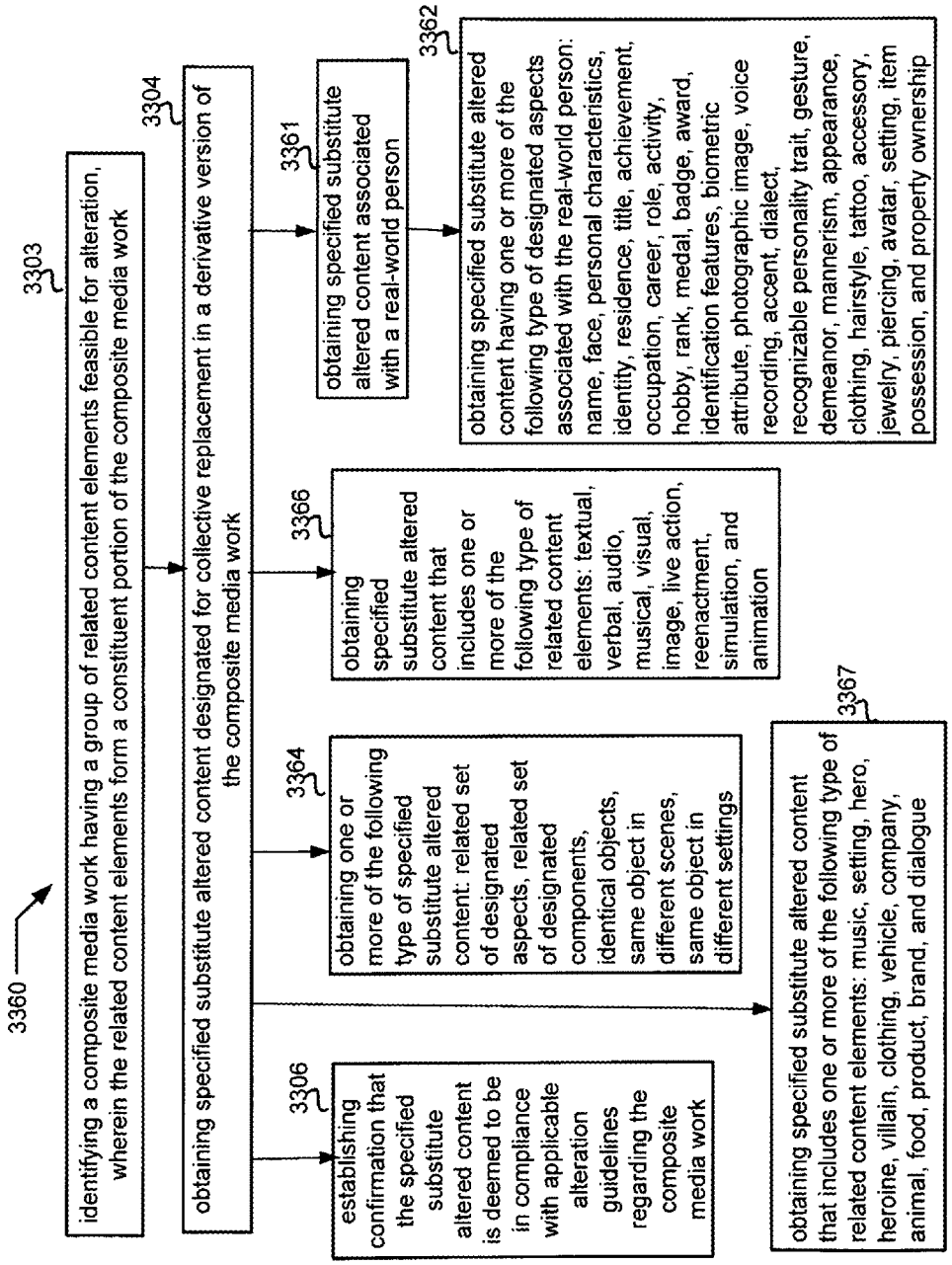

Referring to FIG. 82, exemplary embodiment features 3360 may include previously described features 3303, 3304, 3306 along with obtaining specified substitute altered content associated with a real-world person (block 3361). Other exemplary process features may include obtaining specified substitute altered content having one or more of the following type of designated aspects associated with the real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 3362).

Some implementations my further include obtaining one or more of the following type of specified substitute altered content: related set of designated aspects, related set of designated components, identical objects, same object in different scenes, and same object in different settings (block 3364).

Other possible enhancements may include obtaining specified substitute altered content that includes one or more of the following type of related content elements: textual, verbal, audio, musical, visual, image, live action, reenactment, simulation, and animation (block 3366). In some instances an exemplary process embodiment may further include obtaining specified substitute altered content that includes one or more of the following type of related content elements: music, setting, hero, heroine, villain, clothing, vehicle, company, animal, food, product, brand, and dialogue (block 3367).

Figure 83:
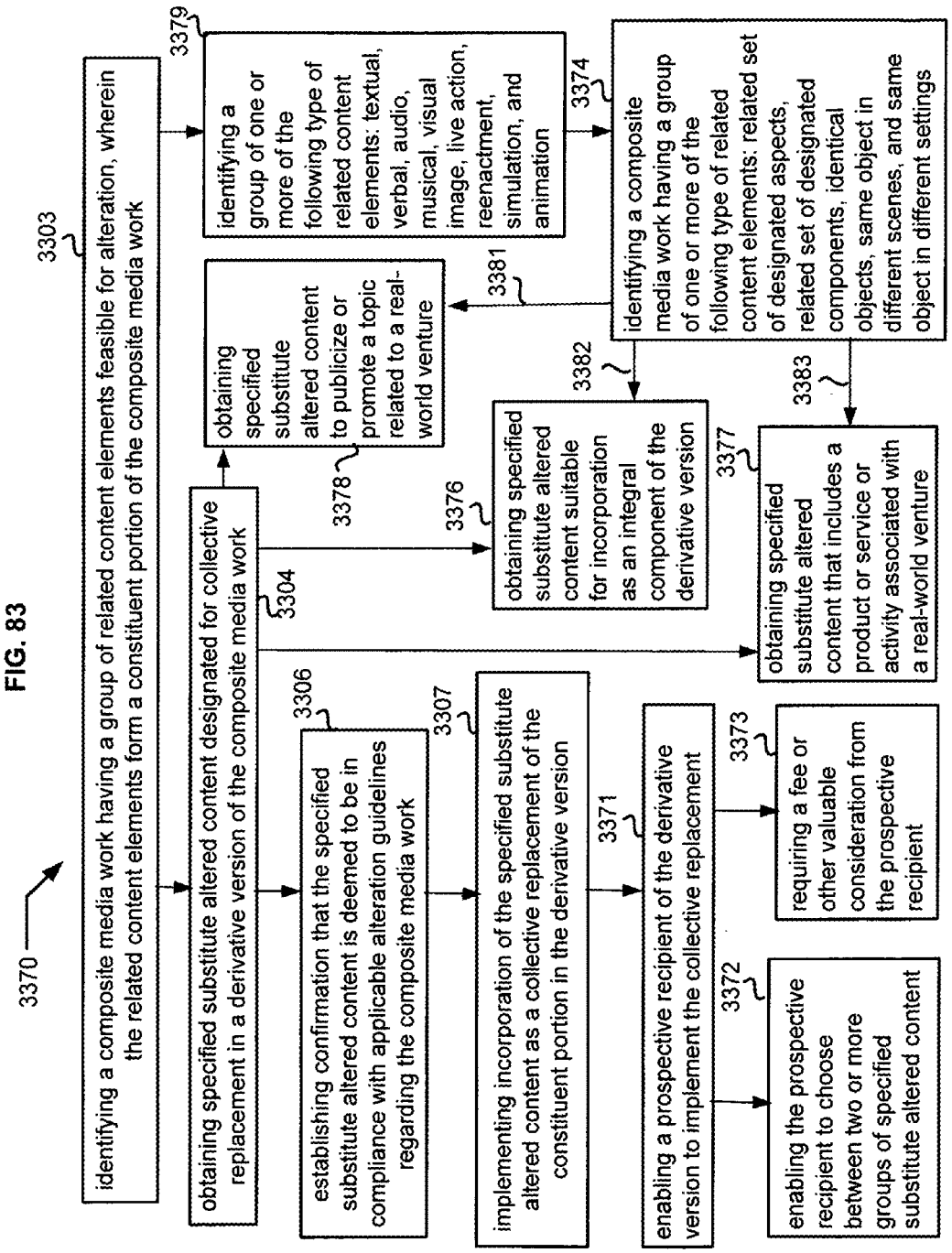

The detailed flow chart of FIG. 83 illustrates further embodiment features 3370, including previously described operations 3303, 3304, 3306, 3307 that may be combined with enabling a prospective recipient of the derivative version to implement the collective replacement (block 3371), and with enabling the prospective recipient to choose between two or more groups of specified substitute altered content (block 3372). Another possible feature may include requiring a fee or other valuable consideration from the prospective recipient (block 3373).

Additional process possibilities may include identifying a group of one or more of the following type of related content elements: textual, verbal, audio, musical, visual image, live action, reenactment, simulation, and animation (block 3379). Some implementations may further include identifying a composite media work having a group of one or more of the following type of related content elements: related set of designated aspects, related set of designated components, identical objects, same object in different scenes, and same object in different settings (block 3374).

Also depicted in FIG. 83 are further possible enhancements, including obtaining specified substitute altered content suitable for incorporation as an integral component of the derivative version (block 3376). As shown by arrow 3382, such specified substitute altered content may be further utilized in connection with various groupings of related content elements (e.g., see block 3374) in a composite media work. Another possible enhancement may include obtaining specified substitute altered content that includes a product or service or activity associated with a real-world venture (block 3377). As shown by arrow 3383, such specified substitute altered content may be further utilized in connection with various groupings of related content elements (e.g., see block 3374) in a composite media work.

A further possible enhancement may include obtaining specified substitute altered content to publicize or promote a topic related to a real-world venture (block 3378). As shown by arrow 3381, such specified substitute altered content may be further utilized in connection with various groupings of related content elements (e.g., see block 3374) in a composite work.

Figure 84:
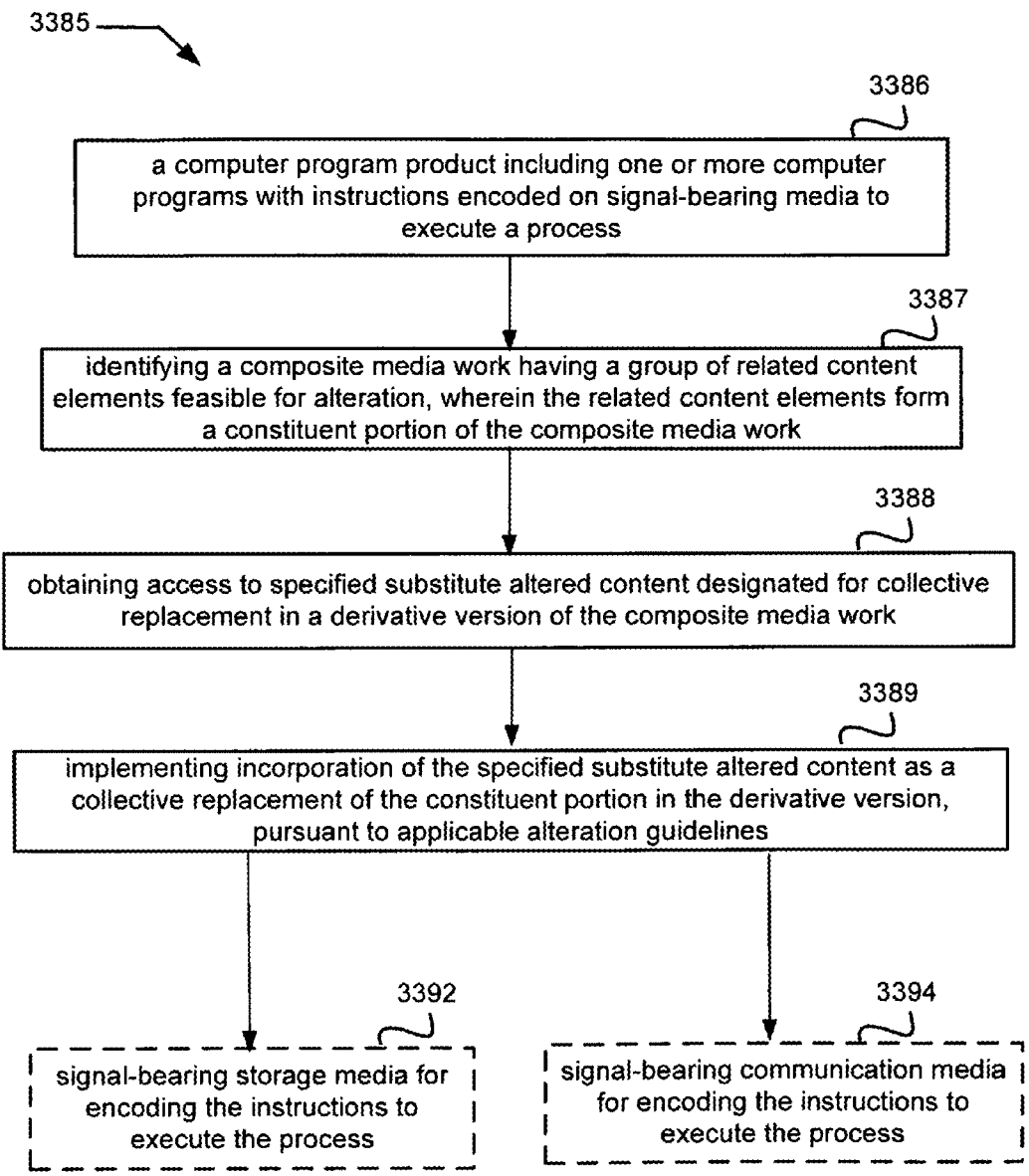
FIG. 84 is a diagrammatic flow chart for another exemplary computer program product embodiment.

FIG. 84 illustrates an exemplary computer program product embodiment that includes one or more computer programs with instructions encoded on signal-bearing computer readable media to execute a process (block 3386). Such an exemplary process may include identifying a composite media work having a group of related content elements feasible for alteration, wherein the related content elements form a constituent portion of the composite media work (block 3387); and obtaining access to substitute altered content designated for collective replacement in a derivative version of the composite media work (block 3388). Additional program process features may include implementing incorporation of the substitute altered content as a collective replacement of the constituent portion in the derivative version, pursuant to applicable alteration guidelines (block 3389).

Some program product implementations may further include signal-bearing storage media for encoding the instructions to execute an exemplary process (block 3392). Another implementation possibility may include signal-bearing communication media for encoding the instructions to execute an exemplary process (block 3394).

It will be understood from the drawings and descriptions herein that many possible operational benefits may be obtained from an embodiment implemented with computer-readable media bearing programmed process instructions. For example, some computerized components and programmed applications may provide for maintaining applicable alteration guidelines regarding collective replacement of one or more of the following type of related content elements: related set of designated aspects, related set of designated components, identical objects, same object in different scenes, and same object in different settings. Other programmed features may include maintaining applicable alteration guidelines regarding collective replacement of one or more of the following type of related content elements: textual, verbal, visual, image, audio, musical, live action, reenactment, simulation, and animation.

A further programmed process may include maintaining applicable alteration guidelines regarding collective replacement of one or more of the following type of related content elements: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

It will be understood that programmed process instructions may be implemented for collective replacement (e.g., addition, deletion, modification, replacement, etc.) of various groups of related alterable component elements and designated aspects of a composite media work (e.g., derivative versions thereof), and the exemplary recitation of such a group of related content elements suitable for programmed processing is not intended to be limiting but may be varied depending on the circumstances. In some instances such a group of related content elements may be associated with a real-world venture (e.g., real-world entity, real-world person, etc.), and may be incorporated in a constituent portion of a derivative version to publicize or promote a topic related to the real-world venture.

Figure 85:
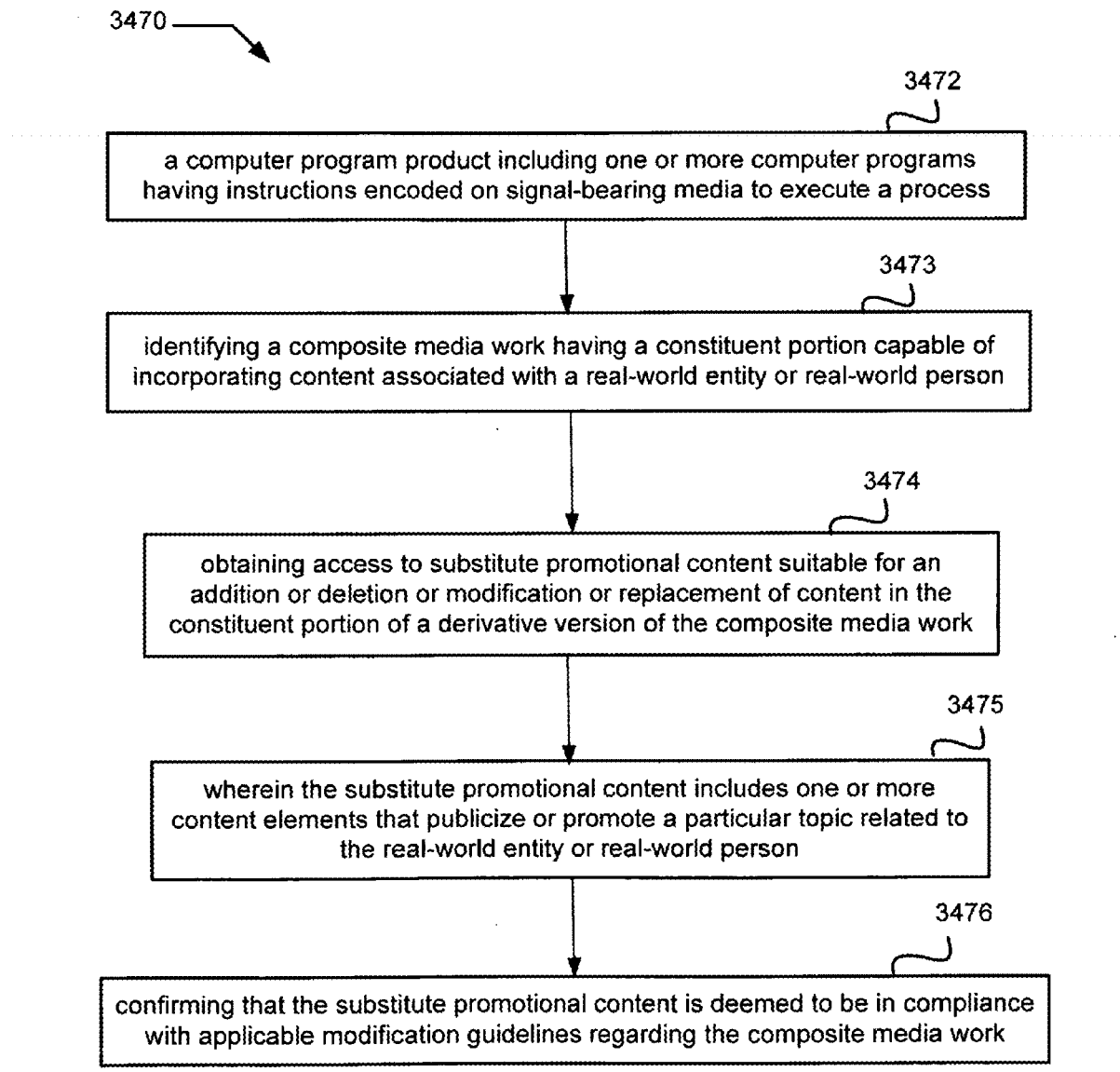
FIG. 85 is a diagrammatic flow chart for another exemplary computer program product embodiment.

The exemplary embodiment 3470 illustrated in FIG. 85 depicts a computer program product including one or more computer programs having instructions encoded on signal-bearing computer readable media to execute a process (block 3472). A possible programmed process may include identifying a composite media work having a constituent portion capable of incorporating content associated with a real-world entity or real-world person (block 3473); and obtaining access to substitute promotional content suitable for an addition or deletion or modification or replacement of content in the constituent portion of a derivative version of the composite media work (block 3474), wherein the substitute promotional content includes one or more content elements that publicize or promote a particular topic related to the real-world entity or real-world person (block 3475).

Another possible programmed process feature may include confirming that the substitute promotional content is deemed to be in compliance with applicable modification guidelines regarding the composite media work (block 3476).

Many other computerized program enhancements may be implemented in view of the exemplary disclosures herein, and some program enhancements may not be necessary, depending on the circumstances.

Further possible computer program process features may include confirming that the substitute promotional content is in compliance with applicable alteration criteria and with certain primary authorization rights regarding the composite media work. Another possible programmed process operation may include confirming that the substitute promotional content is in compliance with one or more of the following types of limitations for the derivative version incorporating the substitute promotional content: distribution, media format, pre-approved alteration parameter, objectionable alteration, restricted alteration, and forbidden alteration.

A programmed process may implement incorporation of many types of substitute promotional content in a derivative version of a composite media. For example, a possible programmed operation may implement incorporation of the substitute promotional content in the derivative version targeted for one or more of the following: geographic area, demographic category, ethnic group, restricted audience, specified devices, group membership, subscriber, distribution channel, distribution time period, and media provider. Another exemplary programmed operation may include implementing incorporation of one or more of the following type of substitute promotional content: related set of designated aspects, related set of designated components, identical objects, same object in different scenes, and same object in different settings.

Further possibilities for programmed process features may include implementing incorporation of one or more of the following type of substitute promotional content: textual, verbal, visual, image, audio, musical, live action, reenactment, simulation, and animation. Another possible programmed process operation may include implementing incorporation of one or more of the following type of substitute promotional content: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

Other types of program product enhancements may provide a process feature that includes implementing incorporation of one or more of the following type of substitute promotional content: livery, color scheme, dress, fabric, jewelry, pattern, design, sculpture, artistic work, musical work, composition, publication, document, event, exhibit, performance, person, animal, mascot, character, obscured attribute, highlighted attribute, and avatar. An additional program product process may include implementing incorporation of one or more of the following type of substitute promotional content: product, service, invention, accessory, vehicle, place, address, location, store, building, school, university, hospital, church, club, group, organization, and business.

In some instances a programmed process enhancement may include implementing incorporation of one or more of the following type of substitute promotional content: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

A further programmed process operation may include obtaining access to substitute promotional content having one or more of the following type of content elements associated with the real-world entity or the real-world person: product, service, and activity. Additional computer program product features may include maintaining a record of the real-world entity or a real-world person associated with substitute promotional content incorporated in the derivative version of the composite media work.

In some instances a programmed process operation involving substitute promotional content may further include maintaining a record of modification guidelines applicable to one or more of the following type of constituent portions of the composite media work: music, setting, hero, heroine, villain, clothing, vehicle, company, animals, food, product, brand, and dialogue. Other programmed process operations involving substitute promotional content may include maintaining a record of modification guidelines that include forbidding or restricting substitute promotional content that includes one or more of following: profanity, violence, murder, death, disfigurement, sexual behavior, nudity, ethnic slur, criminal activity, drug usage, illegal symbol, proprietary material, discriminatory depiction, defamation, slander, disparagement, dissenting material, specified behavior, specified object, specified item, specified depiction, and specified symbol.

In some computer program product embodiments, a process feature may include obtaining previously captured or newly captured substitute promotional content that is deemed to be in compliance with the applicable modification guidelines. A related program product feature may include obtaining one or more of the following types of previously captured or newly captured substitute promotional content: textual, visual, image, audio, musical, live action, reenactment, simulation, and animation.

It will be understood that other process features involving substitute promotional content may be implemented in computer readable signal-bearing media such as a storage medium or a communication medium, and the particular examples disclosed herein are only for purposes of illustration.

Figure 86:
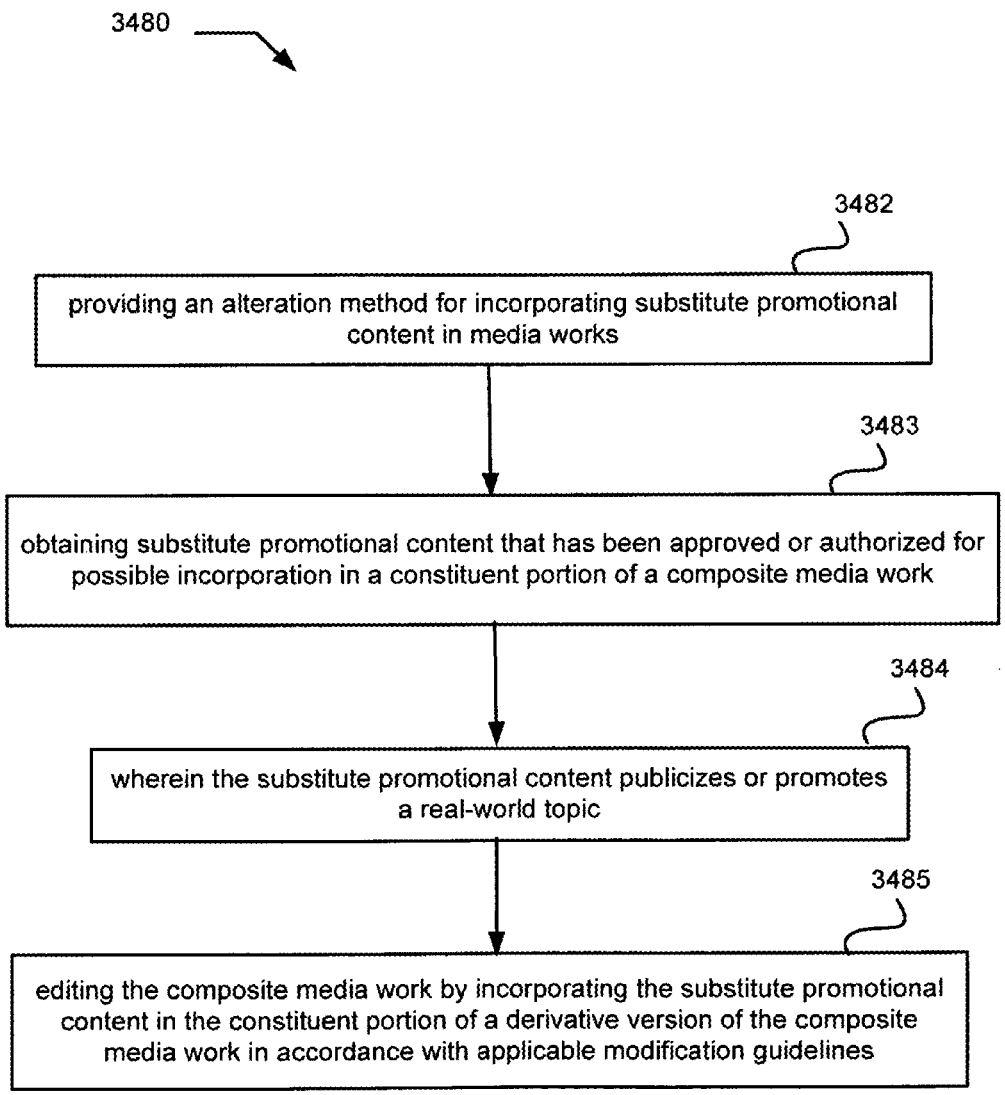
FIG. 86 is a high level flow chart that illustrates an additional exemplary process embodiment related to the incorporation of promotional content in a media work.

The high level flow chart of FIG. 86 illustrates an exemplary process embodiment 3480 that may include providing an alteration method for incorporating substitute promotional content in media works (block 3482), and obtaining substitute promotional content that has been approved or authorized for possible incorporation in a constituent portion of a composite media work (block 3483).

Some embodiments may further include obtaining such substitute promotional content, wherein the substitute promotional content publicizes or promotes a real-world topic (block 3484). A further possible enhancement may include editing the composite media work by incorporating the substitute promotional content in the constituent portion of a derivative version of the composite media work in accordance with applicable modification guidelines (block 3485).

Figure 87:
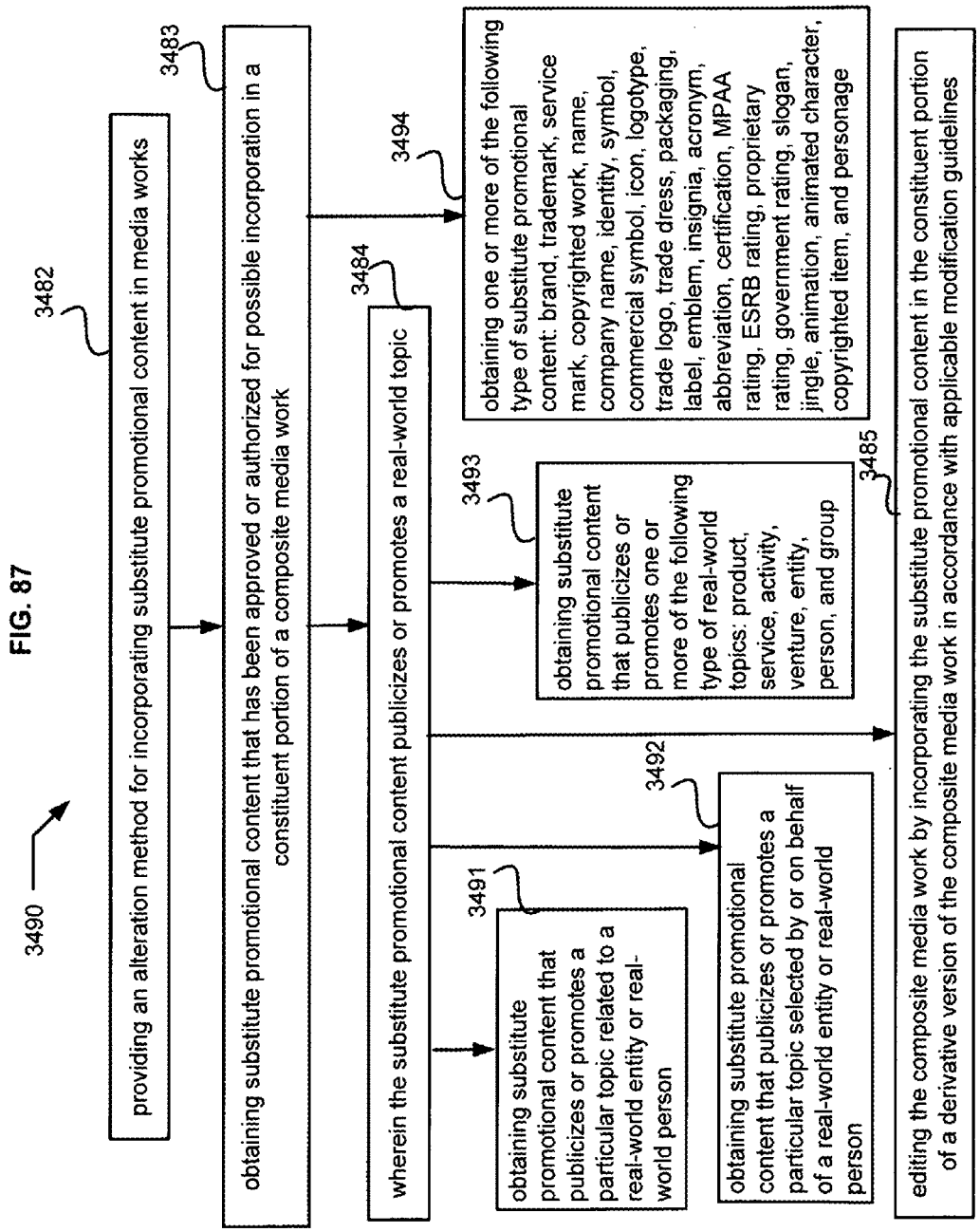
FIGS. 87-88 are more detailed flow charts illustrating further possible features that may be implemented in an exemplary process embodiment.

Referring to possible embodiment features 3490 illustrated in the detailed flow chart of FIG. 87, the previously described process operations 3482, 3483, 3484, 3485 may be combined with obtaining substitute promotional content that publicizes or promotes a particular topic related to a real-world entity or real-world person (block 3491). A further possible process feature may include obtaining substitute promotional content that publicizes or promotes a particular topic selected by or on behalf of a real-world entity or real-world person (block 3492).

In some instances, obtaining substitute promotional content may further include obtaining substitute promotional content that publicizes or promotes one or more of the following type of real-world topics: product, service, activity, venture, entity, person, and group (block 3493). Additional process possibilities may include obtaining one or more of the following type of substitute promotional content: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage (block 3494).

Figure 88:
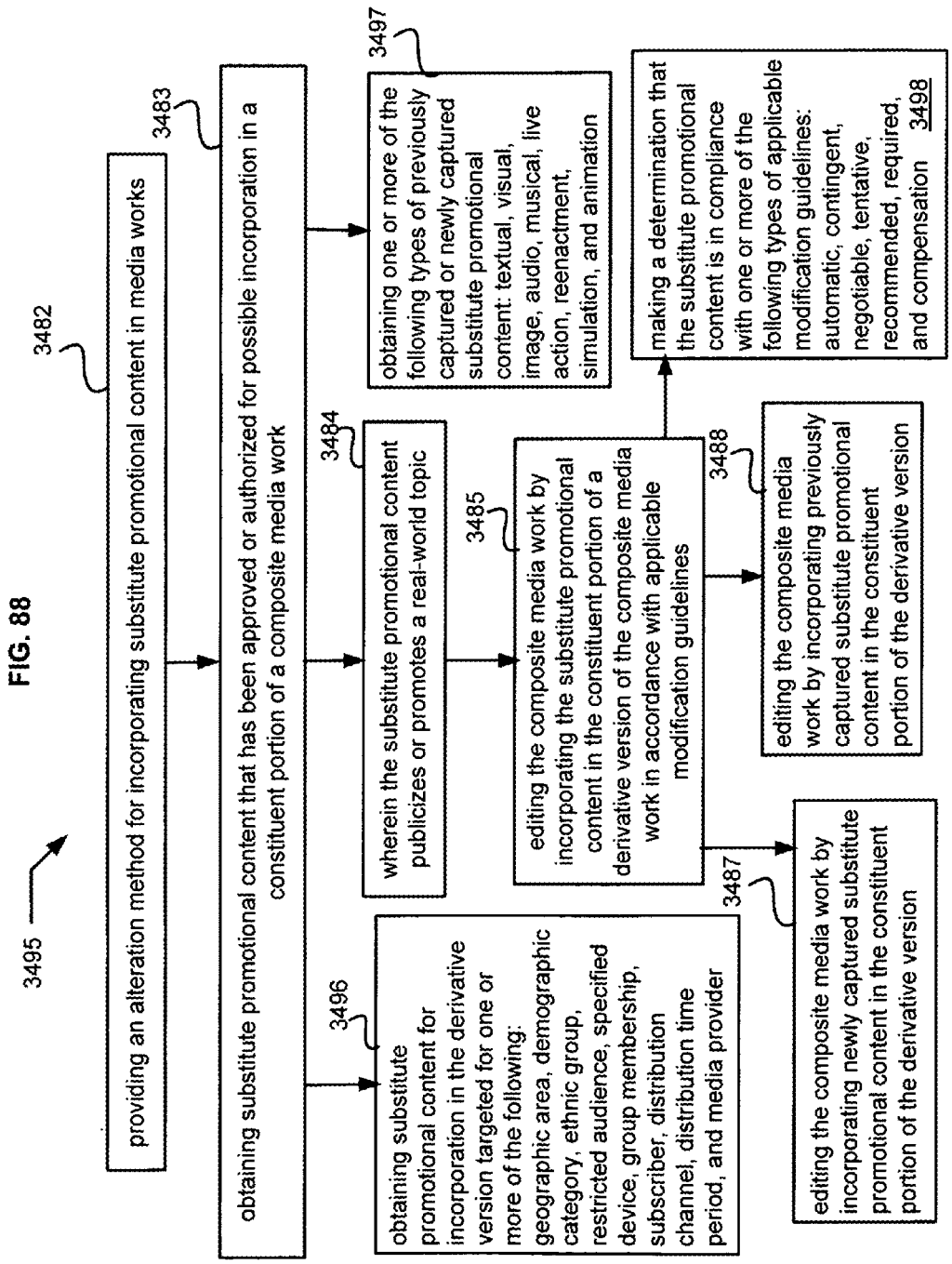

The detailed flow chart of FIG. 88 depicts additional possible embodiment features 3495 such as previously described features 3482, 3483, 3484, 3485 along with obtaining substitute promotional content for incorporation in the derivative version targeted for one or more of the following: geographic area, demographic category, ethnic group, restricted audience, specified device, group membership, subscriber, distribution channel, distribution time period, and media provider (block 3496). Further possible enhancements may include obtaining one or more of the following types of previously captured or newly captured substitute promotional content: textual, visual, image, audio, musical, live action, reenactment, simulation, and animation (block 3497).

In some instances a process embodiment may further include making a determination that the substitute promotional content is in compliance with one or more of the following types of applicable modification guidelines: automatic, contingent, negotiable, tentative, recommended, required, and compensation (block 3498).

As shown in FIG. 88, other possible process enhancements may include editing the composite media work by incorporating newly captured substitute promotional content in the constituent portion of the derivative version (block 3487), and editing the composite media work by incorporating previously captured substitute promotional content in the constituent portion of the derivative version (block 3488).

Figure 89:
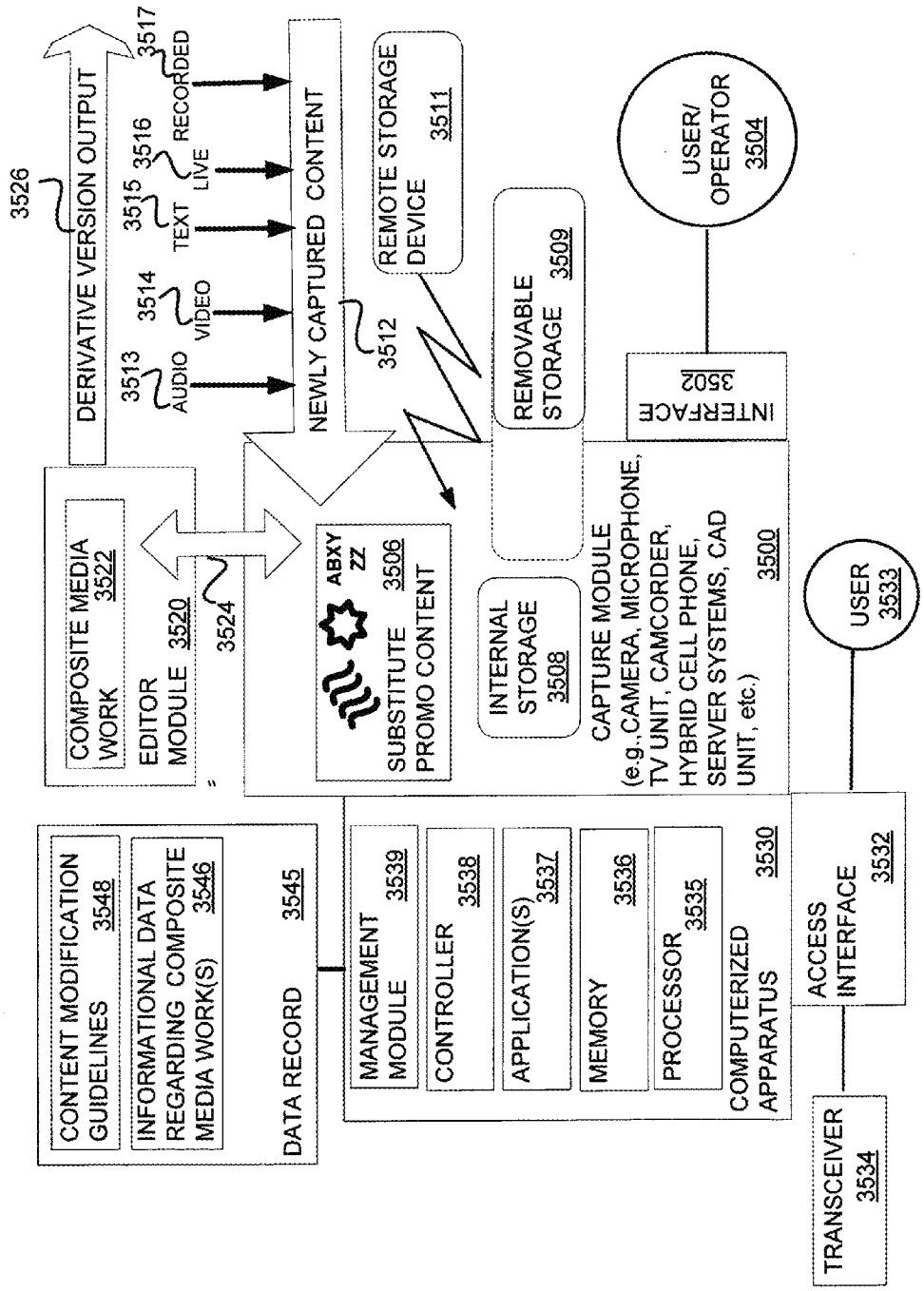
FIG. 89 is a schematic block diagram of an exemplary system embodiment for implementation of promotional content alteration of media works.

Referring to the schematic block diagram of FIG. 89, an exemplary system embodiment may include capture module 3500 and interface 3502 that is accessible to a user/operator 3504 or other appropriate party. The capture module 3500 may include many types of devices capable of obtaining (e.g., creating, storing, retrieving, combining, etc.) substitute promotional content 3506, including but not limited to camera modules, microphones, television units (e.g., receiver, transmitter), camcorders, multi-function hybrid cell phones, server systems, CAD units, etc. The capture module 3500 may include editor module 3520 as part of an integral or collective unit. Cooperative interaction may be provided via a communication interconnect 3524 in order to facilitate the editing of a composite media work 3522 that results in providing a derivative version output 3526.

The substitute promotional content 3506 may be obtained from newly captured content 3512 as well as from media content located in internal storage 3508, removable storage 3509 or remote storage device 3511. Newly captured content may include separate or combined exemplary data input elements such as audio 3513, video 3514, text 3515, live 3516 and recorded 3517 content. Of course it will be understood that newly captured content 3512 may be used separately and also used in combination with previously captured content obtained from various storage locations 3508, 3509, 3511 in order to create the substitute promotional content 3506. The examples given are for purposes of illustration only and are not intended to be limiting.

The exemplary system embodiment of FIG. 89 may include data records 3545 that are linked to computerized apparatus 3530 having an access interface 3532 for user 3533. The access interface 3532 may also provide an interactive communication link with appropriate interested parties via transceiver 3534. Such data records 3545 may include informational data regarding one or more composite media works 3546, and may further include content modification guidelines 3548 applicable to such composite media works 3546.

The computerized apparatus 3530 illustrated in the exemplary embodiment of FIG. 89 may be operatively coupled to capture module 3500 and editor module 3520. It will be understood that various data management and data processing functions may be accomplished by computerized apparatus 3530 which includes processor 3535, memory 3536, one or more applications 3537, controller 3538, and management module 3539. Of course other local or remote computerized devices may also be used for such data management and data processing functions regarding substitute promotional content 3506 and its incorporation into a derivative version output 3526.

Figure 90:
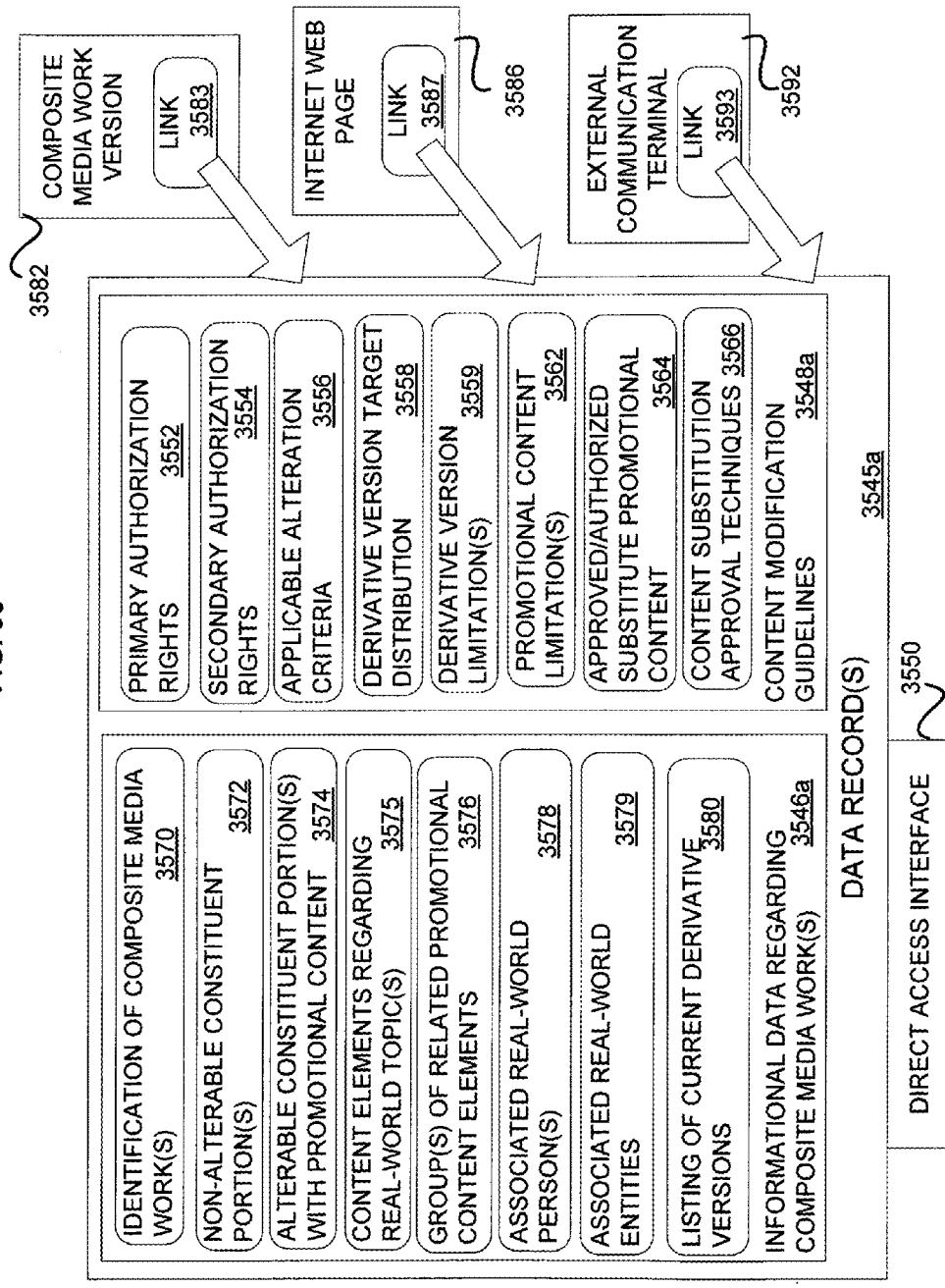
FIG. 90 is a schematic diagram depiction of an exemplary system embodiment of accessible data records regarding substitute promotional content for composite media works.

Referring to the schematic diagram of FIG. 90, additional possible embodiment features are depicted regarding the data records 3545 of FIG. 89. For example, data records 3545a may be accessible via a direct access interface 3550 as well as from an external communication terminal 3592 via link 3593. Additional accessibility may be provided from an Internet web page 3586 via link 3587. In some instances accessibility may also be provided via link 3583 from composite media work version 3582.

FIG. 90 also illustrates additional possible features that may be included in the informational data regarding composite media works 3546 of FIG. 89. For example, the informational data regarding composite media works 3546a may include identification of one or more composite media works 3570, as well as the following related information regarding such composite media works: non-alterable constituent portions 3572, alterable constituent portions with promotional content 3574, content elements regarding real-world topics 3575, and groups of related promotional content elements 3576. Additional informational data regarding alterable content elements in such composite media works may relate to associated real-world persons 3578 and associated real-world entities 3579. Other possible data records may provide a listing of current derivative versions 3580 of such composite media works.

FIG. 90 also illustrates additional possible data features that may be included in the content modification guidelines 3548 of FIG. 89. For example, detailed information regarding content modification guidelines 3548a applicable to certain composite media works (e.g., see identification of composite media works 3570) may include primary authorization rights 3552, secondary authorization rights 3554, and applicable alteration criteria 3556. Further detailed information regarding the content modification guidelines 3548a for such composite media works may include derivative version target distribution 3558, derivative version limitations 3559, and promotional content limitations 3562.

Other possible types of information may include approved/authorized substitute promotional content 3564 and content substitution approval techniques 3566 regarding such composite media works. It will be understood that various representations of substitute promotional content can be considered for incorporation as well as actually incorporated in a derivative version of a composite media work. For example, various different representative exemplars (e.g., story board, printout, still frames, thumbnail excerpt, analog file, digital file, merged file, screen display, textual transcript, etc.) of such substitute promotional content may be transmitted, displayed, viewed, considered (e.g., rejected, partially reject, etc), authorized, approved (e.g., pre-approved), and ultimately incorporated in accordance with applicable modification guidelines 3548 and approval techniques 3566.

As illustrated in the various exemplary system embodiments, computerized apparatus may be operably coupled to the data record and to the capture device, wherein the computerized apparatus facilitates incorporating the substitute promotional content in the derivative version. In some instances an editor module may be configured to incorporate in the derivative version one or more of the following categories of substitute promotional content: related set of designated aspects, related set of alterable components, identical objects, same object in different scenes, and same object in different settings. A further possible system enhancement may include an editor module configured to incorporate substitute promotional content in the derivative version targeted for one or more of the following: geographic area, demographic category, ethnic group, restricted audience, specified devices, group membership, subscriber, distribution channel, distribution time period, and media provider.

Other possible system embodiments may provide an editor module configured to incorporated substitute promotional content in the derivative version targeted for one or more of the following distribution channels: Internet, network, cable, satellite, wireless, broadcast, narrowcast, download, upload, shared, concurrent, streaming audio, streaming video, packet switching, and storage media delivery.

Other possible system implementations may include a capture module capable of obtaining one or more of the following type of substitute promotional content: textual, verbal, visual, image, audio, musical, live action, reenactment, simulation, and animation. In some instances a system embodiment may provide a capture module capable of obtaining substitute promotional content having one or more of the following type of content elements associated with the real-world entity or the real-world person: product, service, and activity.

Further exemplary system possibilities may include a capture module capable of obtaining substitute promotional content having one or more of the following type of content elements associated with the real-world entity or the real-world person: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating. Other exemplary system embodiments may include a capture module capable of obtaining substitute promotional content having one or more of the following type of content elements associated with the real-world entity or real-world person: livery, color scheme, dress, fabric, jewelry, pattern, design, sculpture, artistic work, musical work, composition, publication, document, event, exhibit, performance, person, animal, mascot, character, obscured attribute, highlighted attribute, and avatar.

Additional exemplary system features may include a capture module capable of obtaining substitute promotional content having one or more of the following type of designated aspects associated with the real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Further exemplary system embodiments may provide computerized apparatus that includes a management module configured to coordinate compliance with applicable modification guidelines regarding the composite media work. Such compliance with modification guidelines may include compliance with certain primary authorization rights and with applicable alteration criteria.

Some exemplary system data records may include modification guidelines regarding a media format limitation for the derivative version that incorporates the substitute promotional content, and in some instances may include modification guidelines regarding a limitation allowing or precluding one or more of the following media formats for the derivative version: analog, digital, VHS, CD, VCD, SVCD, DVD, HD, HD DVD, Blu-ray, MPEG, MP3, reformatted, upgraded, downgraded, future format standard, video snippet, digitized vignette, data compression, and data decompression.

Additional exemplary system data records may include modification guidelines regarding a limitation allowing or precluding one or more distribution channels for the derivative version that incorporates the substitute altered content, and may further include modification guidelines regarding a limitation allowing or precluding one or more of the following type of distribution channels for the derivative version: Internet, network, cable, satellite, wireless, broadcast, narrowcast, download, upload, shared, concurrent, streaming audio, streaming video, packet switching, and storage media delivery.

It will be further understood that some system data record embodiments may include informational data that identifies the real-world entity or a real-world person associated with substituted promotional content incorporated in the derivative version of the composite media work.

Of course some illustrated types of data records disclosed herein may not be necessary, and additional related records may be maintained, depending on the circumstances. Some exemplary system embodiments involving substitute promotional content may further include a management module operably configured to coordinate compliance with modification guidelines that may include alteration criteria applicable to a composite media work.

Figure 91:
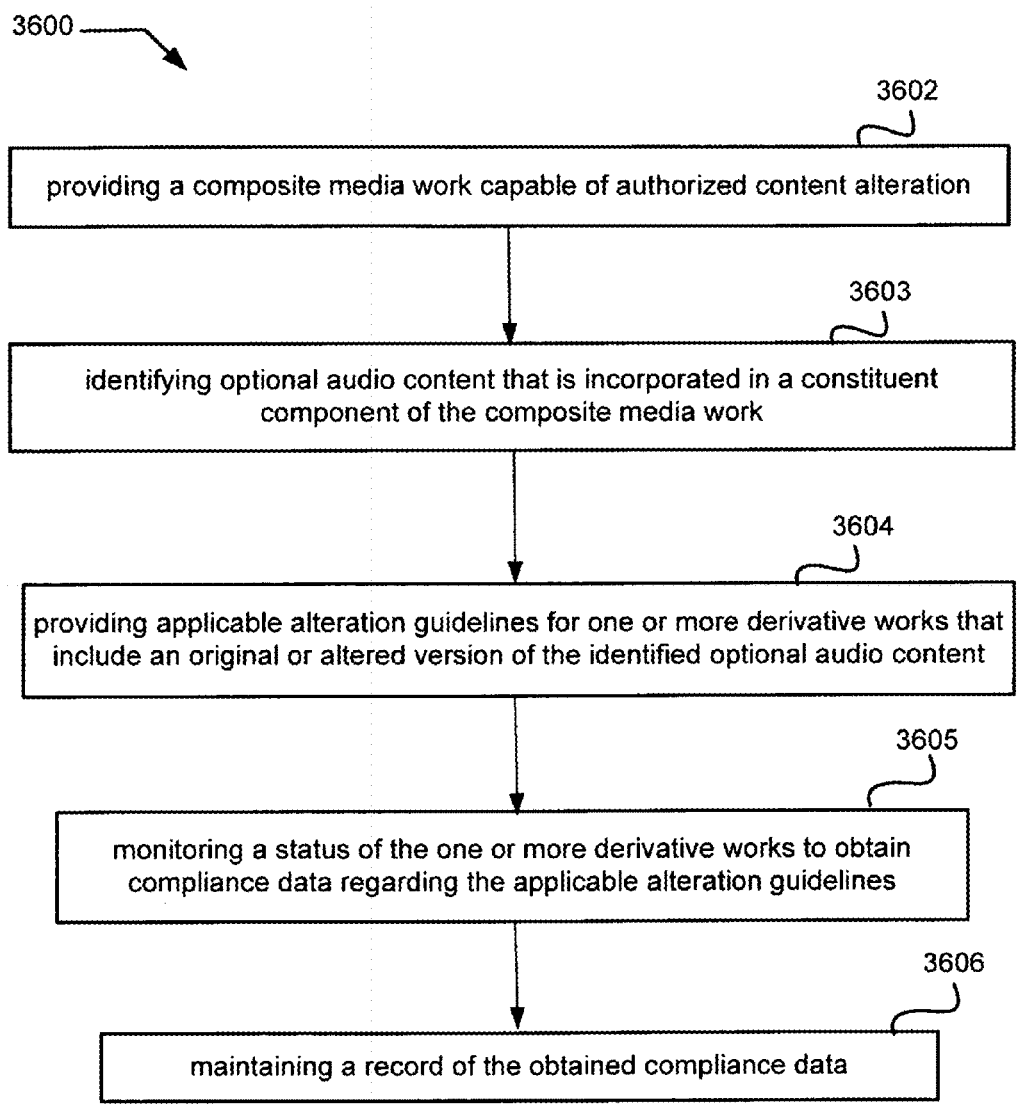
FIG. 91 is a high level flow chart that illustrates an exemplary process embodiment relating to a content alteration regarding audio elements in a media work.

Referring to the exemplary process features 3600 depicted in FIG. 91, an exemplary embodiment regarding audio substitution options may include providing a composite media work capable of authorized content alteration (block 3602), identifying optional audio content that is incorporated in a constituent component of the composite media work (block 3603), and providing applicable alteration guidelines for one or more derivative works that include an original or altered version of the identified optional audio content (block 3604). Other possible process components may include monitoring a status of the one or more derivative works to obtain compliance data regarding the applicable alteration guidelines (block 3605), and maintaining a record of the obtained compliance data (block 3606).

Figure 92:
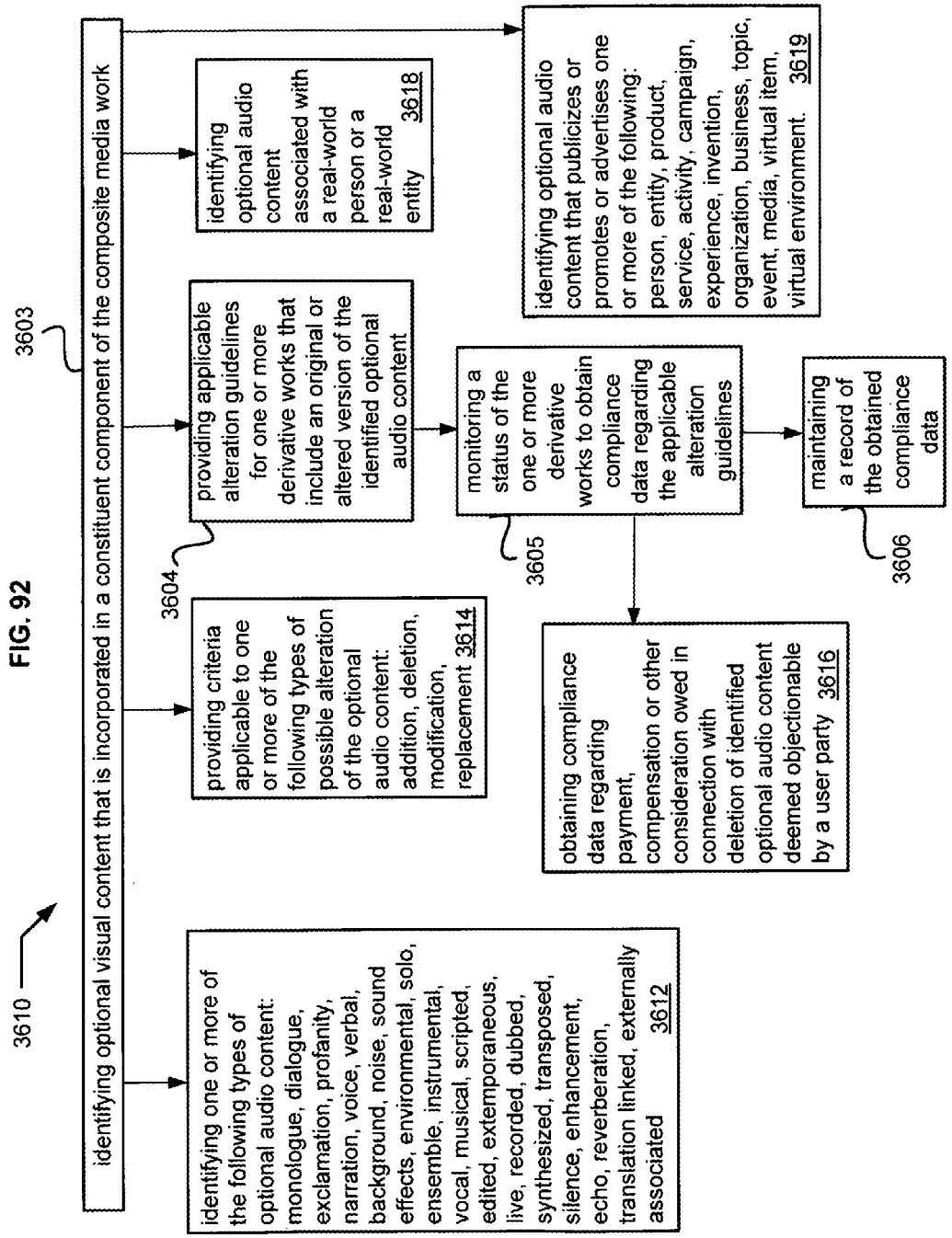
FIGS. 92-96 are more detailed flow charts illustrating additional exemplary process embodiment features.

Additional possible operational features 3610 are illustrated in FIG. 92, which includes previously described process components 3603, 3604, 3605, 3606 in combination with identifying one or more of the following types of optional audio content: monologue, dialogue, exclamation, profanity, narration, voice, verbal, background, noise, sound effects, environmental, solo, ensemble, instrumental, vocal, musical, scripted, edited, extemporaneous, live, recorded, dubbed, synthesized, transposed, silence, enhancement, echo, reverberation, translation, linked, externally associated (block 3612). A further operational feature may include providing criteria applicable to one or more of the following types of possible alteration of the optional audio content: addition, deletion, modification, replacement (block 3614).

A further exemplary embodiment feature may include obtaining compliance data regarding payment, compensation, or other consideration owed in connection with deletion of identified optional audio content deemed objectionable by a user party (block 3616). Other possible features may include identifying optional audio content associated with a real-world person or a real-world entity (block 3618). In some instances an exemplary process may include identifying optional audio content that publicizes or promotes or advertises one or more of the following: person, entity, product, service, activity, campaign, experience invention, organization, business, topic, event, media, virtual item, virtual environment (block 3619).

Figure 93:
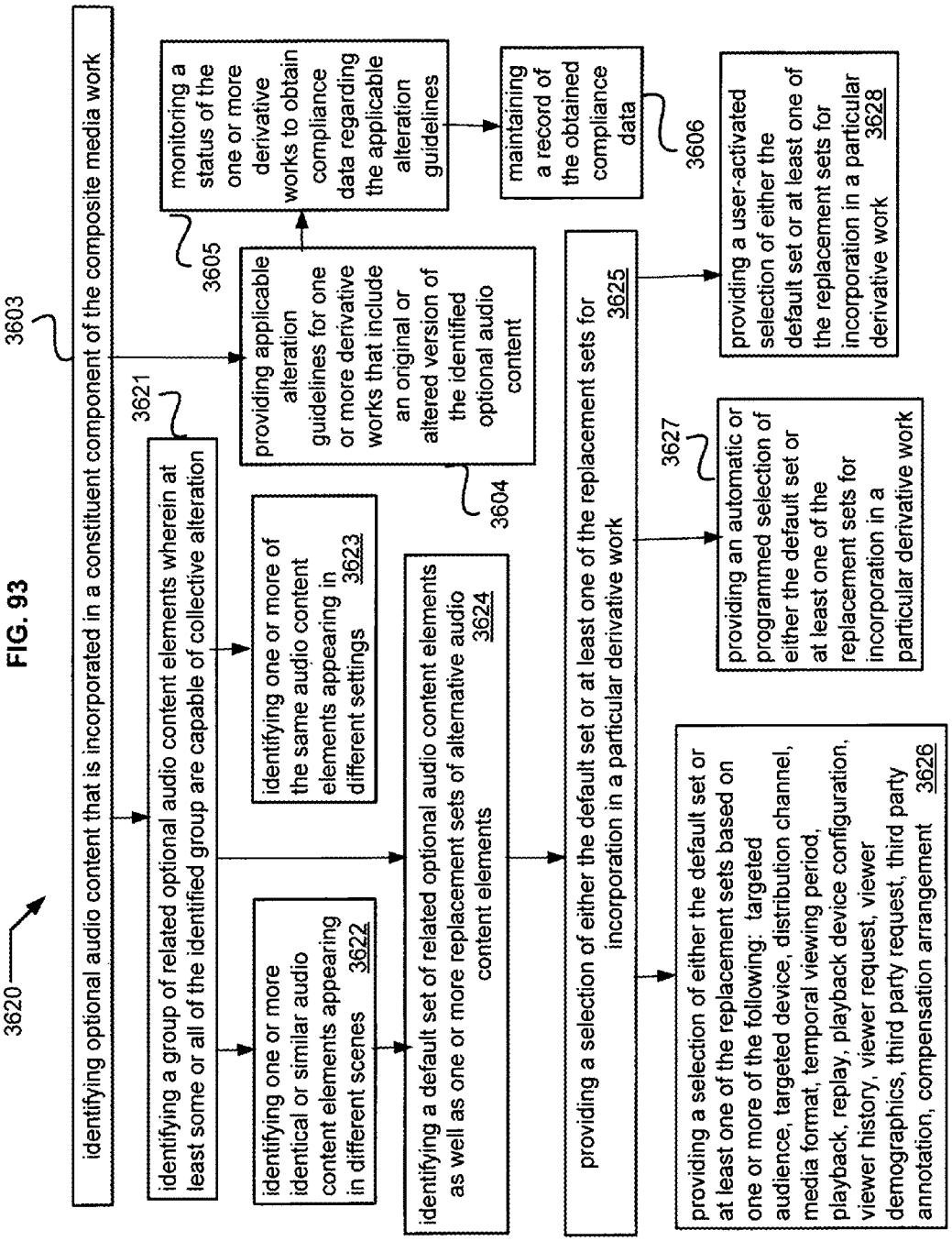

Additional exemplary features 3620 illustrated in FIG. 93 may include previously described operations 3603, 3604, 3605, 3606 as well as identifying a group of related optional audio content elements wherein at least some or all of the identified group are capable of collective alteration (block 3621). Related operations may include identifying one or more identical or similar audio content elements appearing in different scenes (block 3622), and identifying one or more of the same audio content elements appearing in different settings (block 3623).

FIG. 93 also illustrates a possibility of identifying a default set of related optional audio content elements as well as one or more replacement sets of alternative audio content elements (block 3624). A related possible operation may include providing a selection of either the default set or at least one of the replacement sets for incorporation in a particular derivative work (block 3625).

Some exemplary implementations may provide a selection of either the default set or at least one of the replacement sets based on one or more of the following: targeted audience, targeted device, distribution channel, media format, temporal viewing period, playback, replay, playback device configuration, viewer history, viewer request, viewer demographics, third party request, third party annotation, compensation arrangement (block 3626). A further possible process feature may include providing an automatic or programmed selection of either the default set or at least one of the replacement sets for incorporation in a particular derivative work (block 3627). Some embodiments may include providing a user-activated selection of either the default set or at least one of the replacement sets for incorporation in a particular derivative work (block 3628).

Figure 94:
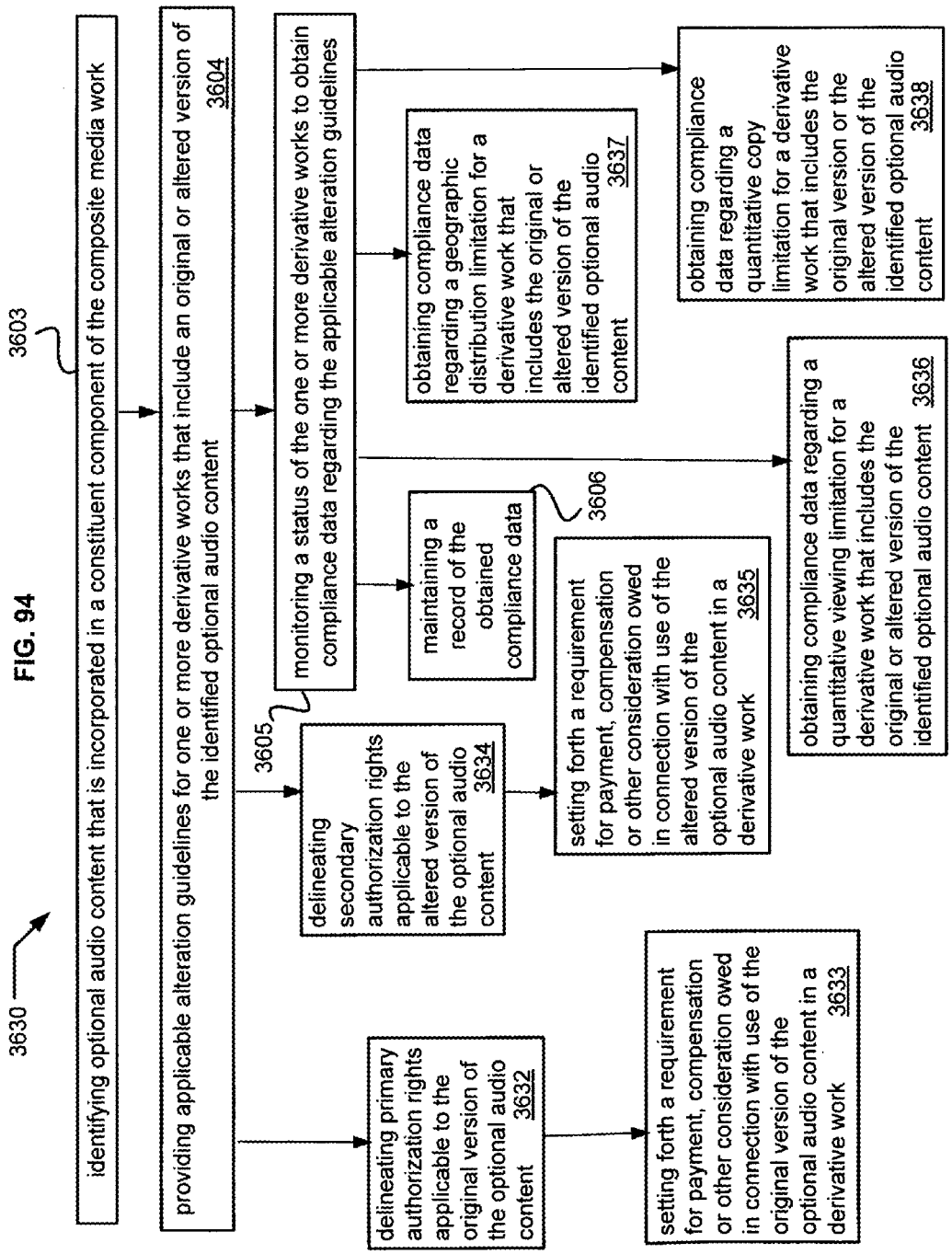

Referring to the exemplary process features 3630 of FIG. 94, an embodiment may include previously described operations 3603, 3604, 3605, 3606 along with delineating primary authorization rights applicable to the original version of the optional audio content (block 3632). Another possibility includes setting forth a requirement for payment, compensation or other consideration owed in connection with use of the original version of the optional audio content in a derivative work (block 3633).

A further exemplary feature may include delineating secondary authorization rights applicable to the altered version of the optional audio content (block 3634). A possible operation feature may include setting forth a requirement for payment, compensation or other consideration owed in connection with use of the altered version of the optional audio content in a derivative work (block 3635).

Additional implementation possibilities may include obtaining compliance data regarding various types of limitations for derivative works. For example, such limitations may include a geographic distribution limitation for a derivative work that includes the original version or the altered version of the optional audio content (block 3637). Other embodiments may include obtaining compliance data regarding a quantitative viewing limitation for a derivative work that includes the original version or the altered version of the optional audio content (block 3636). Another operational feature may include obtaining compliance data regarding a quantitative copy limitation for a derivative work that includes the original version or the altered version of the optional audio content (block 3638).

Figure 95:
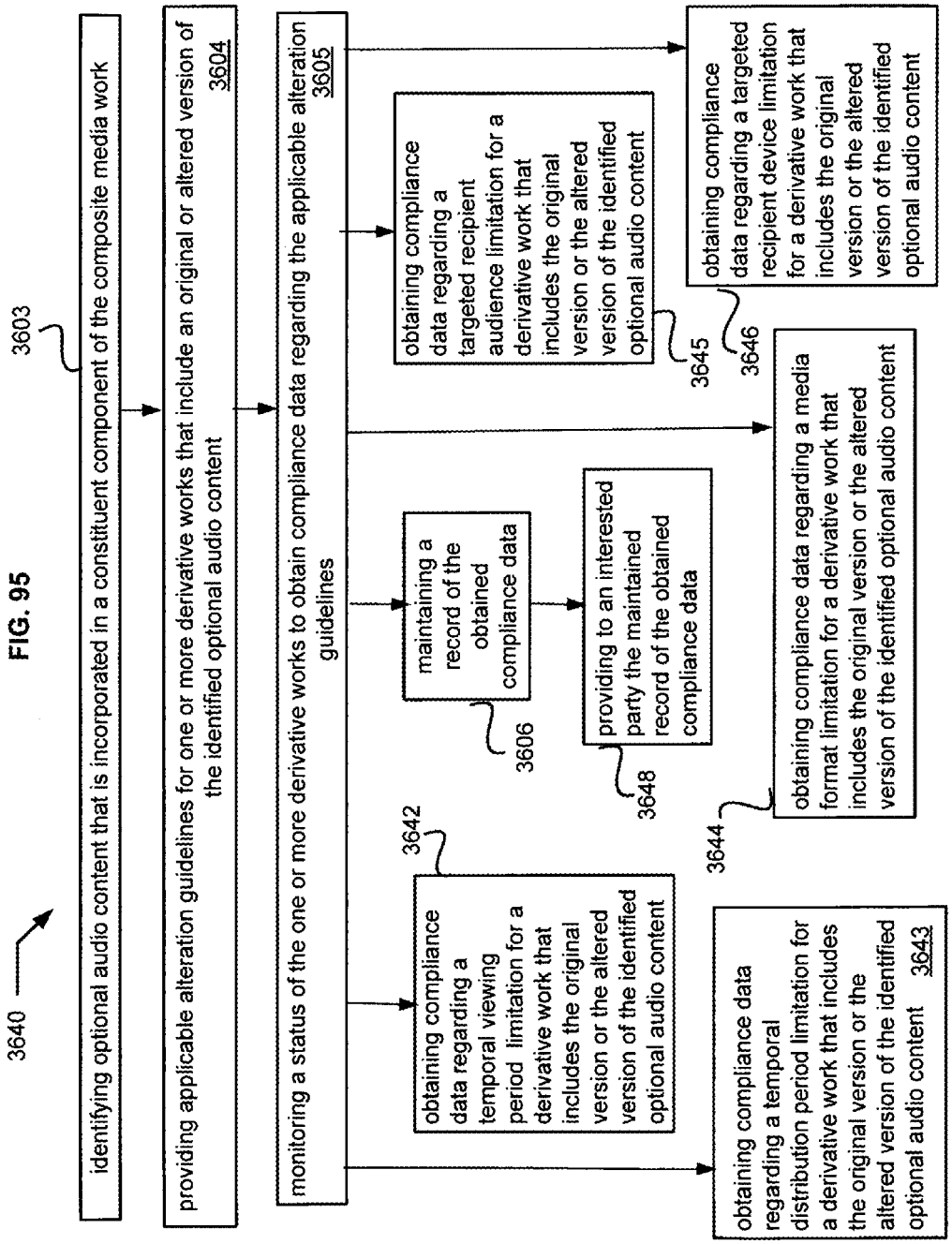

The detailed flow chart of FIG. 95 illustrates possible operation features 3640 that include previously described process components 3603, 3604, 3605, 3606 in combination with compliance data regarding other exemplary derivative work limitations. For example, exemplary operational features may include obtaining compliance data regarding a temporal viewing period limitation for a derivative work that includes the original version or the altered version of the optional audio content (block 3642). Another related exemplary operation may include obtaining compliance data regarding a temporal distribution period limitation for a derivative work that includes the original version or the altered version of the optional audio content (block 3643).

Further possibilities may include obtaining compliance data regarding a targeted recipient audience limitation for a derivative work that includes the original version or the altered version of the optional audio content (block 3645). In some instances a further operation feature may include obtaining compliance data regarding a targeted recipient device limitation for a derivative work that includes the original version or the altered version of the optional audio content (block 3646).

Also depicted in FIG. 95 is another exemplary process component that includes obtaining compliance data regarding a media format limitation for a derivative work that includes the original version or the altered version of such optional audio content (block 3644). A further enhancement may include providing to an interested party the maintained record of the obtained compliance (block 3648).

Figure 96:
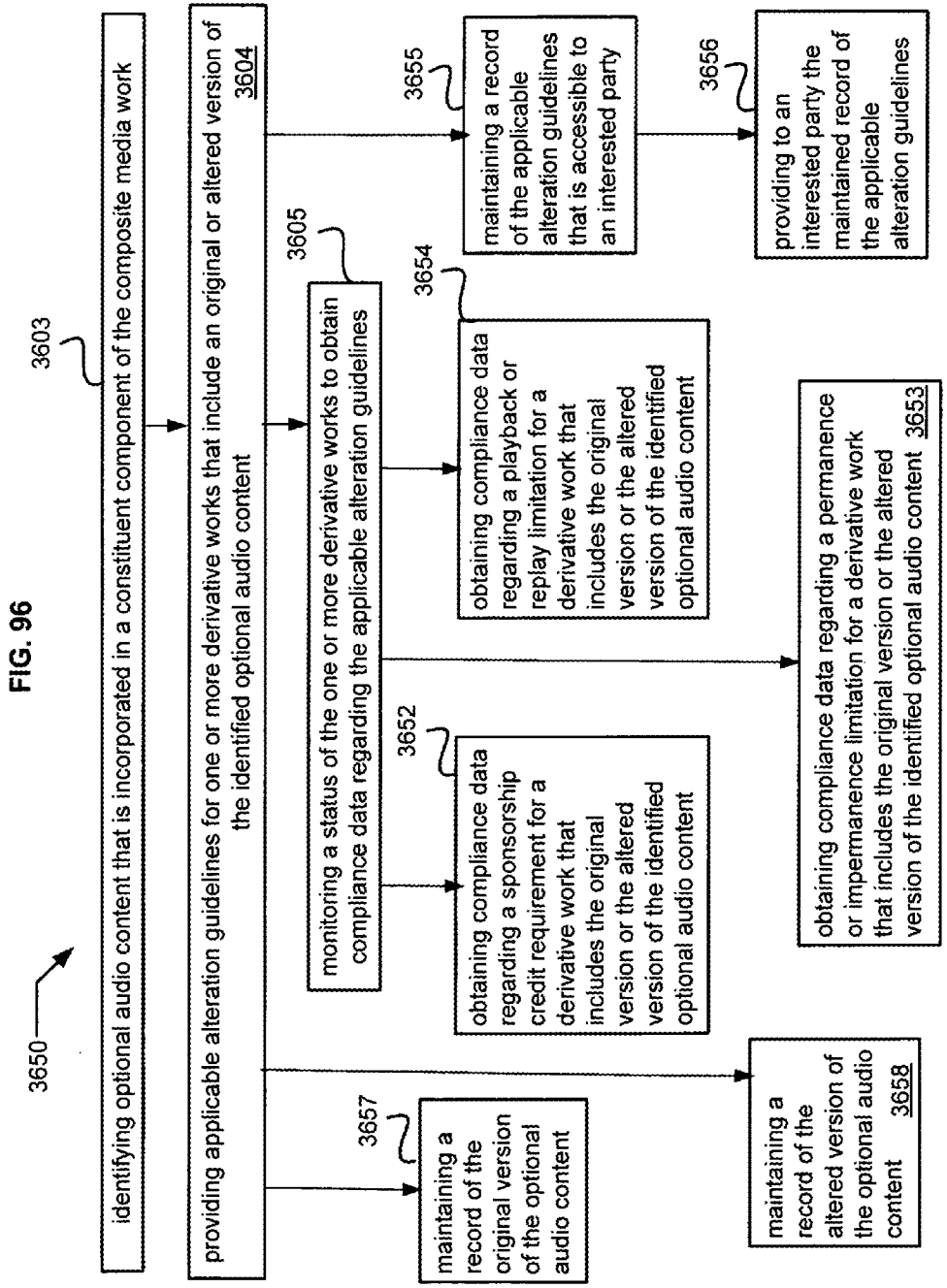

Referring now to the detailed flow chart of FIG. 96, exemplary operational features 3650 may include previously described process components 3603, 3604, 3605 along with obtaining compliance data regarding a sponsorship credit requirement for a derivative work that includes the original version or the altered version of such optional audio content (block 3653). Another possible process feature may include obtaining compliance data regarding a playback or replay limitation for a derivative work that includes the original version or the altered version of such optional audio content (block 3654).

Further process possibilities may include obtaining compliance data regarding a permanence or impermanence limitation for a derivative work that includes the original version or the altered version of such optional audio content (block 3653). Additional process components may include maintaining a record of the applicable alteration guidelines that is accessible to an interested party (block 3655), and providing to an interested party the maintained record of the applicable alteration guidelines (block 3656).

In some instances an exemplary embodiment may include maintaining a record of the original version of the optional audio content (block 3657). Another possibility may include maintaining a record of the altered version of the optional audio content (block 3658).

Figure 97:
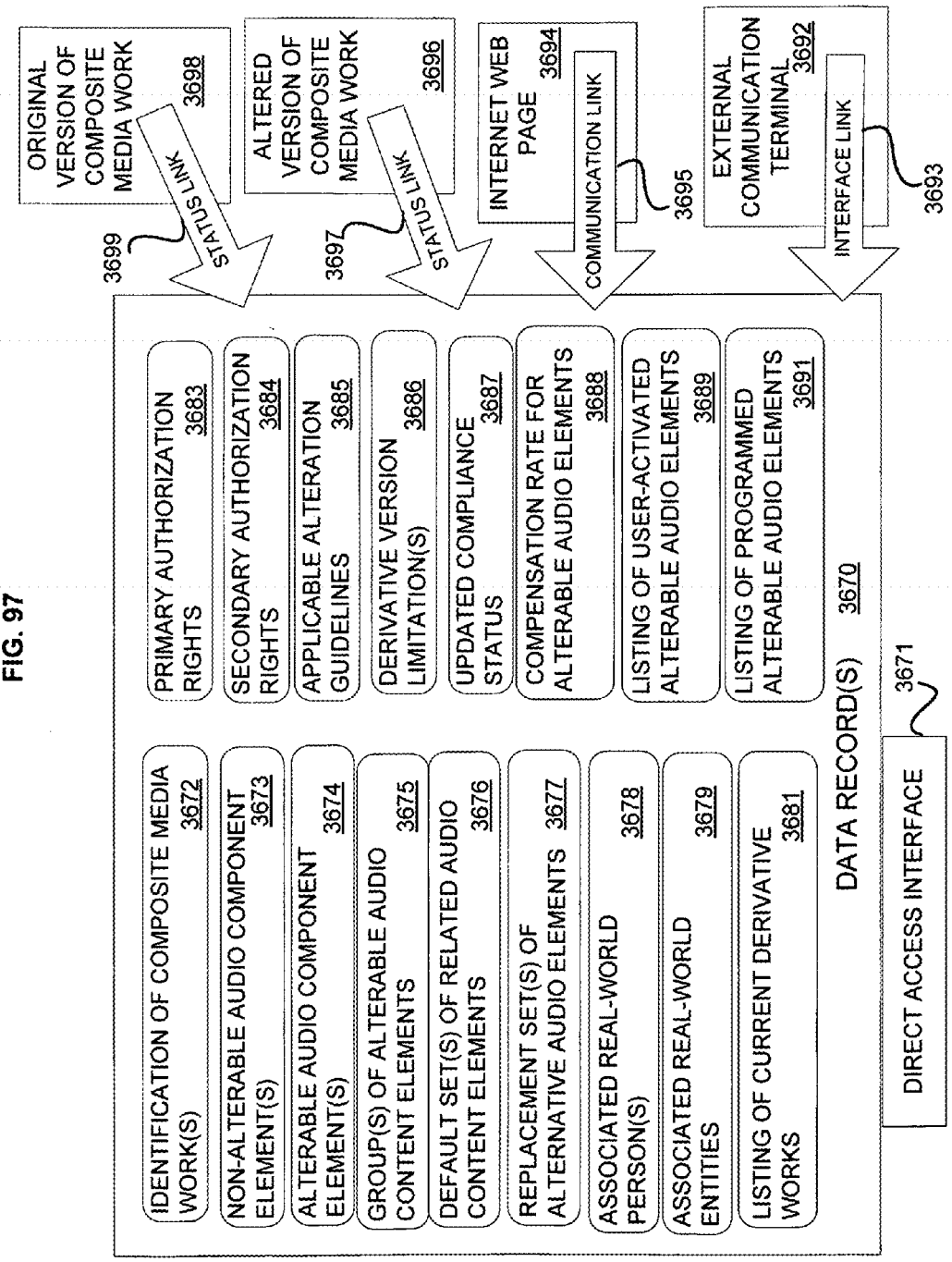
FIG. 97 is a schematic diagram that depicts an exemplary system embodiment for data records that includes various audio content alteration features.

The schematic diagram of FIG. 97 shows an exemplary system embodiment for maintaining various data records 3670 regarding audio substitution options in connection with composite media works. The data records 3670 may be managed and viewed via a direct access interface 3671, and may include identification of composite media works 3672 that are capable of authorized content alteration. Other information included in the exemplary system records regarding derivative works may include non-alterable audio component elements 3673, alterable audio component elements 3674, as well as groups of alterable audio content elements 3675. Additional record categories may include one or more default sets of related audio content elements 3676, and one or more replacement sets of alternative audio elements 3677.

In some embodiments the system records may further include a listing of associated real-world persons 3678 and associated real-world entities 3679 for the optional audio content, and also a listing of current derivative works 3681. Further possible record categories may include primary authorization rights 3683 for an original version of identified optional audio content, and may also include secondary authorization rights 3684 for an altered version of identified optional audio content.

Additional data possibilities may include applicable alteration guidelines 3685 for identified optional audio content, derivative version limitations 3686, and updated compliance status 3687 for the various derivative works. In that regard the data records 3670 may be accessible via a status link 3699 for an original version of a composite media work 3698, and may also be accessible via a status link 3697 for an altered version of a composite media work 3696.

It will be understood that both read and/or write accessibility to interested parties will help to assure the accuracy of information maintained in the data records 3670. Such accessibility may in some instances be provided via a communication link 3695 from an Internet web page 3694, and may also be provided via an interface link 3693 from an external communication terminal 3692. Of course, other types of access links may be provided depending on the circumstances.

Additional types of informational data records in some instances may include a compensation rate (e.g., payment, consideration, etc.) for alterable audio elements 3688, a listing of user-activated alterable audio elements 3689, and a listing of programmed alterable audio elements 3691 (e.g., automated, predetermined, contingent, etc.).

Of course certain types of informational data records may be deemed unnecessary in some embodiments, and additional information data records may be helpful in other embodiments depending on the circumstances. It should be understood that the exemplary system devices and modules shown in the drawings and described herein are for purposes of illustration only and are not intended to be limiting.

It will be understood that exemplary systems are disclosed herein for possible content alteration of a composite media work having one or more optional audio component elements that are feasible for alteration and are included in a constituent portion of the composite media work. Some embodiments may include applicable alteration guidelines for one or more derivative works that include an original or altered version of the optional audio component elements. In some instances a system may include a data record of compliance data regarding the applicable alteration guidelines, wherein the data record is maintained to be accessible to an interested party.

Additional exemplary system embodiments disclosed herein for implementing audio content alteration of a media work may include a composite media work having a constituent component configured to include one or more optional audio elements, and a capture device having a capability to obtain specified optional audio content confirmed to be in compliance with applicable alteration guidelines regarding possible audio content alteration of the composite media work. Other possible system components may include an editor module operatively coupled to the capture device and configured to incorporate the specified optional audio content in a derivative version of the composite media work. Another system feature may provide a data record of status information regarding the confirmed compliance with the applicable alteration guidelines.

It will be further understood that the various process components disclosed herein may be incorporated in one or more computer programs having instructions encoded on computer readable media to execute a process that may include identifying a composite media work having one or more related audio content elements feasible for alteration, wherein the related content elements form a constituent portion of the composite media work. Additional instructions may further execute a process that includes maintaining a first data record of applicable alteration guidelines for one or more derivative works that include an original or altered version of the identified optional audio content, and maintaining a second data record of compliance data for the one or more derivative works regarding applicable alteration guidelines.

Other possible process embodiments disclosed herein may be implemented in computer readable media bearing encoded instructions for executing a process that includes identifying a composite media work having a constituent component configured to include one or more optional audio elements, obtaining specified optional audio content confirmed to be in compliance with applicable alteration guidelines regarding possible audio content alteration of the composite media work, and incorporating the specified optional audio content in a derivative version of the composite media work. Other programmed process operations may include maintaining a data record of status information regarding the confirmed compliance with the applicable alteration guidelines.

Figure 98:
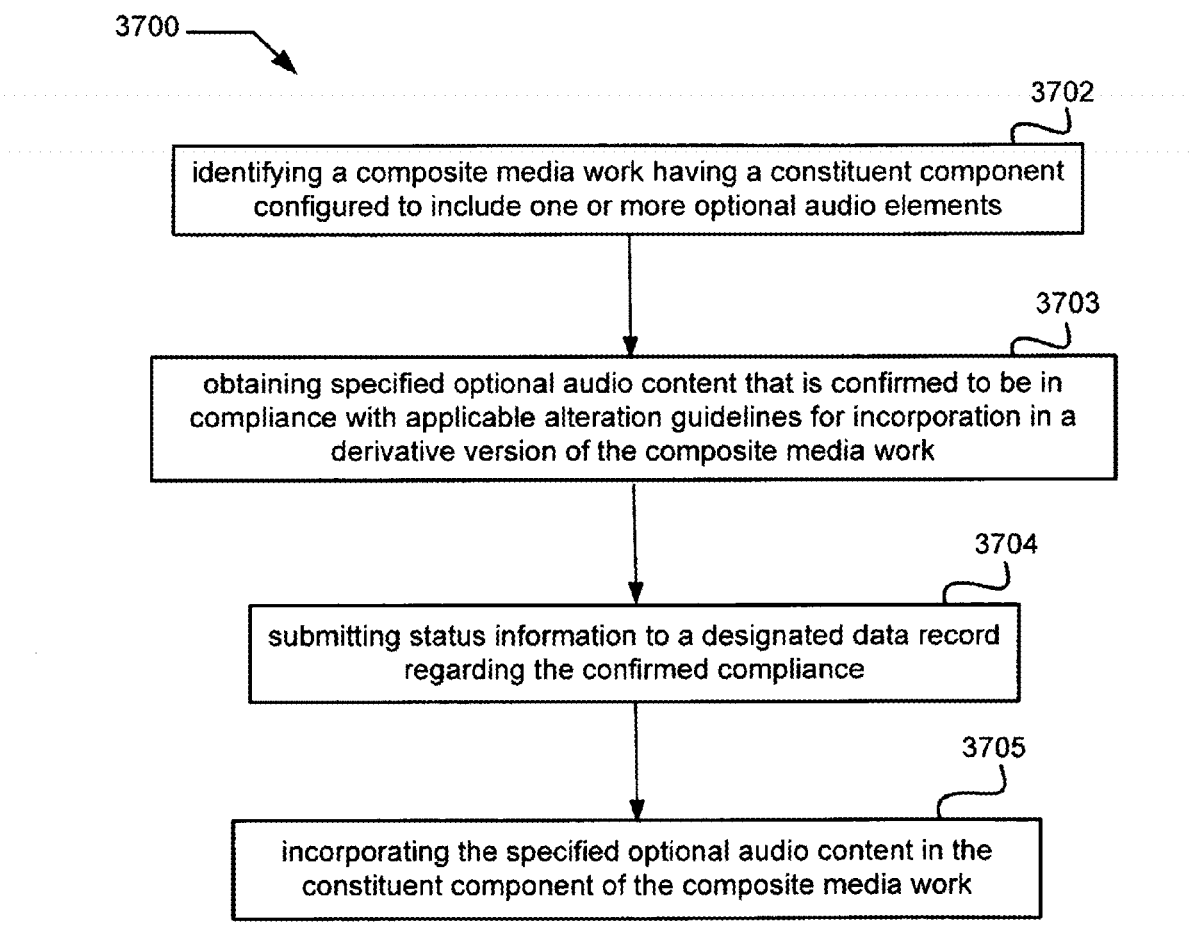
FIG. 98 is a high level flow chart illustrating another exemplary process embodiment relating to implementing substitute audio elements in a media work.

Referring to FIG. 98, an exemplary high level embodiment may provide an exemplary method of implementing authorized content alteration in a media work. Possible operational features may include identifying a composite media work having a constituent component configured to include one or more optional audio elements (block 3702), obtaining specified optional audio content that is confirmed to be in compliance with applicable alteration guidelines for incorporation in a derivative version of the composite media work (block 3703), submitting status information to a designated data record regarding the confirmed compliance (block 3704), and incorporating the specified optional audio content in the constituent component of the composite media work (block 3705).

Figure 99:
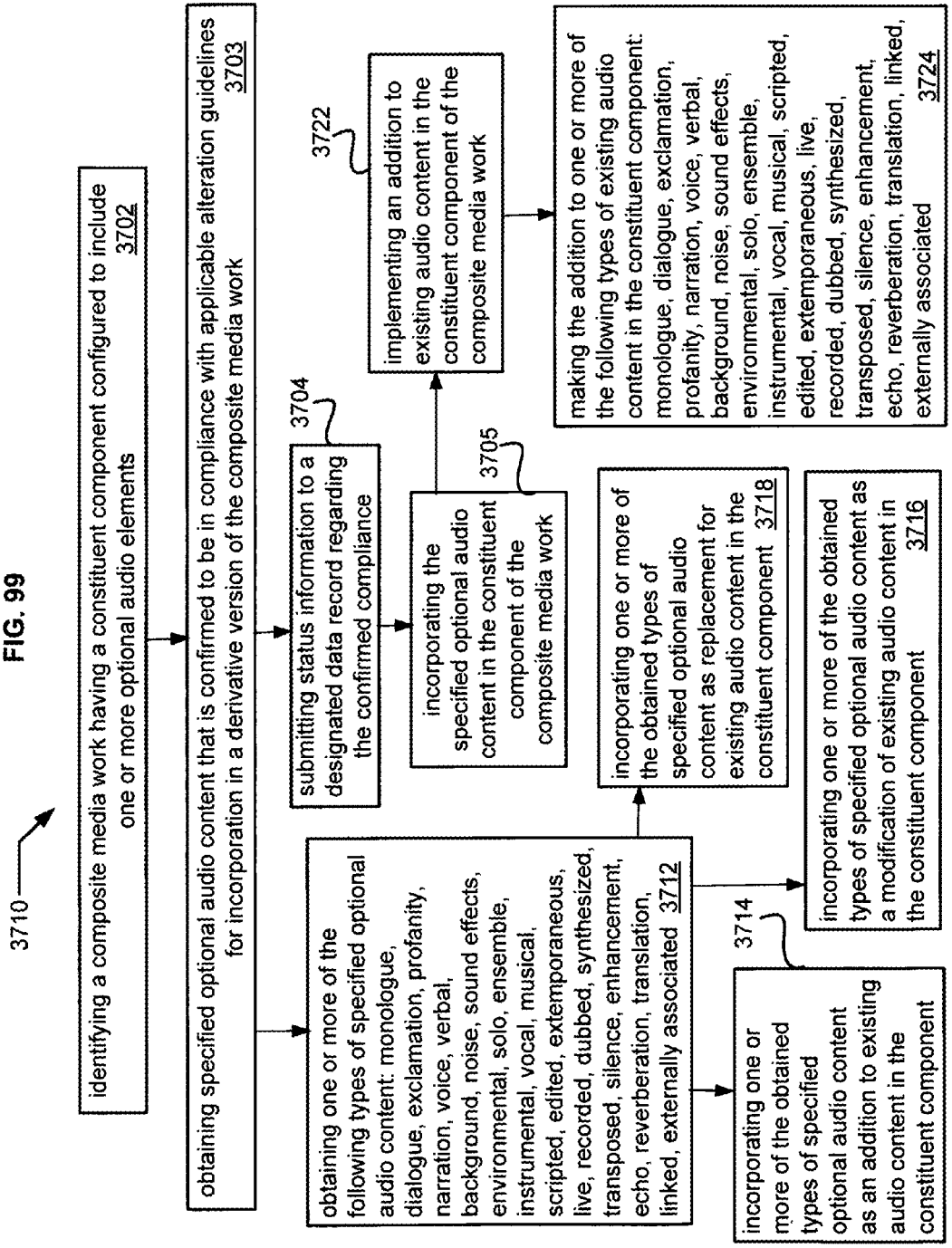
FIGS. 99-103 are more detailed flow charts depicting further exemplary process embodiment features.

Various possible process features 3710 are depicted in the flow chart of FIG. 99, including previously described operations 3702, 3703, 3704, 3705 along with obtaining one or more of the following types of specified optional audio content: monologue, dialogue, exclamation, profanity, narration, voice, verbal, background, noise, sound effects, environmental, solo, ensemble, instrumental, vocal, musical, scripted, edited, extemporaneous, live, recorded, dubbed, synthesized, transposed, silence, enhancement, echo, reverberation, translation, linked, externally associated (block 3712).

In some instances one or more of the aforesaid types of obtained specified optional audio content may be incorporated in the constituent component of the composite media work. For example, a possible operation may include incorporating such a type of specified optional audio content as an addition to existing audio content in the constituent component (block 3714), or as a modification of existing audio content in the constituent component (block 3716), or as a replacement for existing audio content in the constituent component (block 3718).

Additional process possibilities are illustrated in FIG. 99 regarding alteration of a constituent component configured to include one or more optional audio elements. In some instances a possible operation may include implementing an addition to existing audio content in the constituent component of the composite media work (block 3722); such an exemplary operation may include making the addition to one or more of the following types of existing audio content in the constituent component: monologue, dialogue, exclamation, profanity, narration, voice, verbal, background, noise, sound effects, environmental, solo, ensemble, instrumental, vocal, musical, scripted, edited, extemporaneous, live, recorded, dubbed, synthesized, transposed, silence, enhancement, echo, reverberation, translation, linked, externally associated (block 3724).

Figure 100:
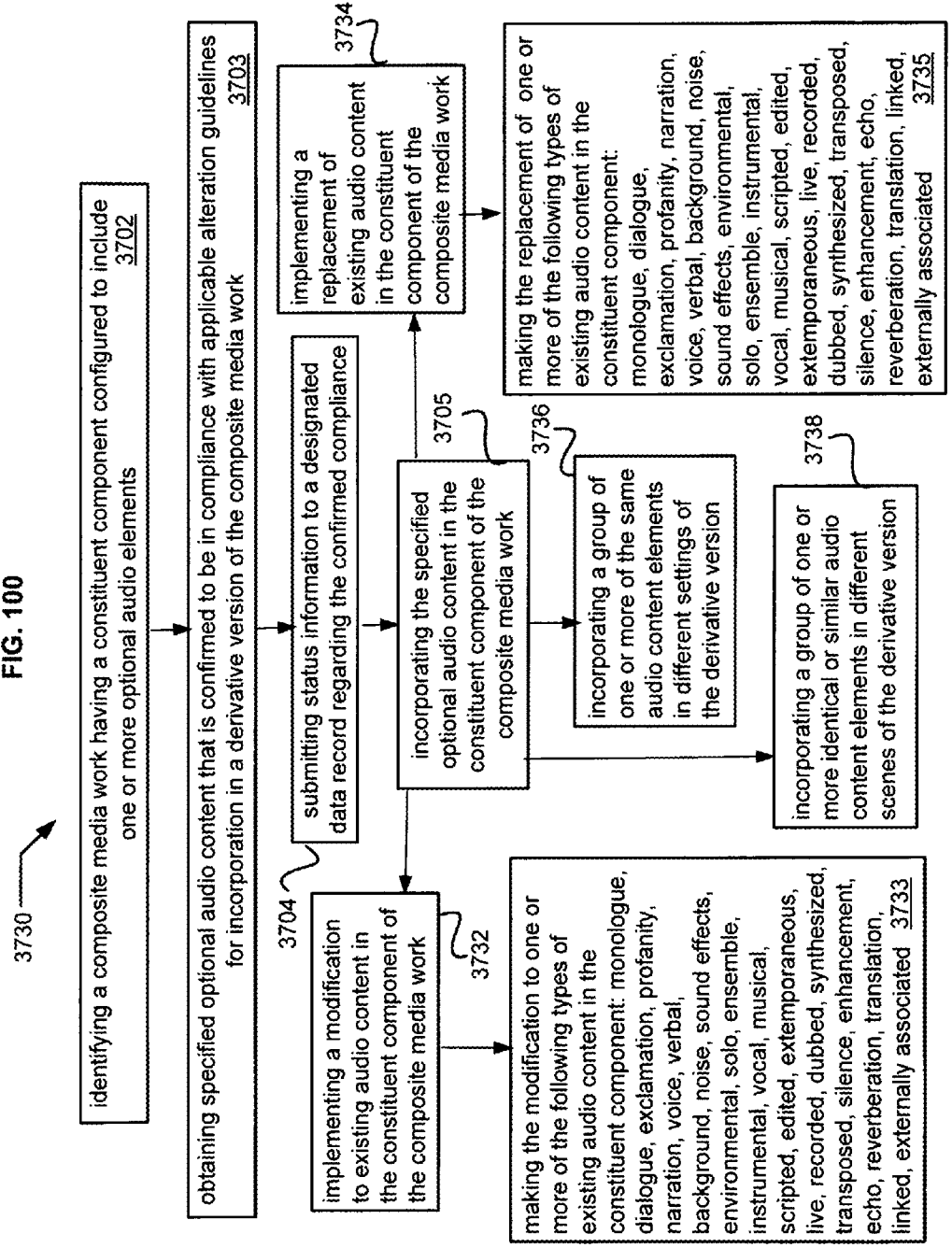

Various embodiment features 3730 are depicted in the flow chart of FIG. 100, including previously described operations 3702, 3703, 3704, 3705. Another possible operation may include implementing a modification to existing audio content in the constituent component of the composite media work (block 3732); such an exemplary operation may include making the modification to one or more of the following types of existing audio content in the constituent component: monologue, dialogue, exclamation, profanity, narration, voice, verbal, background, noise, sound effects, environmental, solo, ensemble, instrumental, vocal, musical, scripted, edited, extemporaneous, live, recorded, dubbed, synthesized, transposed, silence, enhancement, echo, reverberation, translation, linked, externally associated (block 3733).

A further possible operation may include implementing a replacement of existing audio content in the constituent component of the composite media work (block 3734); such an exemplary operation may include making the replacement of one or more of the following types of existing audio content in the constituent component: monologue, dialogue, exclamation, profanity, narration, voice, verbal, background, noise, sound effects, environmental, solo, ensemble, instrumental, vocal, musical, scripted, edited, extemporaneous, live, recorded, dubbed, synthesized, transposed, silence, enhancement, echo, reverberation, translation, linked, externally associated (block 3735).

Also depicted in FIG. 100 are exemplary process features that include incorporating a group of one or more identical or similar audio content elements in different scenes of the derivative version (block 3736). Other possible process features may include incorporating a group of one or more of the same audio content elements in different settings of the derivative version (block 3738).

Figure 101:
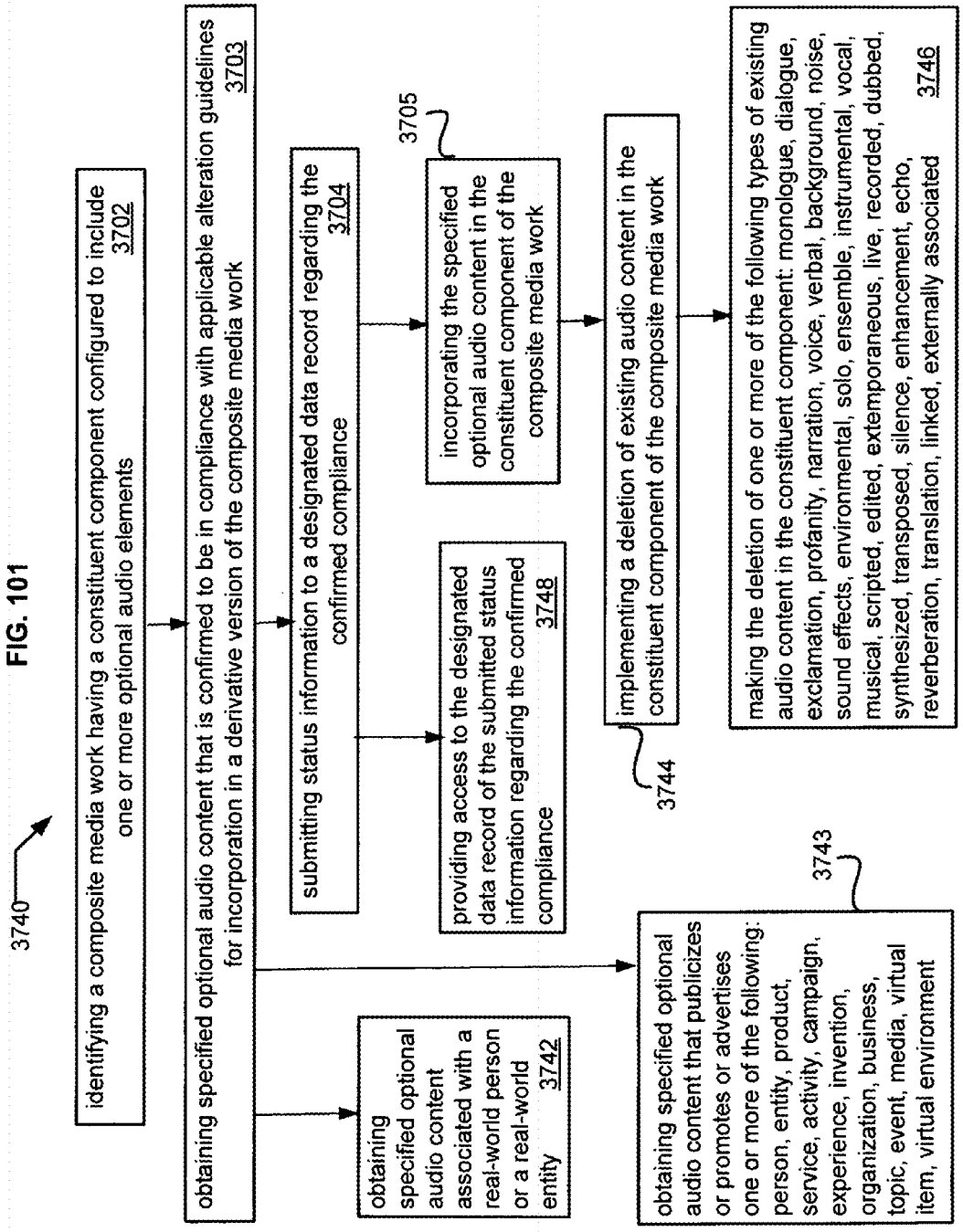

Referring to the exemplary embodiment features 3740 of FIG. 101, previously described operations 3702, 3703, 3704, 3705 are shown in combination with obtaining specified optional audio content associated with a real-world person or a real-world entity (block 3742). Another possible operation may include obtaining specified optional audio content that publicizes or promotes or advertises one or more of the following: person, entity, product, service, activity, campaign, experience, invention, organization, business, topic, event, media, virtual item, virtual environment (block 3743).

In some instances an exemplary process feature may include implementing a deletion of existing audio content in the constituent component of the composite media work (block 3744); such an exemplary process feature may include making the deletion of one or more of the following types of existing audio content in the constituent component: monologue, dialogue, exclamation, profanity, narration, voice, verbal, background, noise, sound effects, environmental, solo, ensemble, instrumental, vocal, musical, scripted, edited, extemporaneous, live, recorded, dubbed, synthesized, transposed, silence, enhancement, echo, reverberation, translation, linked, externally associated (block 3746).

An additional possibility may include providing access to the designated data record of the submitted status information regarding the confirmed compliance (block 3748).

Figure 102:
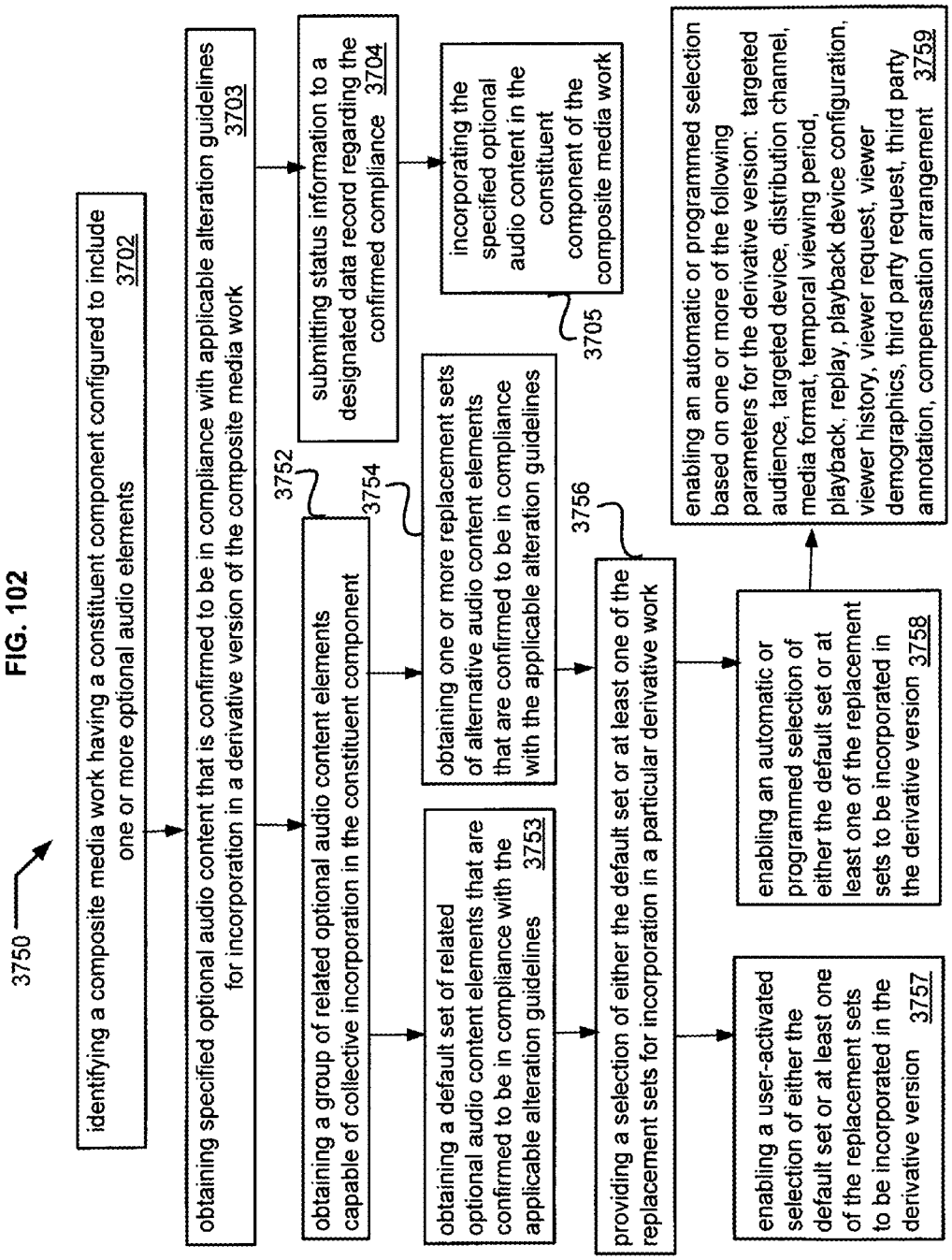

The detailed flow chart of FIG. 102 depicts additional exemplary embodiment features 3750 that include previously described operations 3702, 3703, 3704, 3705 as well as obtaining a group of related optional audio content elements capable of collective incorporation in the constituent component (block 3752). In some instances an operation may include obtaining a default set of related optional audio content elements that are confirmed to be in compliance with the applicable alteration guidelines (block 3753). Another possible operation may include obtaining one or more replacement sets of alternative audio content elements that are confirmed to be in compliance with the applicable alteration guidelines (block 3754).

As further illustrated in FIG. 102, an embodiment may provide a selection of either the default set or at least one of the replacement sets for incorporation in a particular derivative work (block 3756). For example, a possible feature may include enabling a user-activated selection of either the default set or at least one of the replacement sets to be incorporated in the derivative version (block 3757). As another example, a further possible feature may include enabling an automatic or programmed selection of either the default set or at least one of the replacement sets to be incorporated in the derivative version (block 3758). A related exemplary feature may include enabling an automatic or programmed selection based on one or more of the following parameters for the derivative version: targeted audience, targeted device, distribution channel, media format, temporal viewing period, playback, replay, playback device configuration, viewer history, viewer request, viewer demographics, third party request, third party annotation, compensation arrangement (block 3759).

Figure 103:
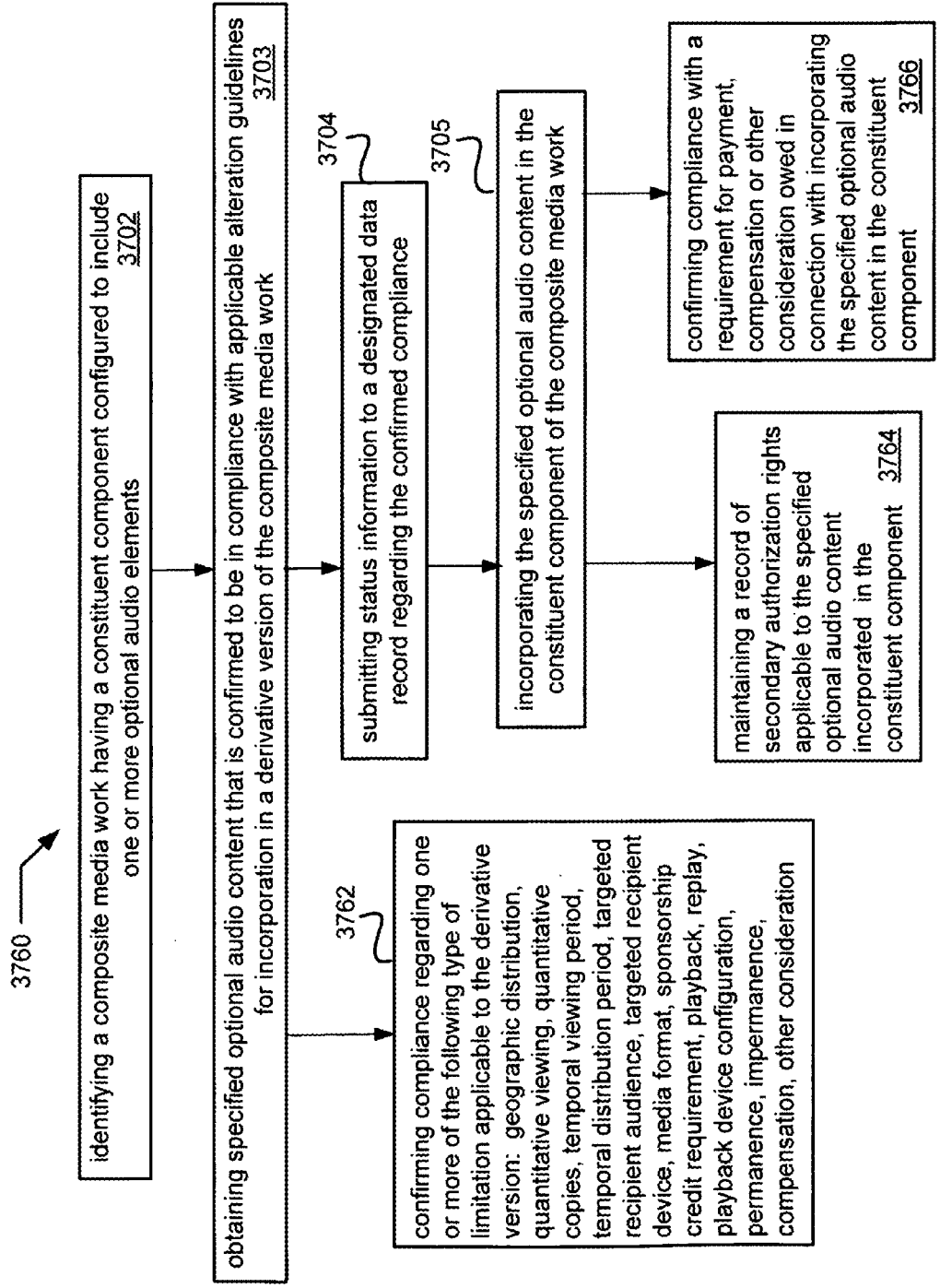

Referring to FIG. 103, some additional exemplary operations 3760 are illustrated along with previously described operation 3702, 3703, 3704, 3705. For example in some instances a process feature may include confirming compliance regarding one or more of the following type of limitation applicable to the derivative version: geographic distribution, quantitative viewing, quantitative copies, temporal viewing period, temporal distribution period, targeted recipient audience, targeted recipient device, media format, sponsorship credit requirement, playback, replay, playback device configuration, permanence, impermanence, compensation, other consideration (block 3762).

An additional exemplary process feature may include maintaining a record of secondary authorization rights applicable to the specified optional audio content incorporated in the constituent component (block 3764). In some instances an exemplary embodiment may also include a process component that includes confirming compliance with a requirement for payment, compensation or other consideration owed in connection with incorporating the specified optional audio content in the constituent component (block 3766).

The exemplary system, apparatus, and computer program product embodiments disclosed herein including FIGS. 1-2, FIGS. 12-13, FIGS. 16-26, FIGS. 34-35, FIGS. 43-44, FIGS. 55-56, FIGS. 67-68, FIG. 75, FIGS. 84-85, FIGS. 89-90 and FIG. 97 along with other components, devices, know-how, skill and techniques known in the art have the capability of implementing and practicing the methods and processes shown in FIGS. 3-11, FIGS. 14-15, FIGS. 27-33, FIGS. 36-42, FIGS. 45-54, FIGS. 57-66, FIGS. 69-74, FIGS. 76-83, FIGS. 86-88, FIGS. 91-96, and FIGS. 98-103. However it is to be further understood by those skilled in the art that other systems, apparatus and technology may be used to implement and practice such methods and processes.

As disclosed herein, an exemplary classification method and system for possible content alteration of a media work may include criteria regarding content that is feasible for alteration. Such criteria may be maintained in records that are accessible to an interested party. Some embodiments may include a record of primary authorization rights applicable to a possible content alteration. A further embodiment feature may include a record of secondary authorization rights applicable to substitute altered content incorporated in a derivative version. Some embodiment implementations may include a derivative version of the media work wherein substitute content, such as an alterable component element having one or more designated aspects, is associated with a real-world entity or person. Various exemplary techniques may be used to provide audio and/or visual substitute options in a derivative version of the media work in accordance with applicable alteration guidelines, and the examples disclosed herein are not intended to be limiting.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As a further definition of "open" terms in the present specification and claims, it will be understood that usage of a language construction "A or B" is generally interpreted as a non-exclusive "open term" meaning: A alone, B alone, A and B together.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interactable and/or logically interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of implementing preferred image modification, comprising:
   receiving at least one media asset;
   determining at least one restricted image within the at least one media asset based at least partially on at least one concurrent image also within the at least one media asset, including at least determining at least one restriction related to at least one subject depicted in the at least one restricted image where the at least one media asset also includes the at least one concurrent image;
   identifying at least one real-world entity associated with the at least one subject depicted in the at least one restricted image, the at least one real-world entity including one or more of at least one person, at least one group, or at least one entity related to the at least one subject depicted in the at least one restricted image;
   determining at least one preference of the at least one real-world entity associated with the at least one subject depicted in the at least one restricted image, the at least one preference related to the at least one subject and the at least one concurrent image within the at least one media asset;
   modifying the at least one media asset to alter the at least one restricted image within the at least one media asset based at least partially on at least one determined preference; and
   outputting the modified at least one media asset including at least the altered at least one restricted image,
   wherein at least one of the receiving, determining at least one restricted image, identifying, determining at least one preference, modifying, or outputting is at least partially implemented using one or more processing devices.

2. A system for implementing preferred image modification, comprising:
   circuitry configured to receive at least one media asset;
   circuitry configured to determine at least one restricted image within the at least one media asset based at least partially on at least one concurrent image also within the at least one media asset, including at least determining at least one restriction related to at least one subject depicted in the at least one restricted image where the at least one media asset also includes the at least one concurrent image;
   circuitry configured to identify at least one real-world entity associated with the at least one subject depicted in the at least one restricted image, the at least one real-world entity including one or more of at least one person, at least one group, or at least one entity related to the at least one subject depicted in the at least one restricted image;
   circuitry configured to determine at least one preference of the at least one real-world entity associated with the at least one subject depicted in the at least one restricted image, the at least one preference related to the at least one subject and the at least one concurrent image within the at least one media asset;
   circuitry configured to modify the at least one media asset to alter the at least one restricted image within the at least one media asset based at least partially on at least one determined preference; and
   circuitry configured to output the modified at least one media asset including at least the altered at least one restricted image.

3. The system of claim 2, wherein circuitry configured to receive at least one media asset comprises:
   circuitry configured to receive at least one media asset, the at least one media asset at least one of publicizing, promoting, or advertising one or more of at least one product or at least one service.

4. The system of claim 2, wherein circuitry configured to receive at least one media asset comprises:
   circuitry configured to receive at least one indication of at least one media asset at a website, the at least one media asset at least one of publicizing, promoting, or advertising one or more of at least one product or at least one service.

5. The system of claim 2, wherein circuitry configured to output the modified at least one media asset including at least the altered at least one restricted image comprises:
   circuitry configured to cause at least one computing device associated with at least one user requesting playback of the at least one media asset to display the at least one media asset in association with displaying at least one other content concurrently, including at least transmitting at least a portion of the at least one media asset to the at least one computing device via the internet.

6. The system of claim 2, wherein circuitry configured to determine at least one restricted image within the at least one media asset based at least partially on at least one concurrent image also within the at least one media asset, including at least determining at least one restriction related to at least one subject depicted in the at least one restricted image where the at least one media asset also includes the at least one concurrent image comprises:
   circuitry configured to determine at least one restricted image within the at least one media asset based at least partially on at least one concurrent image also within the at least one media asset, including at least identifying at least one subject of the at least one concurrent image based at least partially on at least some metadata associated with the at least one media asset.

7. The system of claim 6, wherein circuitry configured to determine at least one restricted image within the at least one media asset based at least partially on at least one concurrent image also within the at least one media asset, including at least determining at least one subject of the at least one concurrent image based at least partially on at least some metadata associated with the at least one media asset comprises:
   circuitry configured to determine, based at least partially on the presence of at least one identified subject portrayed in the at least one media asset, that at least one other subject portrayed in the at least one media asset should be modified, the at least one other subject that should be modified portrayed by the at least one restricted image.

8. The system of claim 2, wherein circuitry configured to determine at least one restricted image within the at least one media asset based at least partially on at least one concurrent image also within the at least one media asset, including at least determining at least one restriction related to at least one subject depicted in the at least one restricted image where the at least one media asset also includes the at least one concurrent image comprises:
circuitry configured to determine, using recognition logic associated with the system, at least one subject of the at least one media asset subject to at least one restriction on concurrent media asset portrayal with at least one subject of the at least one concurrent image also within the at least one media asset.

9. The system of claim 2, wherein circuitry configured to identify at least one real-world entity associated with the at least one subject depicted in the at least one restricted image, the at least one real-world entity including one or more of at least one person, at least one group, or at least one entity related to the at least one subject depicted in the at least one restricted image comprises:
circuitry configured to identify at least one real-world entity associated with the at least one subject depicted in the at least one restricted image based at least partially on at least some metadata associated with the at least one media asset.

10. The system of claim 2, wherein circuitry configured to determine at least one preference of the at least one real-world entity associated with the at least one subject depicted in the at least one restricted image, the preference related to the at least one subject and the at least one concurrent image within the at least one media asset comprises:
circuitry configured to determine at least one preference of the at least one real-world entity associated with the at least one subject depicted in the at least one restricted image, the at least one preference including one or more of at least one level or at least one type of anonymization to be provided with respect to the at least one restricted image.

11. The system of claim 2, wherein circuitry configured to determine at least one preference of the at least one real-world entity associated with the at least one subject depicted in the at least one restricted image, the at least one preference related to the at least one subject and the at least one concurrent image within the at least one media asset comprises:
circuitry configured to determine at least one preference of the at least one real-world entity associated with the at least one subject depicted in the at least one restricted image, the at least one preference based at least partially on at least one identity of at least one recipient for the modified at least one media asset.

12. The system of claim 2, wherein circuitry configured to modify the at least one media asset to alter the at least one restricted image within the at least one media asset based at least partially on at least one determined preference comprises:
circuitry configured to modify the at least one media asset based at least partially on at least one indication of at least one copyright, including at least overlaying at least one content over the at least one media asset, the at least one content at least one of publicizing, promoting, or advertising one or more of at least one product or at least one service.

13. The system of claim 2, wherein circuitry configured to modify the at least one media asset to alter the at least one restricted image within the at least one media asset based at least partially on at least one determined preference comprises:
circuitry configured to modify the at least one media asset to alter the at least one restricted image, including at least modifying the at least one media asset while maintaining a general presentation context of the at least one media asset.

14. The system of claim 2, wherein circuitry configured to modify the at least one media asset to alter the at least one restricted image within the at least one media asset based at least partially on at least one determined preference comprises:
circuitry configured to delete the at least one restricted image from the at least one media asset, including at least deleting the at least one restricted image while maintaining a general presentation context of the at least one media asset.

15. The system of claim 2, wherein circuitry configured to modify the at least one media asset to alter the at least one restricted image within the at least one media asset based at least partially on at least one determined preference comprises:
circuitry configured to replace the at least one restricted image with at least one replacement image selected from at least one database of replacement images that are known to include at least one shared attribute of the at least one restricted image.

16. The system of claim 2, further comprising:
circuitry configured to determine whether one or more of at least one payment, at least some compensation, or at least one other consideration has been received for the modifying at least one media asset to alter the at least one restricted image.

17. The system of claim 2, wherein circuitry configured to determine at least one restricted image within the at least one media asset based at least partially on at least one concurrent image also within the at least one media asset, including at least determining at least one restriction related to at least one subject depicted in the at least one restricted image where the at least one media asset also includes the at least one concurrent image comprises:
circuitry configured to associate at least a portion of the at least one media asset with a user capture device used to capture the at least one media asset.

18. The system of claim 17, wherein circuitry configured to associate at least a portion of the at least one media asset with a user capture device used to capture the at least one media asset comprises:
circuitry configured to recognize metadata associated with the at least one media asset to associate at least a portion of the at least one media asset with a user capture device used to capture the at least one media asset.

19. The system of claim 2, wherein circuitry configured to modify the at least one media asset to alter the at least one restricted image within the at least one media asset based at least partially on at least one determined preference comprises:
circuitry configured to anonymize the at least one restricted image within the at least one media asset, wherein the at least one restricted image portrays an object.

20. The system of claim 19, wherein circuitry configured to anonymize the at least one restricted image within the at least one media asset, wherein the at least one restricted image portrays an object comprises:
circuitry configured to anonymize the at least one restricted image within the at least one media asset, wherein the restricted image portrays at least one of a physical place, a public landmark, a private landmark, a building, a sports arena, a car, a type of car, a work of art, an animal, a computer, a computing device, a piece of jewelry, or a piece of clothing.

21. The system of claim 2, wherein circuitry configured to identify at least one real-world entity associated with the at least one subject depicted in the at least one restricted image, the at least one real-world entity including one or more of at least one person, at least one group, or at least one entity related to the at least one subject depicted in the at least one restricted image comprises:

circuitry configured to identify at least one real-world entity associated with one or more of at least one brand, at least one trademark, at least one service mark, or at least one trade logo related to the at least one subject depicted in the at least one restricted image.

22. The system of claim 2, wherein circuitry configured to determine at least one preference of the at least one real-world entity associated with the at least one subject depicted in the at least one restricted image, the at least one preference related to the at least one subject and the at least one concurrent image within the at least one media asset comprises:

circuitry configured to determine at least one image restriction criterion for producing at least one modified media asset based at least partially on receiving the at least one media asset.

23. The system of claim 2, wherein circuitry configured to identify at least one real-world entity associated with the at least one subject depicted in the at least one restricted image, the at least one real-world entity including one or more of at least one person, at least one group, or at least one entity related to the at least one subject depicted in the at least one restricted image comprises:

circuitry configured to identify at least one robotic user configured for producing at least one modified media asset based at least partially on receiving the at least one media asset, including at least determining at least one image restriction criterion accessible to the at least one robotic user, the determined at least one image restriction criterion related to at least one subject depicted in the at least one restricted image within the at least one media asset.

24. The system of claim 2, wherein circuitry configured to modify the at least one media asset to alter the at least one restricted image within the at least one media asset based at least partially on at least one determined preference comprises:

circuitry configured to obtain at least one group of related content elements capable of collective incorporation in the at least one media asset.

25. The system of claim 2, wherein circuitry configured to determine at least one restricted image within the at least one media asset based at least partially on at least one concurrent image also within the at least one media asset, including at least determining at least one restriction related to at least one subject depicted in the at least one restricted image where the at least one media asset also includes the at least one concurrent image comprises:

circuitry configured to confirm expiration of at least one primary authorization right associated with media assets including at least one subject depicted in the at least one restricted image and at least one subject of the at least one concurrent image.

26. The system of claim 25, wherein circuitry configured to confirm expiration of at least one primary authorization right associated with media assets including at least one subject depicted in the at least one restricted image and at least one subject of the at least one concurrent image comprises:

circuitry configured to confirm expiration of at least one license for use of the at least one subject depicted in the at least one restricted image concurrently with the at least one subject of the at least one concurrent image.

27. The system of claim 2, wherein circuitry configured to determine at least one restricted image within the at least one media asset based at least partially on at least one concurrent image also within the at least one media asset, including at least determining at least one restriction related to at least one subject depicted in the at least one restricted image where the at least one media asset also includes the at least one concurrent image comprises:

circuitry configured to determine at least one restricted image within the at least one media asset based at least partially on at least one concurrent image also within the at least one media asset, including at least determining at least one restriction related to at least one subject depicted in the at least one restricted image, the at least one subject at least one of publicizing, promoting, or advertising at least one aspect associated with the at least one real-world entity.

28. The system of claim 27, wherein circuitry configured to determine at least one restricted image within the at least one media asset based at least partially on at least one concurrent image also within the at least one media asset, including at least determining at least one restriction related to at least one subject depicted in the at least one restricted image, the at least one subject at least one of publicizing, promoting, or advertising at least one aspect associated with the at least one real-world entity comprises:

circuitry configured to determine the at least one restriction related to at least one subject depicted in the at least one restricted image, the at least one subject at least one of publicizing, promoting, or advertising at least one aspect associated with the at least one real-world entity, the at least one aspect including one or more of at least one person, at least one product, at least one service, at least one activity, at least one campaign, at least one organization, at least one business, at least one topic, or at least one event.

29. The system of claim 2, wherein circuitry configured to determine at least one restricted image within the at least one media asset based at least partially on at least one concurrent image also within the at least one media asset, including at least determining at least one restriction related to at least one subject depicted in the at least one restricted image where the at least one media asset also includes the at least one concurrent image comprises:

circuitry configured to determine at least one restricted image within the at least one media asset based at least partially on at least one concurrent image also within the at least one media asset, including at least determining one or more of the at least one restricted image or the at least one concurrent image from at least one news article naming at least one person portrayed in the at least one news article as the at least one media asset.

30. The system of claim 2, wherein circuitry configured to determine at least one restricted image within the at least one media asset based at least partially on at least one concurrent image also within the at least one media asset, including at least determining at least one restriction related to at least one subject depicted in the at least one restricted image where the at least one media asset also includes the at least one concurrent image comprises:

circuitry configured to determine at least one restriction on images portraying at least one human subject of the at least one restricted image in at least one location associated with the at least one concurrent image.

31. The system of claim 2, wherein circuitry configured to modify the at least one media asset to alter the at least one restricted image within the at least one media asset based at least partially on at least one determined preference comprises:

circuitry configured to modify the at least one media asset to anonymize at least one subject depicted in the at least one restricted image while maintaining a general presentation context of the at least one concurrent image where the system has determined a restriction on media assets including the at least one subject depicted in the at least one restricted image in at least one location associated with the at least one concurrent image.

32. The system of claim 2, wherein circuitry configured to identify at least one real-world entity associated with the at least one subject depicted in the at least one restricted image, the at least one real-world entity including one or more of at least one person, at least one group, or at least one entity related to the at least one subject depicted in the at least one restricted image comprises:

circuitry configured to identify one or more of at least one entity associated with capture of the at least one media asset, at least one entity associated with review of the at least one media asset, or at least one entity associated with receipt of the at least one media asset.

33. The system of claim 2, wherein circuitry configured to determine at least one preference of the at least one real-world entity associated with the at least one subject depicted in the at least one restricted image, the preference related to the at least one subject and the at least one concurrent image within the at least one media asset comprises:

circuitry configured to determine whether the at least one real-world entity authorizes output of the at least one media asset including at least portrayals of both of at least one subject depicted in the at least one restricted image and at least one subject of the at least one concurrent image and, if the at least one real-world entity does not authorize output of the at least one media asset including at least portrayals of both of at least one subject depicted in the at least one restricted image and at least one subject of the at least one concurrent image, signaling to anonymize the at least one subject depicted in the at least one restricted image of the at least one media asset while maintaining at least one original state of the at least one concurrent image.

34. The system of claim 2, wherein the circuitry configured to receive at least one media asset, the circuitry configured to determine at least one restricted image within the at least one media asset based at least partially on at least one concurrent image also within the at least one media asset, including at least determining at least one restriction related to at least one subject depicted in the at least one restricted image where the at least one media asset also includes the at least one concurrent image, the circuitry configured to identify at least one real-world entity associated with the at least one subject depicted in the at least one restricted image, the at least one real-world entity including one or more of at least one person, at least one group, or at least one entity related to the at least one subject depicted in the at least one restricted image, the circuitry configured to determine at least one preference of the at least one real-world entity associated with the at least one subject depicted in the at least one restricted image, the at least one preference related to the at least one subject and the at least one concurrent image within the at least one media asset, the circuitry configured to modify the at least one media asset to alter the at least one restricted image within the at least one media asset based at least partially on at least one determined preference, and the circuitry configured to output the modified at least one media asset including at least the altered at least one restricted image are effected in at least one image capture device associated with capture of the at least one media asset.

35. The system of claim 2, wherein circuitry configured to modify the at least one media asset to alter the at least one restricted image within the at least one media asset based at least partially on at least one determined preference comprises:

circuitry configured to modify the at least one media asset, including at least modifying the at least one media asset by at least one image capture device associated with capture of the at least one media asset.

36. A computer program product for implementing preferred image modification, comprising:

at least one non-transitory computer-readable medium including at least one or more instructions for:
receiving at least one media asset;
determining at least one restricted image within the at least one media asset based at least partially on at least one concurrent image also within the at least one media asset, including at least determining at least one restriction related to at least one subject depicted in the at least one restricted image where the at least one media asset also includes the at least one concurrent image;
identifying at least one real-world entity associated with the at least one subject depicted in the at least one restricted image, the at least one real-world entity including one or more of at least one person, at least one group, or at least one entity related to the at least one subject depicted in the at least one restricted image;
determining at least one preference of the at least one real-world entity associated with the at least one subject depicted in the at least one restricted image, the at least one preference related to the at least one subject and the at least one concurrent image within the at least one media asset;
modifying the at least one media asset to alter the at least one restricted image within the at least one media asset based at least partially on at least one determined preference; and
outputting the modified at least one media asset including at least the altered at least one restricted image.

37. A system for implementing preferred image modification, comprising:
one or more computing devices; and
one or more instructions that when executed on at least some of the one or more computing devices cause at least one of the one or more computing devices to perform one or more operations including at least:
receiving at least one media asset;
determining at least one restricted image within the at least one media asset based at least partially on at least one concurrent image also within the at least one media asset, including at least determining at least one restriction related to at least one subject depicted in the at least one restricted image where the at least one media asset also includes the at least one concurrent image;

identifying at least one real-world entity associated with the at least one subject depicted in the at least one restricted image, the at least one real-world entity including one or more of at least one person, at least one group, or at least one entity related to the at least one subject depicted in the at least one restricted image;

determining at least one preference of the at least one real-world entity associated with the at least one subject depicted in the at least one restricted image, the at least one preference related to the at least one subject and the at least one concurrent image within the at least one media asset;

modifying the at least one media asset to alter the at least one restricted image within the at least one media asset based at least partially on at least one determined preference; and outputting the modified at least one media asset including at least the altered at least one restricted image.

38. The system of claim 37, wherein the one or more computing devices comprise:

at least one of personal digital assistant (PDA), a personal entertainment device, a mobile phone, a laptop computer, a tablet personal computer, a networked computer, or a computing system including at least a cluster of processors.

39. The system of claim 37, wherein the one or more computing devices are operable to perform the one or more operations from at least one memory.

* * * * *